(12) United States Patent
Mihara et al.

(10) Patent No.: US 6,995,922 B2
(45) Date of Patent: Feb. 7, 2006

(54) ZOOM LENS AND ELECTRONIC IMAGING APPARATUS HAVING THE SAME

(75) Inventors: Shinichi Mihara, Tama (JP); Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 47 days.

(21) Appl. No.: 10/750,798

(22) Filed: Jan. 5, 2004

(65) Prior Publication Data

US 2004/0201902 A1 Oct. 14, 2004

(30) Foreign Application Priority Data

| Jan. 10, 2003 | (JP) | ............................. 2003-004737 |
| Jan. 31, 2003 | (JP) | ............................. 2003-024494 |
| Feb. 28, 2003 | (JP) | ............................. 2003-054666 |
| Mar. 4, 2003 | (JP) | ............................. 2003-057592 |

(51) Int. Cl.
*G02B 15/14* (2006.01)

(52) U.S. Cl. ..................... 359/689; 359/690; 359/676

(58) Field of Classification Search ............... 359/689, 359/690, 676
See application file for complete search history.

(56) References Cited

U.S. PATENT DOCUMENTS

| 4,059,344 | A | * | 11/1977 | Yamasita ..................... 359/783 |
| 5,193,030 | A | * | 3/1993 | Nozaki et al. ............... 359/687 |
| 5,905,530 | A | | 5/1999 | Yokota et al. ............... 348/240 |
| 6,016,228 | A | | 1/2000 | Uzawa ......................... 359/687 |
| 6,124,987 | A | | 9/2000 | Kayanuma et al. ......... 359/692 |
| 6,185,048 | B1 | | 2/2001 | Ishii et al. ................... 359/687 |
| 6,308,011 | B1 | | 10/2001 | Wachi et al. ................. 396/72 |
| 6,331,917 | B1 | | 12/2001 | Ishii et al. ................... 359/687 |
| 6,728,482 | B2 | * | 4/2004 | Hagimori et al. ............. 396/72 |
| 6,744,571 | B2 | * | 6/2004 | Ishii et al. ................... 359/795 |
| 2002/0057502 | A1 | | 5/2002 | Ishii et al. ................... 359/687 |

FOREIGN PATENT DOCUMENTS

| JP | 08-248318 | 9/1996 |
| JP | 09-211287 | 8/1997 |
| JP | 10-020191 | 1/1998 |

(Continued)

*Primary Examiner*—Georgia Epps
*Assistant Examiner*—M. Hasan
(74) *Attorney, Agent, or Firm*—Kenyon & Kenyon

(57) ABSTRACT

An optical apparatus is provided with a zoom optical system. The zoom optical system includes a lens unit located at the most object-side position and a moving lens unit with positive refracting power, located on the image side of the lens unit. The lens unit includes a single positive lens and the moving lens unit is simply moved toward the object side when the magnification of the zoom lens is changed in the range from a wide-angle position to a telephoto position so as to satisfy the following condition:

$$0.8 < y_{07}/(fw \cdot \tan \omega_{07w}) < 0.96$$

where fw is the focal length of the entire system of the zoom lens at the wide-angle position, $y_{07}$ is an image height expressed by $0.7 \times y_{10}$, where $y_{10}$ is a distance from the center to a point farthest therefrom on the effective imaging surface of an electronic image sensor, and $\omega_{07w}$ is an angle made by a direction of an object point with an optical axis, where the object point corresponds to an image point that is at the point $y_{07}$ away from the center on the effective imaging surface of the electronic image sensor at the wide angle position.

34 Claims, 91 Drawing Sheets

FOREIGN PATENT DOCUMENTS

| | | |
|---|---|---|
| JP | 11-160739 | 6/1999 |
| JP | 11-194274 | 7/1999 |
| JP | 2000-131610 | 5/2000 |
| JP | 2000-187159 | 7/2000 |
| JP | 2000-187160 | 7/2000 |
| JP | 2002-169088 | 6/2002 |

* cited by examiner

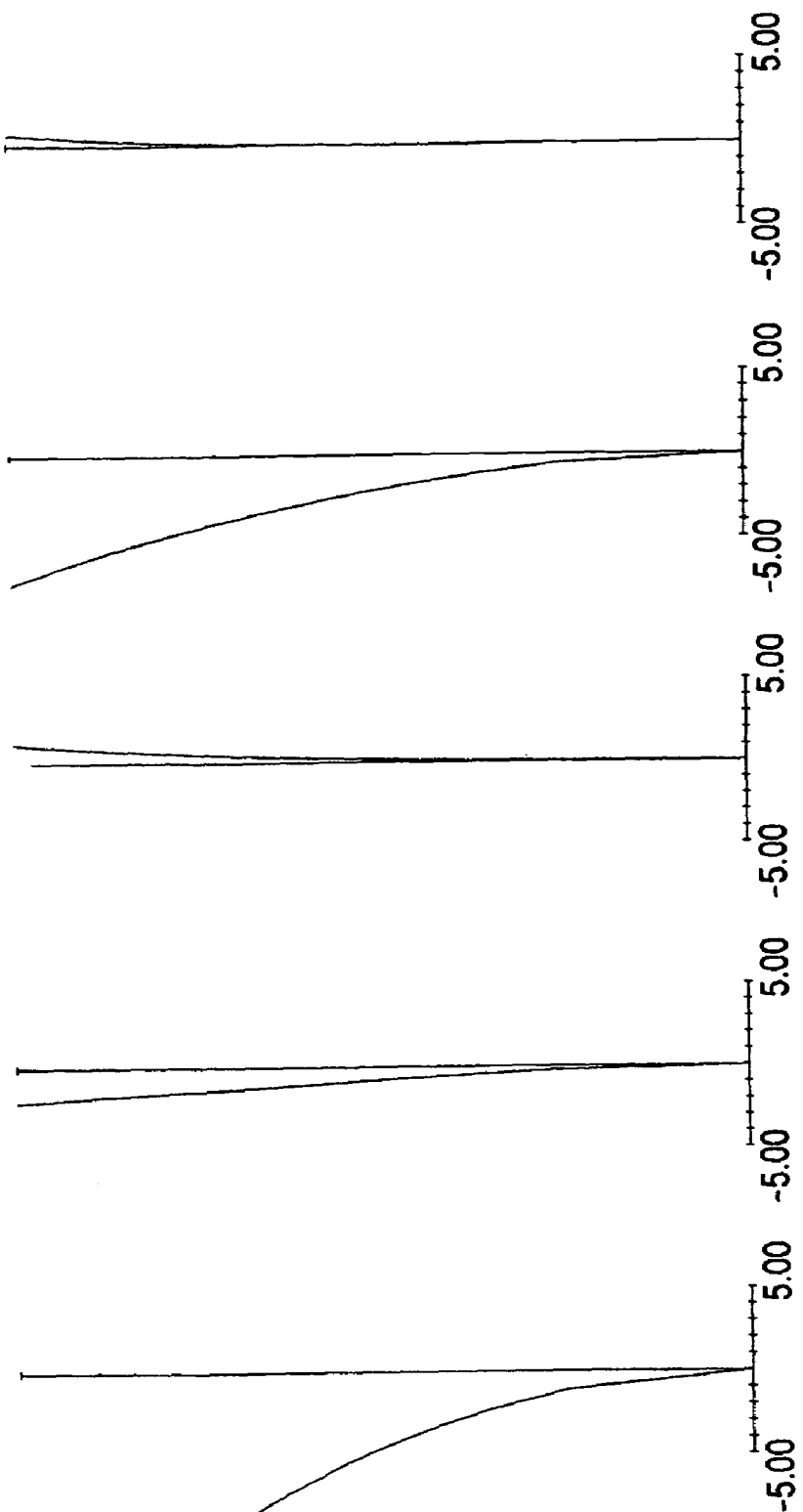

SPHERICAL
ABERRATION
FNO 2.849

-0.10    0.10

ASTIGMATISM
IH 2.50

-0.10    0.10

DISTORTION
IH 2.50

-5.00    5.00

CHROMATIC
ABERRATION OF
MAGNIFICATION
IH 2.50

-0.01    0.01

SPHERICAL
ABERRATION
FNO 3.506

-0.10    0.10

ASTIGMATISM
IH 2.50

-0.10    0.10

DISTORTION
IH 2.50

-5.00    5.00

CHROMATIC
ABERRATION OF
MAGNIFICATION
IH 2.50

-0.01    0.01

SPHERICAL
ABERRATION
FNO 4.381

-0.10    0.10

ASTIGMATISM
IH 2.50

-0.10    0.10

DISTORTION
IH 2.50

-5.00    5.00

CHROMATIC
ABERRATION OF
MAGNIFICATION
IH 2.50

-0.01    0.01

SPHERICAL ABERRATION

FNO 3.143

ASTIGMATISM

IH 2.50

DISTORTION

IH 2.50

CHROMATIC ABERRATION OF MAGNIFICATION

IH 2.50

SPHERICAL ABERRATION

FNO 3.831

ASTIGMATISM

IH 2.50

DISTORTION

IH 2.50

CHROMATIC ABERRATION OF MAGNIFICATION

IH 2.50

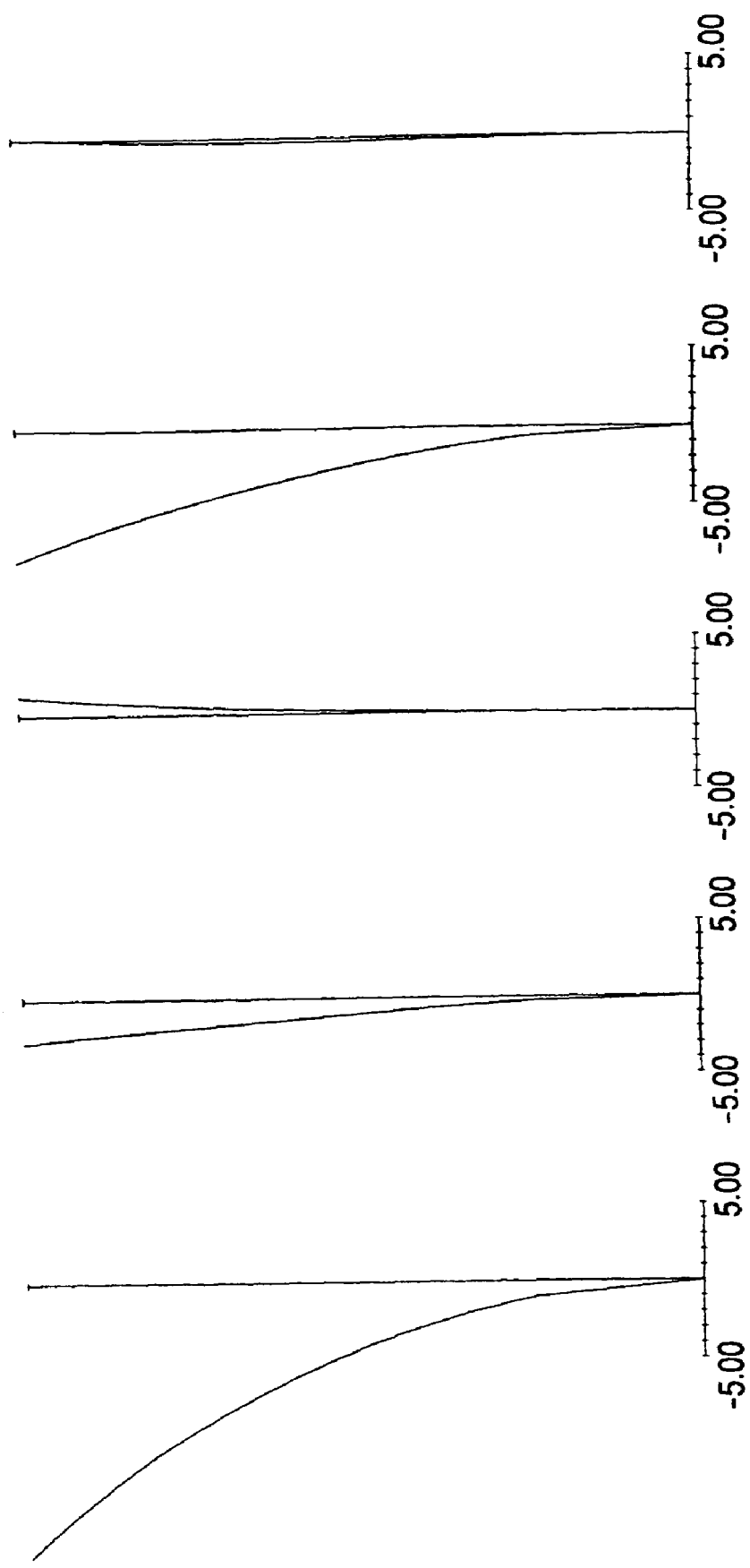

SPHERICAL ABERRATION
FNO 2.800

-0.10   0.10

ASTIGMATISM
IH 2.50

-0.10   0.10

DISTORTION
IH 2.50

-5.00   5.00

CHROMATIC ABERRATION OF MAGNIFICATION
IH 2.50

-0.01   0.01

SPHERICAL ABERRATION
FNO 3.506

-0.10   0.10

ASTIGMATISM
IH 2.50

-0.10   0.10

DISTORTION
IH 2.50

-5.00   5.00

CHROMATIC ABERRATION OF MAGNIFICATION
IH 2.50

-0.01   0.01

SPHERICAL ABERRATION
FNO 4.381

-0.10   0.10

ASTIGMATISM
IH 2.50

-0.10   0.10

DISTORTION
IH 2.50

-5.00   5.00

CHROMATIC ABERRATION OF MAGNIFICATION
IH 2.50

-0.01   0.01

SPHERICAL
ABERRATION
FNO 3.143

ASTIGMATISM
IH 2.50

DISTORTION
IH 2.50

CHROMATIC
ABERRATION OF
MAGNIFICATION
IH 2.50

SPHERICAL
ABERRATION
FNO 3.831

ASTIGMATISM
IH 2.50

DISTORTION
IH 2.50

CHROMATIC
ABERRATION OF
MAGNIFICATION
IH 2.50

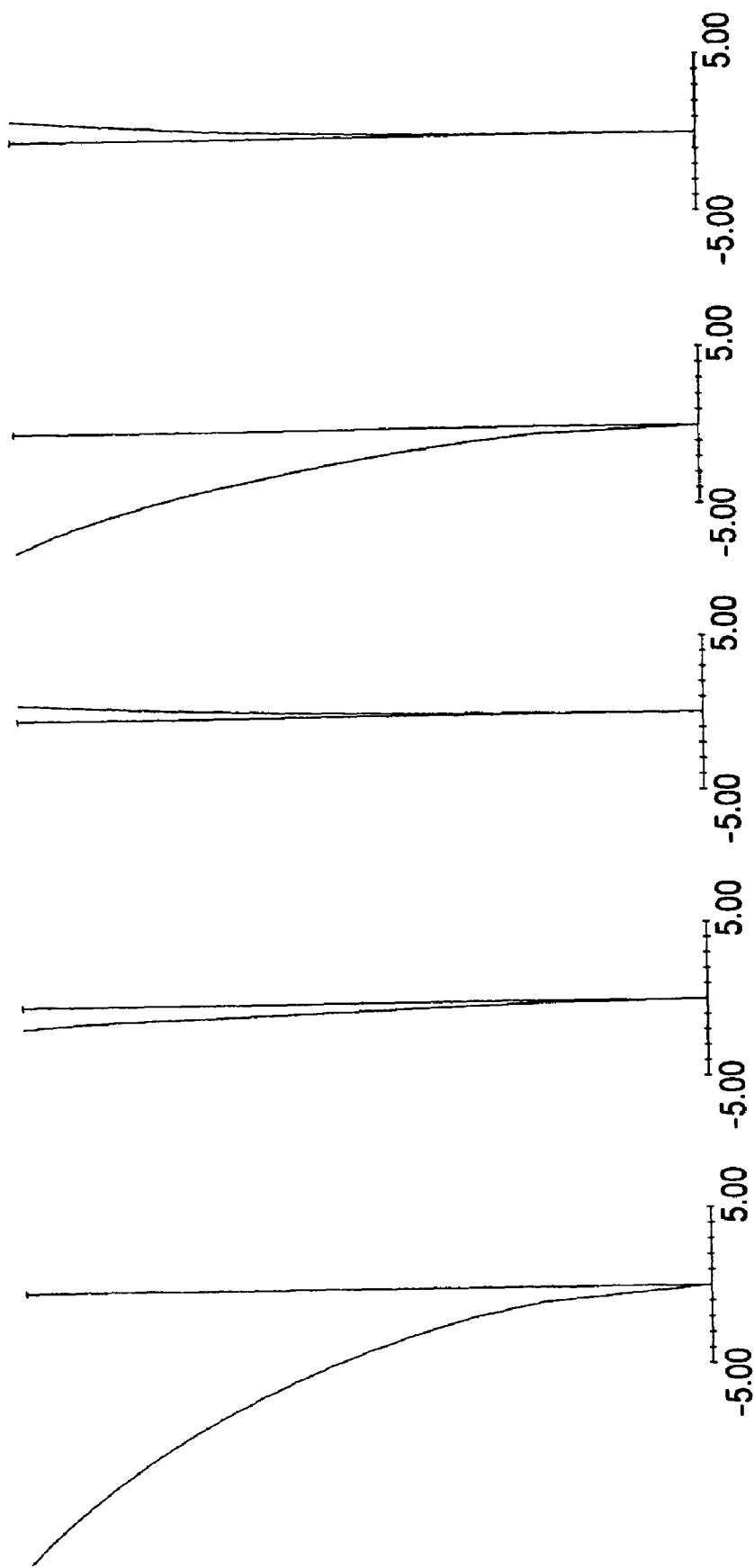

SPHERICAL ABERRATION
FNO 2.860

-0.10    0.10

ASTIGMATISM
IH 2.50

ΔM    ΔS

-0.10    0.10

DISTORTION
IH 2.50

-5.00    5.00

CHROMATIC ABERRATION OF MAGNIFICATION
IH 2.50

-0.01    0.01

SPHERICAL ABERRATION
FNO 3.506

-0.10    0.10

ASTIGMATISM
IH 2.50

ΔM    ΔS

-0.10    0.10

DISTORTION
IH 2.50

-5.00    5.00

CHROMATIC ABERRATION OF MAGNIFICATION
IH 2.50

-0.01    0.01

SPHERICAL ABERRATION
FNO 4.381

-0.10    0.10

ASTIGMATISM
IH 2.50

ΔS    ΔM

-0.10    0.10

DISTORTION
IH 2.50

-5.00    5.00

CHROMATIC ABERRATION OF MAGNIFICATION
IH 2.50

-0.01    0.01

FIG.18A  FIG.18B  FIG.18C  FIG.18D
SPHERICAL ABERRATION / ASTIGMATISM / DISTORTION / CHROMATIC ABERRATION OF MAGNIFICATION
FNO 3.143  IH 2.50  IH 2.50  IH 2.50
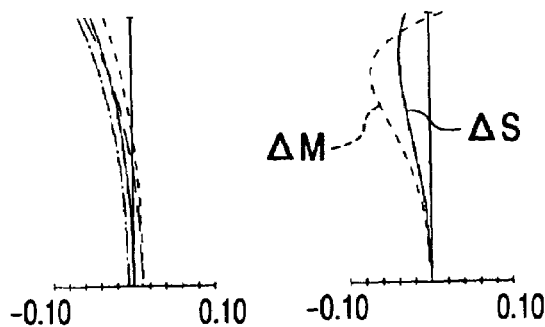
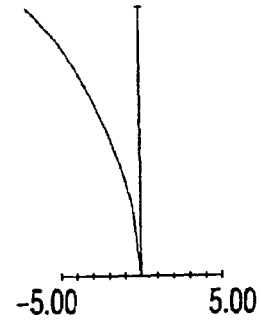
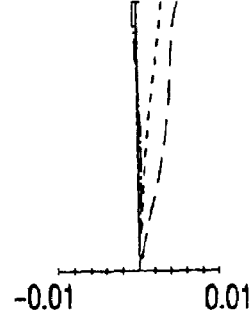
FIG.18E  FIG.18F  FIG.18G  FIG.18H
SPHERICAL ABERRATION / ASTIGMATISM / DISTORTION / CHROMATIC ABERRATION OF MAGNIFICATION
FNO 3.831  IH 2.50  IH 2.50  IH 2.50
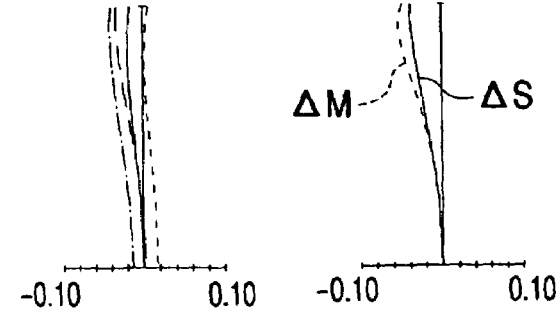
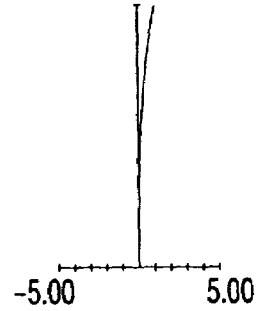
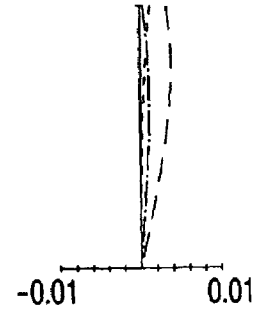

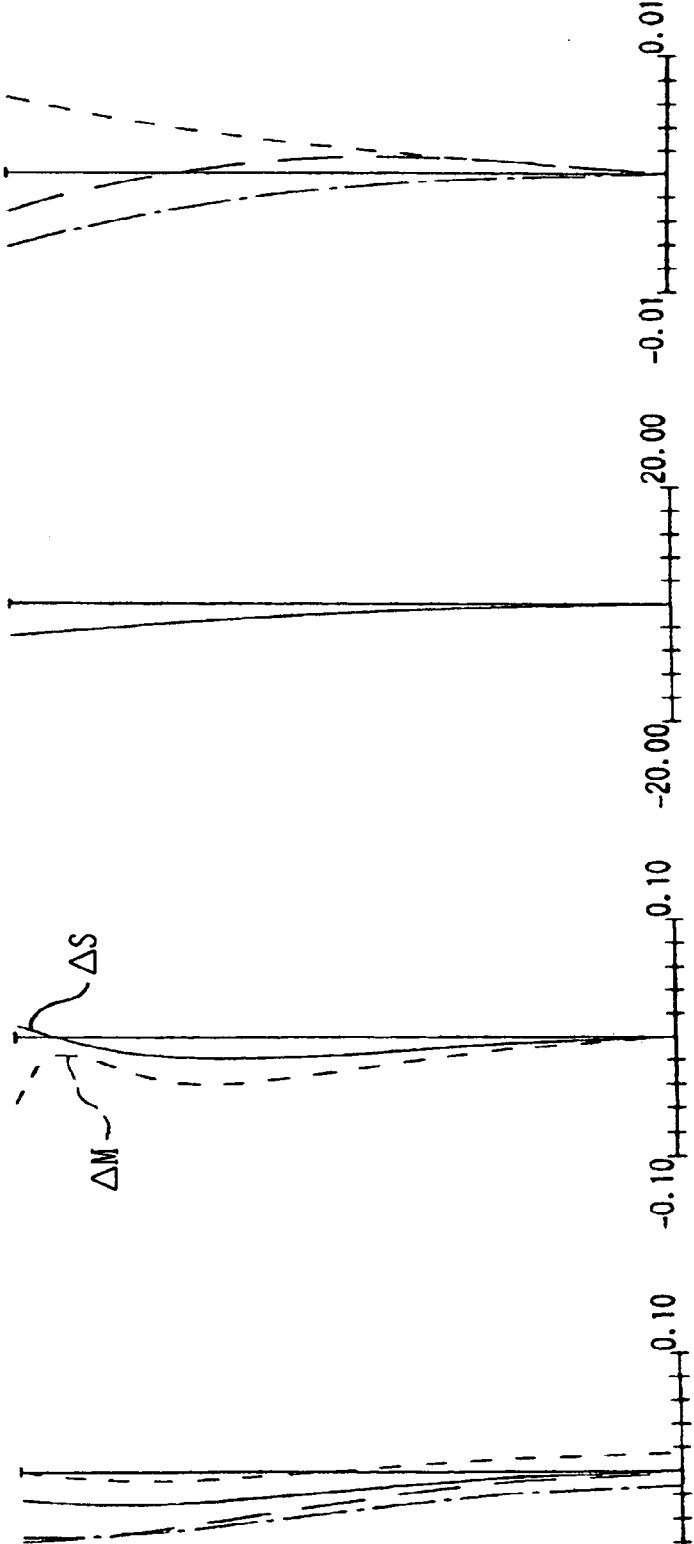

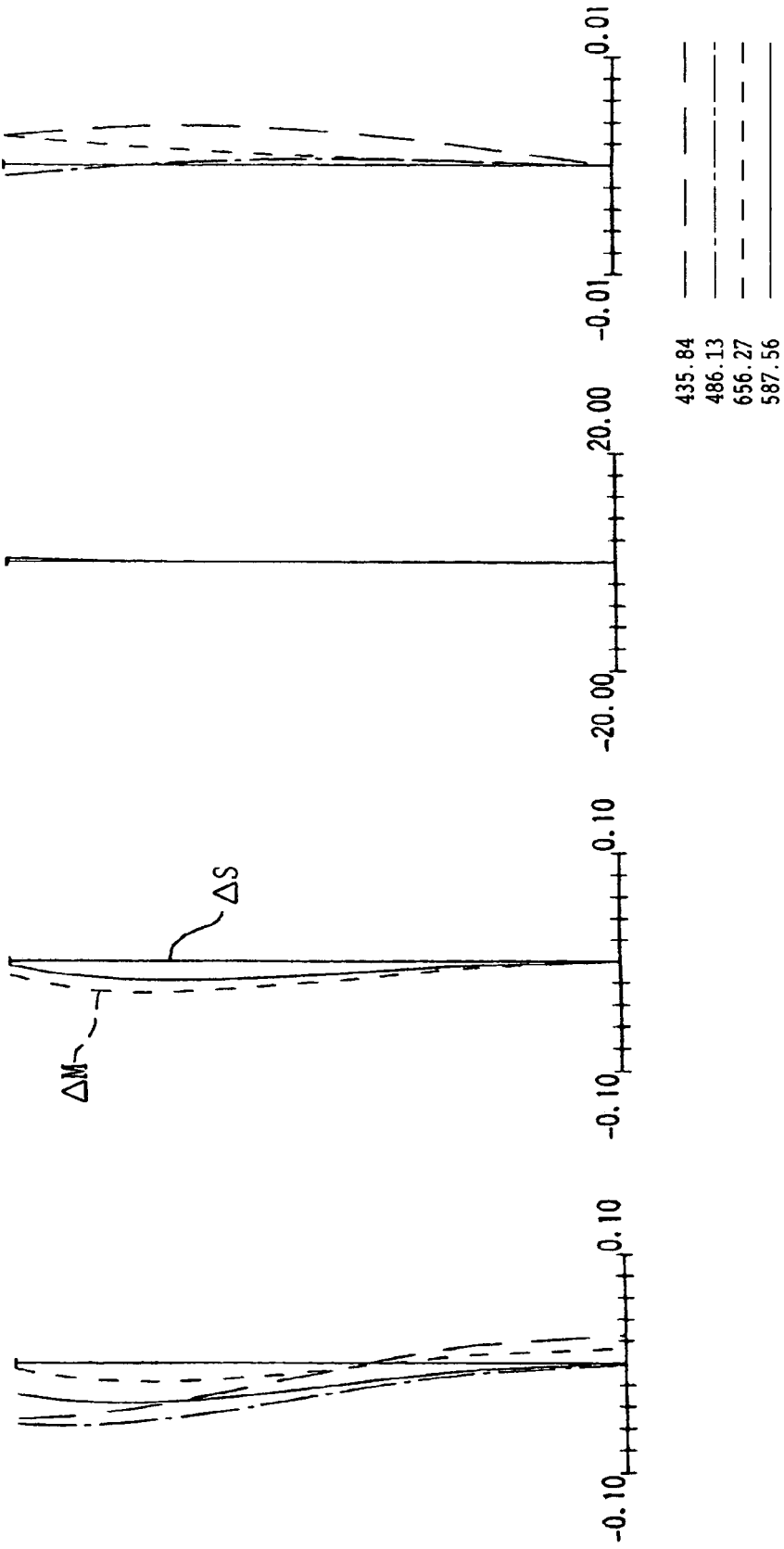

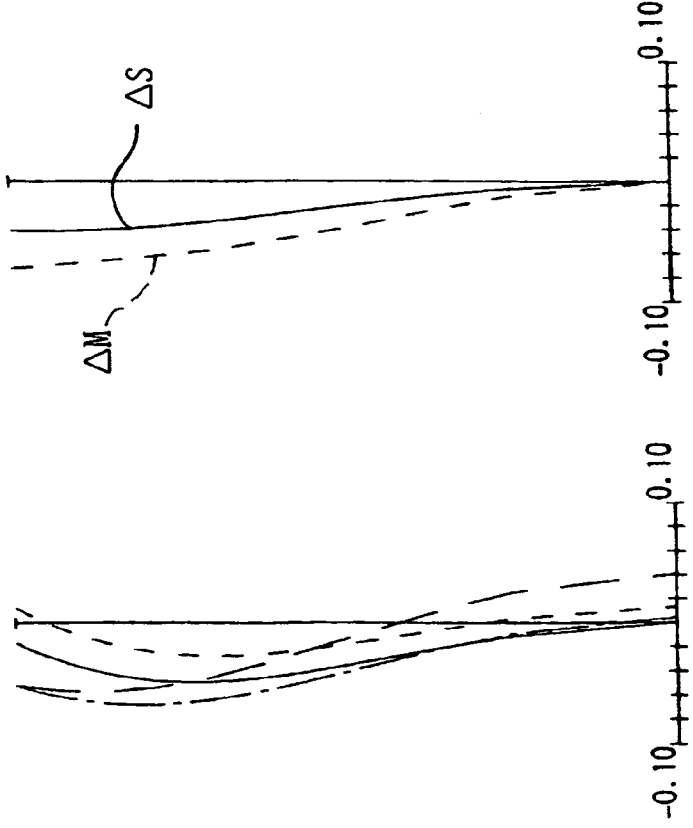

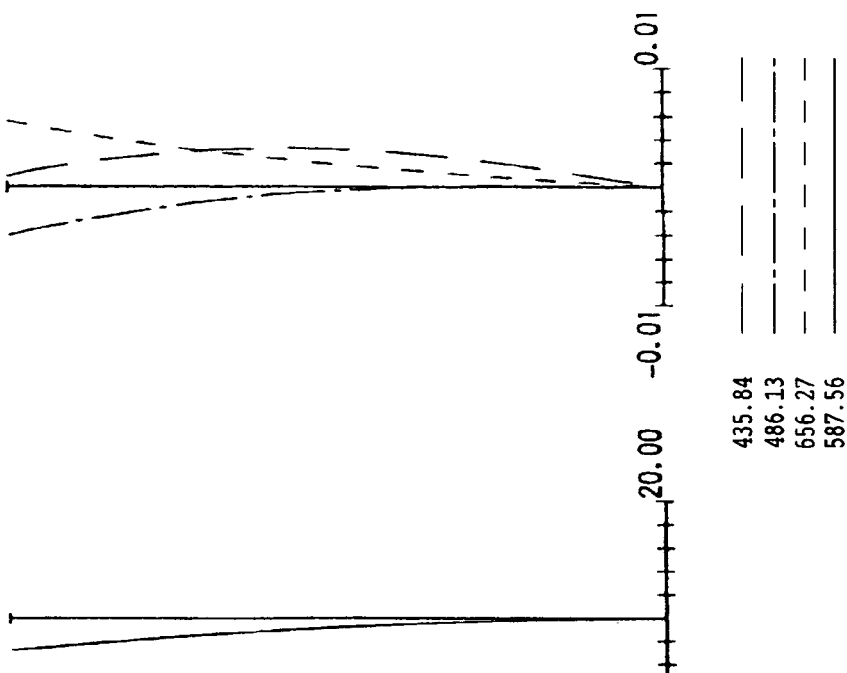
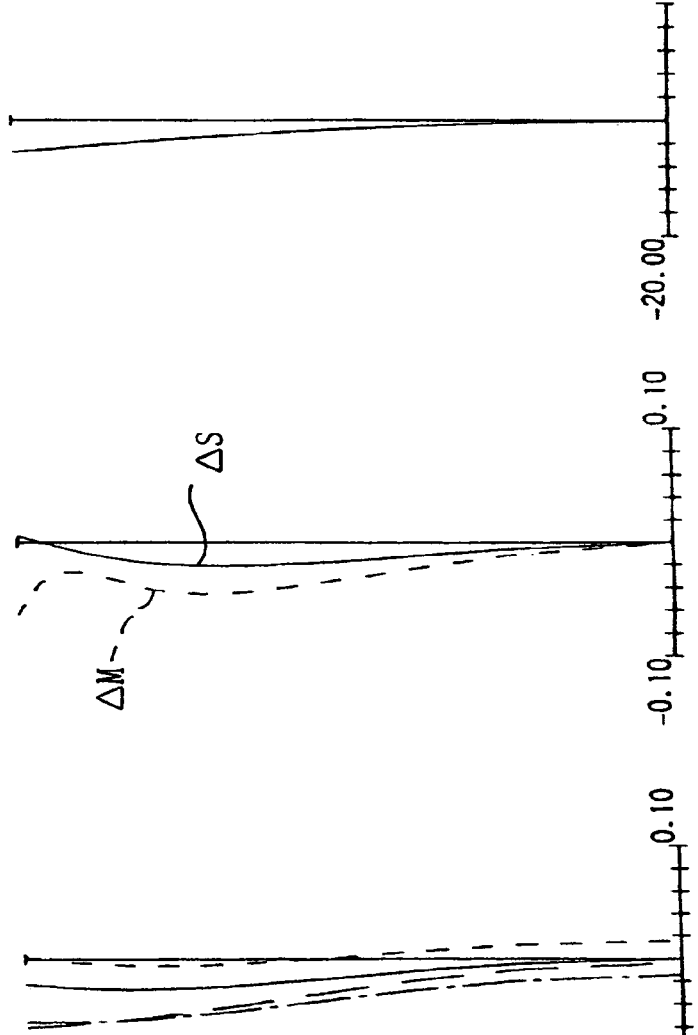

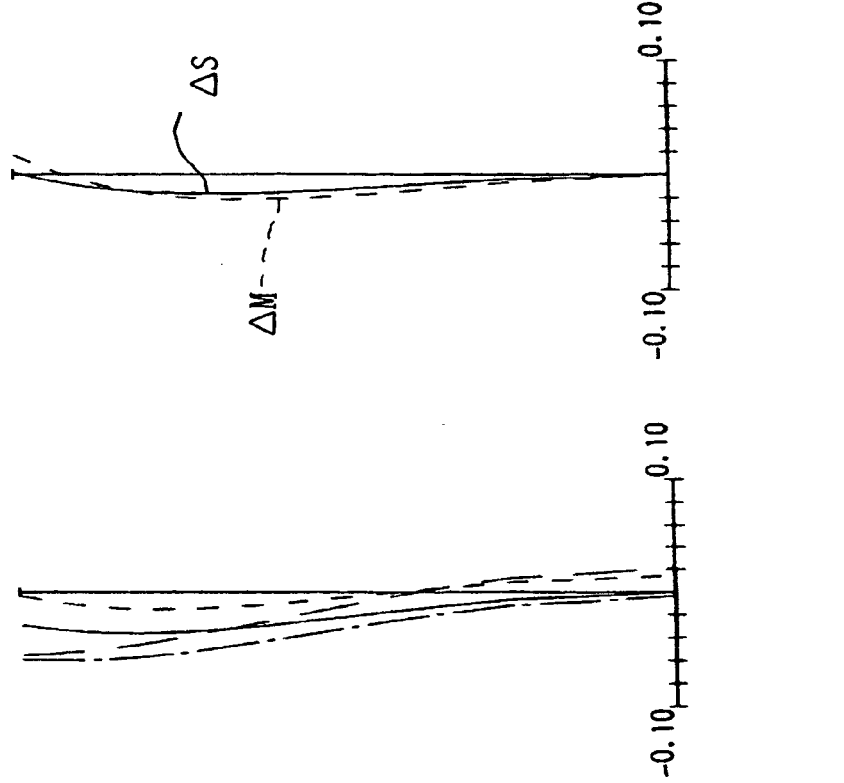

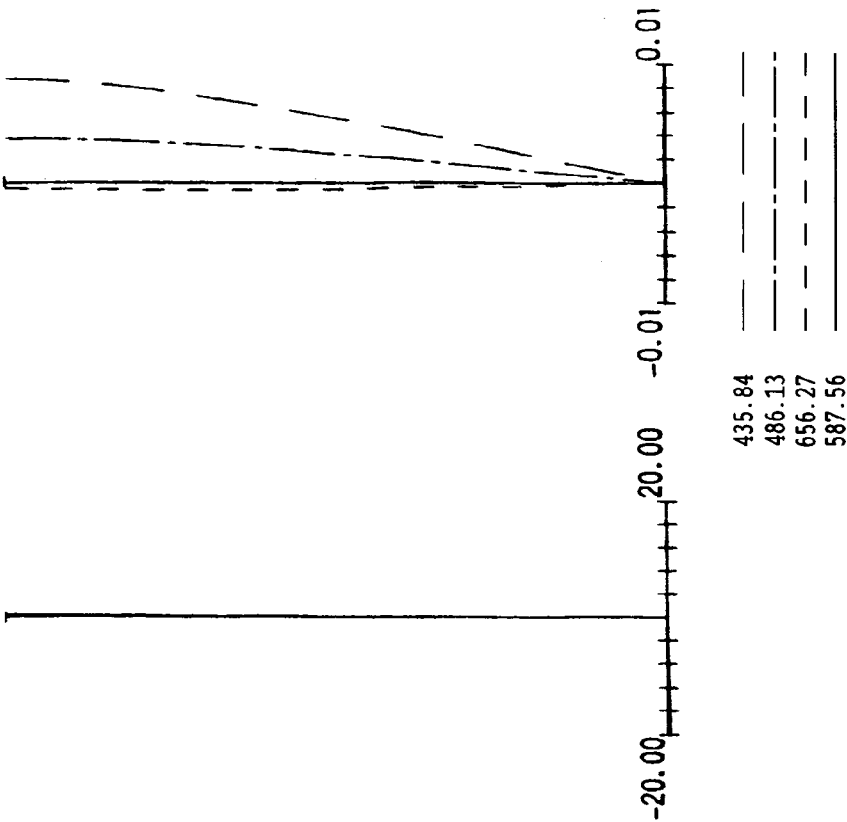
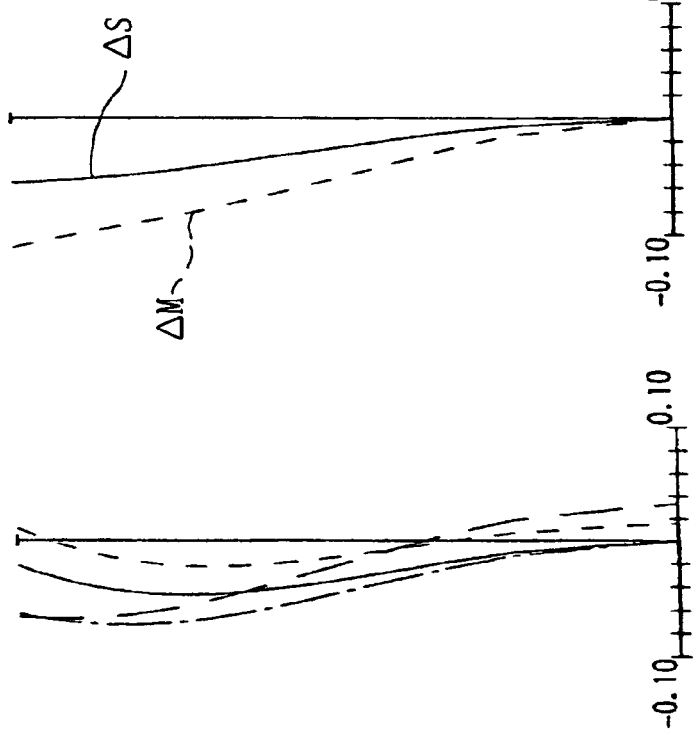

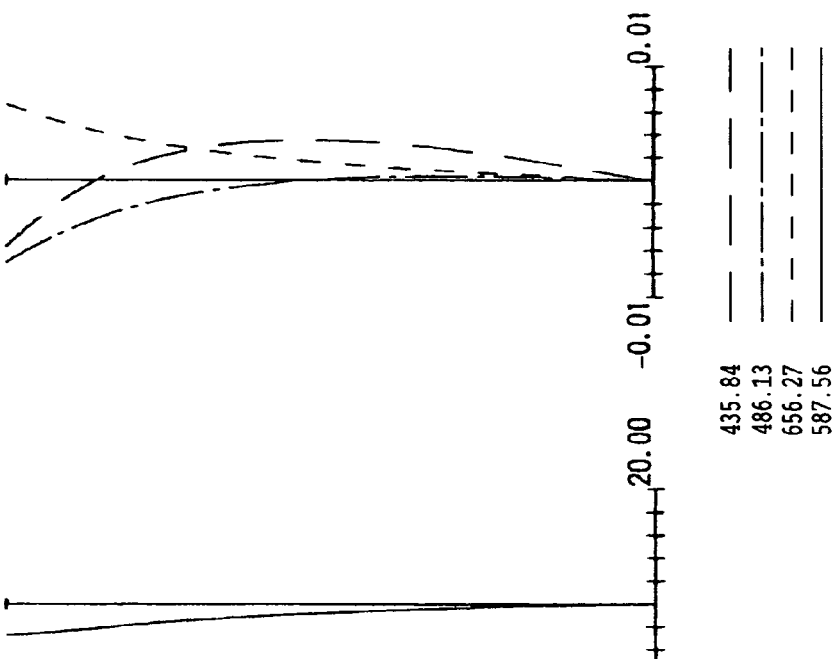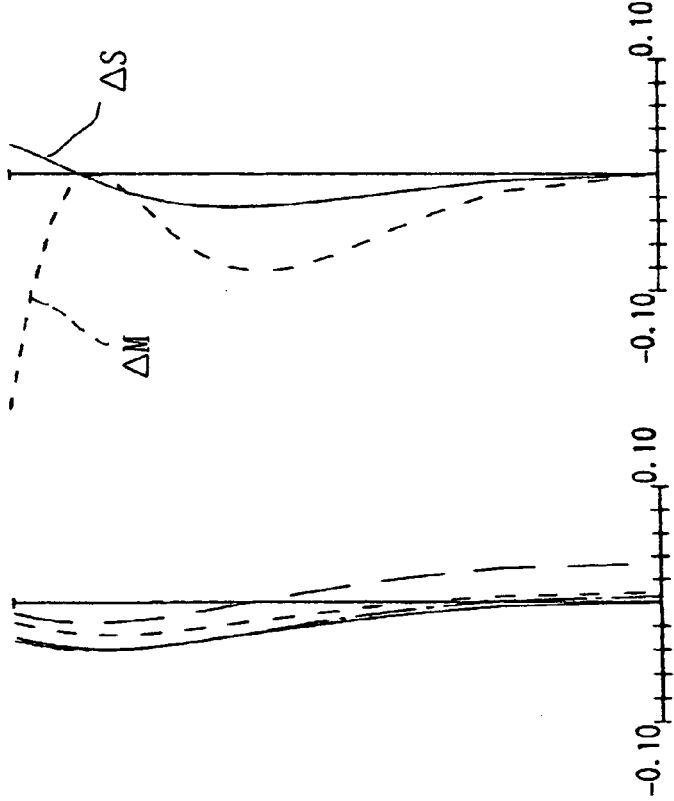

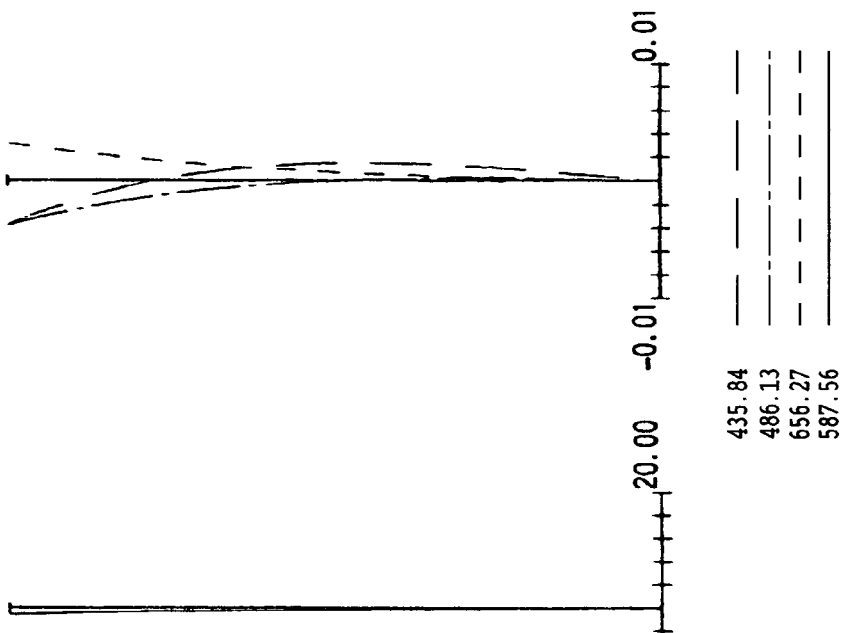
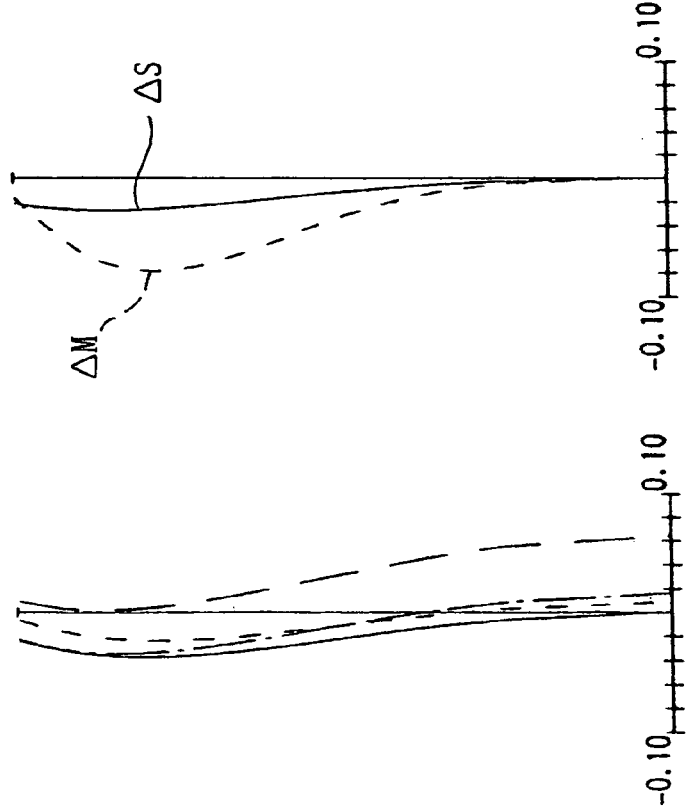
FIG. 27E SPHERICAL ABERRATION FNO 3.837
FIG. 27F ASTIGMATISM IH 2.70
FIG. 27G DISTORTION IH 2.70
FIG. 27H CHROMATIC ABERRATION OF MAGNIFICATION IH 2.70
435.84
486.13
656.27
587.56

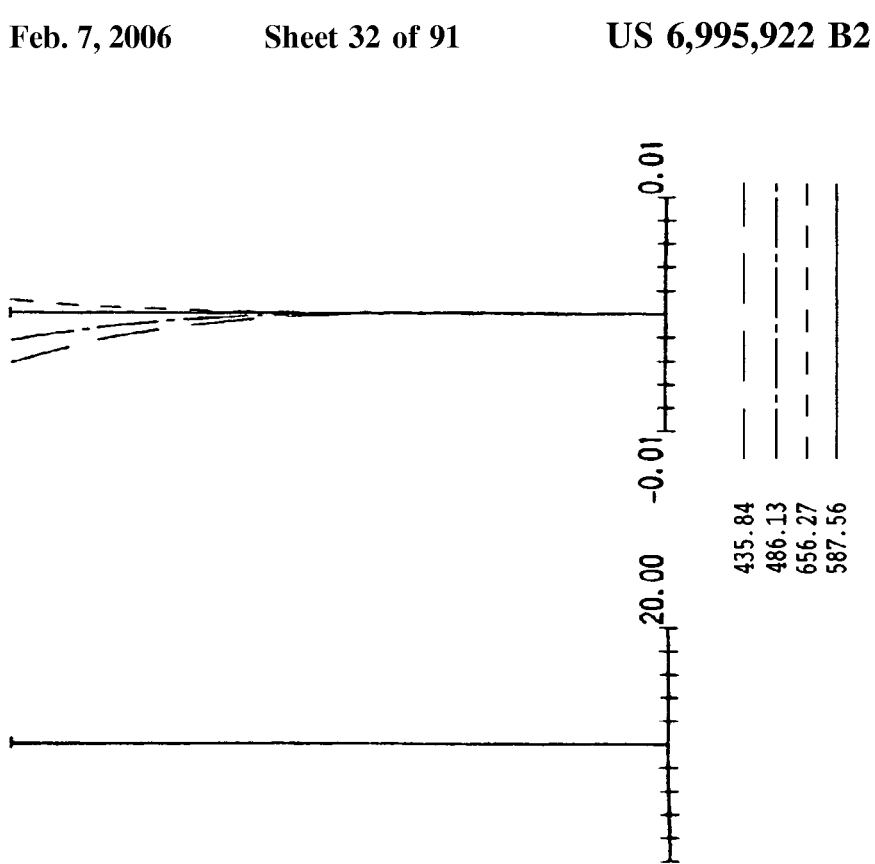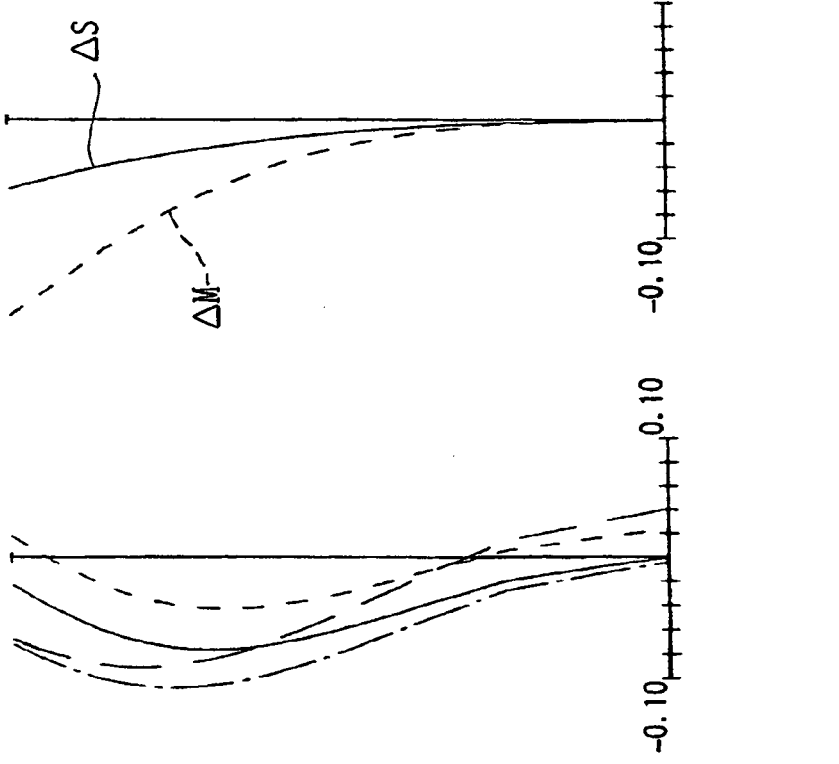

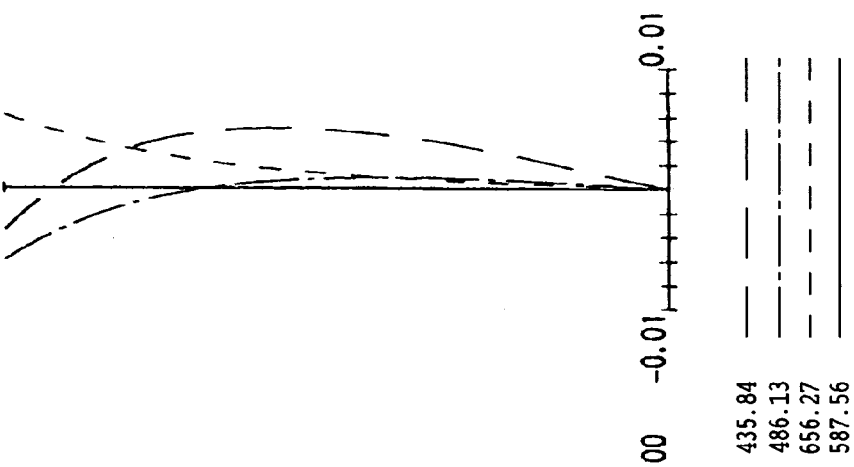
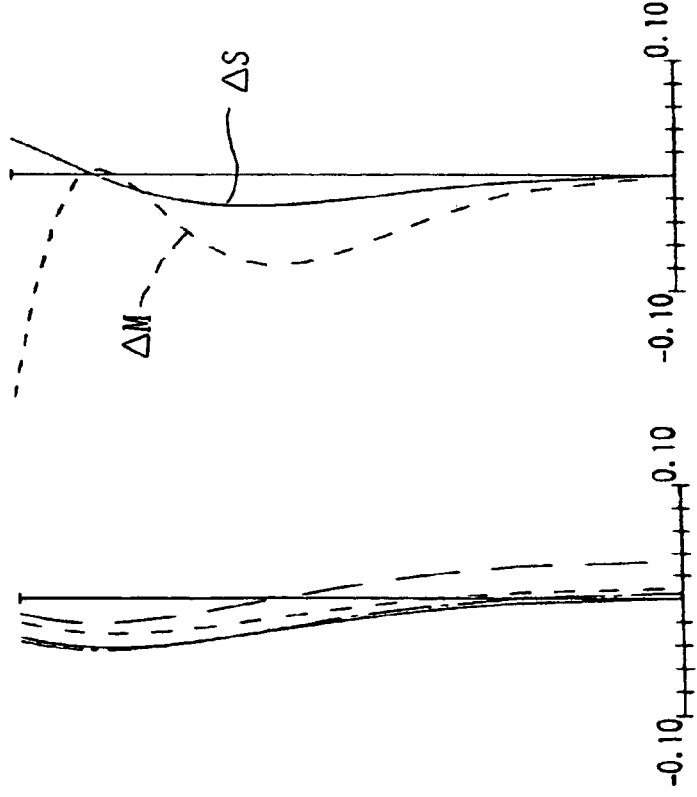

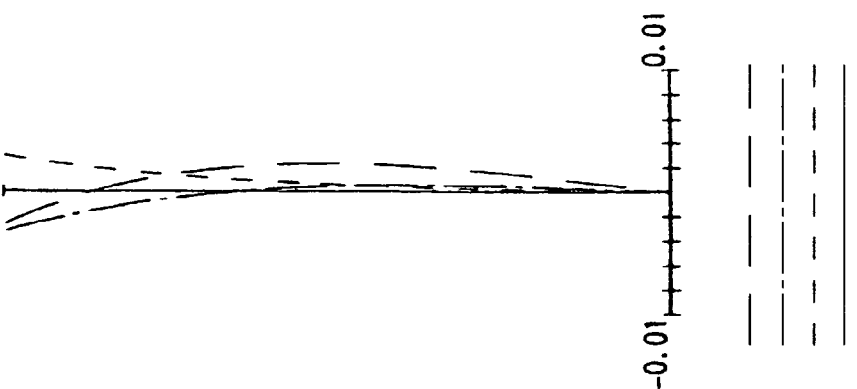
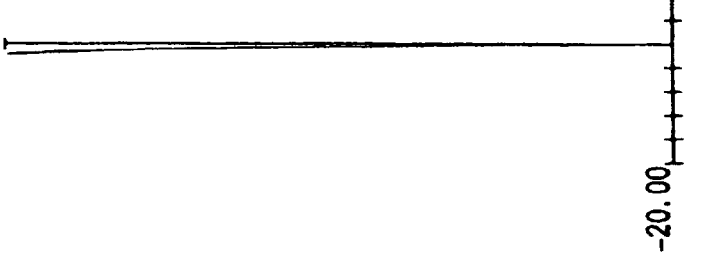
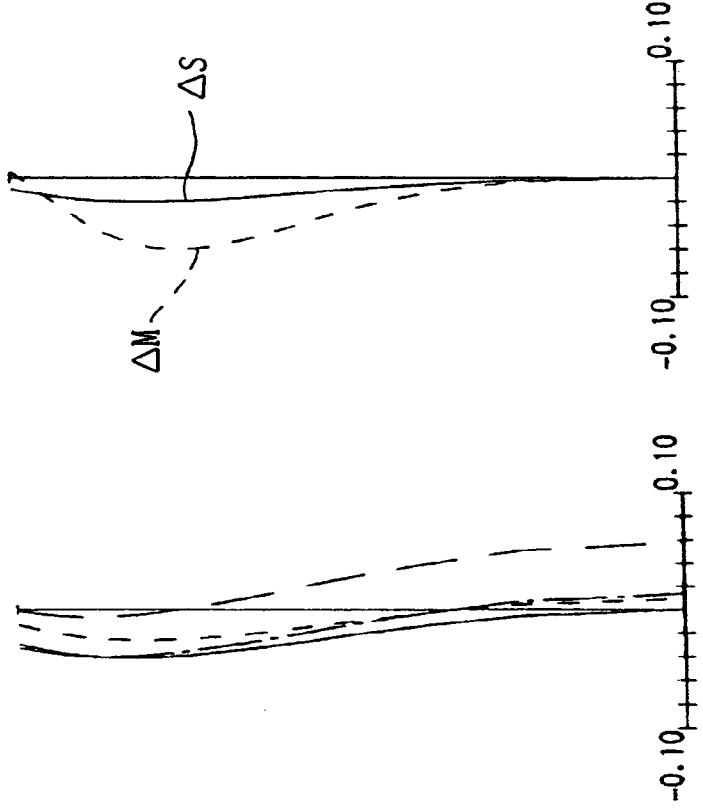

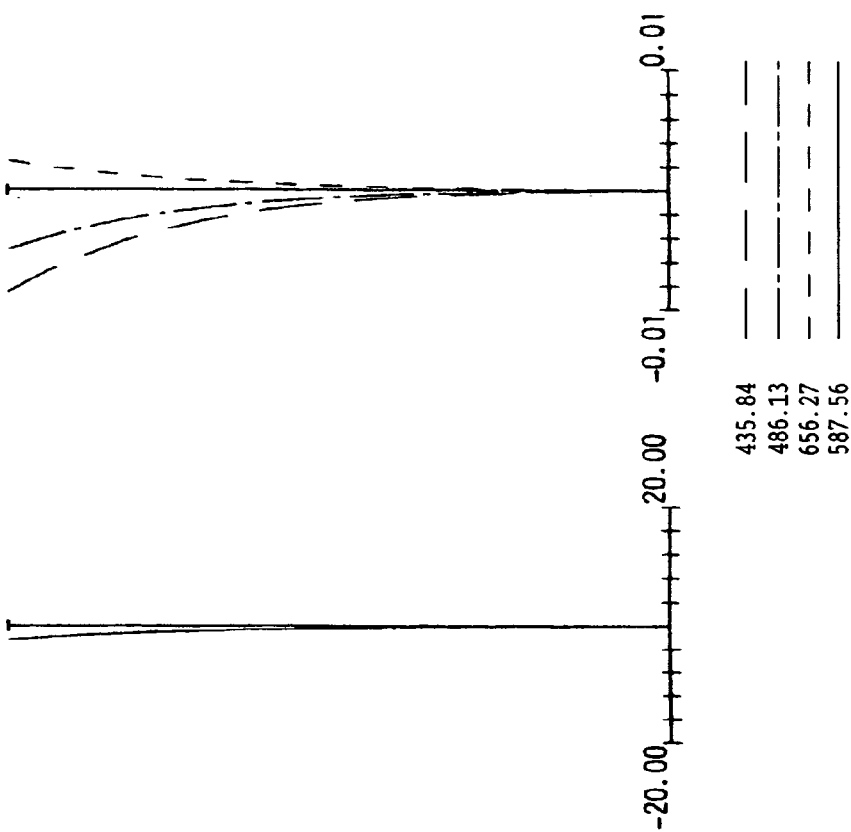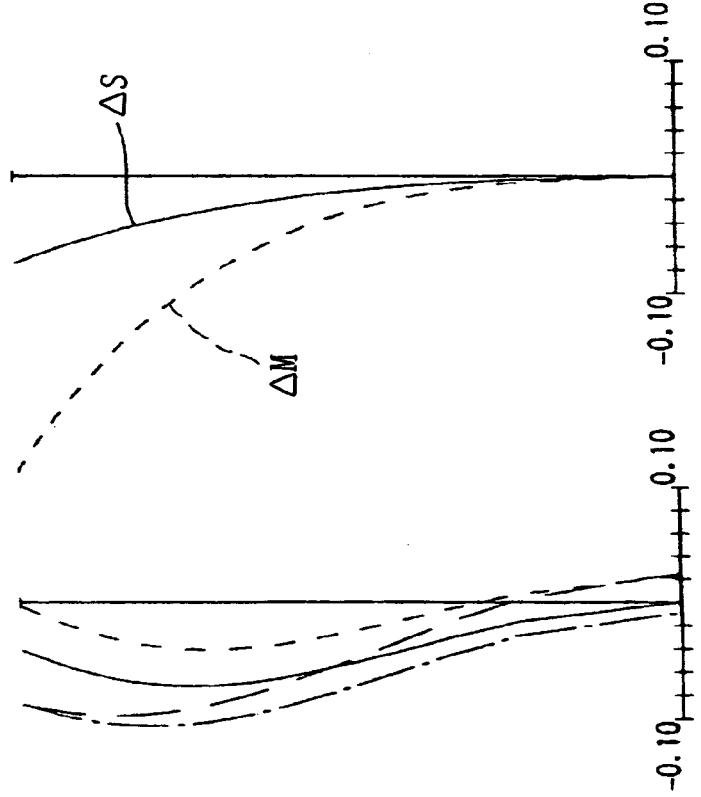

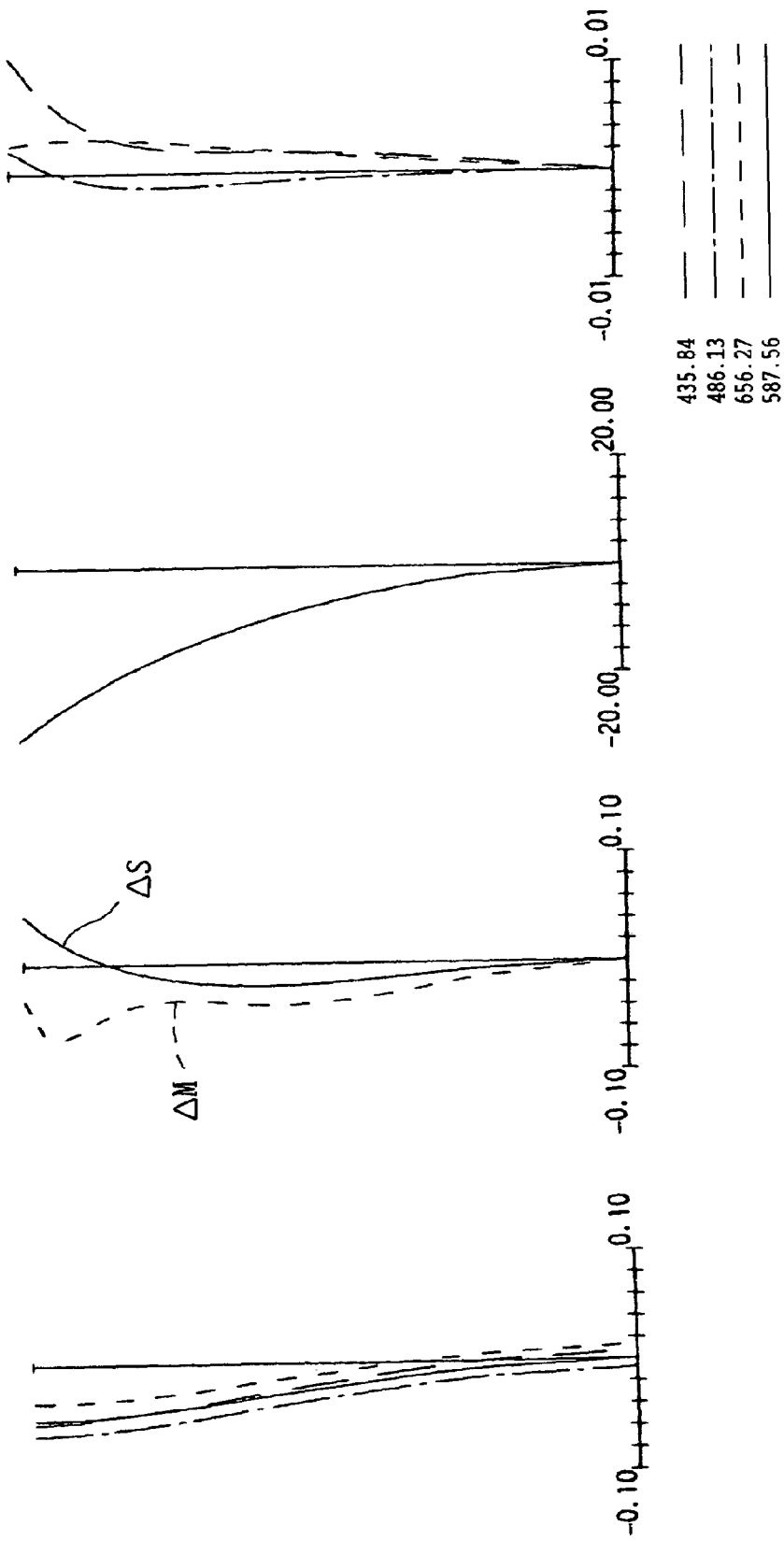

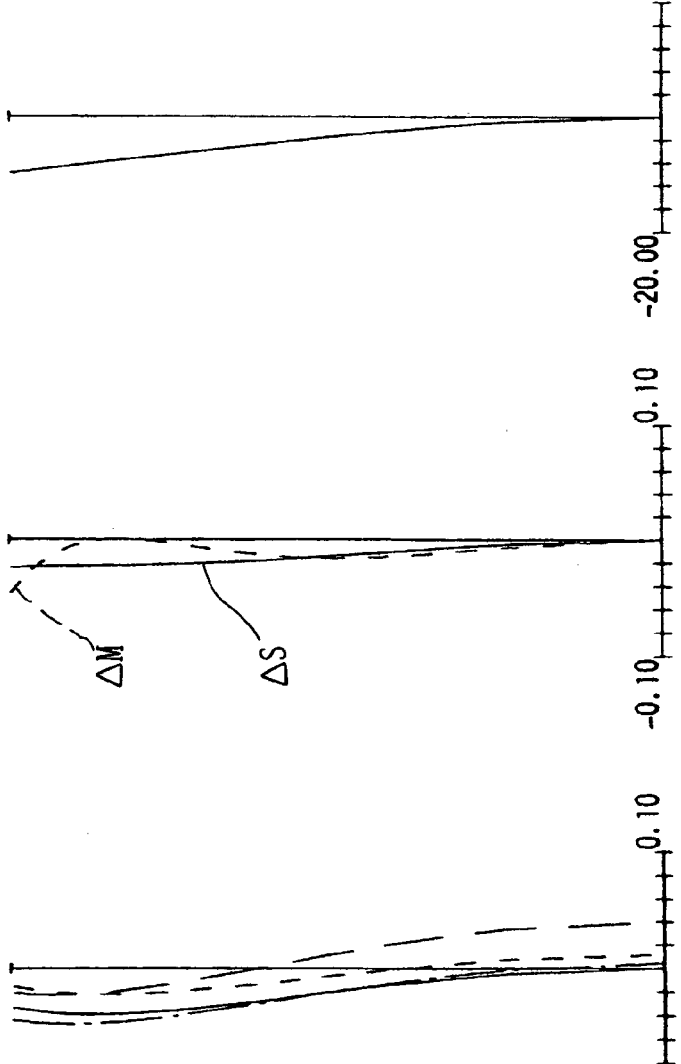

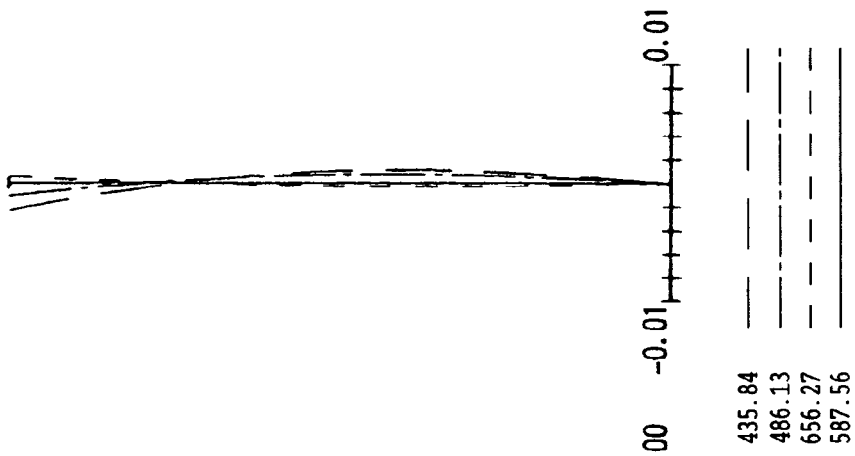

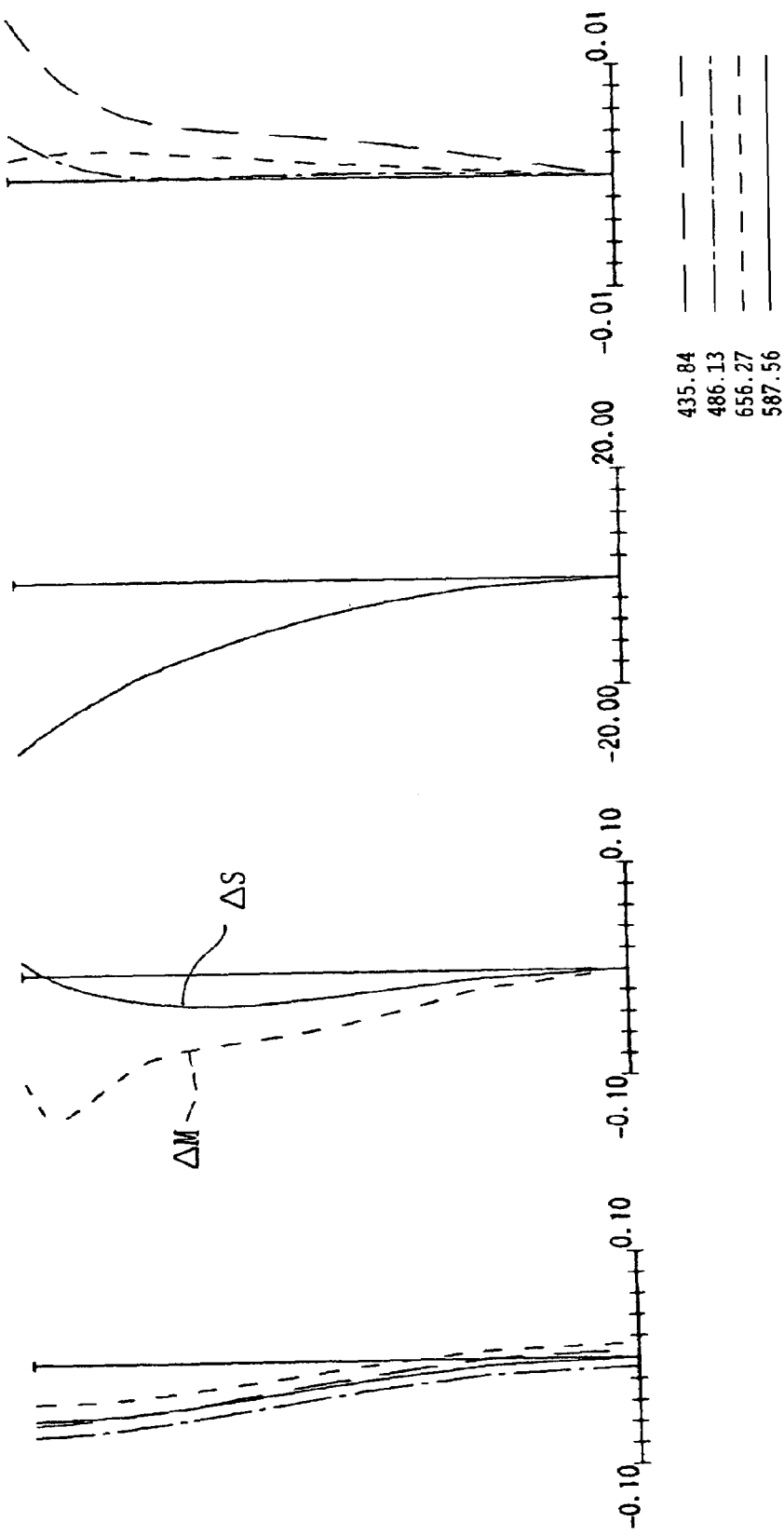

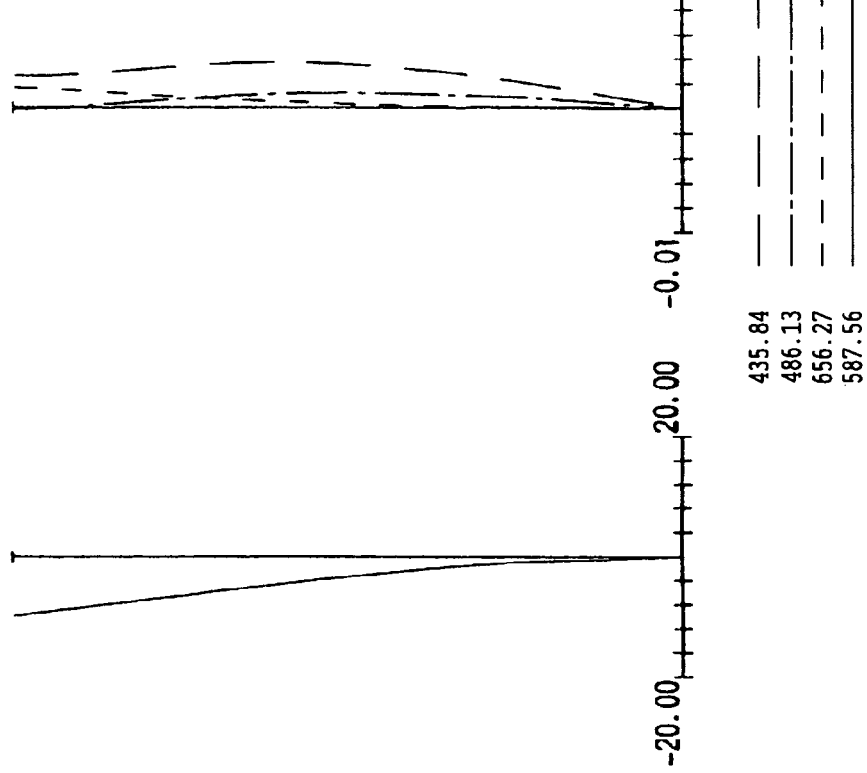

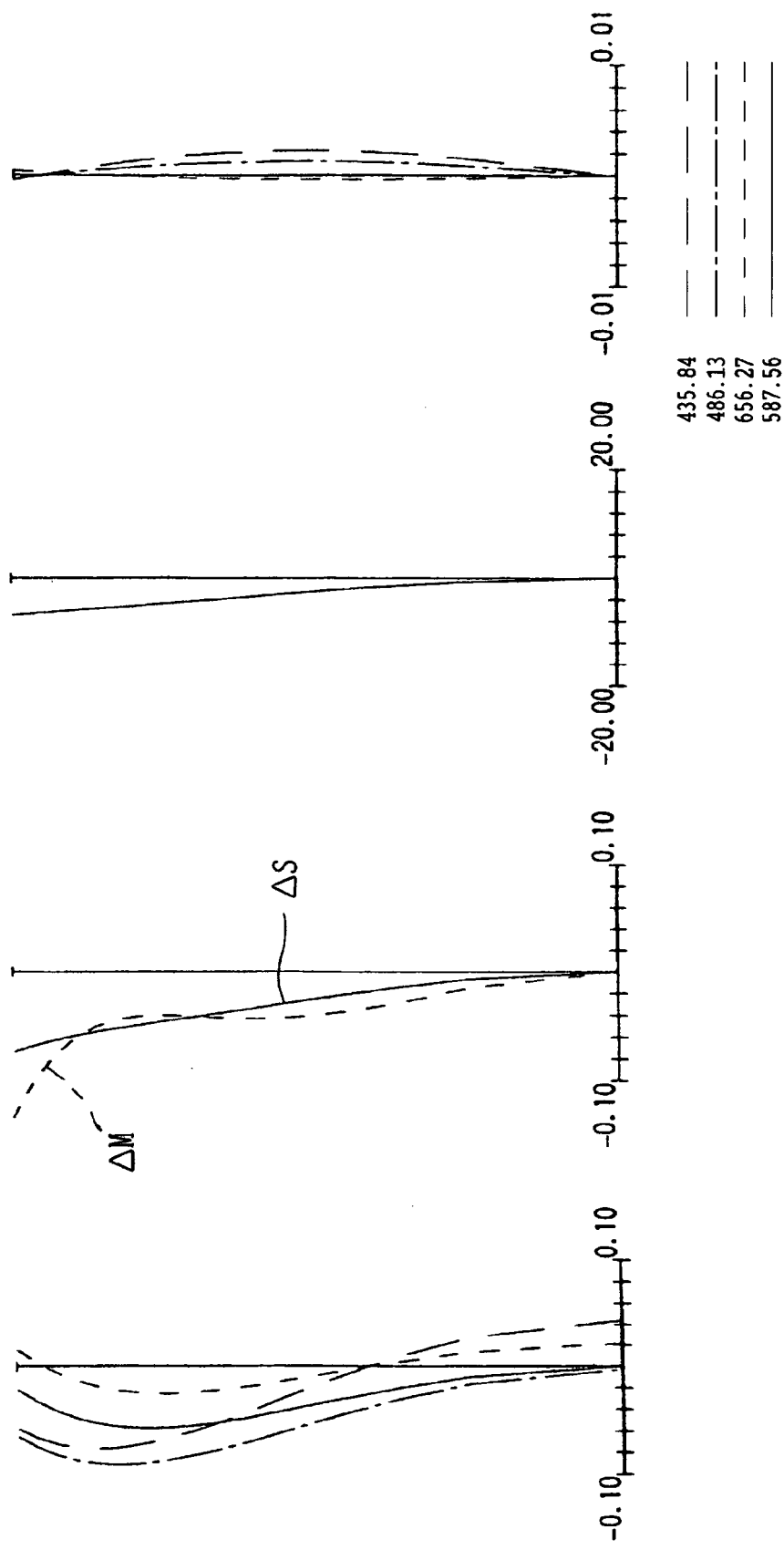

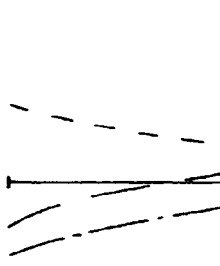
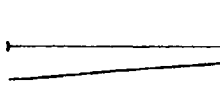
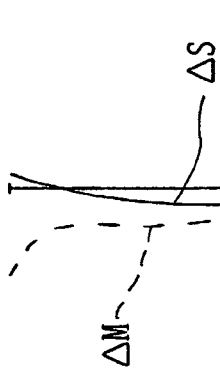
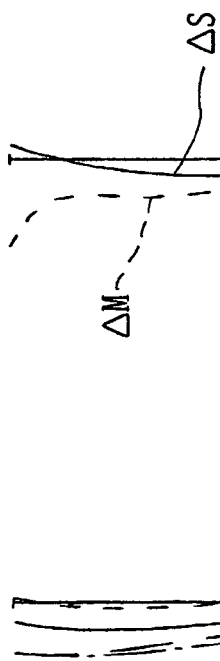
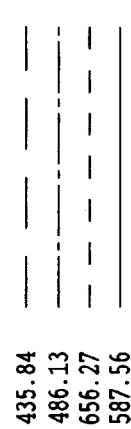

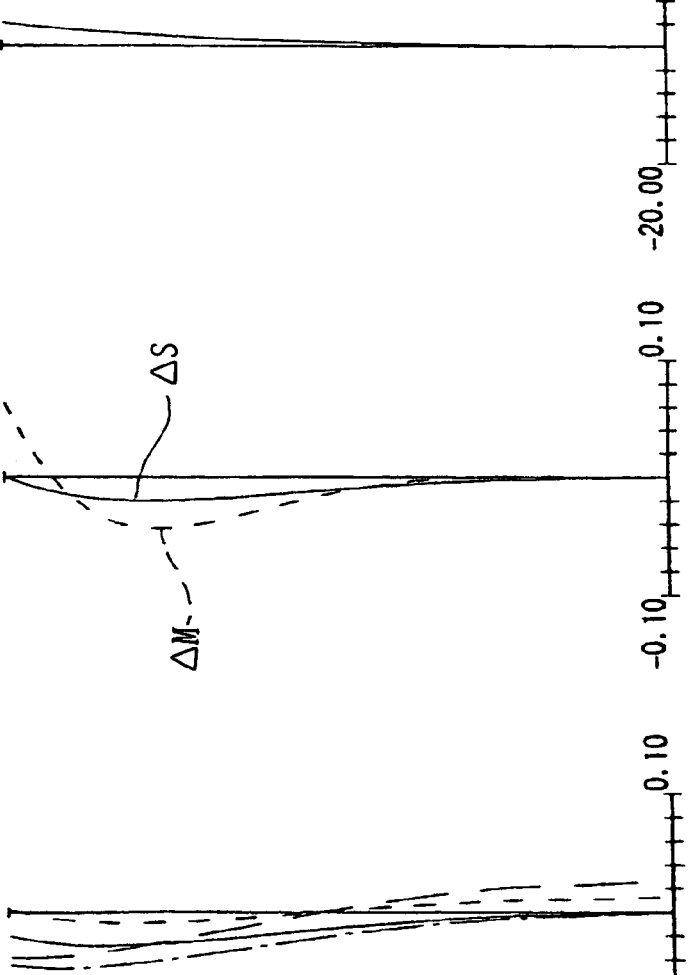

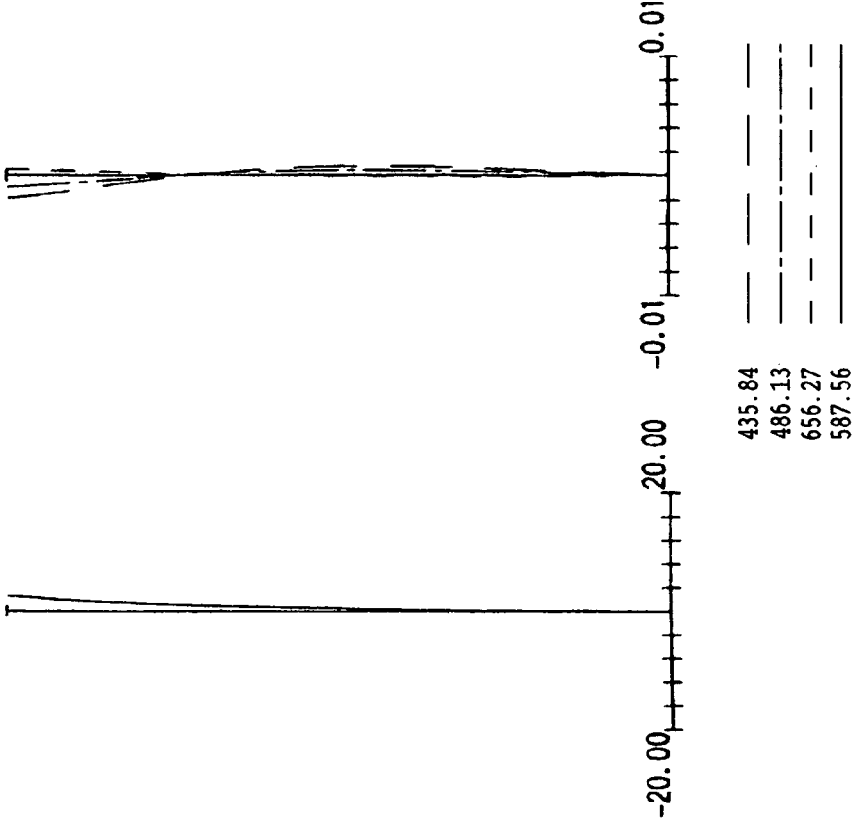

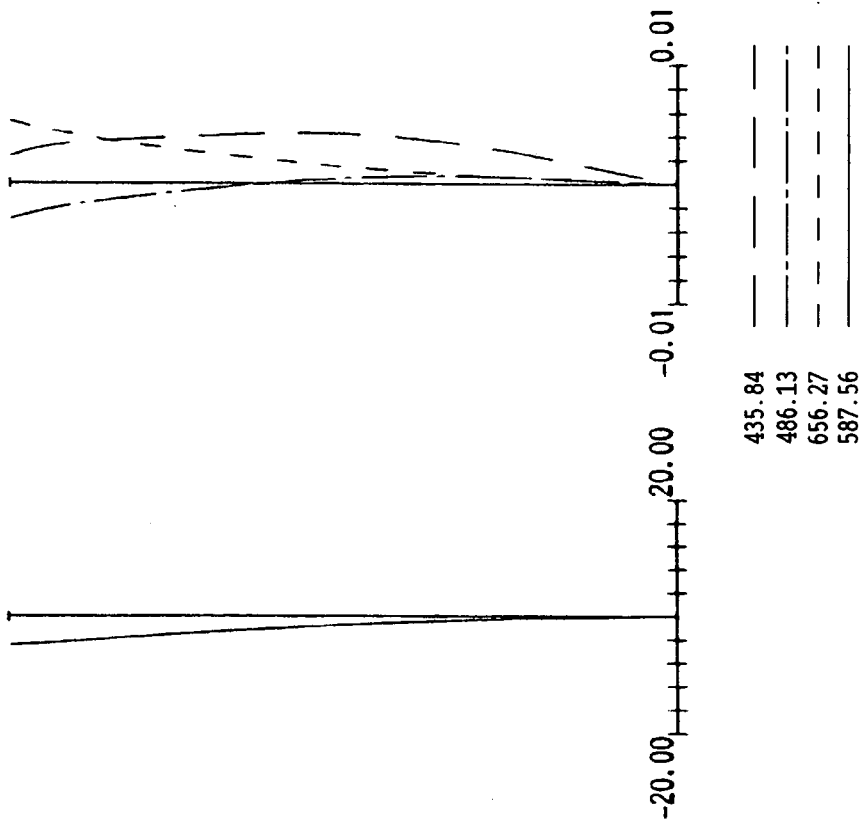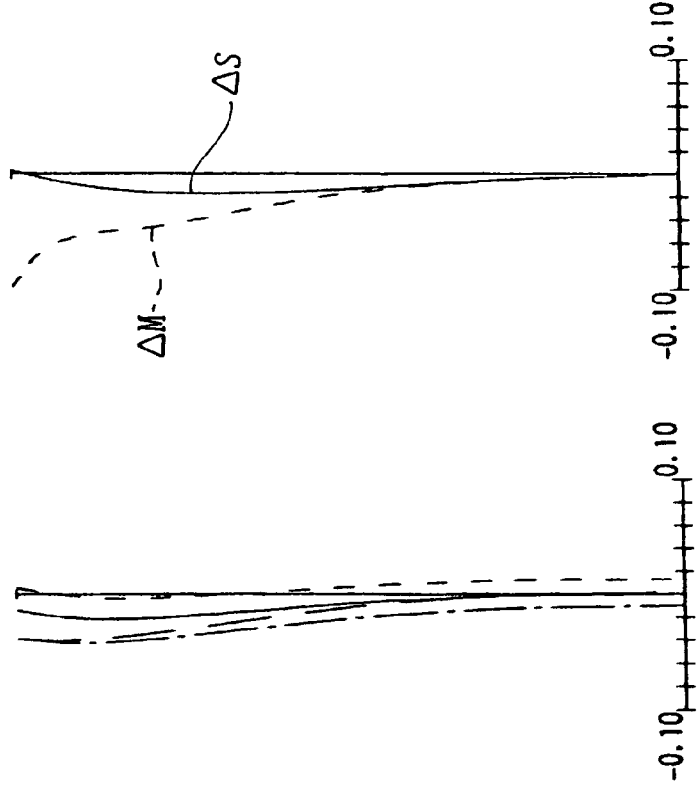

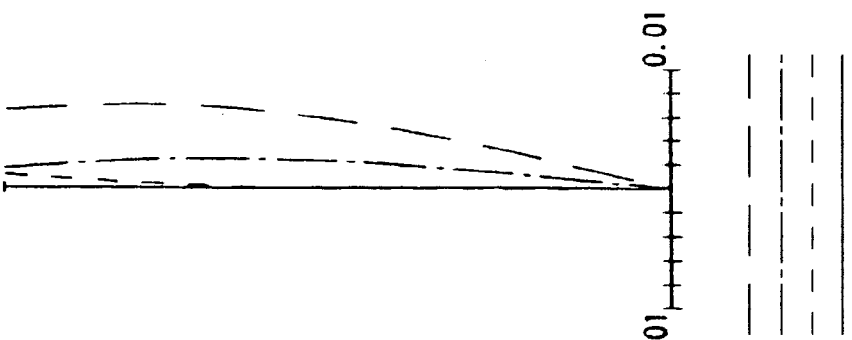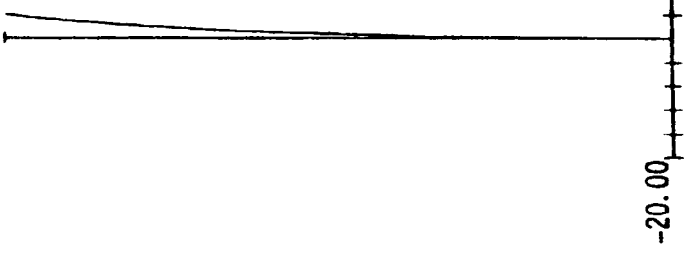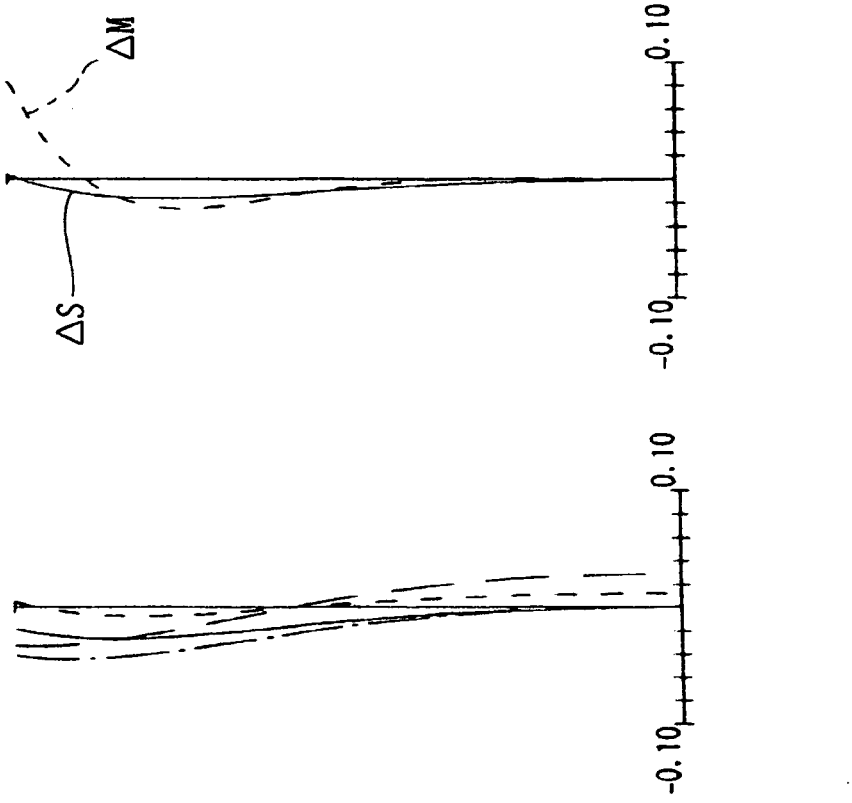

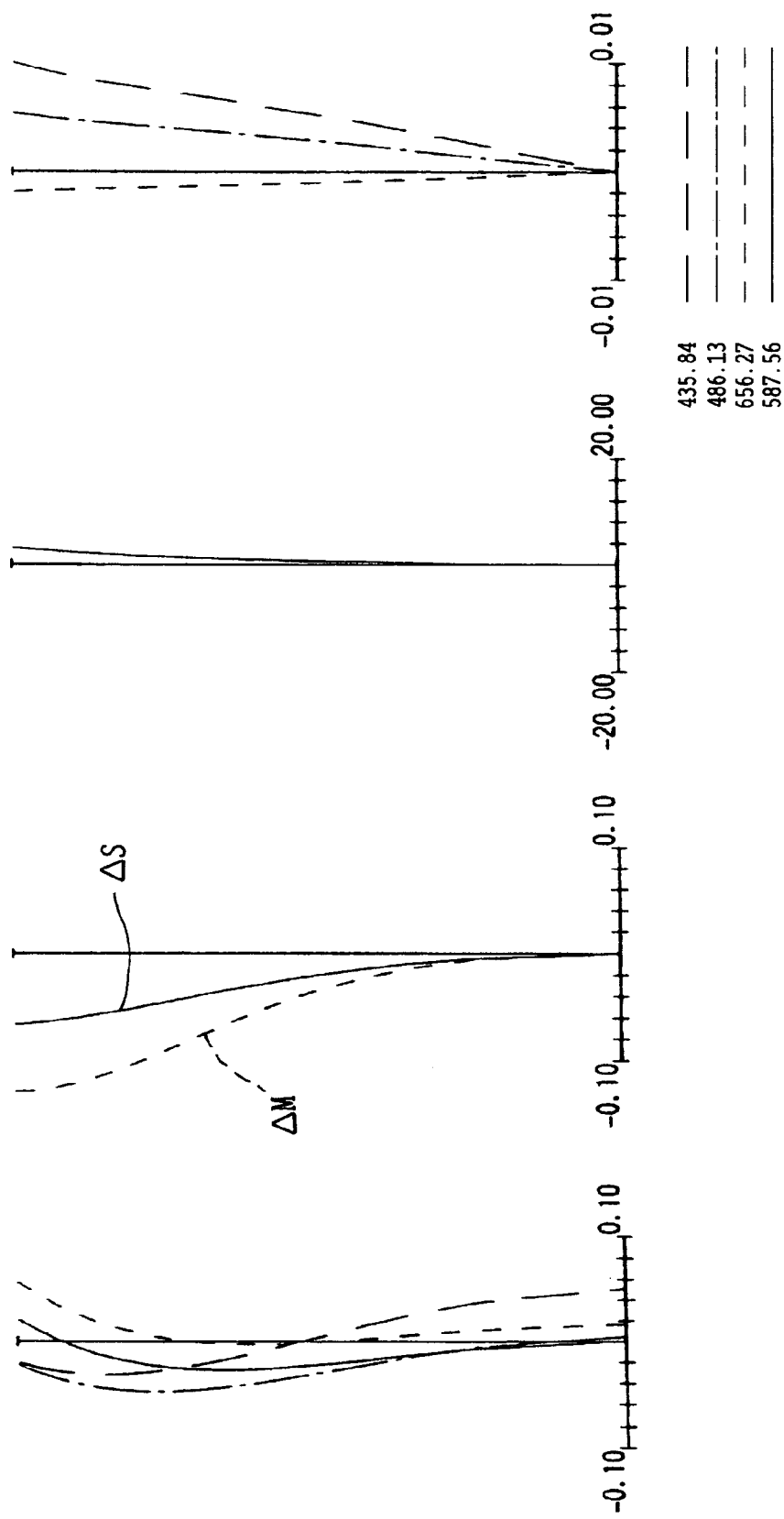

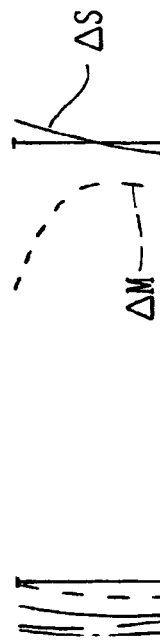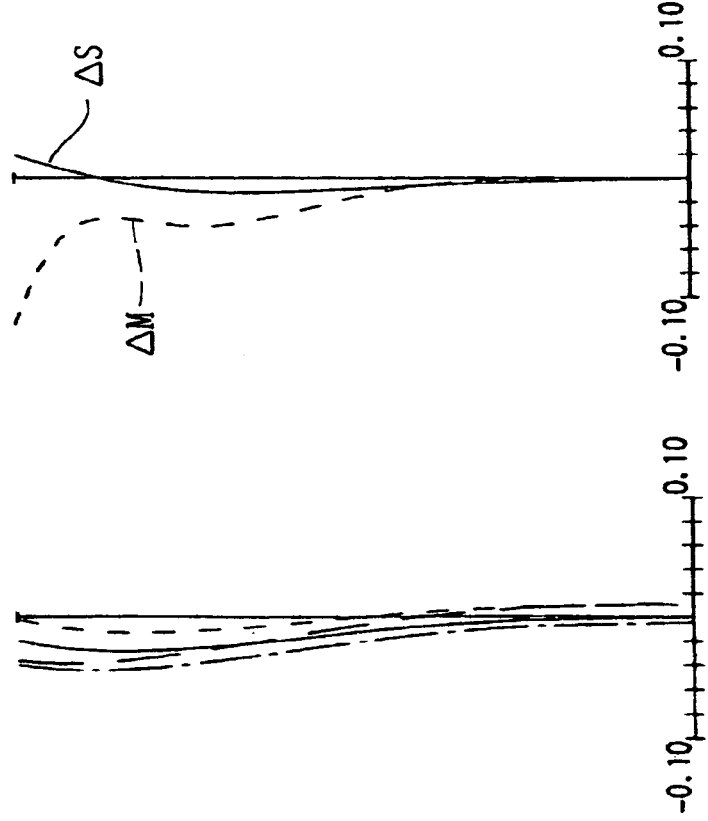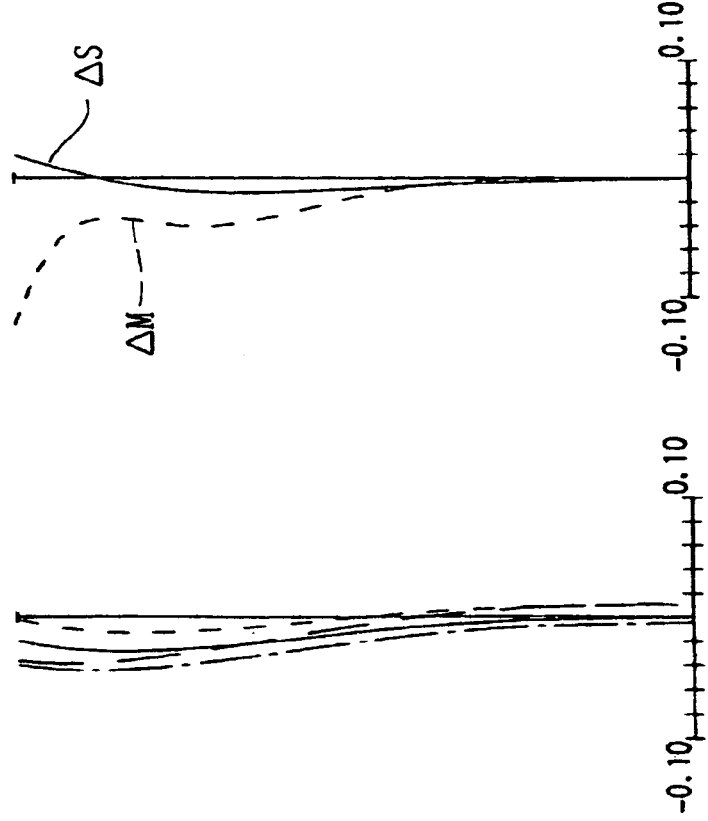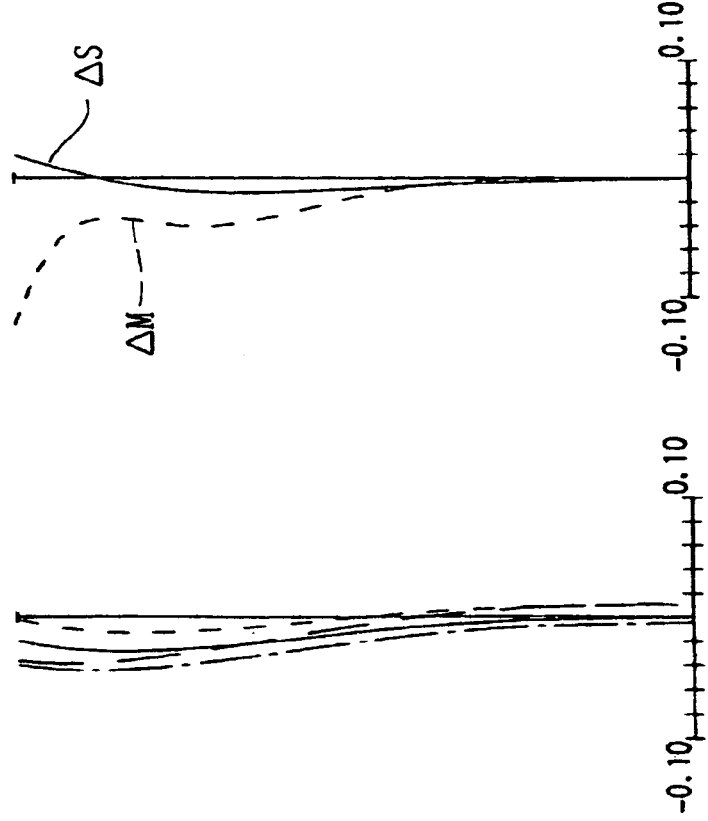

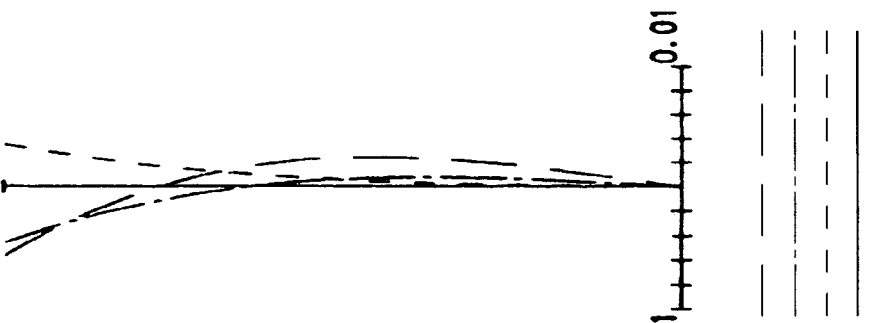
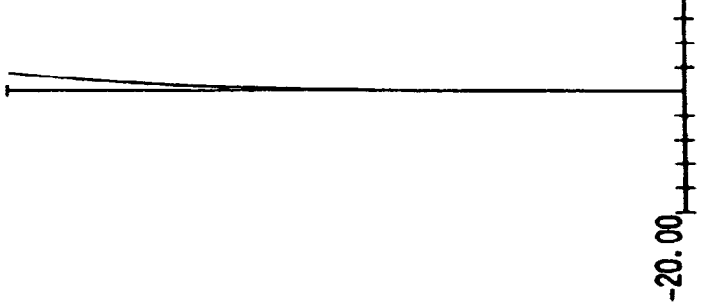
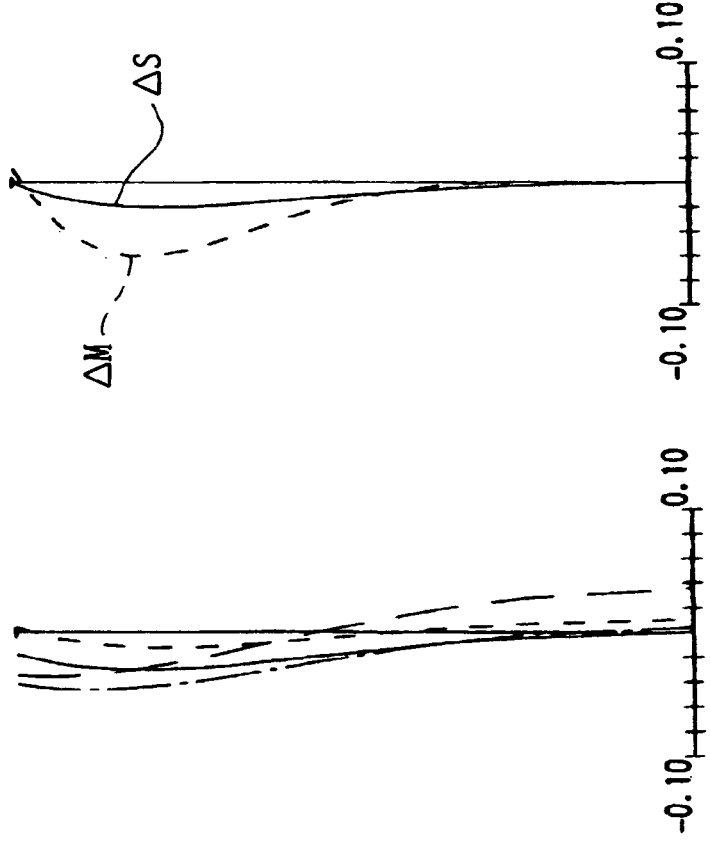

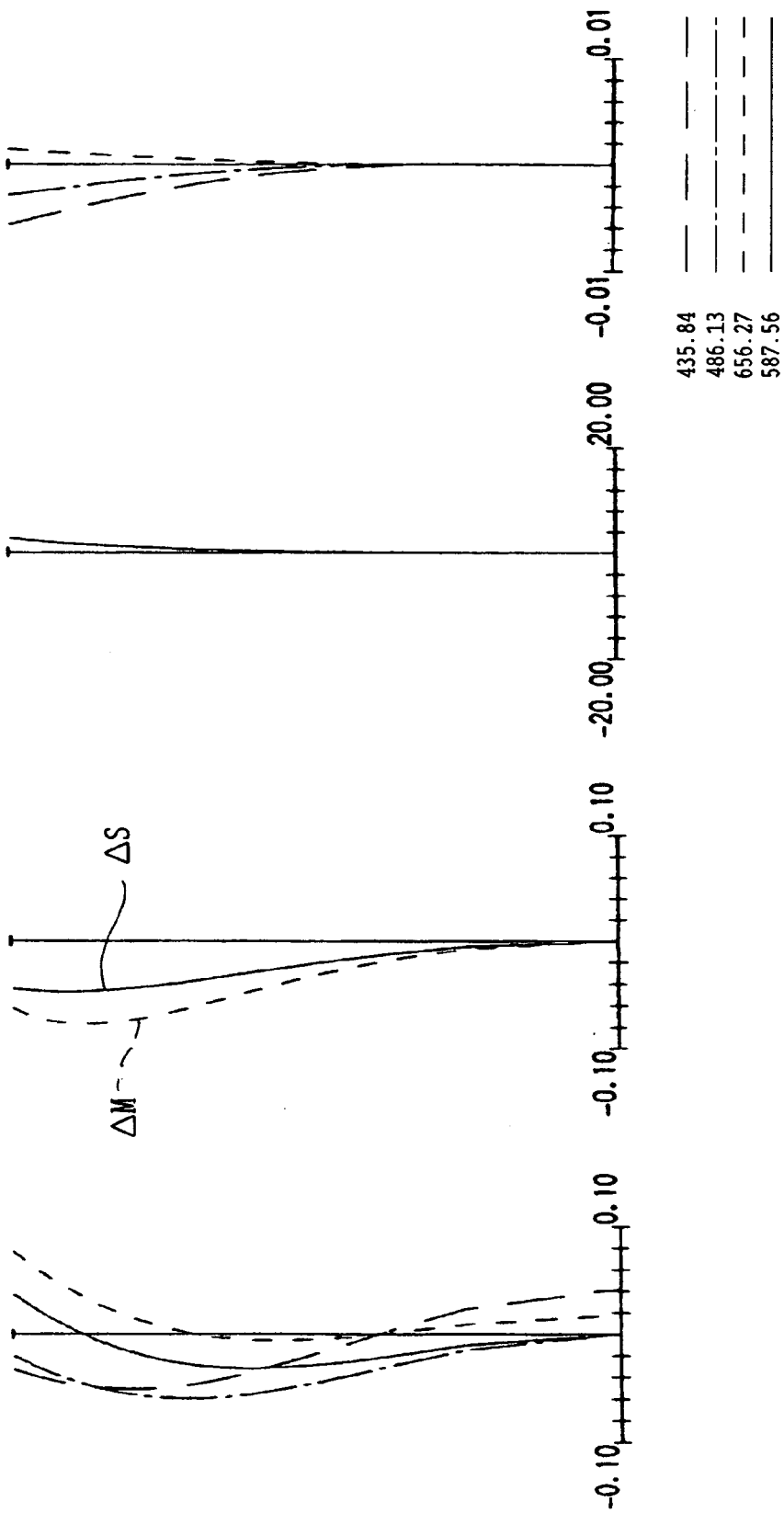

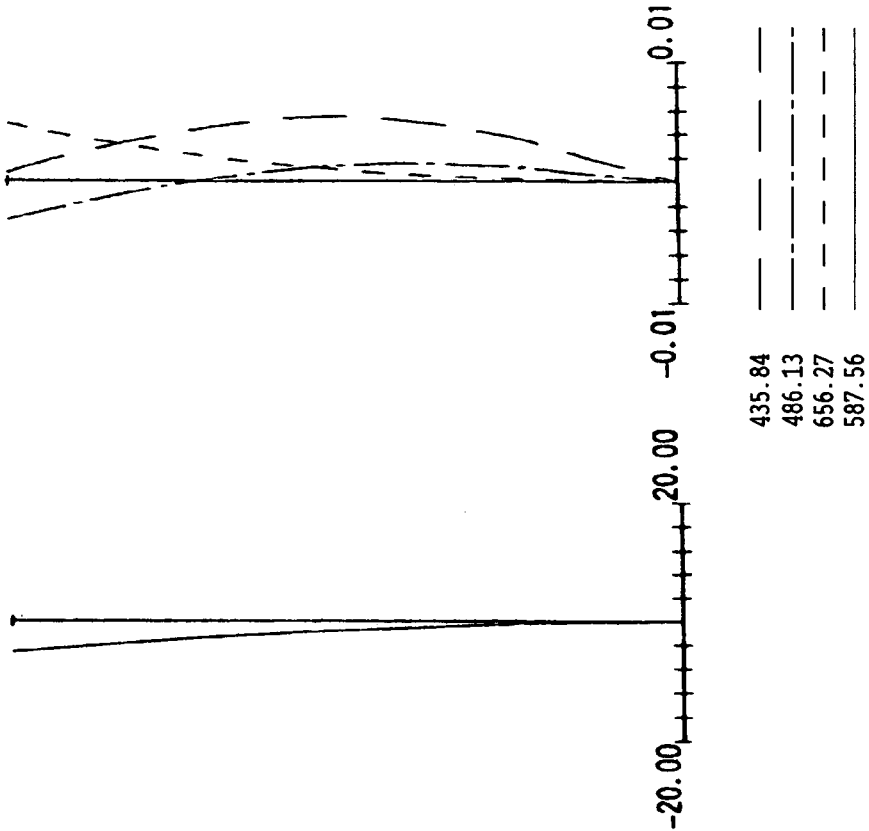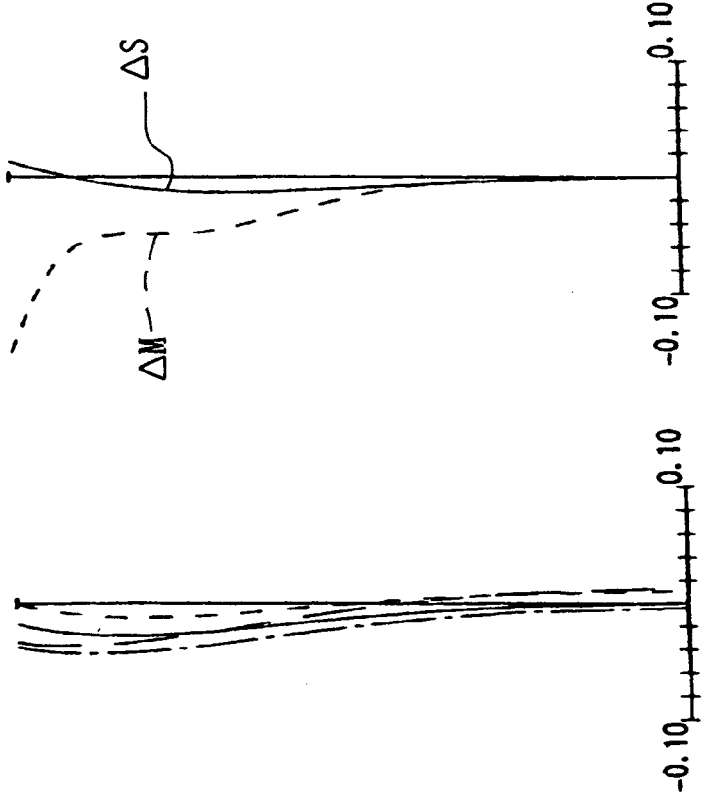

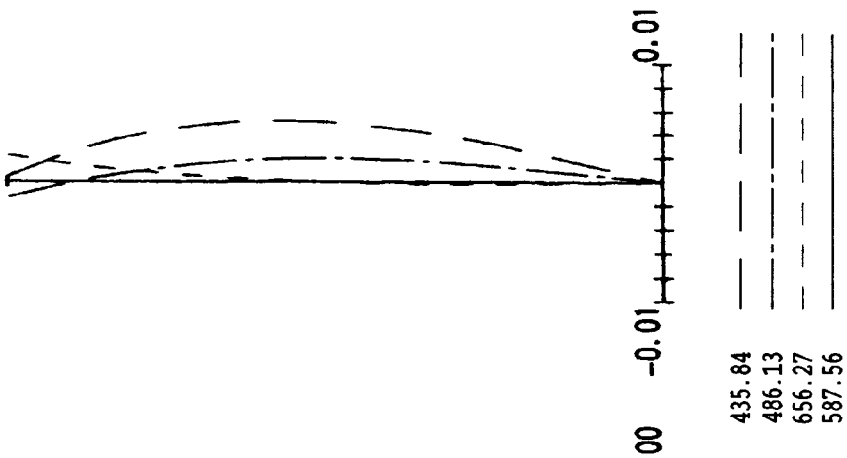
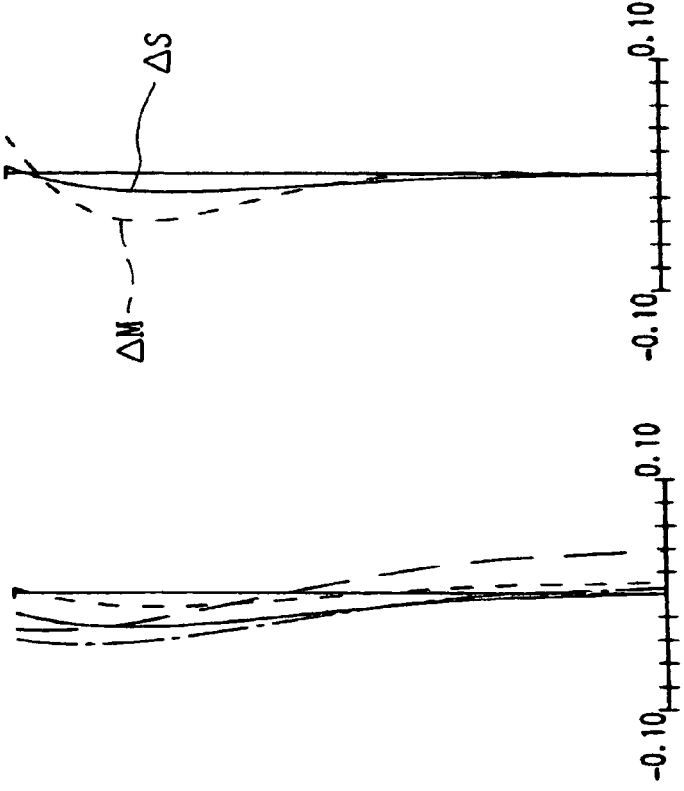

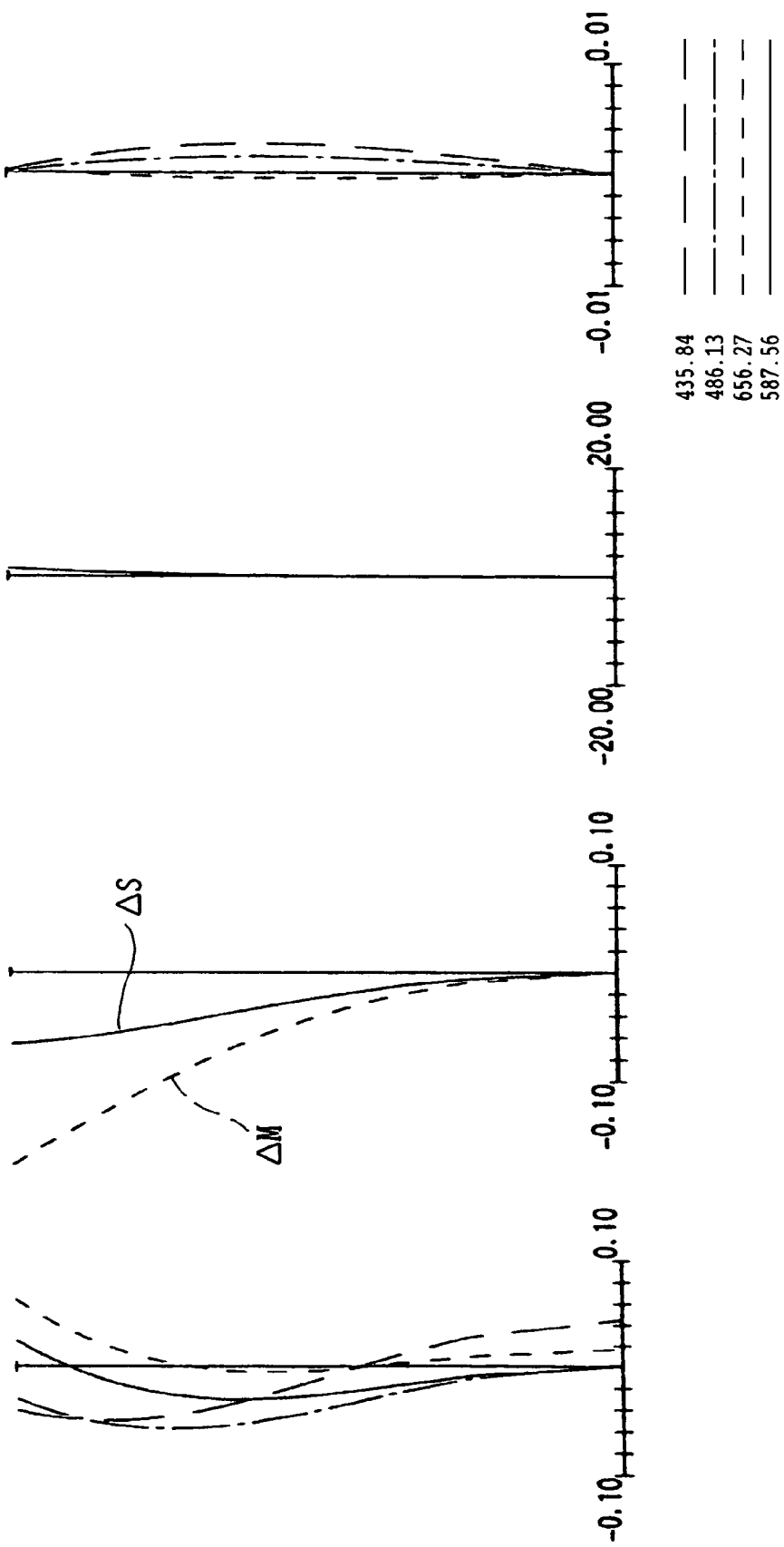

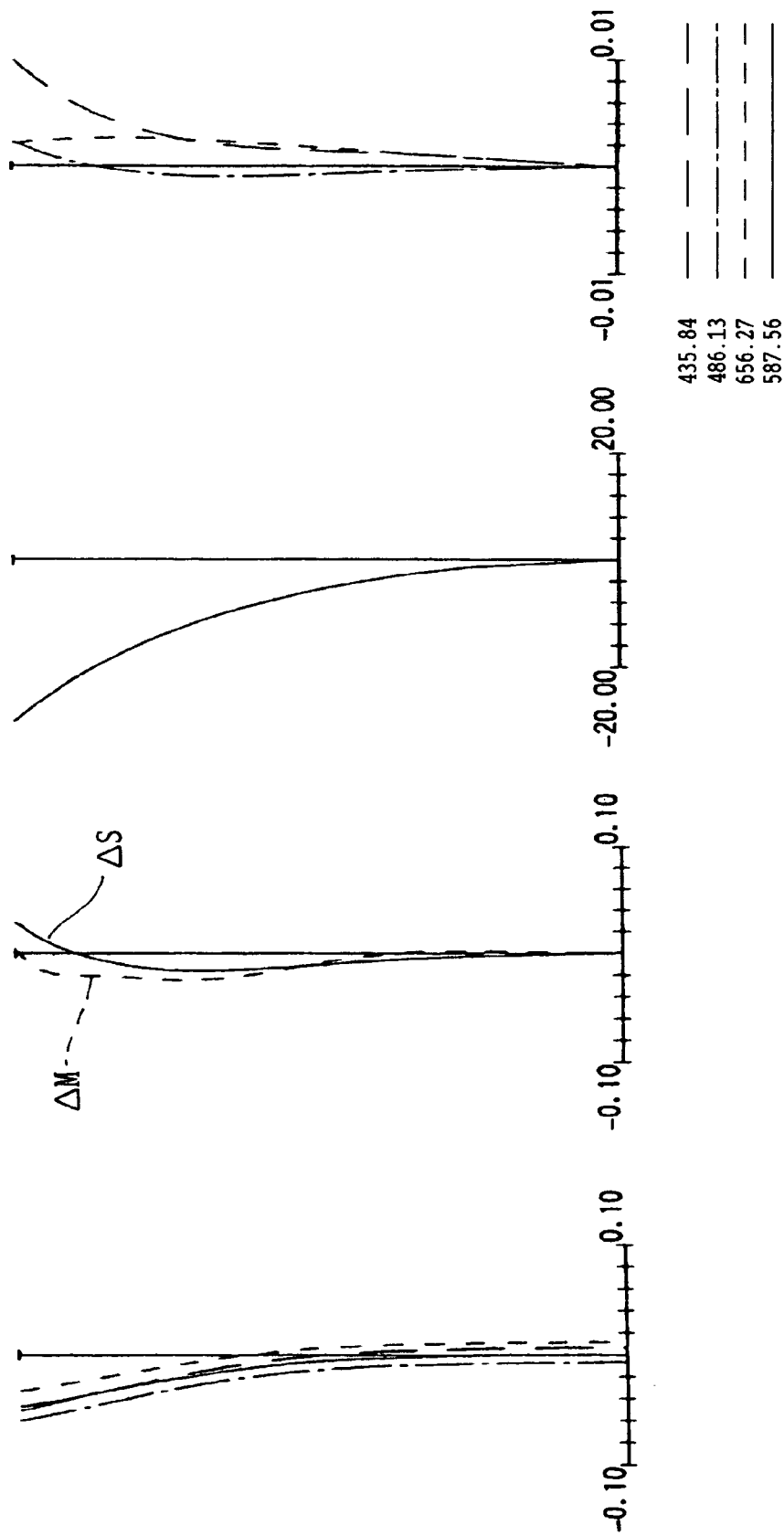

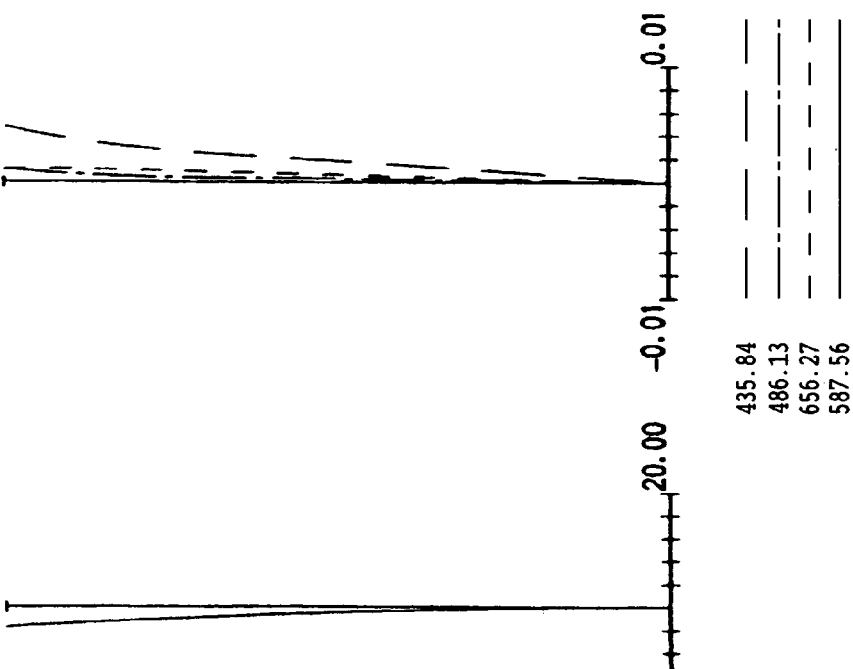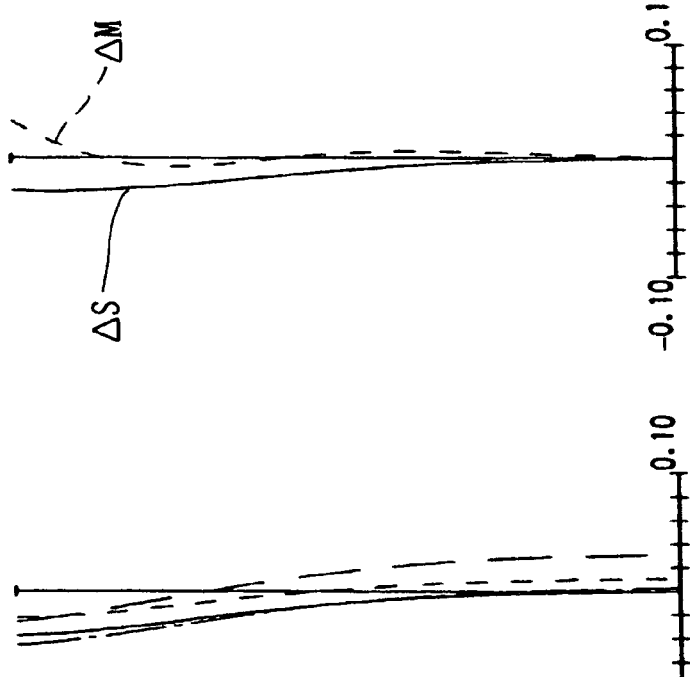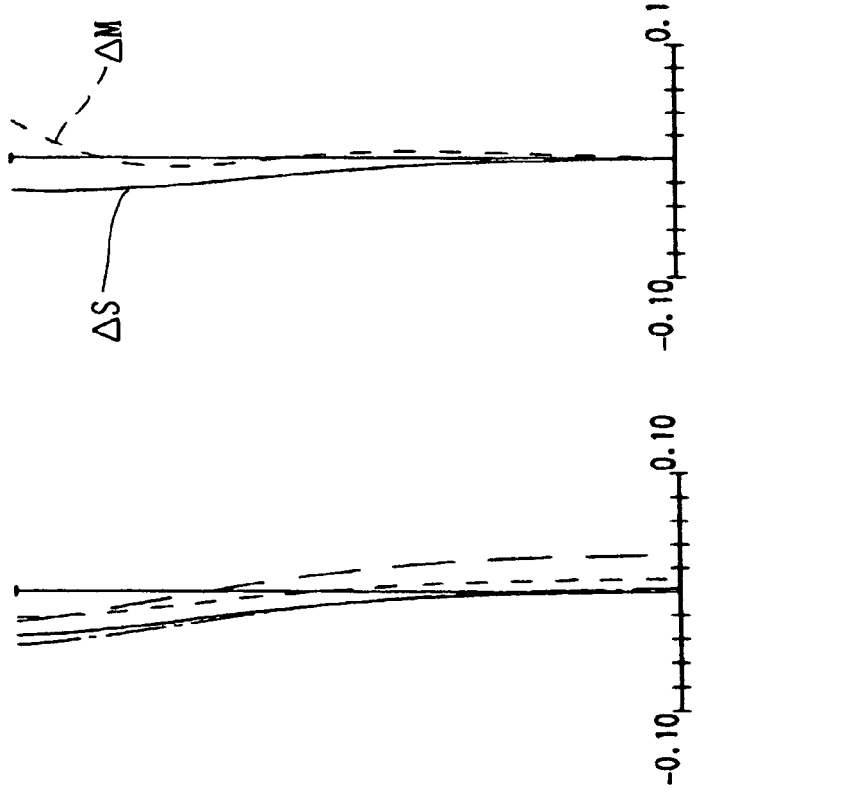

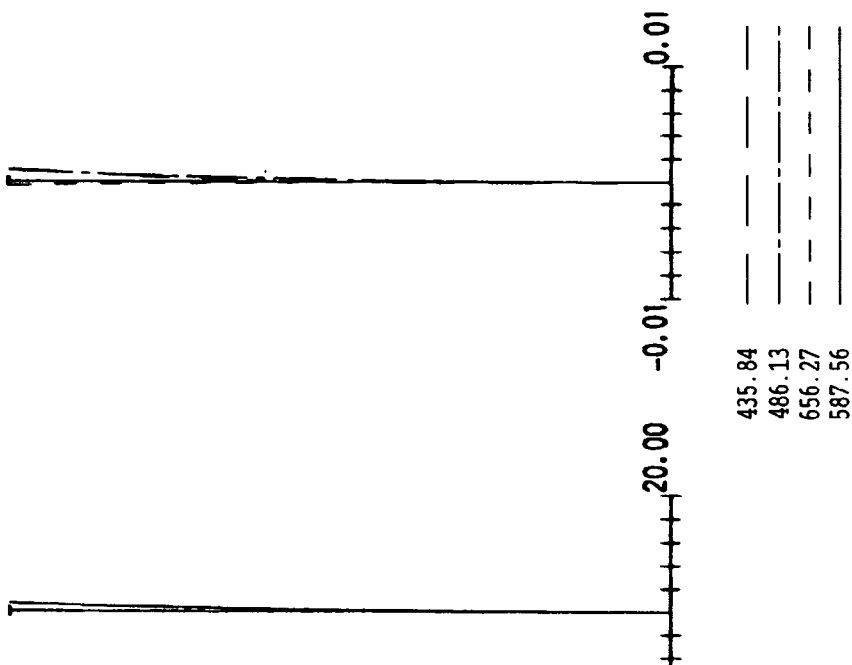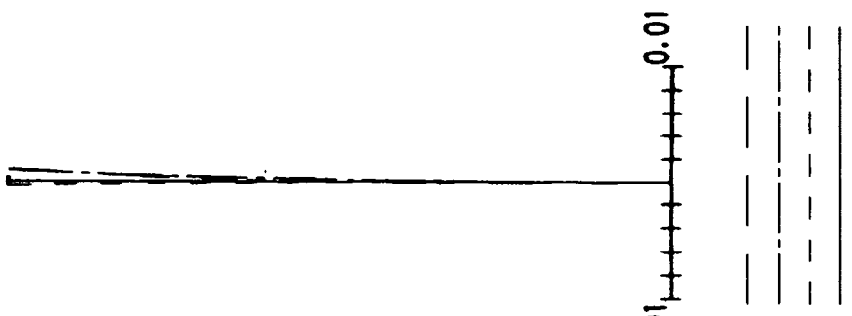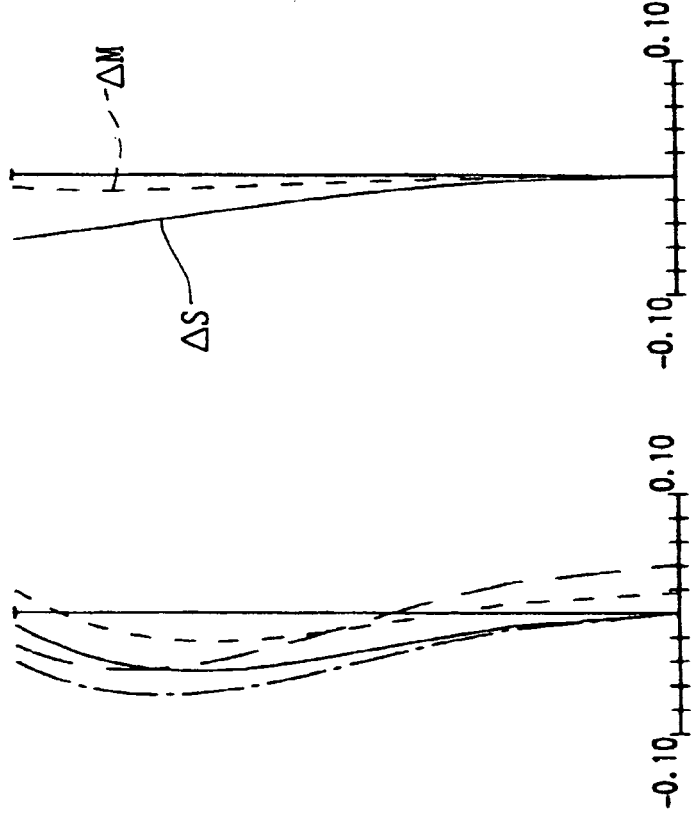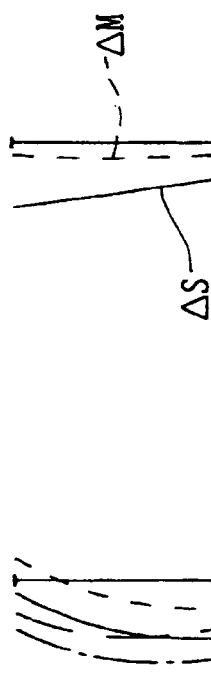

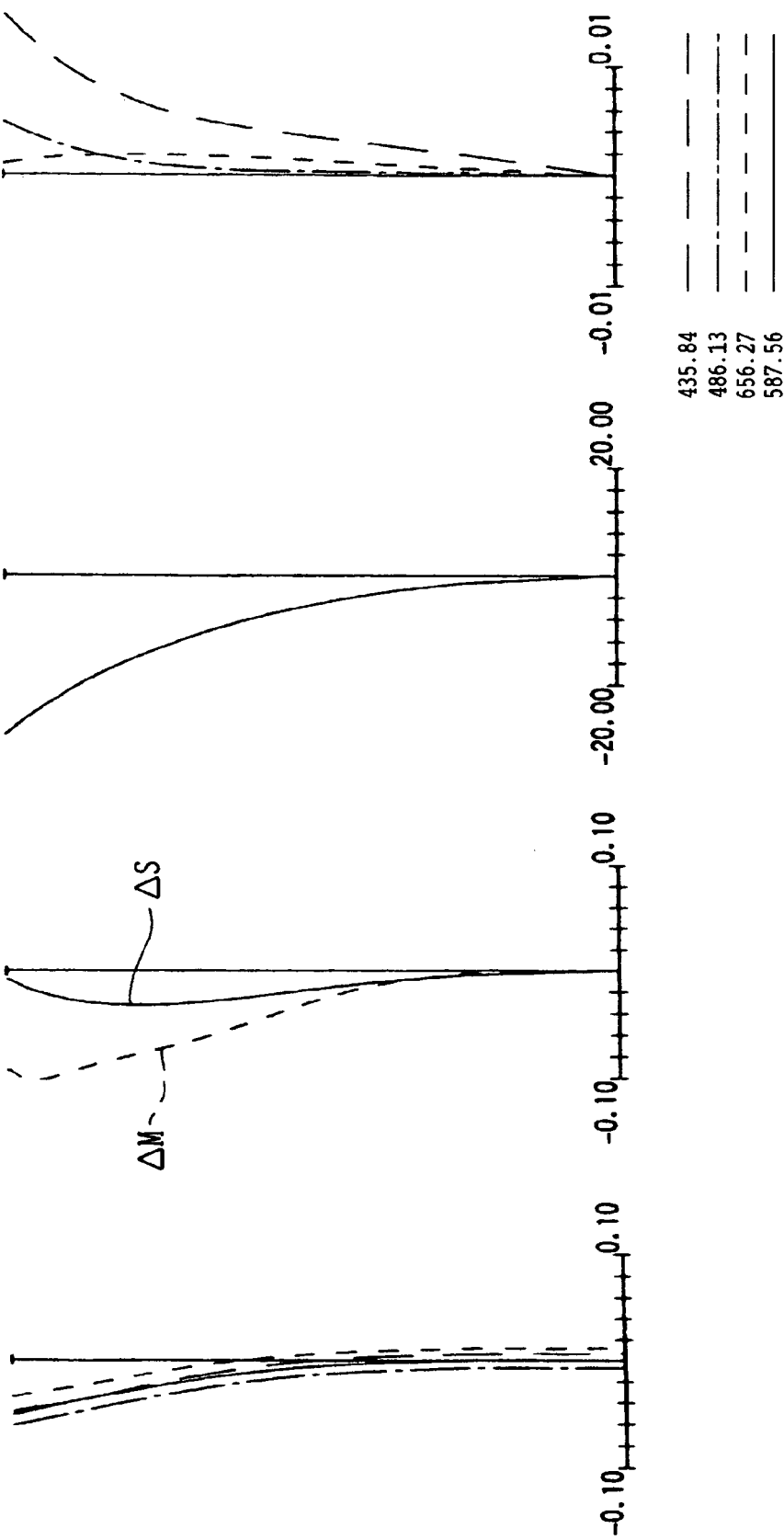

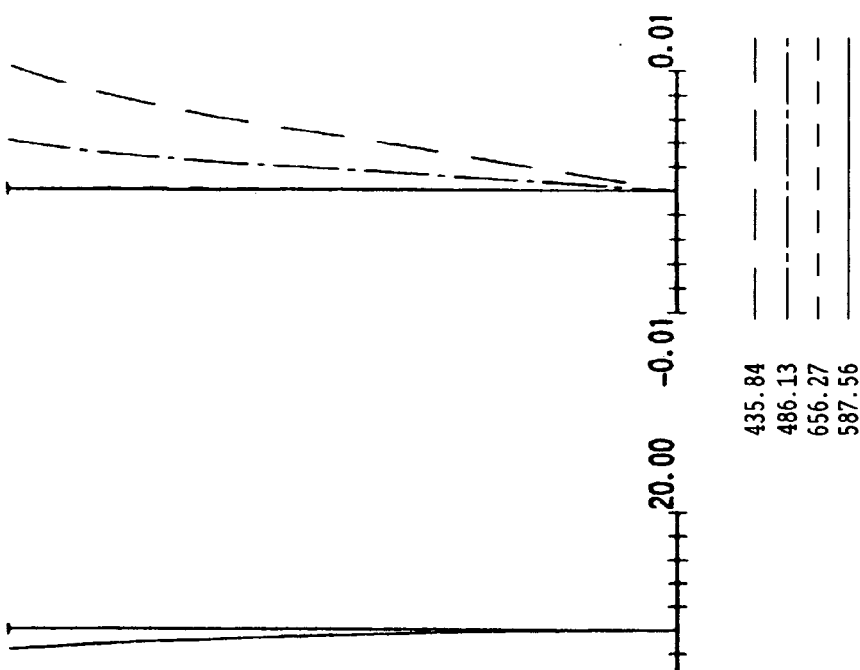

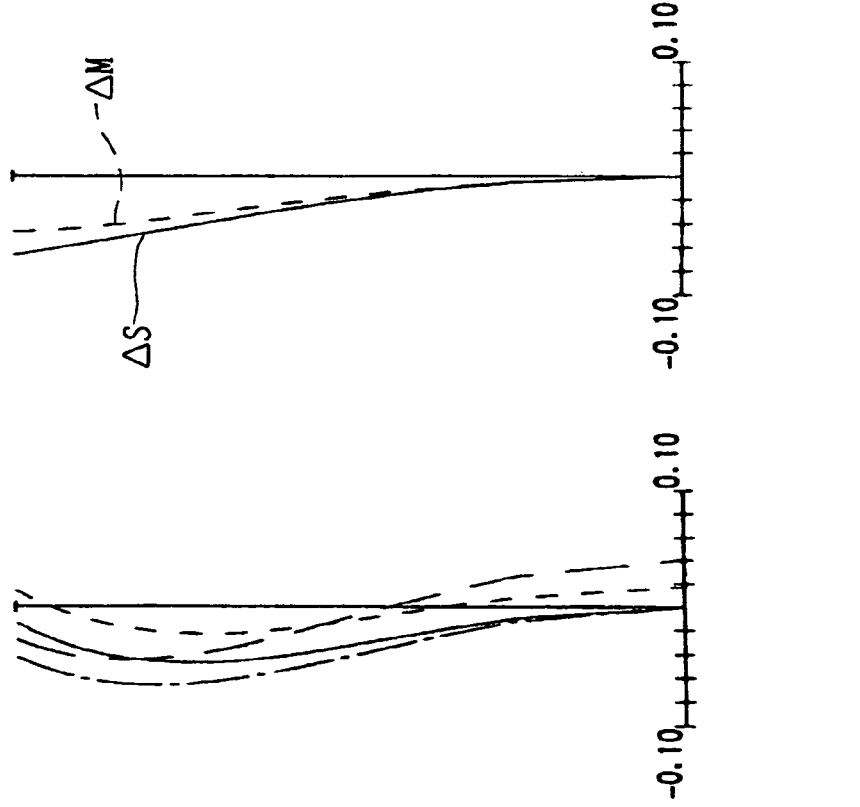

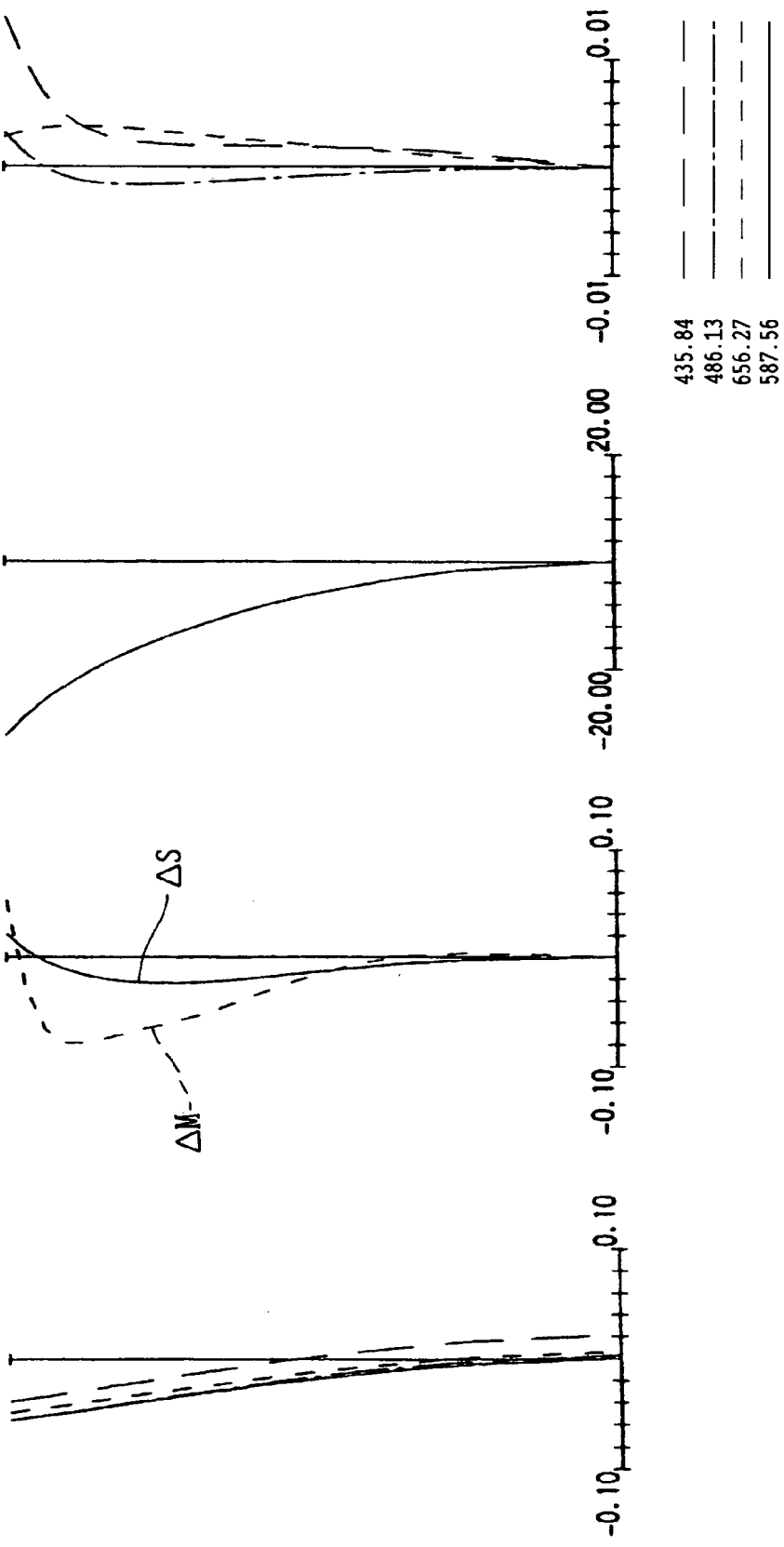

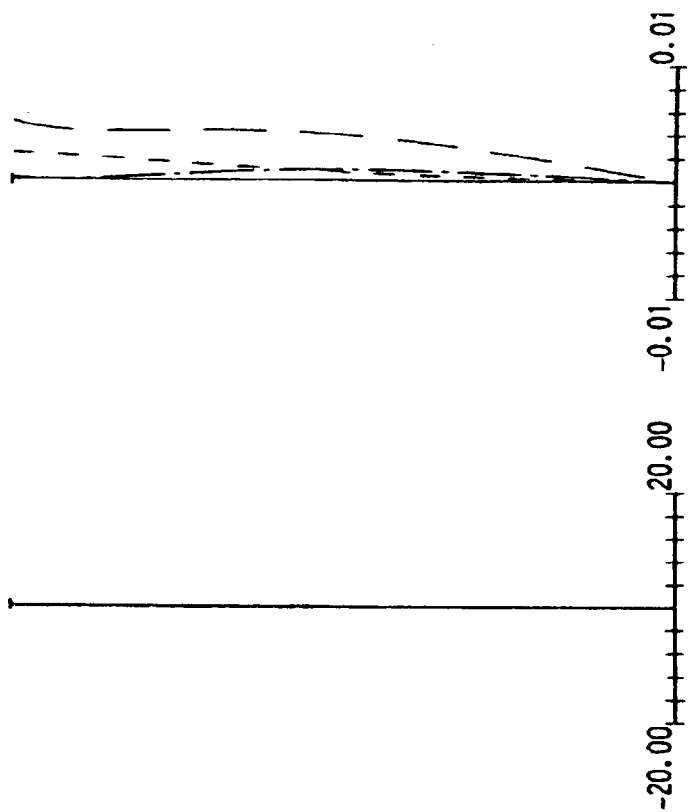
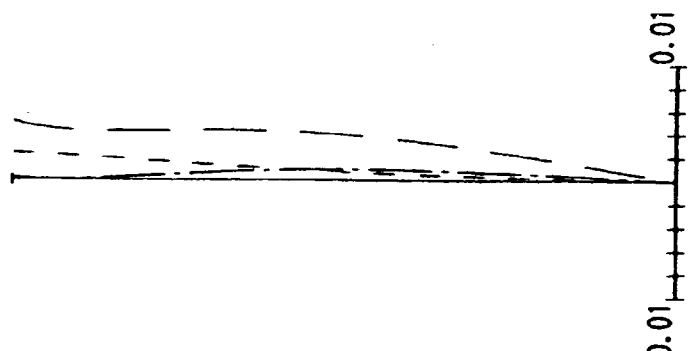
FIG.57E SPHERICAL ABERRATION FNO 3.378
FIG.57F ASTIGMATISM IH 2.70
FIG.57G DISTORTION IH 2.70
FIG.57H CHROMATIC ABERRATION OF MAGNIFICATION IH 2.70
435.84
486.13
656.27
587.56

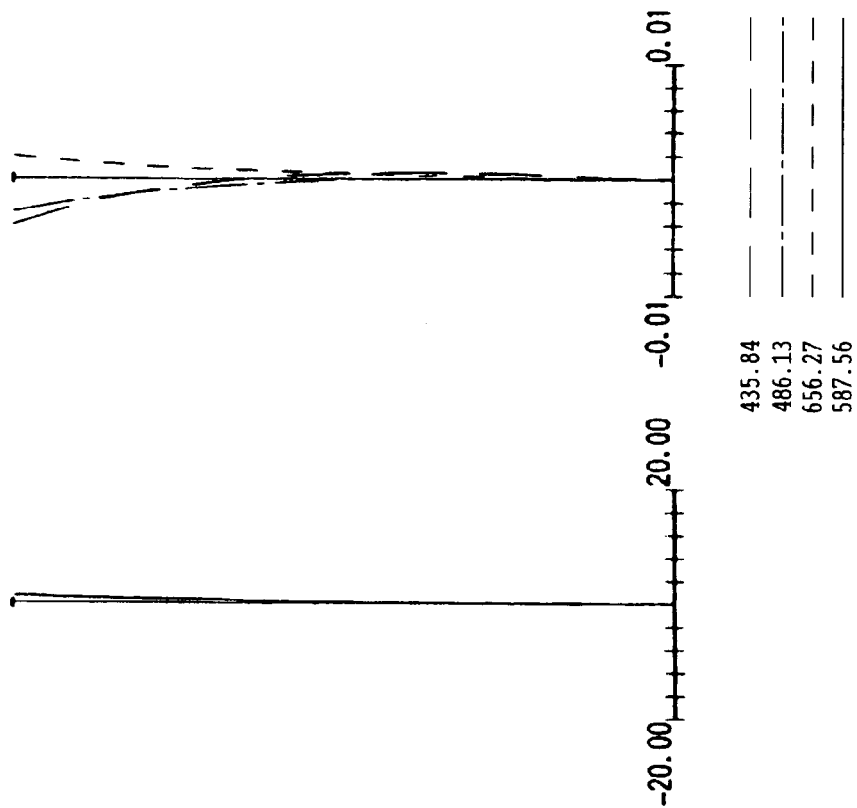

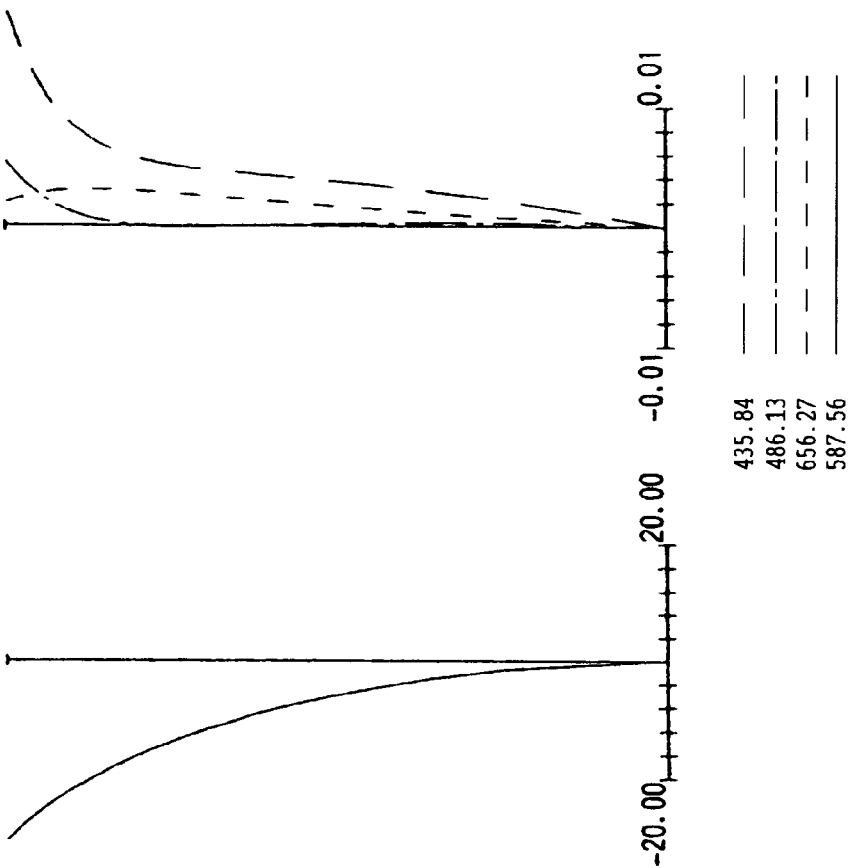
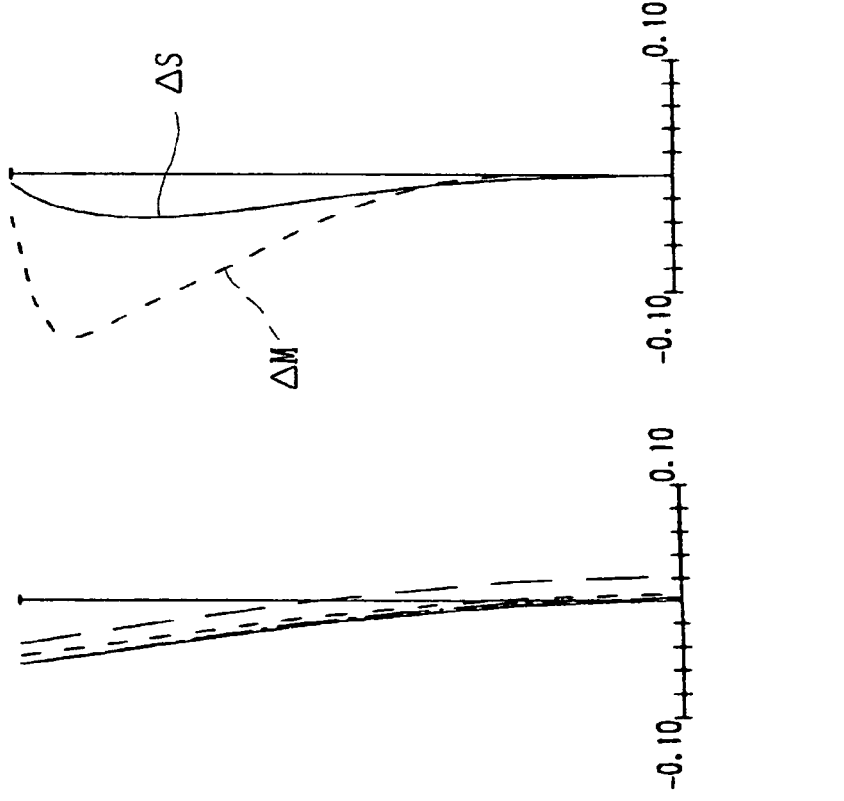

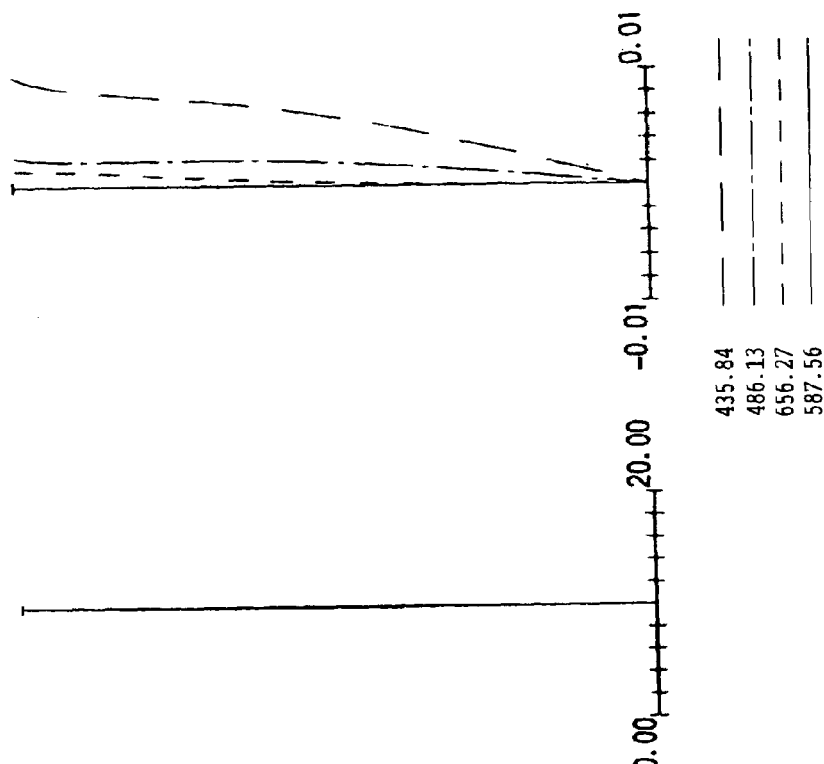
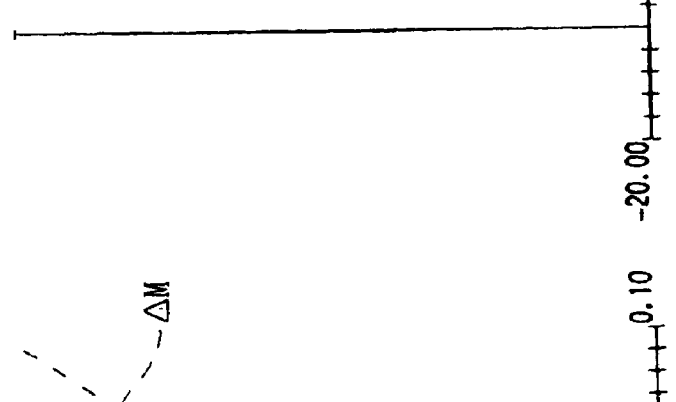
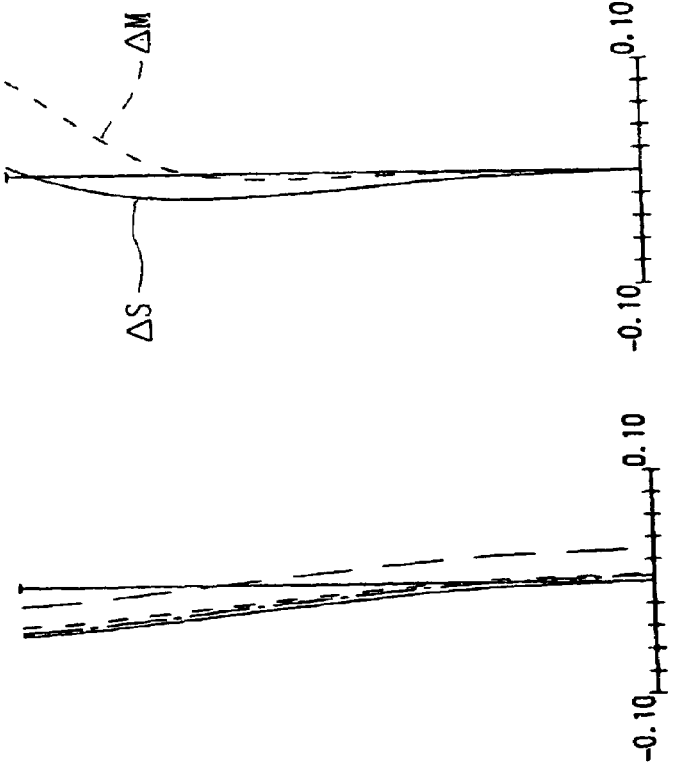

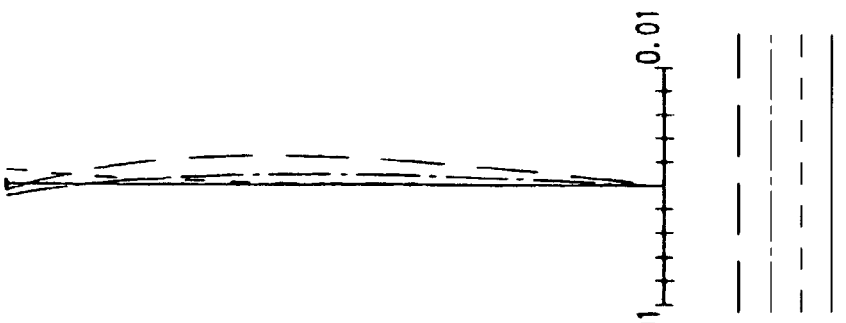
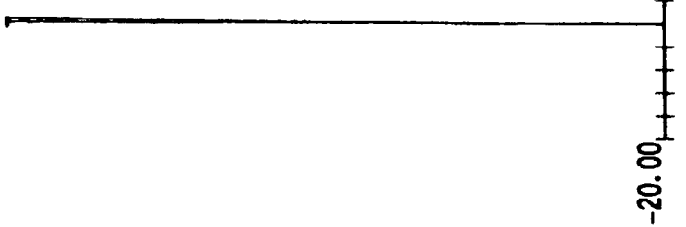
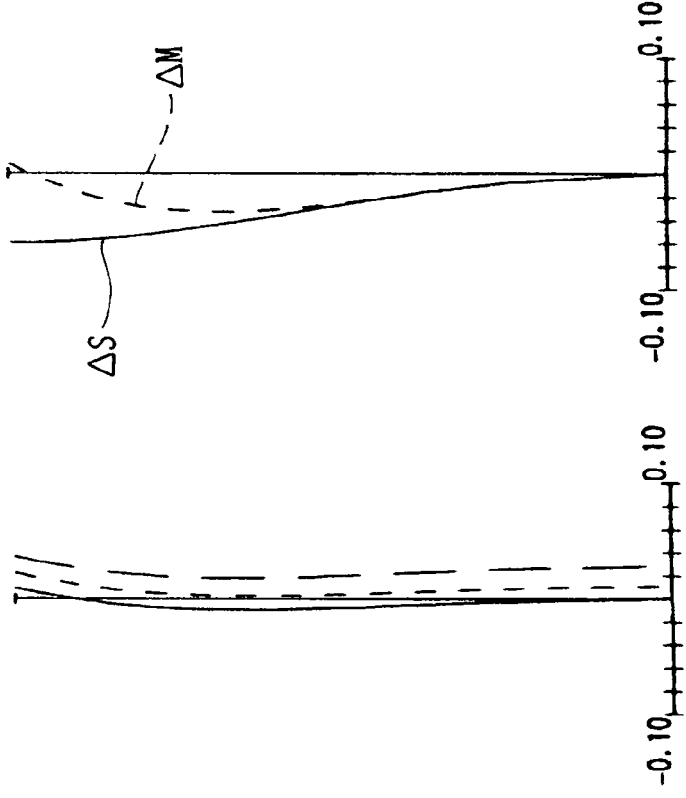

FIG. 66A
FIG. 66B
FIG. 66C
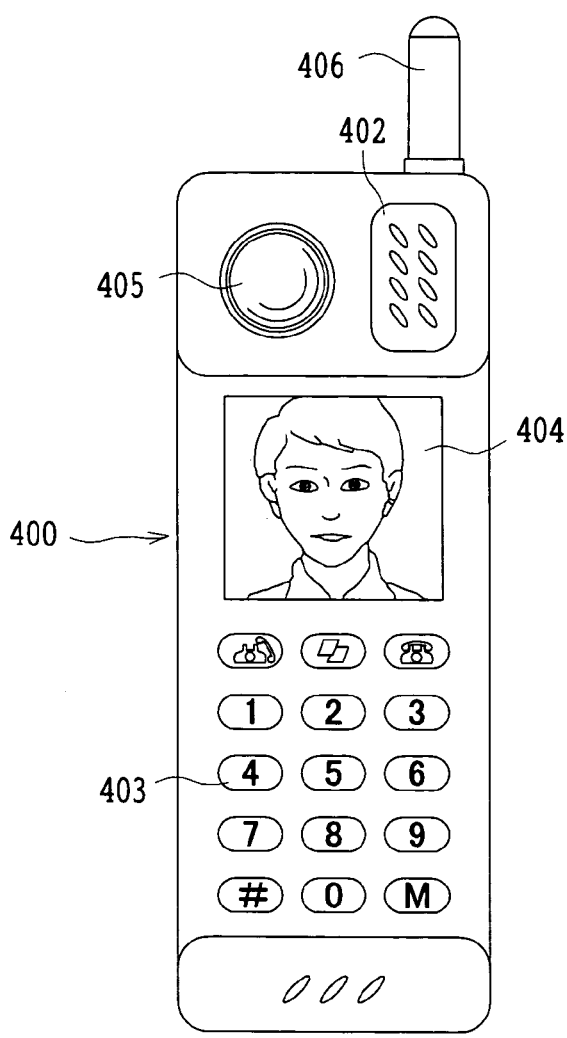
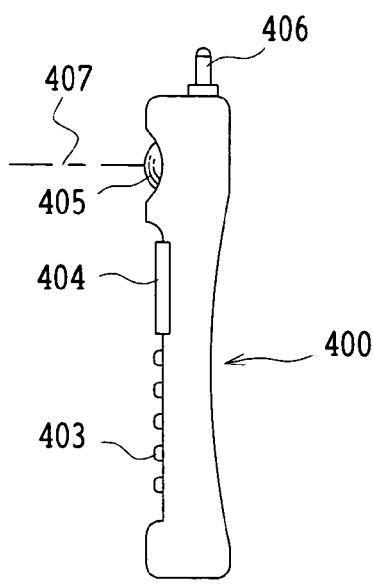
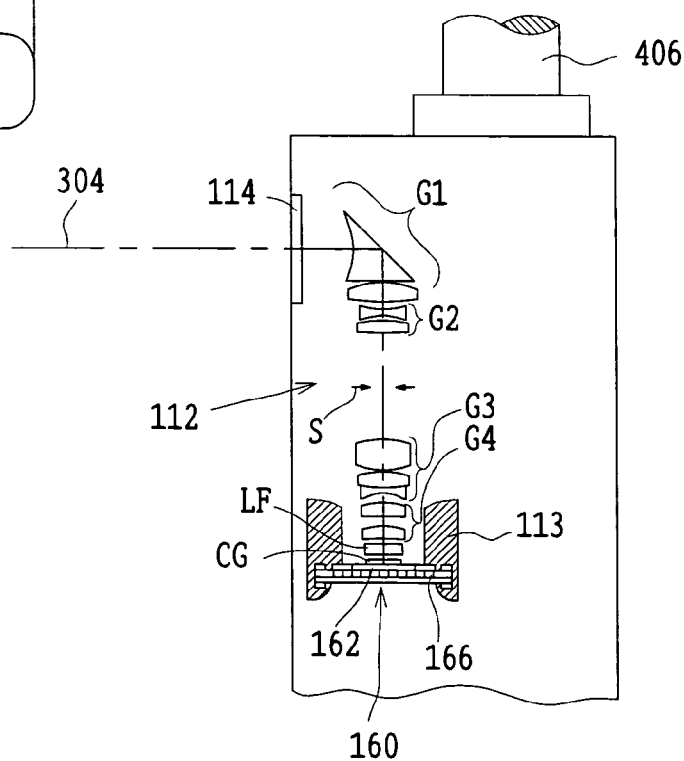

ZOOM LENS AND ELECTRONIC IMAGING APPARATUS HAVING THE SAME

BACKGROUND OF THE INVENTION

1. Field of the Invention

This invention relates to a zoom lens suitable for an electronic imaging apparatus, such as a video camera or a digital camera, in which a slim design relating to a depth and a wide-angle design of the zoom lens have been realized, and to the electronic imaging apparatus having the zoom lens.

2. Description of Related Art

Recently, as cameras for the next generation of an alternative to silver halide 35 mm film (135 format) cameras, special attention has been devoted to digital cameras (electronic cameras). Such digital cameras have come to have many categories in a wide range from a high-function type for business use to a popular potable type. In particular, in the popular portable type, cameras which are slim in depth and easy for use have come to be demanded. In addition, cameras which have high image quality and wide angles of view are required.

A thickness extending from the most object-side surface of an optical system to an imaging plane constitutes the greatest obstacle to a reduction in depth of a camera. In particularly, in a zoom optical system, this thickness offers an obstacle. Thus, the slim design technique of a camera body adopting a collapsible lens barrel has been chiefly used in recent years. The collapsible lens barrel is constructed so that the optical system protrudes from the front side of the camera body in photography, but it is incorporated in the camera body when the camera is carried. Optical systems in which the collapsible lens barrel is used and the slim design is effectively achieved are set forth, for example, in Japanese Patent Kokai Nos. Hei 11-194274, Hei 11-287953, and 2000-9997.

Each of the optical systems described in these publications includes, in order from the object side, a first lens unit with negative refracting power and a second lens unit with positive refracting power so that when the magnification of the optical system is changed, both the first lens unit and the second lens unit are moved.

Recently, a new electronic imaging apparatus has been proposed. This electronic imaging apparatus has the feature that there is no rising time (lens shifting time) required to bring the camera into a working state as in the collapsible lens barrel. Such a feature is also favorable for water and dust proof. In order to make a camera extremely small in depth, the optical system of the electronic imaging apparatus of this type is constructed so that the optical path (optical axis) of the optical system is bent by a reflecting optical element such as a mirror or a prism. Specifically, the most object-side lens unit of the optical system is fixed and the reflecting optical element is provided therein. The optical path running behind this lens is bent in a longitudinal or lateral direction of the camera body. By doing so, the smallest possible dimension of the depth is obtained.

In this case, in order to ensure the angle of view of a certain extent, a diverging surface is necessarily provided on the object side of the reflecting surface of the reflecting optical element.

Further, in order to minimize the production of distortion due to the diverging surface, a negative meniscus lens with a concave surface facing the image side of the reflecting optical element is placed.

Still further, in order to achieve path bending in a state where a succeeding lens system is kept to small size, it is necessary to keep an optical effective surface of the reflecting optical element, such as a prism or a mirror, to a minimum.

SUMMARY OF THE INVENTION

The zoom lens according to the present invention comprises a lens unit located at the most object-side position and a moving lens unit with positive refracting power, located on the image side of the lens unit. The lens unit includes a single positive lens and the moving lens unit is simply moved toward the object side when the magnification of the zoom lens is changed in the range from a wide-angle position to a telephoto position so as to satisfy the following condition:

$$0.8 < y_{07}/(fw \cdot \tan \omega_{07w}) < 0.96$$

where fw is the focal length of the entire system of the zoom lens at the wide-angle position, $y_{07}$ is an image height expressed by $0.7 \times y_{10}$, where $y_{10}$ is a distance from the center to a point farthest therefrom on the effective imaging surface of an electronic image sensor, and $\omega_{07w}$ is an angle made by a direction of an object point with an optical axis, where the object point corresponds to an image point that is at the point $y_{07}$ away from the center on the effective imaging surface of the electronic image sensor at the wide angle position.

The zoom lens according to the present invention preferably has an aperture stop between the lens unit and the moving lens unit and satisfies the following condition:

$$0.4 < \log \gamma B / \log \gamma < 4.0$$

where $\gamma = fT/fw$ (where fT is the focal length of the entire system of the zoom lens at the telephoto position) and $\gamma B$ = the magnification of the moving lens unit at the telephoto position/the magnification of the moving lens unit at the wide-angle position.

In the zoom lens according to the present invention, preferably, the lens unit includes at least one cemented lens component of a positive lens and a negative lens, arranged in this order from the object side.

In the zoom lens according to the present invention, preferably, the lens unit includes at least one optical element with negative refracting power and the optical element has at least one aspherical surface.

In the zoom lens according to the present invention, preferably, the lens unit has an optical element with negative refracting power at the most object-side position and satisfies the following condition:

$$-1.5 < (R11 + R12)/(R11 - R12) < 1.1$$

where R11 is the radius of curvature of the entrance surface of the optical element and R12 is the radius of curvature of the exit surface of the optical element.

In the zoom lens according to the present invention, preferably, the lens unit and the aperture stop are fixed when the magnification is changed.

In the zoom lens according to the present invention, preferably, the lens unit has a reflecting optical element.

In the zoom lens according to the present invention, preferably, the most object-side surface of the reflecting optical element is concave.

In the zoom lens according to the present invention, preferably, the lens unit includes a positive lens, having positive refracting power as a whole.

In the zoom lens according to the present invention, preferably, the entrance surface of the reflecting optical element is configured as an aspherical surface that divergence is impaired progressively in going from the optical axis to the periphery.

The zoom lens according to the present invention preferably satisfies the following condition:

$$0.3 < d_F/d_p < 0.7$$

where $d_F$ is a distance from an intersection of the most object-side surface of the lens unit with the optical axis to an intersection of the reflecting surface with the optical axis and $d_p$ is a distance, measured along the optical axis, from an intersection of the most object-side refracting surface relative to the reflecting surface with the optical axis to an intersection of the most image-side refracting surface relative to the reflecting surface with the optical axis.

The zoom lens according to the present invention preferably has a lens unit with negative refracting power located adjacent to the lens unit, on the image side of the lens unit, and the lens unit with negative refracting power includes a negative lens and a positive lens.

The zoom lens according to the present invention preferably has a lens unit with negative refracting power located adjacent to the lens unit, on the image side of the lens unit, and the aperture stop is interposed between the lens unit with negative refracting power and the moving lens unit.

The zoom lens according to the present invention comprises a first lens unit with positive refracting power, located at the most object-side position; a second lens unit with negative refracting power, located on the image side of the first lens unit; and a third lens unit with positive refracting power, located on the image side of the second lens unit. The zoom lens is constructed so that the first lens unit has two aspherical surfaces, and when the magnification of the zoom lens is changed in the range from the wide-angle position to the telephoto position, the second lens unit is moved and the third lens unit is simply moved toward the object side.

The zoom lens according to the present invention comprises a first lens unit with positive refracting power, located at the most object-side position; a second lens unit with negative refracting power, located on the image side of the first lens unit; and a third lens unit with positive refracting power, located on the image side of the second lens unit. The zoom lens is constructed so that the first lens unit and the second lens unit have four aspherical surfaces, and when the magnification of the zoom lens is changed in the range from the wide-angle position to the telephoto position, the second lens unit is moved and the third lens unit is simply moved toward the object side.

The zoom lens according to the present invention comprises a first lens unit with positive refracting power, located at the most object-side position; a second lens unit with negative refracting power, located on the image side of the first lens unit; and a third lens unit with positive refracting power, located on the image side of the second lens unit. The zoom lens is constructed so that each of the first lens unit and the second lens unit has two aspherical surfaces in total, and when the magnification of the zoom lens is changed in the range from the wide-angle position to the telephoto position, the second lens unit is moved and the third lens unit is simply moved toward the object side.

The zoom lens according to the present invention comprises a first lens unit with positive refracting power, located at the most object-side position; a second lens unit with negative refracting power, located on the image side of the first lens unit; and a third lens unit with positive refracting power, located on the image side of the second lens unit. The zoom lens is constructed so that the second lens unit and the third lens unit have four aspherical surfaces in total, and when the magnification of the zoom lens is changed in the range from the wide-angle position to the telephoto position, the second lens unit is moved and the third lens unit is simply moved toward the object side.

The zoom lens according to the present invention comprises a first lens unit with positive refracting power, located at the most object-side position; a second lens unit with negative refracting power, located on the image side of the first lens unit; and a third lens unit with positive refracting power, located on the image side of the second lens unit. The zoom lens is constructed so that each of the second lens unit and the third lens unit has two aspherical surfaces, and when the magnification of the zoom lens is changed in the range from the wide-angle position to the telephoto position, the second lens unit is moved and the third lens unit is simply moved toward the object side.

In the zoom lens according to the present invention, preferably, the first lens unit includes an optical element of divergence and a positive lens, arranged in this order from the object side along the optical path.

In the zoom lens according to the present invention, preferably, the second lens unit includes a biconcave lens and a positive lens, arranged in this order from the object side along the optical path.

In the zoom lens according to the present invention, preferably, the third lens unit includes a single positive lens and a cemented lens component of a positive lens and a negative lens with a concave surface of strong power facing the image side, arrange in this order from the object side along the optical path.

In the zoom lens according to the present invention, preferably, a lens unit which is movable for focusing is placed on the image side of the third lens unit.

In the zoom lens according to the present invention, preferably, the most object-side lens unit is substantially fixed with respect to the image plane.

In the zoom lens according to the present invention, preferably, the first lens unit is substantially fixed with respect to the image plane, and the optical element is a prism having an entrance surface and an exit surface so that the entrance surface is configured as a concave surface that divergence is impaired progressively in going from the optical axis to the periphery.

In the zoom lens according to the present invention, preferably, the aperture stop fixed with respect to the image plane is interposed between the second lens unit and the third lens unit, and one prism and three or less single lenses are arranged on the object side of the aperture stop.

In the zoom lens according to the present invention, preferably, the second lens unit and the third lens unit are adjacent to each other, with the aperture stop between them, and satisfy the following condition:

$$0.50 < D3/D2 < 1.40$$

where D2 is a distance, measured along the optical axis, from the vertex of the most image-side surface of the second lens unit to the aperture stop at the wide-angle position and D3 is a distance, measured along the optical axis, from the aperture stop to the vertex of the most object-side surface of the third lens unit at the wide-angle position.

The zoom lens according to the present invention preferably satisfies the following condition:

$$0.75 < y_{07}/(f_w \times \tan \omega_{07w}) < 0.96$$

The zoom lens according to the present invention preferably satisfies the following condition:

$$1.0 < f_w/y_{10} < 2.1$$

The zoom lens according to the present invention comprises a first lens unit with positive refracting power, located at the most object-side position; a second lens unit with negative refracting power, located on the image side of the first lens unit; and a third lens unit with positive refracting power, located on the image side of the second lens unit. When the magnification of the zoom lens is changed in the range from the wide-angle position to the telephoto position, the second lens unit is moved and the third lens unit is simply moved toward the object side. The first lens unit has a reflecting surface. In this case, the zoom lens satisfies the following conditions:

$$-1.0 \leq \beta 2W \leq -0.40$$

$$-1.0 \leq \beta 3W \leq -0.40$$

where $\beta 2W$ is the magnification of the second lens unit at the wide-angle position and $\beta 3W$ is the magnification of the third lens unit at the wide-angle position.

In the zoom lens according to the present invention, preferably, the entrance surface of the optical element and one surface of the positive lens are configured as aspherical surfaces that curvature is moderated progressively in going from the optical axis to the periphery.

In the zoom lens according to the present invention, preferably, the negative lens of the second lens unit and the positive lens of the third lens unit have aspherical surfaces.

The electronic imaging apparatus according to the present invention includes the zoom lens, the electronic image sensor, and an image processing unit. The image processing unit has steps that image data imaged by the electronic image sensor are electrically processed and its contour is changed.

According to the present invention, it is possible to provide the electronic imaging apparatus in which the zoom lens of high specification performance, such as a high zoom ratio and small F-number, is mounted and at the same time, the depth is extremely small, distortion is minimized, high image quality is obtained, and photography at a wide angle of view is performed.

These and other features and advantages of the present invention will become apparent from the following detailed description of the preferred embodiments when taken in conjunction with the accompanying drawings.

BRIEF DESCRIPTION OF THE DRAWINGS

FIGS. 6A, 6B, 6C, 6D, and 6E are diagrams showing characteristics of distortion at the wide-angle position, the middle position, the telephoto position, an intermediate point between the wide-angle position and the middle position, and an intermediate point between the middle position and the telephoto position, respectively, in focusing of the infinite object point of the zoom lens in the first embodiment;

FIGS. 11A, 11B, 11C, 11D, and 11E are diagrams showing characteristics of distortion at the wide-angle position, the middle position, the telephoto position, an intermediate point between the wide-angle position and the middle position, and an intermediate point between the middle position and the telephoto position, respectively, in focusing of the infinite object point of the zoom lens in the second embodiment;

FIGS. 16A, 16B, 16C, 16D, and 16E are diagrams showing characteristics of distortion at the wide-angle position, the middle position, the telephoto position, an intermediate point between the wide-angle position and the middle position, and an intermediate point between the middle position and the telephoto position, respectively, in focusing of the infinite object point of the zoom lens in the third embodiment;

FIGS. 18A, 18B, 18C, and 18D are diagrams showing aberration characteristics at the intermediate point between the wide-angle position and the middle position in focusing of the infinite object point of the zoom lens in the second embodiment;

FIGS. 18E, 18F, 18G, and 18H are diagrams showing aberration characteristics at the intermediate point between the middle position and the telephoto position in focusing of the infinite object point of the zoom lens in the third embodiment;

FIGS. 21A, 21B, 21C, and 21D are diagrams showing aberration characteristics at the wide-angle position in focusing of the infinite object point of the zoom lens in the fourth embodiment;

FIGS. 21E, 21F, 21G, and 21H are diagrams showing aberration characteristics at the middle position in focusing of the infinite object point of the zoom lens in the fourth embodiment;

FIGS. 21I, 21J, 21K, and 21L are diagrams showing aberration characteristics at the telephoto position in focusing of the infinite object point of the zoom lens in the fourth embodiment;

FIGS. 22A, 22B, 22C, and 22D are diagrams showing aberration characteristics at the wide-angle position in focusing of a shorter-distance object point of the zoom lens in the fourth embodiment;

FIGS. 22E, 22F, 22G, and 22H are diagrams showing aberration characteristics at the middle position in focusing of the shorter-distance object point of the zoom lens in the fourth embodiment;

FIGS. 22I, 22J, 22K, and 22L are diagrams showing aberration characteristics at the telephoto position in focusing of the shorter-distance object point of the zoom lens in the fourth embodiment;

FIGS. 27A, 27B, 27C, and 27D are diagrams showing aberration characteristics at the wide-angle position in focusing of the infinite object point of the zoom lens in the sixth embodiment;

FIGS. 27E, 27F, 27G, and 27H are diagrams showing aberration characteristics at the middle position in focusing of the infinite object point of the zoom lens in the sixth embodiment;

FIGS. 27I, 27J, 27K, and 27L are diagrams showing aberration characteristics at the telephoto position in focusing of the infinite object point of the zoom lens in the sixth embodiment;

FIGS. 28A, 28B, 28C, and 28D are diagrams showing aberration characteristics at the wide-angle position in focusing of the shorter-distance object point of the zoom lens in the sixth embodiment;

FIGS. 28E, 28F, 28G, and 28H are diagrams showing aberration characteristics at the middle position in focusing of the shorter-distance object point of the zoom lens in the sixth embodiment;

FIGS. 28I, 28J, 28K, and 28L are diagrams showing aberration characteristics at the telephoto position in focusing of the shorter-distance object point of the zoom lens in the sixth embodiment;

FIGS. 31A, 31B, 31C, and 31D are diagrams showing aberration characteristics at the wide-angle position in focusing of the infinite object point of the zoom lens in the seventh embodiment;

FIGS. 31E, 31F, 31G, and 31H are diagrams showing aberration characteristics at the middle position in focusing of the infinite object point of the zoom lens in the seventh embodiment;

FIGS. 31I, 31J, 31K, and 31L are diagrams showing aberration characteristics at the telephoto position in focusing of the infinite object point of the zoom lens in the seventh embodiment;

FIGS. 32A, 32B, 32C, and 32D are diagrams showing aberration characteristics at the wide-angle position in focusing of the shorter-distance object point of the zoom lens in the seventh embodiment;

FIGS. 32E, 32F, 32G, and 32H are diagrams showing aberration characteristics at the middle position in focusing of the shorter-distance object point of the zoom lens in the seventh embodiment;

FIGS. 32I, 32J, 32K, and 32L are diagrams showing aberration characteristics at the telephoto position in focusing of the shorter-distance object point of the zoom lens in the seventh embodiment;

FIGS. 35A, 35B, 35C, and 35D are diagrams showing aberration characteristics at the wide-angle position in focusing of the infinite object point of the zoom lens in the eighth embodiment;

FIGS. 35E, 35F, 35G, and 35H are diagrams showing aberration characteristics at the middle position in focusing of the infinite object point of the zoom lens in the eighth embodiment;

FIGS. 35I, 35J, 35K, and 35L are diagrams showing aberration characteristics at the telephoto position in focusing of the infinite object point of the zoom lens in the eighth embodiment;

FIGS. 36A, 36B, 36C, and 36D are diagrams showing aberration characteristics at the wide-angle position in focusing of the shorter-distance object point of the zoom lens in the eighth embodiment;

FIGS. 36E, 36F, 36G, and 36H are diagrams showing aberration characteristics at the middle position in focusing of the shorter-distance object point of the zoom lens in the eighth embodiment;

FIGS. 36I, 36J, 36K, and 36L are diagrams showing aberration characteristics at the telephoto position in focusing of the shorter-distance object point of the zoom lens in the eighth embodiment;

FIGS. 49A, 49B, 49C, and 49D are diagrams showing aberration characteristics at the wide-angle position in focusing of the infinite object point of the zoom lens in the fourteenth embodiment;

FIGS. 49E, 49F, 49G, and 49H are diagrams showing aberration characteristics at the middle position in focusing of the infinite object point of the zoom lens in the fourteenth embodiment;

FIGS. 49I, 49J, 49K, and 49L are diagrams showing aberration characteristics at the telephoto position in focusing of the infinite object point of the zoom lens in the fourteenth embodiment;

FIGS. 50A, 50B, 50C, and 50D are diagrams showing aberration characteristics at the wide-angle position in focusing of the shorter-distance object point of the zoom lens in the fourteenth embodiment;

FIGS. 50E, 50F, 50G, and 50H are diagrams showing aberration characteristics at the middle position in focusing of the shorter-distance object point of the zoom lens in the fourteenth embodiment;

FIGS. 50I, 50J, 50K, and 50L are diagrams showing aberration characteristics at the telephoto position in focusing of the shorter-distance object point of the zoom lens in the fourteenth embodiment;

FIGS. 53A, 53B, 53C, and 53D are diagrams showing aberration characteristics at the wide-angle position in focusing of the infinite object point of the zoom lens in the fifteenth embodiment;

FIGS. 53E, 53F, 53G, and 53H are diagrams showing aberration characteristics at the middle position in focusing of the infinite object point of the zoom lens in the fifteenth embodiment;

FIGS. 53I, 53J, 53K, and 53L are diagrams showing aberration characteristics at the telephoto position in focusing of the infinite object point of the zoom lens in the fifteenth embodiment;

FIGS. 54A, 54B, 54C, and 54D are diagrams showing aberration characteristics at the wide-angle position in focusing of the shorter-distance object point of the zoom lens in the fifteenth embodiment;

FIGS. 54E, 54F, 54G, and 54H are diagrams showing aberration characteristics at the middle position in focusing of the shorter-distance object point of the zoom lens in the fifteenth embodiment;

FIGS. 54I, 54J, 54K, and 54L are diagrams showing aberration characteristics at the telephoto position in focusing of the shorter-distance object point of the zoom lens in the fifteenth embodiment;

FIGS. 57A, 57B, 57C, and 57D are diagrams showing aberration characteristics at the wide-angle position in focusing of the infinite object point of the zoom lens in the sixteenth embodiment;

FIGS. 57E, 57F, 57G, and 57H are diagrams showing aberration characteristics at the middle position in focusing of the infinite object point of the zoom lens in the sixteenth embodiment;

FIGS. 57I, 57J, 57K, and 57L are diagrams showing aberration characteristics at the telephoto position in focusing of the infinite object point of the zoom lens in the sixteenth embodiment;

FIGS. 58A, 58B, 58C, and 58D are diagrams showing aberration characteristics at the wide-angle position in focusing of the shorter-distance object point of the zoom lens in the sixteenth embodiment;

FIGS. 58E, 58F, 58G, and 58H are diagrams showing aberration characteristics at the middle position in focusing of the shorter-distance object point of the zoom lens in the sixteenth embodiment;

FIGS. 58I, 58J, 58K, and 58L are diagrams showing aberration characteristics at the telephoto position in focusing of the shorter-distance object point of the zoom lens in the sixteenth embodiment;

FIG. 66A is a front view showing a mobile phone in which the path bending zoom lens of the present invention is incorporated as the photographing optical system;

FIG. 66B is a side view showing the mobile phone of FIG. 66A; and

FIG. 66C is a sectional view showing the mobile phone of FIG. 66A.

DETAILED DESCRIPTION OF THE PREFERRED EMBODIMENTS

Before undertaking the description of the embodiment, the function and effect of the present invention will be explained. In the present invention, in the electronic imaging apparatus mounting the zoom lens of a high zoom ratio and small F-number, a slim design relating to the depth and a wide angle of view are made compatible. In particular, the zoom lens, having the focal length in the proximity of the wide-angle position, is constructed so that an image with large-barrel distortion is intentionally formed on the electronic image sensor. By doing so, the information of the wide angle of view can be acquired without rendering the optical system bulky.

In the present invention, the barrel-distorted image is photoelectrically converted through the image sensor into image data. The image data are electrically corrected and processed, corresponding to a shape change (image distortion), through a signal processing system incorporated in the electronic imaging apparatus. That is, the image data output from the electronic imaging apparatus contain image distortion, which is digitally corrected. By doing so, when the image data secured through the image sensor are reproduced on a display device, an image very similar to the object is finally obtained.

Figure 1:
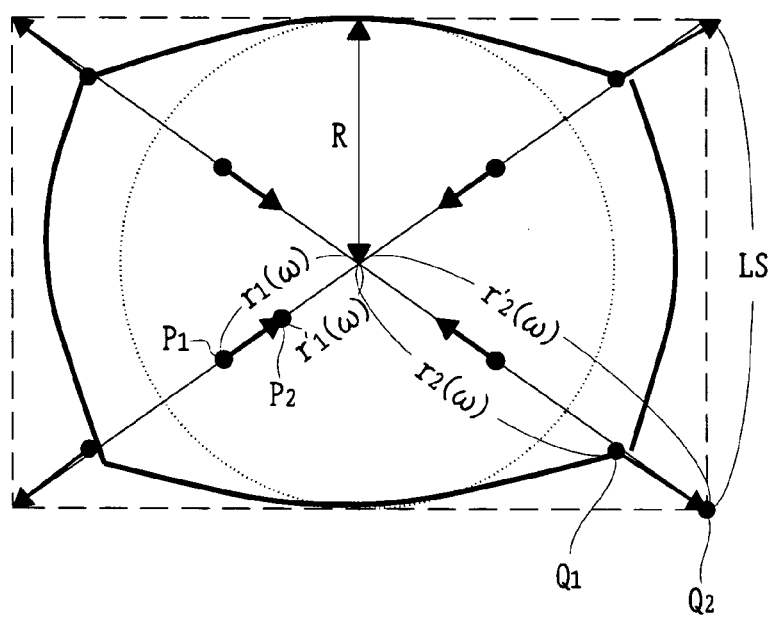
FIG. 1 is an explanatory view showing a basic conception for digitally correcting curvature of field produced by the optical system in the electronic imaging apparatus of the present invention.

Here, reference is made to a basic conception for digitally correcting the image distortion. The magnification on a circle (image height) of a radius R coming into contact with the major sides of the effective imaging surface is made constant, with an intersection of the optical axis and the imaging surface as a center, and this circle is used as a reference of correction. Individual points on circles (image heights) of given radii $r(\omega)$ are almost radially moved. In this case, the individual points are moved concentrically so that the radii $r(\omega)$ become radii $r'(\omega)$. By doing so, the image distortion is corrected. Also, it is needless to say that the circles of the given radii $r(\omega)$ are the ones other than the circle of the radius R An example of the correction is shown in FIG. 1. In FIG. 1, points located inside the circle of the radius R should be corrected toward the center of the circle R. Thus, these pints are moved toward the center of the circle. Points located outside the circle of the radius R should be corrected toward the exterior of the circle. Thus, these points are moved toward the exterior of the circle.

For example, a point P1 on the circle of a radius $r_1(\omega)$ is located inside the circle of the radius R. Thus, the point P1 is moved to a point P2 on the circle of a radius $r_1'(\omega)$ (<the radius $r_1(\omega)$). A point Q1 on the circle of a radius $r_2(\omega)$ is located outside the circle of the radius R. Thus, the point Q1 is moved to a point Q2 on the circle of a radius $r_2'(\omega)$ (> the radius $r_2(\omega)$). Also, a point situated inside the circle of the radius R may be moved toward the exterior of the circle. Similarly, a point situated outside the circle of the radius R may be moved toward the interior of the circle. How the point is moved varies with the image distortion.

Here, the radius $r'(\omega)$ can be expressed as follows:

$$r'(\omega) = \alpha f \tan \omega \ (0 \leq \alpha \leq 1)$$

where $\omega$ is the half angle of view of the object and f is the focal length of an imaging optical system (the zoom optical system of the present invention).

Here, when an ideal image height corresponding to a point on the circle (image height) of the radius R is represented by Y, the following result is obtained:

$$\alpha = R/Y = R/f \tan \omega$$

Ideally, the optical system is rotationally symmetrical about the optical axis. Hence, distortion is also produced rotationally symmetrical about the optical axis. Thus, when distortion optically produced is electrically corrected, as mentioned above, the magnification on the circle (image height) of the radius R coming into contact with the major sides of the effective imaging surface is made constant, with an intersection of the optical axis and the imaging surface as a center, on a reproduced image. Then, individual points on the circles (image heights) of the radii $r(\omega)$ other than the circle of the radius R are almost radially moved. In this case, the individual points are moved concentrically so that the radii $r(\omega)$ become radii $r'(\omega)$. By doing so, when the image distortion can be corrected, it is considered that this is advantageous for amounts of data and calculation.

However, an optical image, when formed by the electronic image sensor, ceases to be continuous. This is because the optical image is sampled by individual pixels of the electronic image sensor. Therefore, unless the pixels of the electronic image sensor are radially arrayed, the circle of the radius R drawn on the optical image ceases to be accurate at all. That is, when the image data are indicated by individual points of discrete coordinates, there is no circle that the magnification can be made constant in the shape correction of the image data. It is thus good practice to use a method of determining coordinates (Xi', Yj') of moved points in accordance with pixels (Xi, Yj). When at least two points of the pixels (Xi, Yj) are moved to the coordinates (Xi', Yj'), the average value of the pixels is taken. When there is no moving point, it is only necessary that the values of the coordinates (Xi', Yj') of some surrounding pixels are used for interpolation.

Such a method is particularly effective for correction when considerable image distortion is produced with respect to the optical axis because of manufacturing errors of the optical system and the electronic image sensor. In this case, since the circle of the radius R drawn on the optical image becomes asymmetrical, correction for determining the coordinates of moved points in accordance with the pixels is effective. In the image sensor or various output devices, geometrical distortion is sometimes produced when a signal is reproduced on the image. Even with correction in this case, the above method is effective. When a toric surface or other rotationally asymmetrical surfaces are applied, the prism can be further downsized and a further slim design of the electronic imaging apparatus is possible. In this case also, this correcting method is effective.

In the electronic imaging apparatus of the present invention, there is the need to calculate the amount of correction, $r'(\omega) - r(\omega)$. For this, the relationship between the radius $r(\omega)$, namely the half angle of view and the image height or between a real image height r and an ideal image height $r'/\omega$ is recorded in a recording medium housed in the electronic imaging apparatus. Also, in an image after correction for distortion, it is desirable that the amount of light does not suffer a serious shortage at both ends of the minor sides. For this purpose, it is favorable that the radius R satisfies the following condition:

$$0 \leq R \leq 0.6 \ Ls$$

where Ls is the length of the minor side of the effective imaging surface.

The radius R preferably satisfies the following condition:

$$0.3 \ Ls \leq R \leq 0.6 \ Ls$$

It is most advantageous that the radius R is made to practically coincide with the radius of a circle coming into contact with the minor sides of the effective imaging surface. Also, when correction is made by holding the magnification constant in the proximity of the radius R=0, namely in axial proximity, the effect of a compact design can be ensured even in a wide-angle design, although somewhat disadvantageous for a substantial number of images.

It is favorable that a focal-length section requiring correction is divided into some focal zones. The amount of correction is calculated so that the result of correction practically satisfying the following relation is obtained in the proximity of the telephoto position within each of divided focal zones. This amount of correction may be used for correction.

$$r'(\omega) = \alpha f \tan \omega$$

In this case, however, the amount of barrel distortion remains to some extent at the wide-angle position in each divided focal zone.

If the number of divided zones is increased, inherent data required for correction must be excessively stored in a recording medium. As such, it is not very favorable to increase the number of divided zones. Thus, one or several coefficients relating to the focal length in each divided focal zone are previously calculated. It is only necessary that such a coefficient is determined on the basis of the measurement of a simulation or actual equipment. The amount of correction is calculated so that the result of correction practically satisfying the following relation is obtained in the proximity of the telephoto position within each divided focal zones.

$$r'(\omega) = \alpha f \tan \omega$$

The amount of correction may be evenly multiplied by the coefficient in accordance with the focal length to obtain the final amount of correction.

When an image obtained by imaging an infinite object is free of distortion, the following relation is established:

$$f = y/\tan \omega$$

where y is a height of an image point from the optical axis (an image height).

On the other hand, when barrel distortion is produced in the imaging system, the following condition is set:

$$f > y/\tan \omega$$

That is, when the focal length f and the image height y are constant, the value of the angle ω enlarges.

Figure 2:
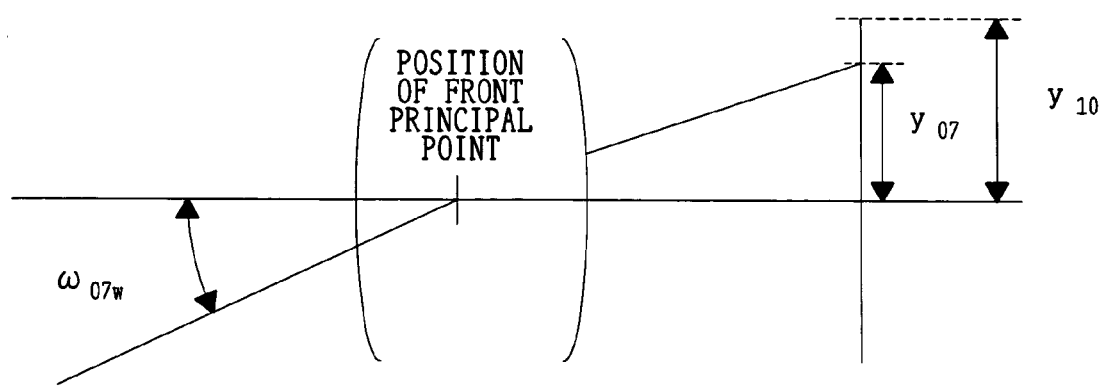
FIG. 2 is an explanatory view showing the relationship between a chief ray directed toward the position of a front principal point of a zoom optical system from the object side and the optical axis.

The following condition determines the extent of barrel distortion at the wide-angle position in the zoom optical system. It is desirable to satisfy this condition.

$$0.8 < y_{07}/(fw \cdot \tan \omega_{07w}) < 0.96 \quad (1)$$

where fw is the focal length of the entire zoom optical system at the wide-angle position, $y_{07}$ is an image height expressed by $0.7 \times y_{10}$, where $y_{10}$ is a distance (the maximum height) from the center to a point farthest therefrom on the effective imaging surface (in a plane where imaging is possible) of an electronic image sensor, and $\omega_{07w}$ is an angle made by a direction of an object point with an optical axis, where the object point corresponds to an image point that is at the point $y_{07}$ away from the center on the effective imaging surface of the electronic image sensor at the wide angle position. More specifically, as shown in FIG. 2, $\omega_{07w}$ is an angle on the object side, made by the chief ray passing through the point of the image height $y_{07}$ with the optical axis, that is, an angle made by the chief ray directed toward the position of the front principal point of the zoom optical system from the object side with the optical axis.

When the zoom optical system satisfies Condition (1), the compact design of the optical system is maintained and at the same time, an image can be obtained over a wide field of view. Furthermore, when the image is processed through the signal processing system incorporated in the electronic imaging apparatus, image distortion caused by aberration of the optical system can be corrected without increasing an enlargement ratio in a radial direction on an image periphery or recognizing the deterioration of sharpness on the image periphery.

In the present invention, distortion is intentionally produced in the optical system, and the image, after being formed by the electronic image sensor, is electrically processed so that distortion is corrected. This is done for the purpose of fulfilling the compact design and the wide-angle design (an angle of view of 38° or more in a vertical direction, allowing for distortion). In the present invention, therefore, it is also important that the optical system is chosen so that it does not have unnecessary size.

In order to maintain the compact design even in the wide-angle design of the zoom optical system, it is necessary to locate the entrance pupil as close to the object side as possible. It is thus desirable that the lens unit for changing the magnification of the zoom optical system is located on the image side of the aperture stop.

For the compact design, it is advantageous that the effective imaging area of the image sensor is narrowed and the focal length of the optical system is reduced. For this purpose, it is advantageous that the zoom optical system has the power corresponding to a so-called retrofocus system that a front lens unit has negative refracting power and a rear lens unit has positive refracting power.

In the zoom optical system of the present invention, therefore, a lens unit B (a moving lens unit) having the positive refracting power to change the magnification is placed on the image side of the apertures stop, and when the magnification is changed in the range from the wide-angle position to the telephoto position, this moving lens unit is moved in only one direction (toward the object side to increase the magnification) without changing its direction. In this case, the optical system satisfies the following condition:

$$0.4 < \log \gamma B/\log \gamma < 4.0 \quad (2)$$

where γ=fT/fw (where fT is the focal length of the entire zoom optical system at the telephoto position) and γB=the magnification of the lens unit B at the telephoto position/the magnification of the lens unit B at the wide-angle position.

When the zoom optical system satisfies Condition (2), there is no need to locate the entrance pupil of the zoom optical system farther away from the object side. Moreover, the fluctuation of aberration in the magnification change is suppressed and imaging performance can be ensured. When the lens unit is located on the object side of the aperture stop, or when the lens unit (a lens unit I) is located at the most object-side position, bulkiness of the diameter and depth of the lens unit is prevented and at the same time, the angle of view can be ensured.

In the lens unit located on the object side of the aperture stop, or in the lens unit located at the most object-side position, there is a tendency that positive lenses are often used in order to ensure correction for chromatic aberration and the zoom ratio. Such positive lenses in the lens unit constitute an obstacle to locating the entrance pupil close to the object side. Thus, in the present invention, only one positive lens is used in the lens unit.

In the present invention, it is further desirable to satisfy at least one of the following conditions:

$$0.85 < y_{07}/(fw \cdot \tan \omega_{07w}) < 0.95 \quad (1')$$

$$0.45 < \log \gamma B/\log \gamma < 2.5 \quad (2')$$

It is more desirable to satisfy at least one of the following conditions:

$$0.8 < y_{07}/(fw \cdot \tan \omega_{07w}) < 0.94 \quad (1'')$$

$$0.5 < \log \gamma B/\log \gamma < 1.0 \quad (2'')$$

As mentioned above, individual points on the circles of the radii r(ω) drawn on the imaging surface, with an intersection of the optical axis and the imaging surface as a center, are moved concentrically so that the radii r(ω) become radii r'(ω) (after correction). Whereby, correction for distortion is made. Here, each of the radii r'(ω) can be expressed as follows:

$$r'(\omega) = \alpha f \tan \omega \, (0 \leq \alpha \leq 1)$$

In order to calculate the amount of correction, r'(ω)−r(ω), the relationship between the half angle of view and the image height (r(ω)) or between the real image height r and the ideal image height r'/ω is recorded in the recording medium housed in the electronic imaging apparatus.

Here, correction for distortion need not be made over all the zoom area and may be made only in the proximity of the wide-angle position where barrel distortion is particularly increased. For example, the optical system may be designed so that the correction is not made over a focal length fs= $\sqrt{fw \cdot ft}$ at the middle position, a focal length fst=$\sqrt{fs \cdot ft}$ between the middle position and the telephoto position, or all the focal lengths between these two focal lengths.

The focal-length section requiring correction is divided into some focal zones. In each of the zones, the same amount of correction is used. In particular, correction is made so that the radius r'(ω)=αf tan ω is satisfied in the proximity of the telephoto position within the focal-length section. It is favorable that the focal-length section is divided into zones so that the amount of barrel distortion remaining at the wide-angle position within the focal-length section is allowable. Also, for the number of zones, three to seven zones are appropriate.

Subsequently, a description is given of the lens unit B used in the zoom optical system of the present invention. The lens unit B has positive refracting power, and is simply moved toward the object side when the magnification is changed in the range from the wide-angle position to the telephoto position. Relative decentration sensitivities of lenses constituting the lens unit B tend to increase. In particular, when the lens unit B includes a negative lens and an adjacent positive lens on the object side thereof, the relative decentration sensitivities of both lenses become considerably high. Thus, in order to moderate the relative decentration sensitivities, it is desirable that the lens unit B has a cemented lens component of a positive lens and a negative lens, arranged in this order from the object side.

In this case, it is favorable to satisfy the following condition:

$$0.30 < R_{B3}/R_{B1} < 1.2 \quad (3)$$

where $R_{B1}$ is the radius of curvature of the most object-side surface of the cemented lens component in the lens unit B and $R_{B3}$ is the radius of curvature, on the optical axis, of the most image-side surface of the cemented lens component in the lens unit B.

When the optical system satisfies Condition (3), the effect of moderating the decentration sensitivity due to lens cementation is brought about and at the same time, spherical aberration, coma, and astigmatism in the entire zoom optical system can be corrected.

It is further desirable to satisfy the following condition:

$$0.33 < R_{B3}/R_{B1} < 1.0 \quad (3')$$

It is more desirable to satisfy the following condition:

$$0.36 < R_{B3}/R_{B1} < 0.8 \quad (3'')$$

In correction for chromatic aberration, it is desirable to satisfy the following conditions:

$$-0.7 < fw/R_{B2} < 0.7 \quad (4)$$

$$20 < \nu_{BP} - \nu_{BN} \quad (5)$$

where $R_{B2}$ is the radius of curvature, on the optical axis, of the interface of the cemented lens component of the lens unit B, $\nu_{BP}$ is the Abbe's number of the medium of the positive lens in the cemented lens component of the lens unit B, and $\nu_{BN}$ is the Abbe's number of the medium of the negative lens in the cemented lens component of the lens unit B.

When the optical system satisfies Condition (4), spherical aberration of short wavelength is neither undercorrected nor overcorrected, and axial chromatic aberration and chromatic aberration of magnification can be corrected.

When the optical system satisfies Condition (5), axial chromatic aberration can be completely corrected. Also, a combination of media such as to exceed the upper limit of Condition (5) does not exist in the natural world.

It is further desirable to satisfy the following conditions:

$$-0.5 < fw/R_{B2} < 0.4 \quad (4')$$

$$25 < \nu_{BP} - \nu_{BN} \quad (5')$$

It is more desirable to satisfy the following conditions:

$$-0.3 < fw/R_{B2} < 0.1 \quad (4'')$$

$$30 < \nu_{BP} - \nu_{BN} \quad (5'')$$

It is good practice to provide the lens unit B with strong power so that the magnification can be efficiently changed by a slight amount of movement. It is thus desirable that the lens unit B includes a single positive lens on the object side of the cemented lens component and has the lens arrangement of two lens components composed of three lens elements as a whole.

Next, the lens unit I will be described more in detail. In order to locate the entrance pupil close to the object side, maintain the compact design, and ensure the wide angle of view, it is good practice to reduce the number of lens elements constituting the lens unit I. The lens unit B preferably includes not more than two optical elements with negative refracting power and has not more than three lens elements as a whole. When the number of lens elements is reduced as mentioned above, coma and astigmatism are liable to be produced. Consequently, it is desirable that the lens unit I is designed to include at least one optical element with negative refracting power, having at least one aspherical surface.

In order to locate the entrance pupil close to the object side, it is desirable that an optical element with negative refracting power is placed at the most object-side position of the lens unit I. In the surface profile of the optical element, it is desirable to satisfy the following condition:

$$-0.5 < (R11+R12)/(R11-R12) < 1.1 \quad (6)$$

where R11 is the radius of curvature of the entrance surface of the optical element with negative refracting power and R12 is the radius of curvature of the exit surface of the optical element with negative refracting power.

To locate the entrance pupil close to the object side, it is desirable that the value of (R11+R12)/(R11−R12) is low. However, when it is too low, barrel distortion is liable to be produced.

In the present invention, in order to achieve the wide-angle design, barrel distortion is positively produced. The present invention is constructed so that this produced aberration is electrically corrected. It is thus desirable that the value of (R11 +R12)/(R11−R12) is relatively low since a double effect relative to the compact design and the wide-angle design can be brought about.

When Condition (6) is satisfied, the extent of barrel distortion at the wide-angle position of the zoom optical system satisfies Condition (1) and the effects of the compact design and the wide-angle design can be secured without lessening the effect of locating the entrance pupil close to the object side.

It is further desirable to satisfy the following condition:

$$-1.3 < (R11+R12)/(R11-R12) < 0.6 \quad (6')$$

It is more desirable to satisfy the following condition:

$$-1.1 < (R11+R12)/(R11-R12) < 0.1 \quad (6'')$$

As a means of reducing the depth of the camera, bending of the optical path (optical axis) of the imaging optical system can be used. In this case, as the optical path is bent on the object side of the imaging optical system as far as possible, the effect of reducing the depth is heightened.

In the present invention, therefore, it is favorable that the lens unit I has a reflecting optical element for bending the optical path and satisfies the following condition:

$$0.3 < d_F/d_P < 0.7 \quad (7)$$

where $d_F$ is a distance from an intersection of the most object-side surface of the lens unit I with the optical axis to an intersection of the first reflecting surface with the optical axis and $d_P$ is a distance, measured along the optical axis, from an intersection of the most object-side refracting surface (an entrance surface in a prism) relative to the reflecting surface with the optical axis to an intersection of the most image-side refracting surface (an exit surface in the prism) relative to the reflecting surface with the optical axis.

When Condition (7) is satisfied, oversizing of the lens unit I is avoided by the positional relationship with the entrance pupil, and the production of ghost is suppressed. The depth of the camera can thus be reduced.

It is desirable that the reflecting surface is located on the object side of the lens unit I as far as possible. However, if the negative refracting power is not provided on the object side of the position of path bending, the entrance pupil will be located farther away from the most object-side surface of the imaging optical system. In particular, when the reflecting optical element for bending the optical path is constructed with a prism, it is good practice to configure its entrance surface to be concave. It is desirable that this prism is located at the most object-side position in the lens unit I and satisfies the following condition:

$$-7 < R11/y_{10} < -1.5 \qquad (8)$$

where R11 is the radius of curvature, on the optical axis, of the most object-side surface of the lens unit I and $y_{10}$ is a distance (the maximum image height) form the center to a point farthest therefrom on the effective imaging surface (in a plane where imaging is possible) of the electronic image sensor.

When Condition (8) is satisfied, it is avoidable that the negative refracting power on the object side of the position of path bending is lessened and the entrance pupil is located far away from the object side. As a result, bulkiness of the prism can be suppressed. Furthermore, since a ray height can be lowered on the image side of the prism, bulkiness of succeeding lenses and an increase of a stop diameter can be suppressed. Consequently, the depth of the camera can be reduced.

It is further desirable to satisfy the following condition:

$$0.35 < d_F/d_P < 0.6 \qquad (7')$$

It is more desirable to satisfy the following condition:

$$0.4 < d_F/d_P < 0.55 \qquad (7'')$$

It is further desirable to satisfy the following condition:

$$-5.5 < R11/y_{10} < -2 \qquad (8')$$

It is more desirable to satisfy the following condition:

$$-4.5 < R11/y_{10} < -2.5 \qquad (8'')$$

To reduce the depth of the camera, it is most advantageous that the prism is used as the reflecting optical element. The refractive index of the medium of the prism in the d line should be high, preferably at least 1.68 and ideally at least 1.75.

It is also desirable that the entrance surface of the prism is configured as an aspherical surface that curvature is moderated progressively in going from the optical axis to the periphery. Moreover, in the radius of curvature on the optical axis, it is desirable to satisfy the following condition:

$$-0.70 \leq fw \cdot (n1-1)/R11 \leq -0.20 \qquad (9)$$

where n1 is the refractive index (reference wavelength) of the medium of the prism.

When Condition (9) is satisfied, the curvature is not very strong and the deterioration of off-axis aberrations can be prevented. In addition, the entrance pupil is not located far away from the object side, and a tendency toward bulkiness of the prism can be repressed.

It is further desirable to satisfy the following condition:

$$-0.60 < fw \cdot (n1-1)/R11 \leq -0.25 \qquad (9')$$

It is more desirable to satisfy the following condition:

$$-0.50 \leq fw \cdot (n1-1)/R11 \leq -0.30 \qquad (9'')$$

A driving mechanism is indispensable for the zoom lens. Even though the optical system is downsized, a complicated and oversized driving mechanism is meaningless. In the electronic imaging apparatus of the present invention, the depth is reduced as one purpose. Thus, it is undesirable that the diameter of the zoom lens including the driving mechanism (which is hereinafter referred to as a zoom lens unit) is increased.

In order to reduce the diameter of the zoom lens unit, it is necessary that the position of a shutter unit is not shifted in zoom operation, the stop diameter is made small, and the amount of movement of the lens unit is decreased. To satisfy these requirements at the same time, it is desirable that the lens unit I has positive refracting power as a whole. In this case, it is good practice that a lens unit II with negative refracting power, which is moved along the optical axis and thereby exercises a variable magnification function, is placed on the image side of the lens unit 1, followed by the lens unit B on the image side thereof.

Specifically, the variable magnification function is shared between the lens unit II and the lens unit B, and thus the amount of movement of each of the lens units is decreased. Moreover, the lens unit II and the lens unit B, which have refracting powers of mutually different signs, are moved on opposite directions when the magnification changed. As such, when the aperture stop and a shutter are interposed between the lens unit II and the lens unit B, there is no need to move the aperture stop and the shutter when the magnification is changed. In addition, the aperture diameter can be made small.

In the lens unit I with positive refracting power, it is desirable that the ray height is kept to a minimum to obviate oversizing and aberrations can be favorably corrected. For this, the lens unit I is preferably constructed to include, in order from the object side, a reflecting optical element for bending the optical path, with an entrance surface configured as a concave surface facing the object side and a positive lens.

It is further desirable that the entrance surface of the reflecting optical element is configured as an aspherical surface that curvature is moderated progressively in going from the optical axis to the periphery. By doing so, the amount of production of distortion can be controlled relatively free, and coma can be favorably corrected.

In addition, it is also desirable that the positive lens, like the reflecting optical element, is such that at least one surface is configured as an aspherical surface that curvature is moderated progressively in going from the optical axis to the periphery. When the optical system is constructed as mentioned above, the decentration sensitivity is liable to be increased. Hence, it is favorable that the lens unit I is fixed when the magnification is changed.

In the present invention, the lens unit moved for focusing (called a lens unit F) is placed on the image side of the lens unit B. By doing so, it is avoidable that a paraxial magnification becomes −1×, aberration is heavily fluctuated in the magnification change, and the amount of shift is extremely increased. The lens unit F may be placed as the most image-side lens unit, but another fixed lens unit (called a lens unit C) may be provided on the image side thereof.

It is desirable that the lens unit I, when having positive refracting power, is constructed with two elements, a prism and a positive lens, arranged in this order from the object side. This prism has the entrance surface configured as an aspherical concave surface and includes a reflecting surface for bending the optical path. The prism preferably has negative refracting power so that it particularly satisfies at least one of Conditions (9), (9'), and (9"). By doing so, the entrance pupil is located close to the object side and compactness of the prism can be kept.

In order to improve the variable magnification efficiency of the lens unit II, the lens unit I is required to have the highest possible refractive index as a whole. In this case, it is desirable to satisfy the following condition:

$$2.0 \leq f1/fw \leq 10.0 \quad (10)$$

where f1 is the focal length of the whole of the lens unit I.

When Condition (10) is satisfied, the difficulty of correction for off-axis aberration or chromatic aberration and bulkiness of the prism are avoidable, the variable magnification ratio of the lens unit II can be increased.

It is further desirable to satisfy the following condition:

$$2.5 \leq f1/fw \leq 8.0 \quad (10')$$

It is more desirable to satisfy the following condition:

$$3.0 \leq f1/fw \leq 6.0 \quad (10'')$$

It is favorable that the positive lens placed in the lens unit I is designed to satisfy Condition (11) described below. By doing so, the ratio of the refractive index to the height of a transmitted off-axis ray can be increased. At the same time, it is desirable that the shape of the positive lens satisfies Condition (12) described below.

$$1.3 \leq f12/fw \leq 4.0 \quad (11)$$

$$-1.1 < (R_{1PF}+R_{1PR})/(R_{1PF}-R_{1PR}) < 0.2 \quad (12)$$

where f12 is the focal length of the positive lens in the lens unit I, $R_{1PF}$ is the radius of curvature, on the optical axis, of the object-side surface of the positive lens in the lens unit I, and $R_{1PR}$ is the radius of curvature, on the optical axis, of the image-side surface of the positive lens in the lens unit I.

When Condition (11) is satisfied, it is avoidable that the variable magnification ratio of the lens unit II becomes low for the amount of movement and the optical system is bulky. Moreover, it is also avoidable that correction for off-axis aberration, such as astigmatism, becomes difficult. When Condition (12) is satisfied, a tendency that the principal point of the lens unit I is located on the image side is not exhibited, and the variable magnification efficiency of the lens unit II can be favorably maintained. Furthermore, the production of coma can be suppressed, and interference with the lens unit II does not occur because the lens unit I does not assume a meniscus shape of strong curvature.

It is further desirable to satisfy the following conditions:

$$1.5 \leq f12/fw \leq 3.6 \quad (11')$$

$$-0.9 < (R_{1PF}+R_{1PR})/(R_{1PF}-R_{1PR}) < 0.2 \quad (12')$$

It is more desirable to satisfy the following conditions:

$$1.7 < f12/fw < 3.2 \quad (11'')$$

$$-0.7 < (R_{1PF}+R_{1PR})/(R_{1PF}-R_{1PR}) < 0.2 \quad (12'')$$

Also, even though Conditions (11) and (12) are satisfied, cases occur in which correction for off-axis aberration is incomplete. In the present invention, therefore, an aspherical surface that convergence is impaired progressively in going from the optical axis to the periphery is introduced into the object-side surface of the positive lens. By doing so, a remarkable improvement effect of off-axis aberration is obtained.

Subsequently, a description is given of the lens unit II. It is desirable that the lens unit II is constructed with two lenses, a negative lens and a positive lens, arranged in this order from the object side. It is further desirable that at least one surface of this negative lens is configured as an aspherical surface and in addition, the negative lens satisfies the following condition:

$$-1.0 < (R_{2NF}+R_{2NR})/(R_{2NF}-R_{2NR}) < 1.0 \quad (13)$$

where $R_{2NF}$ is the radius of curvature, on the optical axis, of the object-side surface of the negative lens in the lens unit II and $R_{2NR}$ is the radius of curvature, on the optical axis, of the image-side surface of the negative lens in the lens unit II.

When Condition (13) is satisfied, the production of coma and barrel distortion can be suppressed.

It is further desirable to satisfy the following condition:

$$-0.7 < (R_{2NF}+R_{2NR})/(R_{2NF}-R_{2NR}) < 0.6 \quad (13')$$

It is more desirable to satisfy the following condition:

$$-0.4 < (R_{2NF}+R_{2NR})/(R_{2NF}-R_{2NR}) < 0.2 \quad (13'')$$

Next, reference is made to an optical low-pass filter applicable to the electronic imaging apparatus of the present invention. In the lens system using the electronic image sensor, an optical low-pass filter taking advantage of birefringence is usually interposed between the imaging optical system and the electronic image sensor. However, this arrangement offers an obstacle to the compact design and correction for aberration. It is thus desirable to use the optical low-pass filter of the smallest possible thickness.

In order to decrease the thickness of the optical low-pass filter, it is desirable to increase a difference between refractive indices of a birefringent optical element relative to an ordinary ray and an extraordinary ray by satisfying the following condition:

$$5 < ne \cdot no | ne^2 - no^2 | < 20 \quad (14)$$

where ne is the refractive index of the birefringent optical element relative to the extraordinary ray and no is the refractive index of the birefringent optical element relative to the ordinary ray.

When Condition (14) is satisfied, the thickness is moderated, which is suitable for the compact design. In addition, the optical low-pass filter capable of completely transmitting visible light can be realized.

It is further desirable to satisfy the following condition:

$$7 < ne \cdot no | ne^2 - no^2 | < 15 \quad (14')$$

It is more desirable to satisfy the following condition:

$$9 < ne \cdot no | ne^2 - no^2 | < 11 \quad (14'')$$

The optical low-pass filter is required to prevent the production of aliasing. The aliasing is the phenomenon occurring when the imaging optical system possesses a vast number of components over the Nyquist rate. However, when the pixel size is moderately reduced, the components over the Nyquist rate are eliminated due to diffraction. In the electronic imaging apparatus of the present invention, therefore, it is desirable to use the image sensor satisfying the following condition:

$$Fw \geq a \ (\mu m) \quad (15)$$

where Fw is an exposure F value at the wide-angle position and a is a pixel-to-pixel distance (in micrometers) in a horizontal direction of the image sensor. More specifically, it is dimensionless. Also, the pixel-to-pixel distance may be a pixel pitch.

When Condition (15) is satisfied, aliasing can be suppressed to an allowable extent even though the optical low-pass filter is not used.

It is further desirable to satisfy the following condition:

$$Fw > 1.2a \ (\mu m) \quad (15')$$

It is more desirable to satisfy the following condition:

$$Fw > 1.4a \ (\mu m) \quad (15'')$$

When Condition (15) is not satisfied, the optical low-pass filter becomes necessary. In this case, the optical low-pass filter is preferably constructed as described below to have the smallest possible thickness.

In general, the optical low-pass filter takes advantage of a birefringence function of a uniaxial crystal such as quartz. The optical low-pass filter is constructed with one uniaxial crystal (a crystal having the birefringence function) or a plurality of uniaxial crystals. When the optical low-pass filter is constructed with the plurality of uniaxial crystals, individual crystals constitute the optical low-pass filter.

In either case, an angle made by the crystal axis with the optical axis of the zoom lens varies from 35° to 55°. The optical low-pass filter, when constructed with the plurality of uniaxial crystals, is such that directions where individual crystal axes are projected on an image plane are different.

When such optical low-pass filters are contained in the optical system, it is desirable that a thickness $t_{LPF}$ (mm) of the optical low-pass filter satisfies the following conditions:

when a<4 μm, $$0.08a < t_{LPF} < 0.16a \quad (16)$$

when a<3 μm, $$0.075a < t_{LPF} < 0.5a \quad (17)$$

where $t_{LPF}$ (mm) is the largest thickness of an optical low-pass filter, measured along the optical axis, having one crystal axis within the range that the angle made with the optical axis of the zoom lens varies from 35° to 55°.

Of a plurality of optical low-pass filters, an optical low-pass filter of the largest thickness is set with respect to the thickness so that contrast theoretically becomes zero by the Nyquist limited rate. The thickness in this case is approximately a/5.88 (mm). Beyond the value of a/5.88 (mm), the effect of preventing false signals such as moiré fringes is brought about, but the resolution of the image sensor ceases to be completely applicable. Below the value of a/5.88 (mm), false signals such as moiré fringes cannot be completely eliminated.

However, the false signals such as moiré fringes have a close relationship with the imaging performance of a photographic lens such as the zoom lens. For example, when the imaging performance is high, the false signals such as moiré fringes are liable to be produced. Consequently, it is favorable that the thickness of the optical low-pass filter is set to be somewhat large when the imaging performance is high, and to be somewhat small when it is not very high.

On the other hand, as the pixel pitch becomes small, the contrast of the frequency component over the Nyquist limit is decreased by the influence of diffraction of the imaging lens system. As a result, the production of the false signals such as moiré fringes is minimized. In such a case, therefore, the thickness is made several to several tens of percent smaller than the value of a/5.88 (mm). By doing so, contrast at a preset spatial frequency is rather improved, which is favorable. Here, the preset spatial frequency refers to a spatial frequency below the frequency corresponding to the Nyquist limit.

When the following conditions are satisfied, a further effective result is obtained:

when a<4 μm, $$0.075a < t_{LPF} < 0.15a \quad (16')$$

when a<3 μm, $$0.07a < t_{LPF} < 0.14a \quad (17')$$

When the following conditions are satisfied, a more effective result is obtained:

when a<4 μm, $$0.07a < t_{LPF} < 0.14a \quad (16'')$$

when a<3 μm, $$0.065a < t_{LPF} < 0.13a \quad (17'')$$

When the thickness is made extremely small in the condition, a<4 μm, the fabrication of the optical low-pass filter is difficult. Thus, even when the thickness of the optical low-pass filter is not made very small, that is, even when the upper limit of Condition (16), (16'), or (16'') is exceeded, there are other approaches of increasing the spatial frequency (cutoff frequency) that contrast becomes zero.

One of these approaches is to set an angle made by the crystal axis of the optical low-pass filter with the optical axis of the zoom lens in the range from 15 to 35 degrees or from 55 to 75 degrees. In this angle range, the amount of separation of incident light into the ordinary ray and the extraordinary ray is less than in the proximity of 45 degrees. At an angle of 0 or 90 degrees, the incident light ceases to separate into the ordinary ray and the extraordinary ray (however, at 90 degrees, a velocity difference is produced between both rays, resulting in a phase difference . . . the principle of the quarter-wave plate). Another approach is to eliminate the optical low-pass filter, as the case may be.

When the pixel pitch is decreased, as mentioned above, imaging performance at a high spatial frequency is deteriorated accordingly by the influence of diffraction. Consequently, it is difficult to increase the F-number. Thus, if the camera is provided with only two kinds of aperture stops that have considerable deterioration due to geometrical aberration in opening and a stop value in the proximity of the diffraction limit, the optical low-pass filter may be eliminated. In particular, when the pixel pitch is small and imaging performance in opening is best, it is not necessary to use a method of replacing a variable inside-diameter stop or a different inside-diameter stop as a means of restricting the size of a light beam incident on the imaging surface. It is good practice, for example, to use a fixed inside-diameter aperture stop and to provide a variable transmittance means at any place in the optical path.

Figure 3:
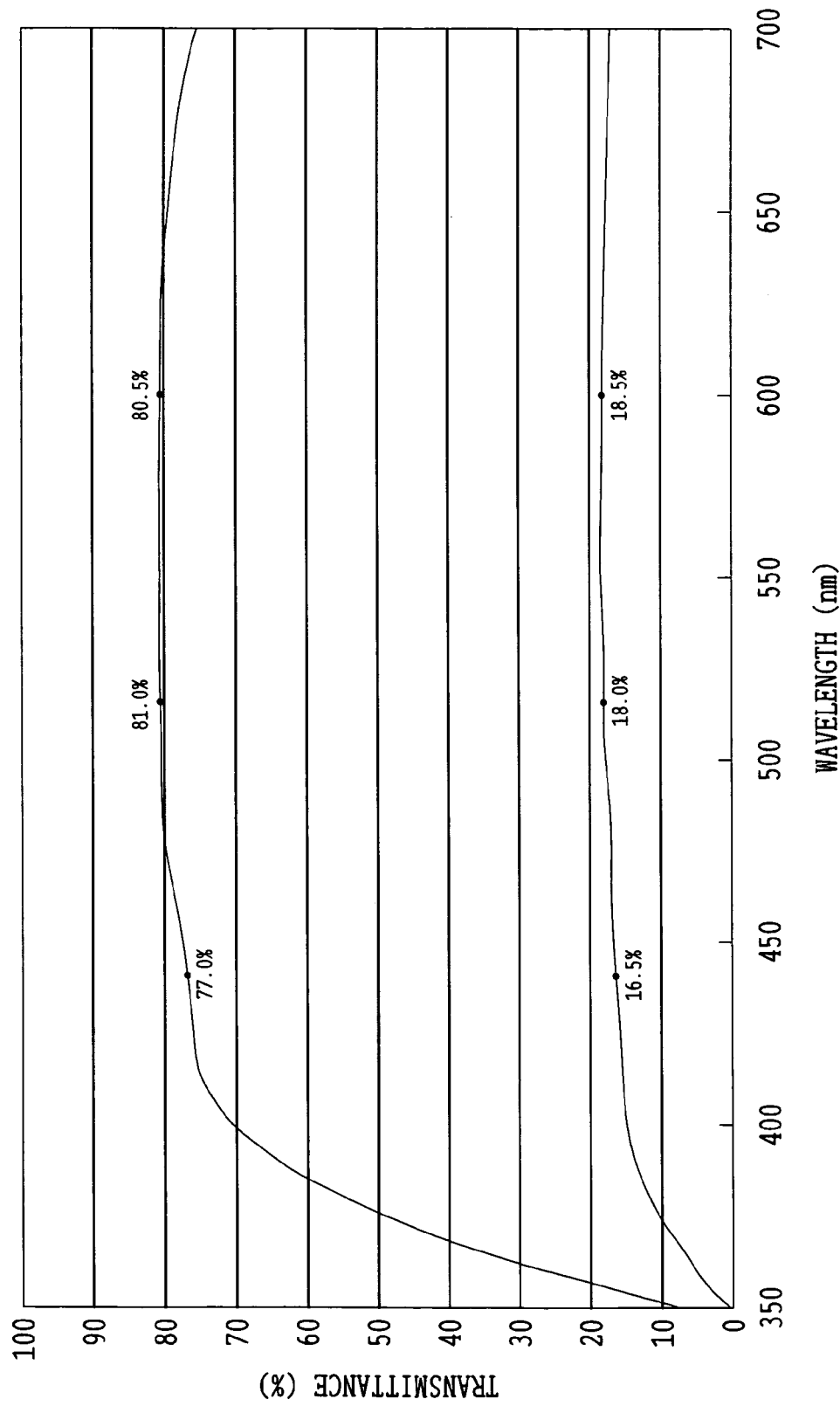
FIG. 3 is a graph showing spectral transmittance characteristics of an electro-chromic element applicable as a variable transmittance means in the electronic imaging apparatus of the present invention.

When the variable transmittance means is introduced into the optical path, there is a method of use an optical element whose transmittance is different. For example, an optical element whose transmittance can be changed by a voltage, like an electrochromic element, may be used. FIG. 3 shows spectral transmittance characteristics of the electrochromic element. In this case, the ratio between a maximum transmittance $\tau$ max ($\geq 0.7$) at a wavelength of 520 nm and a minimum transmittance $\tau$ min ($\geq 0.3$) should be at least 2.5, preferably at least 3.5.

It is desirable that, in the whole range of a condition, $\tau$ min<$\tau$520<$\tau$ max, the spectral transmittance satisfies the following conditions:

$$\tau 440/\tau 520 > 0.7 \tag{18}$$

$$\tau 600/\tau 520 > 0.8 \tag{19}$$

where $\tau x$ (x is a numeral) is a transmittance at a wavelength of x nm.

It is further desirable to satisfy the following conditions:

$$\tau 440/\tau 520 > 0.75 \tag{18'}$$

$$\tau 600/\tau 520 > 0.85 \tag{19'}$$

It is more desirable to satisfy the following conditions:

$$\tau 440/\tau 520 > 0.8 \tag{18''}$$

$$\tau 600/\tau 520 > 0.9 \tag{19''}$$

Also, it is favorable that the optical low-pass filter is placed on the image side of the most image-side lens unit of the imaging lens unit. However, the optical low-pass filter is extremely thin and thus a strength problem arises. Therefore, it is favorable that the image-side surface of a lens located at the most image-side position is configured as a flat surface, to which the optical low-pass filter is cemented. Alternatively, the optical low-pass filter may be cemented to the cover glass of the image sensor.

For a means of cutting off infrared light, it is good practice to coat the flat surface of any lens with an infrared cutoff film.

As a variable transmittance optical element, the electrochromic element mentioned above is available. The electrochromic element is such that a substance in which a chemical change is electrically carried out to vary the transmittance is sandwiched between two glass base plates having transparent electrodes. It is good practice to locate such a variable transmittance optical element at any place of the optical path. In this case, it is desirable that the electrochromic element is placed on the image side of the lens unit F moved for focusing, described above. Alternatively, one of the two glass base plates of the variable transmittance optical element may be substituted with an optical element having flat surfaces. In particular, when the image-side surface of the last lens is flat, the two glass base plates may be substituted with a lens having flat surfaces and the optical low-pass filter.

Subsequently, reference is made to the infrared cutoff filter. In the electronic imaging apparatus, an infrared absorbing filter of constant thickness is usually introduced into the optical path on the object side of the image sensor so that infrared light is not incident on the imaging surface. Consider now that the infrared absorbing filter is replaced with a coating having no thickness to speak of, in order to render the optical system short or thin in the electronic imaging apparatus. Although the optical system is, of course, made thin accordingly, the secondary effect to be described below is brought about.

For example, a near-infrared sharp cutoff coating in which the transmittance at a wavelength of 600 nm is 80% or more and the transmittance at a wavelength of 700 nm is 8% or less is introduced into the optical path on the object side of the image sensor located behind the zoom lens. Then, the transmittance in the near-infrared region of wavelengths more than 700 nm is lower than that of the absorption-type filter and the transmittance on the red side becomes relatively high. In this case, a gain adjustment moderates the defect of a tendency to magenta on the blue-violet side, caused by the solid-state image sensor, such as a CCD, having a complementary color mosaic filter. As a result, color reproducibility like that of the solid-state image sensor, such as the CCD, having the primary color filter can be obtained. Also, the color reproducibility at a high reflectance in the near-infrared region as in plants and human skins, not to speak of the primary colors and the complementary color, is improved.

That is, it is desirable to satisfy the following conditions:

$$\tau 600/\tau 550 \geq 0.8 \tag{20}$$

$$\tau 700/\tau 550 \leq 0.08 \tag{21}$$

It is further desirable to satisfy the following conditions:

$$\tau 600/\tau 550 \geq 0.85 \tag{20'}$$

$$\tau 700/\tau 550 \leq 0.05 \tag{21'}$$

It is more desirable to satisfy the following conditions:

$$\tau 600/\tau 550 \geq 0.9 \tag{20''}$$

$$\tau 700/\tau 550 \leq 0.03 \tag{21''}$$

Another defect of the solid-state image sensor such as the CCD is that sensitivity to a wavelength of 550 nm in the near-ultraviolet region is considerably higher than that of the human eye. This brings about remarkable blurring of color at the edge of an image due to chromatic aberration in the near-ultraviolet region. In particular, it is fatal when the optical system is downsized. Thus, an absorbing body or a reflecting body such that the ratio of the transmittance ($\tau 400$) at a wavelength of 400 nm to the transmittance ($\tau 550$) at a wavelength of 550 nm is 0.08 or less and the ratio of the transmittance ($\tau 440$) at a wavelength of 440 nm to the transmittance ($\tau 550$) at a wavelength of 550 nm is 0.4 or more is preferably introduced in the optical path. By ding so, the wavelength region necessary for color reproducibility is maintained (while keeping favorable color reproducibility) and a noise, such as color blurring, is lessened significantly.

That is, it is desirable to satisfy the following conditions:

$$\tau 400/\tau 550 \leq 0.08 \tag{22}$$

$$\tau 440/\tau 550 \geq 0.4 \tag{23}$$

It is further desirable to satisfy the following conditions:

$$\tau 400/\tau 550 \leq 0.06 \tag{22'}$$

$$\tau 440/\tau 550 > 0.5 \tag{23'}$$

It is more desirable to satisfy the following conditions:

$$\tau 400/\tau 550 \leq 0.04 \tag{22''}$$

$$\tau 440/\tau 550 \geq 0.6 \tag{23''}$$

Also, it is favorable that these filters are interposed between the imaging optical system and the image sensor.

On the other hand, the complementary color filter, because of its high energy of transmitted light, is higher in substantial sensitivity than in the CCD with the primary color filter and is more advantageous for resolution. Consequently, there is a great merit where a small-sized CCD is used.

Also, the above conditions and arrangements are properly combined, and thereby more favorable electronic imaging apparatuses can be constructed. In individual conditions, only the upper of lower limit may be restricted by the upper or lower limit corresponding to a more favorable condition. The corresponding value of the condition in each of the embodiments to be described later may be set to the upper limit or the lower limit.

In the optical system suitable for the imaging apparatus which is small in depth, when an attempt is made to ensure imaging performance and a wide angle of view, the optical system is designed to have arrangements described below. One of them is to reduce the number of constituent lenses as far as possible. Another is to bend the optical path on the entrance side of the optical system as far as possible.

As a fundamental arrangement of the optical system, a first lens unit with positive refracting power is placed on the most object-side position, a second lens unit with negative refracting power is placed on the image side of the first lens unit, and a third lens unit with positive refracting power is placed on the image side of the second lens unit. In this arrangement, a plurality of aspherical surfaces are effectively used in the range from a front lens unit of the optical system to a lens unit taking charge of the magnification change of the optical system.

In the aspherical surfaces, it is favorable to adopt any of the ways that (1) at least two surfaces are placed in a first lens unit G1, (2) at least four surfaces are placed in a lens unit combining a second lens unit G2 with a third lens unit G3, (3) at least four surfaces are placed in a lens unit combining the first lens unit G1 with the second lens unit G2, (4) at least two surfaces are placed in each of the first lens unit G1 and the third lens unit G3, (5) at least two surfaces are placed in each of the second lens unit G2 and the third lens unit G3, and (6) three third lens units, each having at least two surfaces, are placed.

Two aspherical surfaces may be introduced into each of the three lens units. In this case, it is good practice that, in the first lens unit G1, the aspherical surfaces are introduced into a divergent surface and a convergent surface, placed in this order from the object side. In the second lens unit G2, they are introduced into only a negative lens, and in the third lens unit G3, they are introduced into only a positive lens. These aspherical surfaces are indispensable for corrections for distortion at the wide-angle position, coma at the telephoto position, spherical aberration due to the magnification change, and fluctuation of coma.

It is desirable that each of the lens units is constructed with the minimum number of elements. The first lens unit G1 should include, in order from the object side along the optical path, an optical element with divergence and a positive lens, arranged as two elements. The second lens unit G2 should include, in order from the object side along the optical path, a biconcave lens and a positive lens. The third lens unit G3 should include, in order from the object side along the optical path, a single positive lens and a lens component of a positive lens and a negative lens with a concave surface of strong power facing the image side, arranged as two lens components composed of three lens elements. For focusing, it is favorable that a movable lens unit is placed, as a fourth lens unit G4 (the focusing lens unit F), on the image side of the third lens unit G3.

In the second lens unit G2 and the third lens unit G3, it is desirable that their magnifications satisfy the following conditions:

$$-1.0 \leq \beta 2W \leq -0.4 \tag{24}$$

$$-1.0 \beta 3W \leq -0.4 \tag{25}$$

where β2W is the magnification of the second lens unit G2 at the wide-angle position and β3W is the magnification of the third lens unit G3 at the wide-angle position.

Below the lower limit of Condition (24), the variable magnification ratio due to the movement of the second lens unit G2 is liable to be decreased. Beyond the upper limit, the variable magnification ratio due to the movement of the third lens unit G3 is liable to be decreased. Within Condition (24), the magnification of the third lens unit G3 is as in Condition (25).

It is more desirable to satisfy at least one of the following conditions:

$$-0.9 \leq \beta 2W \leq -0.45 \tag{24'}$$

$$-0.9 \leq \beta 3W \leq -0.45 \tag{25'}$$

It is most desirable to satisfy at least one of the following conditions:

$$-0.8 \leq \beta 2W \leq -0.5 \tag{24''}$$

$$-0.8 \leq \beta 3W \leq -0.5 \tag{25''}$$

The fourth lens unit G4 may be moved in the magnification change. However, it is desirable that, in view of compactness of a focus actuator, a movement limit including the movement in the magnification change satisfies the following condition:

$$0.8 \times 10^2 < M4 \times S1 < 6.0 \times 10^2 \tag{26}$$

where M4 is a difference between a distance where the fourth lens unit G4 is located at the most object-side position in any state and a distance where it is located at the most image-side position and S1 is a distance (mm) from an object focused when the fourth lens unit G4 is located at the most object-side position to the entrance surface of the optical system.

Beyond the upper limit of Condition (26), the actuator for focusing becomes bulky.

It is more desirable to satisfy the following condition:

$$1.2 \times 10^2 < M4 \times S1 < 5.5 \times 10^2 \tag{26'}$$

It is most desirable to satisfy the following condition:

$$1.6 \times 10^2 < M4 \times S1 < 5.0 \times 10^2 \tag{26''}$$

In order to properly set an angle of emergence of a ray of light from the optical system, another lens unit (hereinafter referred to as the last lens unit) may be located at the most image-side position of the optical system so that the position of the lens unit is practically fixed with respect to the image plane. It is favorable that the last lens unit is constructed with a single lens and satisfies the following condition:

$$-0.10 < fw/fR < 0.50 \tag{27}$$

where fR is the focal length of the last lens unit.

Below the lower limit of Condition (27), the power of the fourth lens unit G4 is increased and the fluctuation of aberration due to focusing becomes heavy. Beyond the upper limit, the amount of movement of the fourth lens unit G4 is increased and the focus actuator is liable to become bulky.

It is more favorable to satisfy the following condition:

$$-0.06 < fw/fR < 0.40 \tag{27'}$$

It is most favorable to satisfy the following condition:

$$-0.02 < fw/fR < 0.32 \tag{27''}$$

It is desirable to satisfy the following conditions:

$$40 < vF \tag{28}$$

$$25 < vR < 60 \tag{29}$$

where νF is the Abbe's number of a medium when the fourth lens unit is constructed with a single lens and νR is the Abbe's number of a medium when the last lens unit is constructed with a single lens.

Below the lower limit of Condition (28), the fluctuation of color due to focusing becomes heavy. Beyond the upper limit of Condition (29), chromatic aberration of magnification is overcorrected, while below the lower limit, chromatic aberration of magnification is liable to be undercorrected.

It is more desirable to satisfy at least one of the following conditions:

$$45 < \nu F \tag{28'}$$

$$25 < \nu R < 50 \tag{29'}$$

It is most desirable to satisfy at least one of the following conditions:

$$50 < \nu F \tag{28''}$$

$$25 < \nu R < 40 \tag{29''}$$

As mentioned above, one of methods of reducing the depth of the electronic imaging apparatus is to bend the optical path on the entrance side of the optical system as far as possible. The first lens unit G1 is practically fixed with respect to the image plane. The optical element with divergence in the first lens unit G1 is located at the most object-side position. As this optical element, a prism which has an entrance surface configured as a concave surface facing the object side and a reflecting surface for bending the optical path is suitable. It is desirable that the entrance surface is configured as an aspherical surface that divergence is impaired progressively in going from the optical axis to the periphery. It is also desirable that the object-side surface of the positive lens located on the image side thereof is configured as the aspherical surface.

In the second lens unit G2, one or both surfaces of the negative lens should be aspherical. In the third lens unit G3, one or both surfaces of the positive lens should be aspherical.

It is desirable that the first lens unit G1 satisfies the following conditions:

$$33 < \nu 12 < 75 \tag{30}$$

$$1.55 < n12 \tag{31}$$

where ν12 is the Abbe's number of the medium of the positive lens in the first lens unit G1 and n12 is the refractive index of the medium of the positive lens in the first lens unit G1.

Beyond the upper limit of Condition (30), chromatic aberration of magnification is undercorrected, and below the lower limit, chromatic aberration of magnification is overcorrected. Below the lower limit of Condition (31), coma is liable to be produced at the telephoto position.

It is more desirable to satisfy at least one of the following conditions:

$$33 < \nu 12 < 55 \tag{30'}$$

$$1.65 < n12 \tag{31'}$$

It is most desirable to satisfy at least one of the following conditions:

$$33 < \nu 12 < 50 \tag{30''}$$

$$1.73 < n12 \tag{31''}$$

The aperture stop is interposed between the second lens unit G2 and the third lens unit G3 so that its position is fixed with respect to the image plane. The lens system on the object side of the aperture stop is preferably constructed with one prism and three or less single lenses. By doing so, the entrance pupil is located as close to the object side as possible and the area of path bending can be downsized. The second lens unit G2 and the third lens unit G3 are adjacent to each other, with the aperture stop between them. In this case, when D2 is a distance, measured along the optical axis, from the vertex of the most image-side surface of the second lens unit G2 to the aperture stop at the wide-angle position and D3 is a distance, measured along the optical axis, from the aperture stop to the vertex of the most object-side surface of the third lens unit G3 at the wide-angle position, it is desirable to satisfy the following condition:

$$0.50 < D3/D2 < 1.40 \tag{32}$$

Beyond the upper limit of Condition (32), the F value is liable to increase. Below the lower limit, the prism is liable to become bulky.

The aspherical surfaces are preferably introduced into the negative lens in the second lens unit G2 with negative refracting power and the positive lens in the third lens unit G3 with positive refracting power. Whereby, the fluctuation of aberration due to the movement of the second lens unit G2 and the third lens unit G3 in the magnification change can be minimized. Each of the second lens unit G2 and the third lens unit G3 is preferably provided with two aspherical surfaces. It is more desirable to satisfy the following condition:

$$0.60 < D3/D2 < 1.30 \tag{32'}$$

It is most desirable to satisfy the following condition:

$$0.70 < D3/D2 < 1.20 \tag{32''}$$

In the zoom lens of the present invention, the entrance surface is configured as the divergent surface and thus has the shape that a concave surface faces the object side. In addition, its power is strong. Consequently, barrel distortion is liable to occur. However, when the distortion is accepted, the ray height of incident light is decreased for the angle of view. It is thus possible that the prism is rendered small.

In the zoom lens optical system of the present invention, therefore, barrel distortion is intentionally produced at will. In this state, an image formed through the imaging optical system is picked up by the electronic image sensor. However, image data obtained are not used as they are, but are processed. Specifically, a function, such as image processing, changing the shape is used to correct the distortion of the image due to distortion produced in the optical system so that the image can be observed. In particular, it is ideal to output the image data already corrected from the electronic imaging apparatus such as a camera.

In this case, it is desirable that, with respect to distortion of the imaging optical system in focusing of a nearly infinite object point, the optical system satisfies the following conditions:

$$0.75 < y_{07}/(f_w \cdot \tan \omega_{07w}) < 0.96 \tag{33}$$

$$1.0 < f_w/y_{10} < 2.1 \tag{34}$$

It is more desirable to satisfy at least one of the following conditions:

$$0.80 < y_{07}/(f_w \cdot \tan \omega_{07w}) < 0.95 \tag{33'}$$

$$1.1 < f_w/y_{10} < 2 \tag{34'}$$

It is most desirable to satisfy at least one of the following conditions:

$$0.85 < y_{07}/(fw \cdot \tan \omega_{07w}) < 0.94 \tag{33''}$$

$$1.2 < fw/y_{10} < 1.9 \tag{34''}$$

The zoom lens according to the present invention includes, in order from the object side along the optical path, a first lens unit with positive refracting power, having a reflecting surface for bending the optical path; a first moving lens unit with negative refracting power; and a second moving lens unit simply moved toward the object side when the magnification of the zoom lens is changed in the range from the wide-angle position to the telephoto position. In this case, the zoom lens can be constructed to satisfy the following conditions at the same time:

$$-1.0 \leq \beta 2W \leq -0.40 \tag{35}$$

$$-1.0 \leq \beta 3W \leq -0.40 \tag{36}$$

where $\beta 2W$ is the magnification of the first moving lens unit at the wide-angle position and $\beta 3W$ is the magnification of the second moving lens unit at the wide-angle position.

Below the lower limit of Condition (35), the variable magnification ratio due to the movement of the first moving lens unit is liable to be decreased. Beyond the upper limit, the variable magnification ratio due to the movement of the second moving lens unit is liable to be decreased. Within Condition (35), the magnification of the second moving lens unit is as in Condition (36).

It is more desirable to satisfy at least one of the following conditions:

$$-0.9 \leq \beta 2W \leq -0.45 \tag{35'}$$

$$-0.9 \leq \beta 3W \leq -0.45 \tag{36'}$$

It is most desirable to satisfy at least one of the following conditions:

$$-0.8 \leq \beta 2W \leq -0.50 \tag{35''}$$

$$-0.8 \leq \beta 3W \leq -0.50 \tag{36''}$$

The zoom lens according to the present invention comprises, in order from the object side along the optical path, a first lens unit with positive refracting power, a first moving lens unit with negative refracting power, an aperture stop practically fixed with respect to the image plane, and a second moving lens unit simply moved toward the object side when the magnification of the zoom lens is changed in the range from the wide-angle position to the telephoto position. The first lens unit is practically fixed with respect to the image plane and includes, in order from the object side along the optical path, an optical element which has an entrance surface configured as a concave surface facing the object side and a reflecting surface for bending the optical path and a positive lens. The first moving lens unit includes, in order from the object side along the optical path, a biconcave lens and a positive lens. The second moving lens unit includes, in order from the object side along the optical path, a single positive lens and a cemented lens component of a positive lens and a negative lens with a concave surface of strong power facing the image side.

In the zoom lens, in order to efficiently exercise the variable magnification function and to ensure compactness, it is desirable to satisfy the following conditions:

$$1.4 \leq |f2|/fw \leq 5.0 \tag{37}$$

$$1.4 \leq f3/fw < 5.0 \tag{38}$$

where f2 is the focal length of the first moving lens unit and f3 is the focal length of the second moving lens unit.

Beyond the upper limit of Condition (37) or (38), the power of the first moving lens unit or the second moving lens unit is impaired. Below the lower limit, the magnification of the first moving lens unit or the second moving lens unit becomes low. According to such a relation, in either case, the variable magnification ratio is liable to lower for the amount of movement.

It is more desirable to satisfy at least one of the following conditions:

$$1.7 \leq |f2|/fw \leq 4.5 \tag{37'}$$

$$1.7 \leq f3/fw \leq 4.5 \tag{38'}$$

It is most desirable to satisfy at least one of the following conditions:

$$2.0 \leq |f2|/fw \leq 4.0 \tag{37''}$$

$$2.0 \leq f3/fw \leq 4.0 \tag{38''}$$

In the zoom lens of the present invention, the optical path is bent by the reflecting optical element located at the most object-side position. Thus, the advantage of the zoom lens is that the thickness corresponding to the depth is kept to a minimum. At the same time, the position of the stop is fixed with respect to the image plane, and hence there is no need to provide space for moving the stop and the shutter actuator in the magnification change. In addition, since the lens unit located at the most object-side position has the positive refracting power, the diameter of the aperture stop is small for the F value and shutter blades require a minimum of relief space. Whereby, the zoom lens has a great advantage that the thickness of the optical system after bending is also kept to a minimum.

It is desirable that a high zoom ratio is obtained to some extent and the position of the stop is fixed. This can be realized by dividing the lens unit moved in the magnification change into two and placing them in front of and behind the stop. Since the first moving lens unit and the second moving lend unit have refracting powers of different signs, the magnification can be efficiently changed in regard to the amount of movement.

In order to diminish the size of the reflecting optical element (the optical element which has the entrance surface configured as a concave surface facing the object side and the reflecting surface for bending the optical path) and to reduce the thickness thereof, it is important to locate the entrance pupil as close to the entrance surface as possible. For this, it is only necessary that the number of optical parts to the aperture stop is minimized, and each of the lens units is designed to include, in order from the object side along the optical path, a divergent lens component and a convergent lens component.

In the present invention, the optical system is constructed with only four parts in a combination of the first lens unit with the first moving lens unit. In the path bending optical system like the present invention, an image point relative to a combination system of the first lens unit and the first moving lens unit, that is, an object point relative to a combination system behind the second moving lens unit, is liable to be far away from the object side. Consequently, the magnification of the combination system behind the second moving lens unit tends to decrease. This exhibits a tendency that it is hard to increase the magnification for the movement of the lens unit. In order to repress this tendency, it is favorable that the second moving lens unit has the strongest possible power and the principal point is located as close to the object side as possible.

In the present invention, therefore, the second moving lens unit is designed to include a positive lens, a positive lens, and a negative lens. Moreover, the negative lens of a high decentration sensitivity is cemented to the positive lens located immediately before the negative lens. In the first moving lens unit, to reduce the number of parts and increase the negative power, the negative lens is configured as a biconcave lens.

In the present invention, the reflecting optical element is designed to have the smallest possible size. Thus, the power of each of the divergent lens component and the convergent lens component of the first lens unit is strengthened. Consequently, distortion and coma are liable to occur. In correction for coma, it is desirable that the entrance surface of the optical element and one convergent surface of the positive lens in the first lens unit are configured as aspherical surfaces in which curvature is moderated progressively in going from the optical axis to the periphery. Also, correction for distortion will be described later.

In order to downsize the reflecting optical element, it is desirable that the amount of movement of the first moving lens unit is made much smaller than that of the second moving lens unit. In the present invention, the first moving lens unit and the second moving lens unit are adjacent to each other, with the stop between them. It is thus desirable to satisfy the following condition:

$$0.5 < D3/D2 < 1.4 \tag{39}$$

where D2 is a distance, measured along the optical axis, from the vertex of the most image-side surface of the first moving lens unit to the aperture stop at the wide-angle position and D3 is a distance, measured along the optical axis, from the aperture stop to the vertex of the most object-side surface of the second moving lens unit at the wide-angle position.

Beyond the upper limit of Condition (39), the F value is liable to increase. Below the lower limit, the prism configured as the reflecting optical element is liable to become bulky.

It is more desirable to satisfy the following condition:

$$0.6 < D3/D2 < 1.3 \tag{39'}$$

It is most desirable to satisfy the following condition:

$$0.7 < D3/D2 < 1.2 \tag{39''}$$

The aspherical surfaces are preferably introduced into the negative lens in the first moving lens unit with negative refracting power and the positive lens in the second moving lens unit with positive refracting power. Whereby, the fluctuation of aberration due to the movement of the first moving lens unit and the second moving lens unit in the magnification change can be minimized. Each of the first moving lens unit and the second moving lens unit is preferably provided with two aspherical surfaces.

For focusing, it is favorable that a focusing lens unit is placed on the image side of the second moving lens unit. This focusing lens unit can be moved in focusing. In this case, the smallest possible area is moved for focusing in the whole range of the magnification change. Whereby, the focus actuator can be downsized significantly. It is thus desirable to satisfy the following condition:

$$0.8 \times 10^2 < M4 \cdot S1 < 6.0 \times 10^2 \tag{40}$$

where M4 is a difference between a distance where the focusing lens unit is located at the most object-side position in any state and a distance where it is located at the most image-side position and S1 is a distance (mm) from an object focused when the focusing lens unit is located at the most object-side position to the entrance surface of the optical system.

Beyond the upper limit of Condition (40), the actuator for focusing becomes bulky.

It is more desirable to satisfy the following condition:

$$1.2 \times 10^2 < M4 \cdot S1 < 5.5 \times 10^2 \tag{40'}$$

It is most desirable to satisfy the following condition:

$$1.6 \times 10^2 < M4 \cdot S1 < 5.0 \times 10^2 \tag{40''}$$

For chief purposes of correcting aberration and reducing the emergent angle of a chief ray, a lens unit closest to the image plane may be placed so that its position is fixed with respect to the image plane. This lens unit is different from the focusing lens unit. The lens unit may also be provided with a filter and coated with an infrared cutoff coating.

In the zoom lens of the present invention, the entrance surface is configured as the divergent surface and thus has the shape that a concave surface faces the object side. In addition, since its power is strong, barrel distortion is liable to occur. However, when the distortion is accepted, the ray height of incident light is decreased for the angle of view. It is thus possible that the prism is rendered small.

In the zoom lens optical system of the present invention, therefore, barrel distortion is intentionally produced at will. In this state, an image formed through the imaging optical system is picked up by the electronic image sensor. Image data thus obtained are processed and the shape is changed. As mentioned above, a function processing the image data to correct the distortion of the image due to distortion produced in the optical system so that the image can be observed. In particular, it is ideal to output the image data already corrected from the electronic imaging apparatus such as a camera.

It is desirable that, with respect to distortion of the imaging optical system in focusing of a nearly infinite object point, the zoom lens satisfies the following conditions:

$$0.75 < y_{07}/(fw \cdot \tan \omega_{07w}) < 0.96 \tag{41}$$

$$1.0 < fw/y_{10} < 2.1 \tag{42}$$

It is more desirable to satisfy at least one of the following conditions:

$$0.80 < y_{07}/(fw \cdot \tan \omega_{07w}) < 0.95 \tag{41'}$$

$$1.1 < fw/y_{10} < 2.0 \tag{42'}$$

It is most desirable to satisfy at least one of the following conditions:

$$0.85 < y_{07}/(fw \cdot \tan \omega_{07w}) < 0.94 \tag{41''}$$

$$1.2 < fw/y_{10} < 1.9 \tag{42''}$$

When the zoom lens according to the present invention mentioned above is used, it is further desirable that the first lens unit satisfies at least one of conditions (A) and (B) described below.

(A) It is favorable that the optical element for bending the optical path satisfies the following conditions:

$$0.3 < d_F/d_P < 0.7 \tag{43}$$

$$-6.0 < R11/y10 < -1.2 \tag{44}$$

$$-0.75 \leq fw \cdot (n1-1)/R11 \leq -0.15 \tag{45}$$

where $d_F$ is a distance from an intersection of the most object-side surface of the first lens unit with the optical axis to an intersection of the first reflecting surface with the optical axis, $d_P$ is a distance, measured along the optical axis, from an intersection of the most object-side refracting surface (an entrance surface in a prism) relative to the reflecting surface with the optical axis to an intersection of the most image-side refracting surface (an exit surface in the prism) relative to the reflecting surface with the optical axis, fw is the focal length of the entire system of the zoom lens at the wide-angle position, n1 is the refractive index (reference wavelength) of the medium of the prism, and R11 is the radius of curvature, on the optical axis, of the entrance surface of the prism.

Beyond the upper limit of Condition (43), the first lens unit is liable to be oversized due to the position of the entrance pupil. Below the lower limit, ghost is considerably produced. Below the lower limit of Condition (44), the ray height of off-axis incident light is increased and the prism is liable to be oversized. In addition, chromatic aberration ceases to be completely corrected. Beyond the upper limit, the ray height of the positive lens in the first lens unit is increased. As a result, the dimension of the depth is liable to be increased. Moreover, coma is liable to occur at the telephoto position. Beyond the upper limit of Condition (45), curvature is extremely sharpened. Consequently, off-axis aberration is liable to deteriorate, which is unfavorable. Below the lower limit, the entrance pupil is located too far away from the object side. Thus, the prism tends to bulk.

It is more favorable to satisfy at least one of the following conditions:

$$0.35 < d_F/d_p < 0.6 \quad (43')$$

$$-5.0 < R11/y10 < -1.6 \quad (44')$$

$$-0.70 \leq fw \cdot (n1-1)/R11 \leq -0.20 \quad (45')$$

It is most favorable to satisfy at least one of the following conditions:

$$0.4 < d_F/d_p < 0.55 \quad (43'')$$

$$-4.0 < R11/y10 < -2.0 \quad (44'')$$

$$-0.65 \leq fw \cdot (n1-1)/R11 \leq -0.25 \quad (45'')$$

To reduce the depth of the camera, it is most advantageous that the prism is used as the reflecting optical element. The refractive index of the medium of the prism in the d line should be high, preferably at least 1.65 and ideally at least 1.75.

(B) In order to improve the variable magnification efficiency of the first moving lens unit, it is necessary to have the strongest possible positive power so as to satisfy Condition (46) described below as the whole of the first lens unit. It is thus desirable that the positive lens of the first lens unit is designed to satisfy Condition (47) described below. That is, it is desirable that the positive lens has a strong power for the height of an off-axis ray passing therethrough. At the same time, it is also desirable that the lens shape satisfies Condition (48) described below.

$$2.0 \leq f1/fw \leq 10.0 \quad (46)$$

$$1.1 \leq f12/fw \leq 5.0 \quad (47)$$

$$-1.1 < (R_{1PF}+R_{1PR})/(R_{1PF}-R_{1PR}) < 0.4 \quad (48)$$

where f1 is the focal length of the whole of the first lens unit, f12 is the focal length of the positive lens in the first lens unit, $R_{1PF}$ is the radius of curvature, on the optical axis, of the object-side surface of the positive lens in the first lens unit, and $R_{1PR}$ is the radius of curvature, on the optical axis, of the image-side surface of the positive lens in the first lens unit.

Below the lower limit of Condition (46), the variable magnification ratio becomes low for the amount of movement of the first moving lens unit in the magnification change. Beyond the upper limit, corrections for off-axis aberration and chromatic aberration become difficult. Alternatively, the prism is liable to bulk. Beyond the upper limit of Condition (47), the variable magnification ratio of the first moving lens unit becomes low for the amount of movement. Thus, the optical system is liable to enlarge. Below the lower limit, corrections for off-axis aberrations, such as coma and astigmatism, are liable to become difficult. Beyond the upper limit of Condition (48), the principal point of the first lens unit tends to approach the image side. As such, the variable magnification efficiency of the first moving lens unit is rather impaired. Moreover, coma is liable to be produced. Below the lower limit, the lens in the first lens unit assumes a strong meniscus shape. Hence, the first lens unit is liable to interfere with the first moving lens unit, which is unfavorable.

It is more desirable to satisfy at least one of the following conditions:

$$2.5 \leq f1/fw \leq 8.0 \quad (46')$$

$$1.3 \leq f12/fw \leq 4.0 \quad (47')$$

$$-0.9 < (R_{1PF}+R_{1PR})/(R_{1PF}-R_{1PR}) < 0.2 \quad (48')$$

It is most desirable to satisfy at least one of the following conditions:

$$3.0 \leq f1/fw \leq 6.0 \quad (46'')$$

$$1.5 \leq f12/fw \leq 3.2 \quad (47'')$$

$$-0.7 < (R_{1PF}+R_{1PR})/(R_{1PF}-R_{1PR}) < 0.0 \quad (48'')$$

It is further favorable that the first moving lens unit satisfies the following conditions:

$$-1.0 < (R_{2NF}+R_{2NR})/(R_{2NF}-R_{2NR}) < 1.0 \quad (49)$$

$$-3.0 < (R_{2PF}+R_{2PR})/(R_{2PF}-R_{2PR}) < 1.0 \quad (50)$$

$$d_{22}/fw < 0.3 \quad (51)$$

where $R_{2NF}$ is the radius of curvature, on the optical axis, of the object-side surface of the negative lens in the first moving lens unit, $R_{2NR}$ is the radius of curvature, on the optical axis, of the image-side surface of the negative lens in the first moving lens unit, $R_{2PF}$ is the radius of curvature, on the optical axis, of the object-side surface of the positive lens in the first moving lens unit, $R_{2PR}$ is the radius of curvature, on the optical axis, of the image-side surface of the positive lens in the first moving lens unit, and $d_{22}$ is a distance, on the optical axis, from the image-side surface of the negative lens to the object-side surface of the positive lens in the first moving lens unit.

Beyond the upper limit of Condition (49), below the lower limit of Condition (50), and beyond the upper limit of Condition (51), the entrance pupil is liable to be located far away from the entrance surface of the entire zoom lens. In addition, the prism tends to bulk.

It is more favorable to satisfy at least one of the following conditions:

$$-0.8 < (R_{2NF}+R_{2NR})/(R_{2NF}-R_{2NR}) < 0.8 \quad (49')$$

$$-2.0 < (R_{2PF}+R_{2PR})/(R_{2PF}-R_{2PR}) < 0.5 \quad (50')$$

$$d_{22}/fw < 0.25 \quad (51')$$

It is most favorable to satisfy at least one of the following conditions:

$$-0.6 < (R_{2NF}+R_{2NR})/(R_{2NF}-R_{2NR}) < 0.6 \quad (49'')$$

$$-1.0 < (R_{2PF}+R_{2PR})/(R_{2PF}-R_{2PR}) < 0.0 \quad (50'')$$

$$d_{22}/fw < 0.2 \quad (51'')$$

It is further desirable that the second moving lens unit satisfies the following conditions:

$$0.28 < R_{B3}/R_{B1} < 1.0 \quad (52)$$

$$-0.7 < fw/R_{B2} < 0.7 \quad (53)$$

$$20 < \nu_{BP} - \nu_{BN} \quad (54)$$

where $R_{B1}$ is the radius of curvature, on the optical axis, of the most object-side surface of the cemented lens component in the second moving lens unit, $R_{B3}$ is the radius of curvature, on the optical axis, of the most image-side surface of the cemented lens component in the second moving lens unit, $R_{B2}$ is the radius of curvature, on the optical axis, of the interface of the cemented lens component of the second moving lens unit, $\nu_{BP}$ is the Abbe's number of the medium of the positive lens in the cemented lens component of the second moving lens unit, and $\nu_{BN}$ is the Abbe's number of the medium of the negative lens in the cemented lens component of the second moving lens unit.

Beyond the upper limit of Condition (52), spherical aberration, coma, and astigmatism are advantageously corrected in the entire system, but there is little effect of moderating the decentration sensitivity due to lens cementation. Below the lower limit, corrections for spherical aberration, coma, and astigmatism in the entire system are liable to become difficult. Below the lower limit of Condition (53), axial chromatic aberration and chromatic aberration of magnification are advantageously corrected, but spherical aberration and chromatic aberration are liable to be produced. In particular, even though spherical aberration at the reference wavelength can be favorably corrected, spherical aberration at the short wavelength is overcorrected. This is responsible for the blurring of color in the image, which is unfavorable. Beyond the upper limit, axial chromatic aberration, chromatic aberration, and spherical aberration at the short wavelength are liable to be undercorrected. Below lower limit of Condition (54), axial chromatic aberration is liable to be undercorrected. A combination of media exceeding the upper limit does not exist in the natural world.

It is more desirable to satisfy at least one of the following conditions:

$$0.30 < R_{B3}/R_{B1} < 0.8 \quad (52')$$

$$-0.5 < fw/R_{B2} < 0.4 \quad (53')$$

$$25 < \nu_{BP} - \nu_{BN} \quad (54')$$

It is most desirable to satisfy at least one of the following conditions:

$$0.32 < R_{B3}/R_{B1} < 0.6 \quad (52'')$$

$$-0.3 < fw/R_{B2} < 0.1 \quad (53'')$$

$$30 < \nu_{BP} - \nu_{BN} \quad (54'')$$

In accordance with the drawings, the embodiments of the present invention will be described below.

First Embodiment

Figure 4:
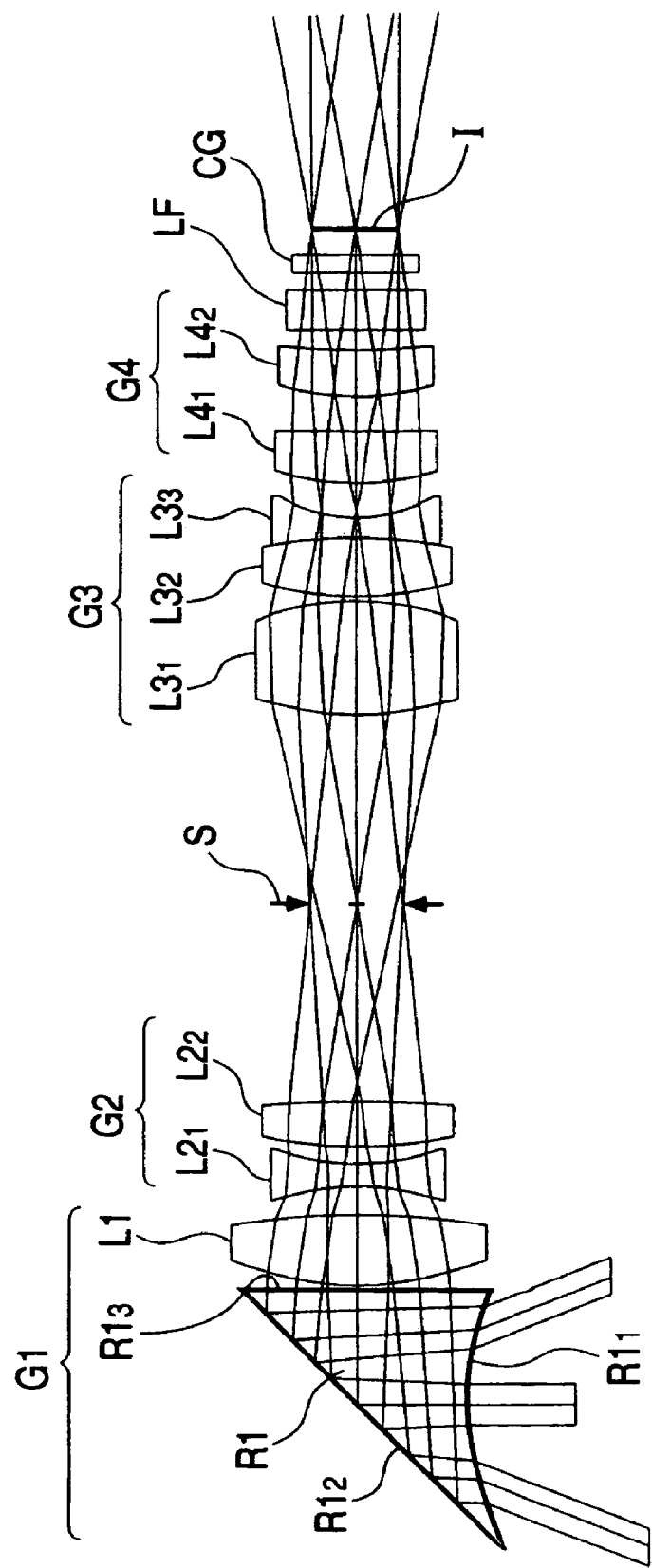
FIG. 4 is a sectional view showing an optical arrangement, developed along the optical axis, of a first embodiment of the zoom lens used in the electronic imaging apparatus according to the present invention.
Figure 5A:
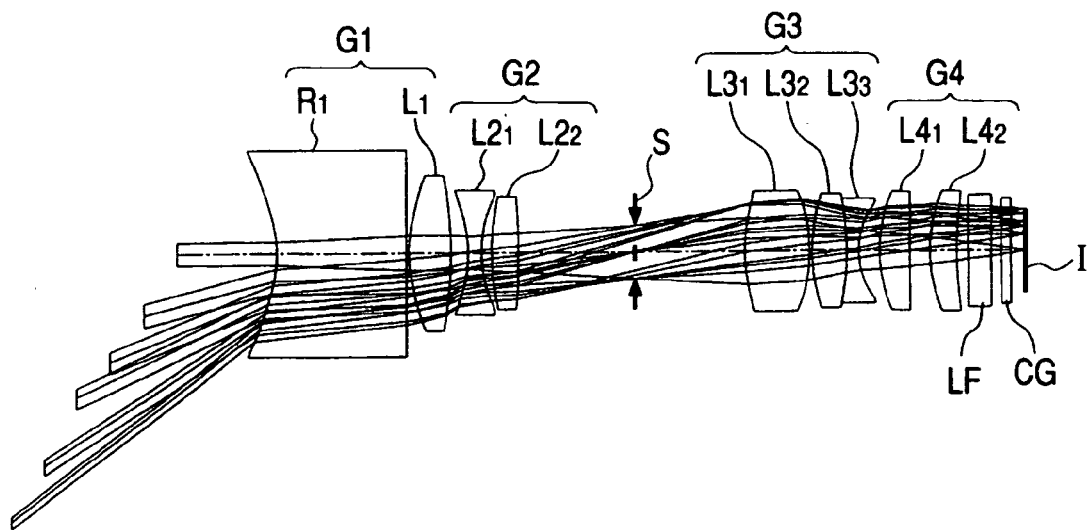
FIGS. 5A, 5B, and 5C are sectional views showing optical arrangements, developed along the optical axis, at wide-angle, middle, and telephoto positions, respectively, in focusing of the infinite object point of the zoom lens in the first embodiment.
Figure 5B:
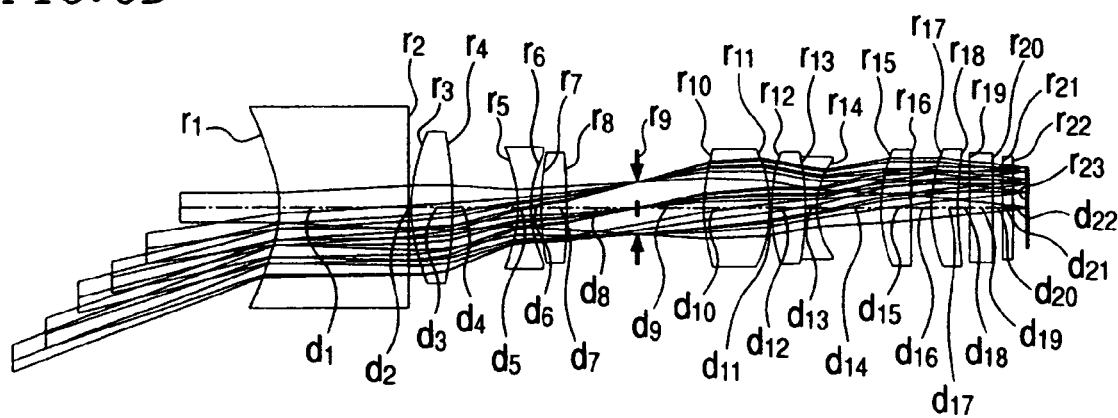
Figure 5C:
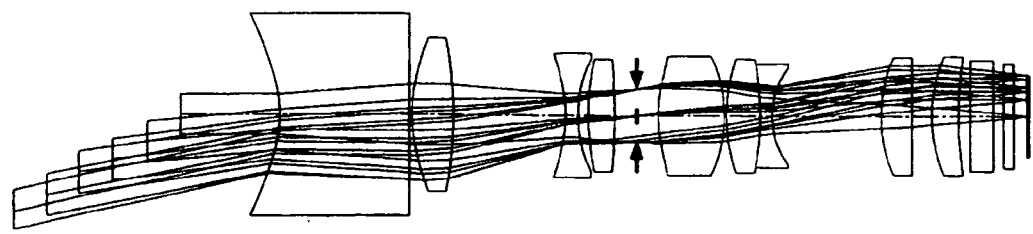
Figure 7A:
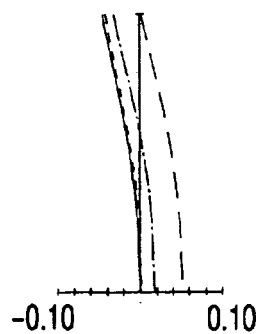
FIGS. 7A, 7B, 7C, and 7D are diagrams showing aberration characteristics at the wide-angle position in focusing of the infinite object point of the zoom lens in the first embodiment.
Figure 7B:
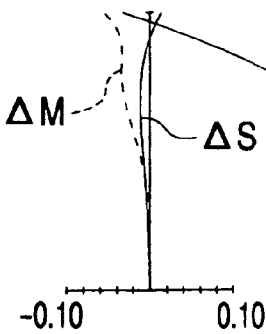
Figure 7C:
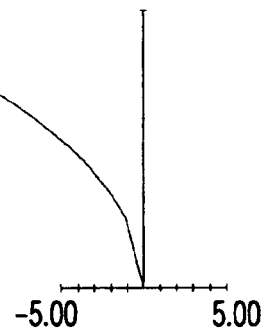
Figure 7D:
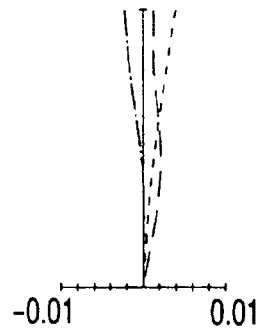
Figure 7E:
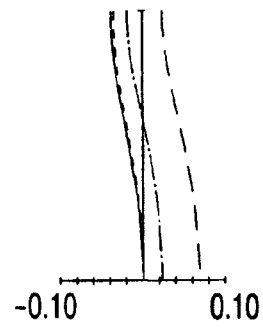
FIGS. 7E, 7F, 7G, and 7H are diagrams showing aberration characteristics at the middle position in focusing of the infinite object point of the zoom lens in the first embodiment.
Figure 7F:
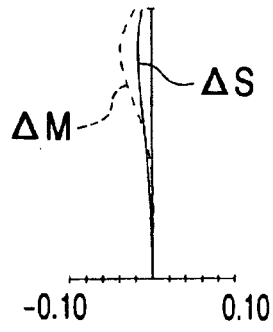
Figure 7G:
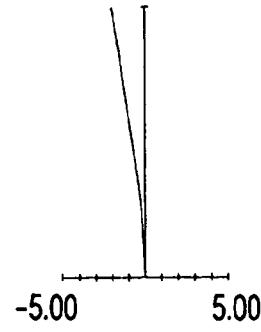
Figure 7H:
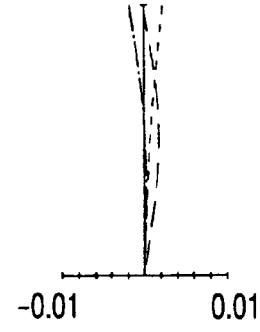
Figure 7I:
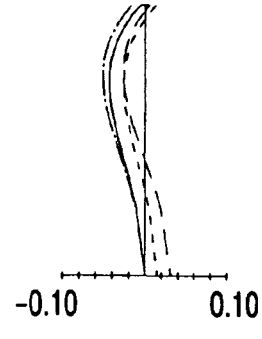
FIGS. 7I, 7J, 7K, and 7L are diagrams showing aberration characteristics at the telephoto position in focusing of the infinite object point of the zoom lens in the first embodiment.
Figure 7J:
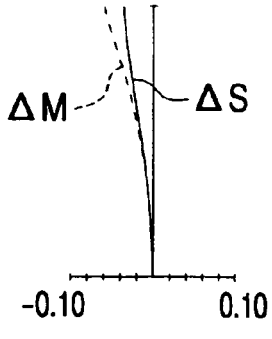
Figure 7K:
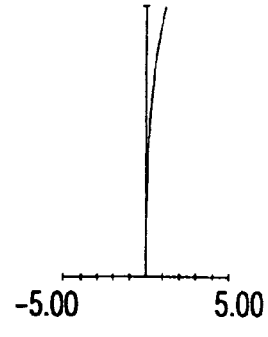
Figure 7L:
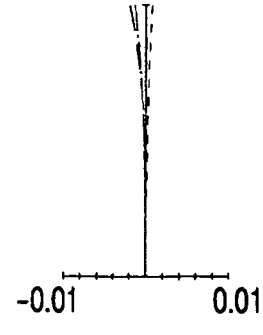
Figure 8A:
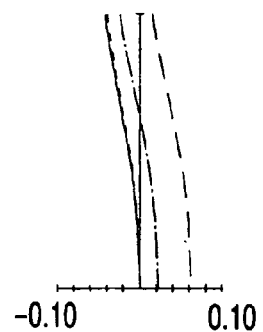
FIGS. 8A, 8B, 8C, and 8D are diagrams showing aberration characteristics at the intermediate point between the wide-angle position and the middle position in focusing of the infinite object point of the zoom lens in the first embodiment.
Figure 8B:
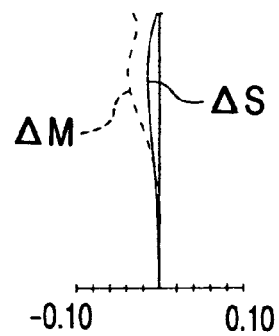
Figure 8C:
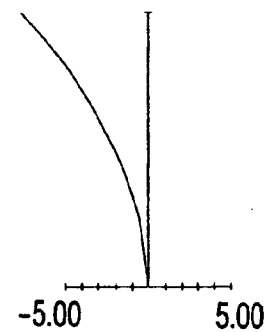
Figure 8D:
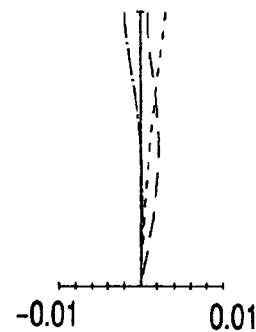
Figure 8F:
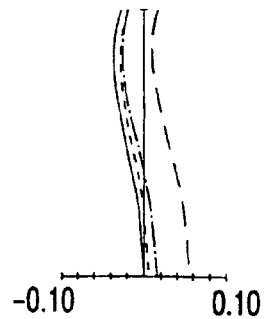
FIGS. 8E, 8F, 8G, and 8H are diagrams showing aberration characteristics at the intermediate point between the middle position and the telephoto position in focusing of the infinite object point of the zoom lens in the first embodiment.
Figure 8E:
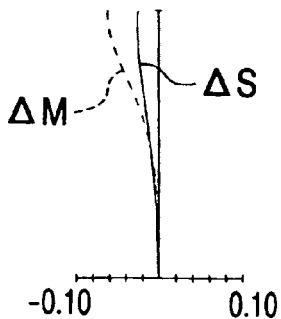
Figure 8G:
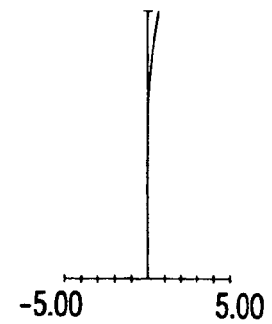
Figure 8H:
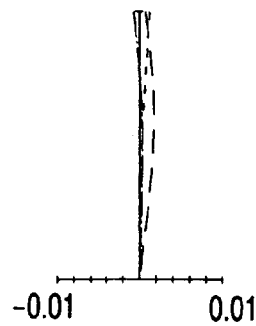

FIG. 4 shows an optical arrangement, where the optical path is bent in focussing of the infinite object point at the wide-angle position, in the first embodiment of the zoom lens used in the electronic imaging apparatus according to the present invention. FIGS. 5A, 5B, and 5C show optical arrangements at wide-angle, middle, and telephoto positions, respectively, in the first embodiment. FIGS. 6A–6E, 7A–7L, and 8A–8H show aberration characteristics in the first embodiment.

The electronic imaging apparatus of the first embodiment, as shown in FIG. 4, has, in order from the object side, a zoom lens and a CCD which is an electronic image sensor. In FIG. 4, reference symbol I represents the imaging surface of the CCD. A plane plate-like optical low-pass filter LF and a CCD cover glass CG are interposed between the zoom lens and the imaging surface I. In each of the embodiments, for example, the optical low-pass filter may be coated with an near-infrared sharp cutoff coating, or apart from this, an infrared cutoff absorbing filter may be placed. Alternatively, the entrance surface of a transparent plane plate may be coated with the near-infrared sharp cutoff coating.

The zoom lens comprises, in order from the object side, a first lens unit G1, a second lens unit G2, an aperture stop S, a third lens unit G3, and a fourth lens unit G4.

The first lens unit G1 includes, in order from the object side, a reflecting optical element R1 for bending the optical path and a single biconvex positive lens L1, and has positive refracting power as a whole.

The reflecting optical element R1 is constructed as a prism which has an entrance surface $R1_1$, a reflecting surface $R1_2$ for bending the optical path, and an exit surface $R1_3$. The entrance surface $R1_1$ is a concave surface facing the object side and is configured as an aspherical surface that divergence is impaired progressively in going from the optical axis to the periphery.

Also, in each embodiment of the present invention, the aspect ratio of the effective imaging area is 3:4 and the optical path is bent in a lateral direction.

The second lens unit G2 includes, in order from the object side, a biconcave negative lens $L2_1$ and a biconvex positive lens $L2_2$, and has negative refracting power as a whole.

The third lens unit G3 includes a biconvex positive lens $L3_1$ and a cemented lens component of a biconvex positive lens $L3_2$ and a biconcave negative lens $L3_3$, and has positive refracting power as a whole.

The fourth lens unit G4 includes a positive meniscus lens $L4_1$ with a convex surface facing the object side and a positive meniscus lens $L4_2$ with a convex surface facing the object side.

When the magnification of the zoom lens is changed over the range from the wide-angle position to the telephoto position in focusing of the infinite object point, the first lens unit G1 is fixed, the second lens unit G2 is moved toward the image side, the aperture stop S is fixed, the third lens unit G3 is simply moved toward the object side, and the fourth lens unit G4 remains fixed.

In a focusing operation, the fourth lens unit G4 is moved along the optical axis.

In addition to being provided for the entrance surface $R1_1$ of the reflecting optical element R1 in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the first embodiment are shown below. In the numerical data of the first embodiment, $r_1$, $r_2$, ... denote radii of curvature of surfaces of individual lenses and a prism; $d_1$, $d_2$, ... denote thicknesses of individual lenses and the prism or air spacings between them; $n_{d1}$, $n_{d2}$, ... denote refractive indices of individual lenses and the prism at the d line; $v_{d1}$, $v_{d2}$, ... denote Abbe's numbers of individual lenses and the prism; Fno denotes an F-number; f denotes the focal length of the entire system; and D0 denotes a distance from an object to a first surface.

Also, when z is the direction of the optical axis, y is a distance from the optical axis, K is a conic constant, and $A_4$, $A_6$, $A_8$, and $A_{10}$ are aspherical coefficients, the configuration of the aspherical surface is expressed by the following equation:

$$z=(y^2/r)/[1+\{1-(1+K)(y/r)^2\}^{1/2}]+A_4 y^4+A_6 y^6+A_8 y^8+A_{10} y^{10}$$

These symbols are also used for the numerical data of other embodiments to be described later.

Numerical Data 1
$r_1=-7.3888$ (aspherical surface)
   $d_1=7.7000$ $n_{d1}=1.84666$ $v_{d1}=23.78$
$r_2=\infty$
   $d_2=0.1500$
$r_3=9.2760$ (aspherical surface)
   $d_3=2.5000$ $n_{d3}=1.81474$ $v_{d3}=37.03$
$r_4=-27.0079$
   $d_4=D4$
$r_5=-7.5903$ (aspherical surface)
   $d_5=0.8000$ $n_{d5}=1.74320$ $v_{d5}=49.34$
$r_6=8.4809$ (aspherical surface)
   $d_6=0.6000$
$r_7=15.7026$
   $d_7=1.6000$ $n_{d7}=1.84666$ $v_{d7}=23.78$
$r_8=-40.5377$
   $d_8=D8$
$r_9=\infty$ (stop)
   $d_9=D9$
$r_{10}=8.9882$ (aspherical surface)
   $d_{10}=4.0001$ $n_{d10}=1.69350$ $v_{d10}=53.21$
$r_{11}=-9.7388$ (aspherical surface)
   $d_{11}=0.1500$
$r_{12}=11.3104$
   $d_{12}=2.0743$ $n_{d12}=1.56384$ $v_{d12}=60.67$
$r_{13}=-16.6974$
   $d_{13}=0.7000$ $n_{d13}=1.84666$ $v_3=23.78$
$r_{14}=5.0192$
   $d_{14}=D14$
$r_{15}=9.3843$
   $d_{15}=1.8000$ $n_{d15}=10.48749$ $v_{d15}=70.23$
$r_{16}=187.5375$
   $d_{16}=D16$
$r_{17}=9.3972$
   $d_{17}=1.6000$ $n_{d17}=1.68893$ $v_{d17}=31.07$
$r_{18}=24.2276$
   $d_{18}=0.7000$
$r_{19}=\infty$
   $d_{19}=1.4000$ $n_{d19}=1.51633$ $v_{d19}=64.14$
$r_{20}=\infty$
   $d_{20}=0.6000$
$r_{21}=\infty$
   $d_{21}=0.6000$ $n_{d21}=1.51633$ $v_{d21}32\ 64.14$
$r_{22}=\infty$
   $d_{22}=D22$
$r_{23}=\infty$ (imaging surface)
   $d_{23}=0$
* Thickness of the nineteenth surface=0.3+0.21×2+0.68=1.4 three crystal filters+one IR absorbing filter Aspherical Coefficients
First Surface
   K=0
   $A_4=1.3911\times10^{-3}$ $A_6=-1.8577\times10^{-5}$ $A_8=2.8434\times10^{-7}$
Third Surface
   K=0
   $A_4=-6.4429\times10^{-4}$ $A_6=3.6455\times10^{-6}$ $A_8=-2.1185\times10^{-8}$
   $A_{10}=0$
Fifth Surface
   K=0
   $A_4=1.3672\times10^{-3}$ $A_6=8.9594\times10^{-6}$ $A_8=-1.6235\times10^{-6}$
   $A_{10}=0$
Sixth Surface
   K=0
   $A_4=3.6245\times10^{-4}$ $A_6=6.7383\times10^{-5}$ $A_8=-5.6459\times10^{-6}$
   $A_{10}=0$
Tenth Surface
   K=0
   $A_4=-7.4708\times10^{-4}$ $A_6=-1.5948\times10^{-5}$ $A_8=-1.5411\times10^{-6}$
   $A_{10}=0$
Eleventh Surface
   K=0
   $A_4=-1.5349\times10^{-4}$ $A_6=-1.8657\times10^{-5}$ $A_8=-6.1411\times10^{-7}$
   $A_{10}=0$ Zoom Data When D0 (the distance from the object to the first surface) is $\infty$,

|  | Wide-angle | Middle | Telephoto | Wide-angle-Middle | Middle-Telephoto |
|---|---|---|---|---|---|
| f (mm) | 4.02399 | 6.47589 | 10.83793 | 5.06321 | 8.33373 |
| Fno | 2.8489 | 3.5064 | 4.3811 | 3.1431 | 3.8306 |
| D0 | $\infty$ | $\infty$ | $\infty$ | $\infty$ | $\infty$ |
| D4 | 0.99933 | 3.84470 | 6.72373 | 2.42177 | 5.47994 |
| D8 | 7.02438 | 4.18365 | 1.29993 | 5.59999 | 2.54796 |
| D9 | 6.65081 | 4.06962 | 1.29970 | 5.42883 | 2.97137 |
| D14 | 1.22479 | 3.79651 | 6.57608 | 2.45769 | 4.88282 |
| D16 | 1.19883 | 1.20089 | 1.19879 | 1.19859 | 1.20212 |
| D22 | 1.00000 | 1.00000 | 1.00000 | 1.00000 | 1.00000 |

Second Embodiment

Figure 9:
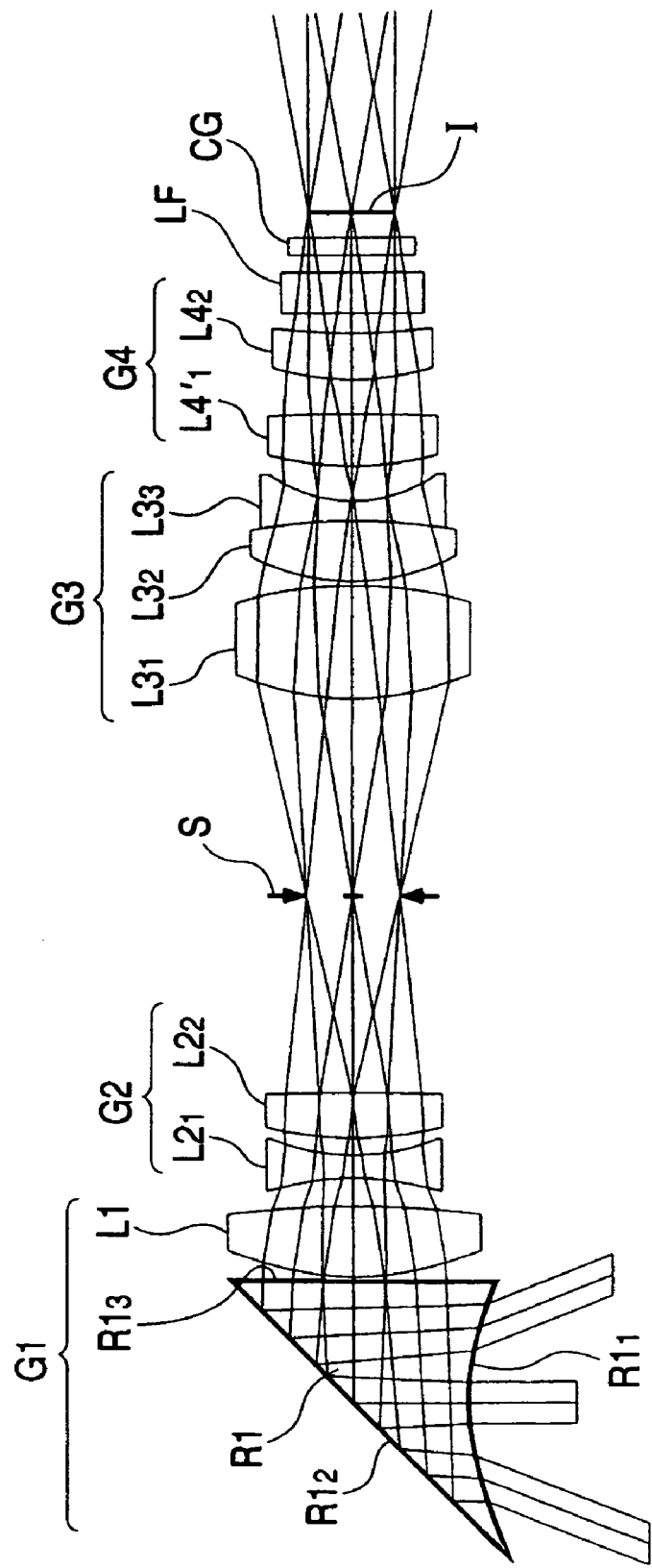
FIG. 9 is a sectional view showing an optical arrangement, developed along the optical axis, of a second embodiment of the zoom lens used in the electronic imaging apparatus according to the present invention.
Figure 10A:
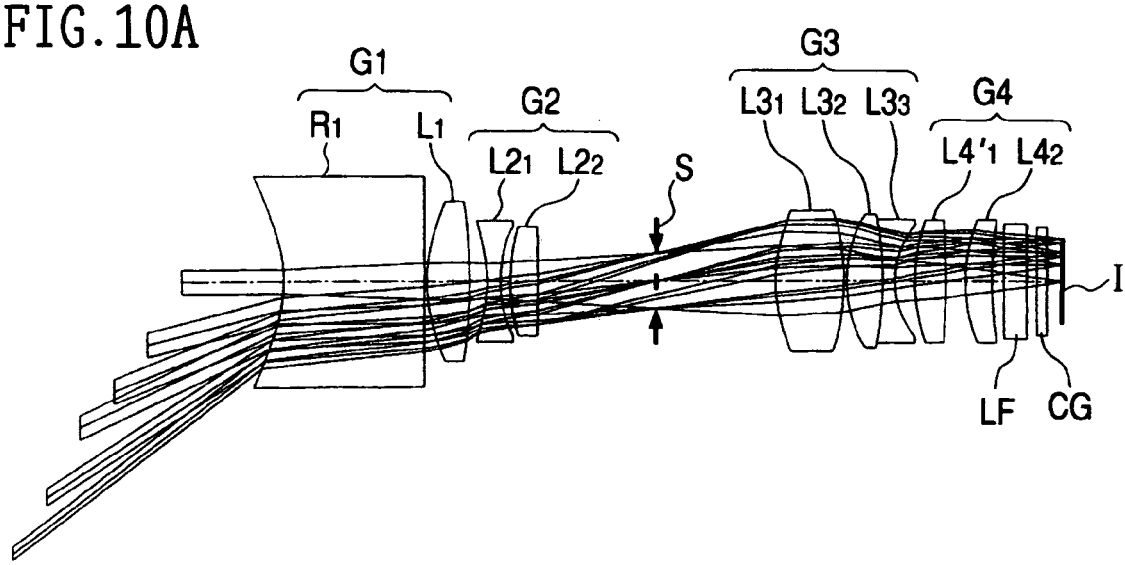
FIGS. 10A, 10B, and 10C are sectional views showing optical arrangements, developed along the optical axis, at wide-angle, middle, and telephoto positions, respectively, in focusing of the infinite object point of the zoom lens in the second embodiment.
Figure 10B:
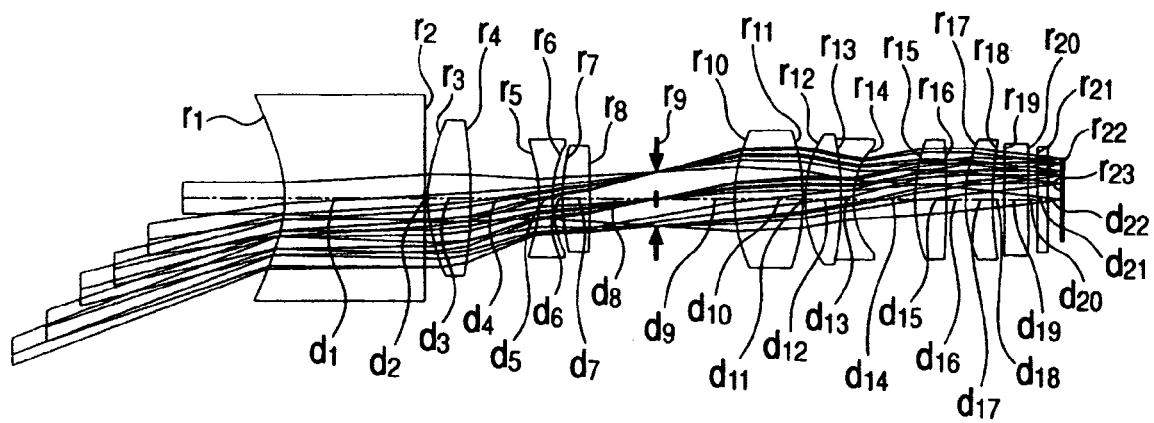
Figure 10C:
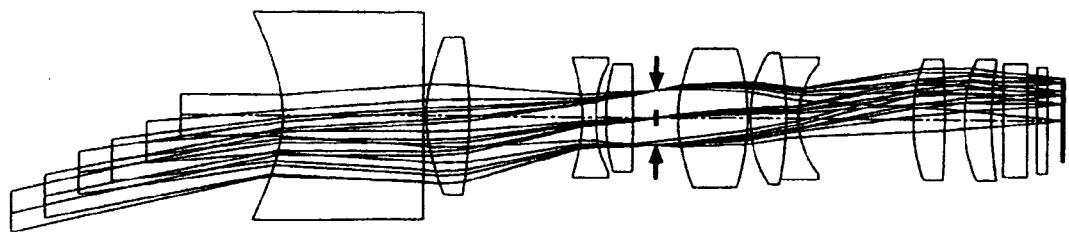
Figure 12A:
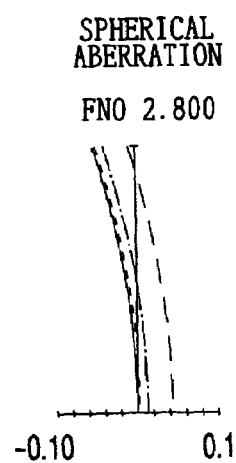
FIGS. 12A, 12B, 12C, and 12D are diagrams showing aberration characteristics at the wide-angle position in focusing of the infinite object point of the zoom lens in the second embodiment.
Figure 12B:
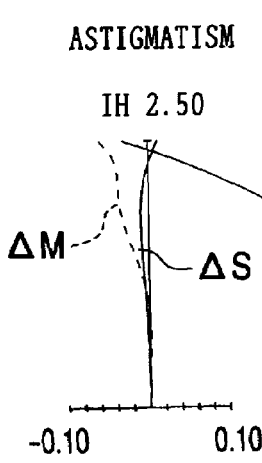
Figure 12C:
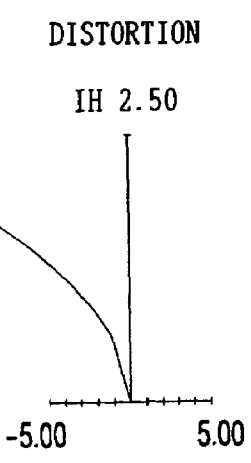
Figure 12D:
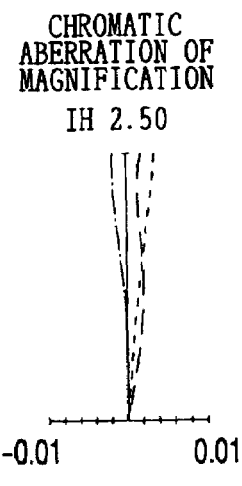
Figure 12E:
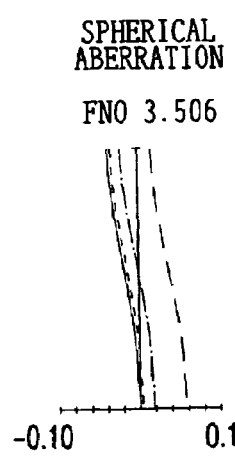
FIGS. 12E, 12F, 12G, and 12H are diagrams showing aberration characteristics at the middle position in focusing of the infinite object point of the zoom lens in the second embodiment.
Figure 12F:
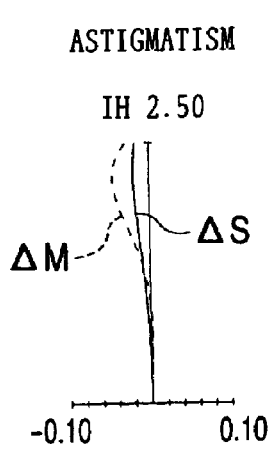
Figure 12G:
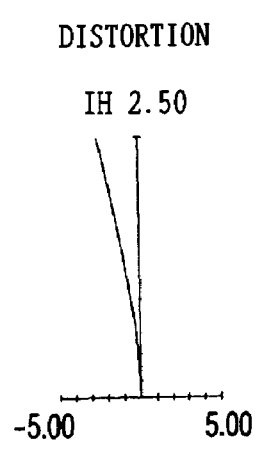
Figure 12H:
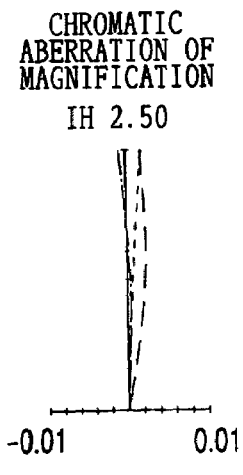
Figure 12I:
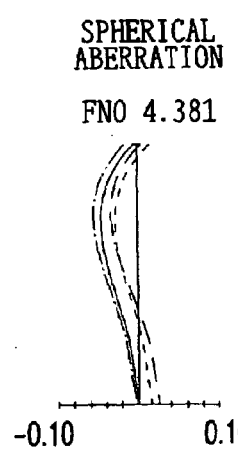
FIGS. 12I, 12J, 12K, and 12L are diagrams showing aberration characteristics at the telephoto position in focusing of the infinite object point of the zoom lens in the second embodiment.
Figure 12J:
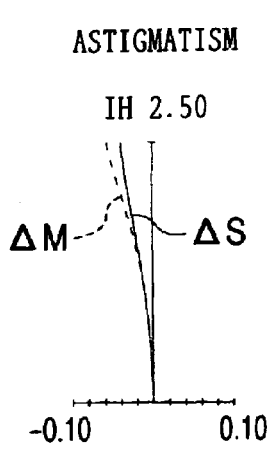
Figure 12K:
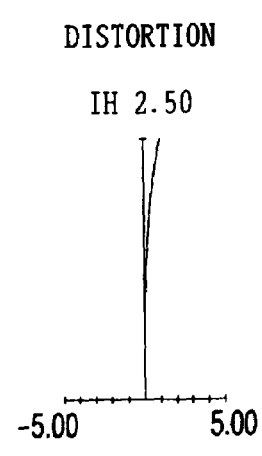
Figure 12L:
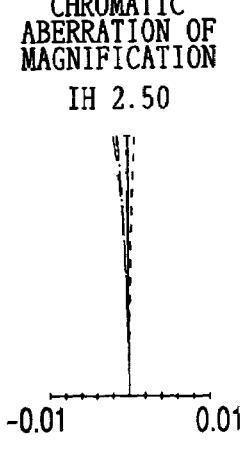
Figure 13A:
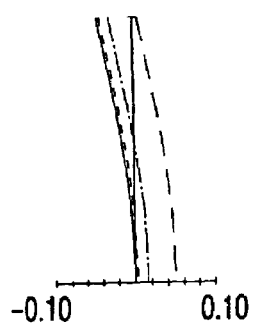
FIGS. 13A, 13B, 13C, and 13D are diagrams showing aberration characteristics at the intermediate point between the wide-angle position and the middle position in focusing of the infinite object point of the zoom lens in the second embodiment.
Figure 13B:
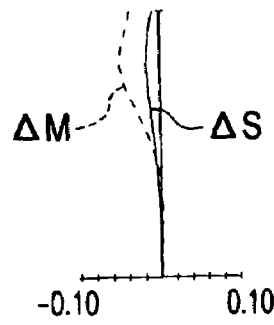
Figure 13C:
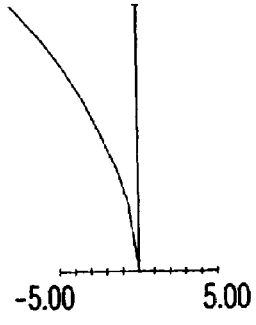
Figure 13D:
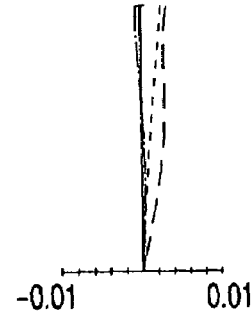
Figure 13F:
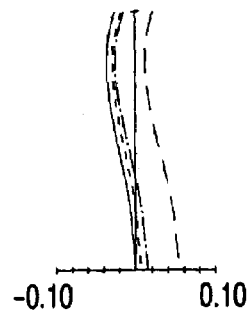
FIGS. 13E, 13F, 13G, and 13H are diagrams showing aberration characteristics at the intermediate point between the middle position and the telephoto position in focusing of the infinite object point of the zoom lens in the second embodiment.
Figure 13E:
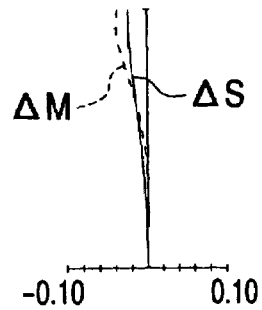
Figure 13G:
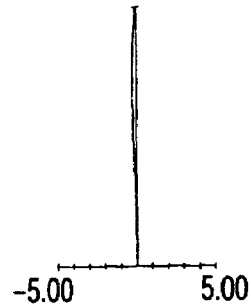
Figure 13H:
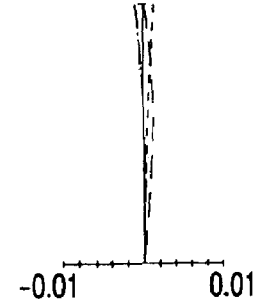

FIG. 9 shows an optical arrangement, where the optical path is bent in focussing of the infinite object point at the wide-angle position, in the second embodiment of the zoom lens used in the electronic imaging apparatus according to the present invention. FIGS. 10A, 10B, and 10C show optical arrangements at wide-angle, middle, and telephoto positions, respectively, in the second embodiment. FIGS. 11A–11E, 12A–12L, and 13A–13H show aberration characteristics in the second embodiment.

The electronic imaging apparatus of the second embodiment, as shown in FIG. 9, has, in order from the object side, a zoom lens and a CCD which is an electronic image sensor. The plane plate-like optical low-pass filter LF and the CCD cover glass CG are interposed between the zoom lens and the imaging surface I.

The zoom lens comprises, in order from the object side, the first lens unit G1, the second lens unit G2, the aperture stop S, the third lens unit G3, and the fourth lens unit G4.

The first lens unit G1 includes, in order from the object side, the reflecting optical element R1 for bending the optical path and the single biconvex positive lens L1, and has positive refracting power as a whole.

The reflecting optical element R1 is constructed as a prism which has the entrance surface $R1_1$ the reflecting surface $R1_2$ for bending the optical path, and the exit surface $R1_3$. The entrance surface $R1_1$ is a concave surface facing the object side and is configured as an aspherical surface that divergence is impaired progressively in going from the optical axis to the periphery.

The second lens unit G2 includes, in order from the object side, the biconcave negative lens $L2_1$ and the biconvex positive lens $L2_2$, and has negative refracting power as a whole.

The third lens unit G3 includes the biconvex positive lens $L3_1$ and the cemented lens component of the biconvex positive lens $L3_2$ and the biconcave negative lens $L3_3$, and has positive refracting power as a whole.

The fourth lens unit G4 includes a biconvex positive lens $L4'_1$ and the positive meniscus lens $L4_2$ with a convex surface facing the object side.

When the magnification of the zoom lens is changed over the range from the wide-angle position to the telephoto position in focusing of the infinite object point, the first lens unit G1 is fixed, the second lens unit G2 is moved toward the image side, the aperture stop S is fixed, the third lens unit G3 is simply moved toward the object side, and the fourth lens unit G4 remains fixed.

In the focusing operation, the fourth lens unit G4 is moved along the optical axis.

In addition to being provided for the entrance surface $R1_1$ of the reflecting optical element R1 in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the second embodiment are shown below.

Numerical Data 2

$r_1$=−7.3483 (aspherical surface)
    $d_1$=8.1290 $n_{d1}$=1.84666 $v_{d1}$=23.78
$r_2$=∞
    $d_2$=0.1500
$r_3$=9.0396 (aspherical surface)
    $d_3$=2.5000 $n_{d3}$=1.81474 $v_{d3}$=37.03
$r_4$=−32.8233
    $d_4$=D4
$r_5$=−8.1045 (aspherical surface)
    $d_5$=0.8000 $n_{d5}$=1.74320 $v_{d5}$=49.34
$r_6$=8.4127 (aspherical surface)
    $d_6$=0.6000
$r_7$=12.7546
    $d_7$=1.6000 $n_{d7}$=1.84666 $v_{d7}$=23.78
$r_8$=−106.7028
    $d_8$=D8
$r_9$=∞ (stop)
    $d_9$=D9
$r_{10}$=8.9754 (aspherical surface)
    $d_{10}$=4.0024 $n_{d10}$=1.69350 $v_{d10}$=53.21
$r_{11}$=−15.1557 (aspherical surface)
    $d_{11}$=0.1500
$r_{12}$=7.5875
    $d_{12}$=2.1316 $n_{d12}$=1.56384 $v_{d12}$=60.67
$r_{13}$=−20.3311
    $d_{13}$=0.7000 $n_{d13}$=1.84666 $v_{d13}$=23.78
$r_{14}$=4.9874
    $d_{14}$=D14
$r_{15}$=11.2264
    $d_{15}$=1.8000 $n_{d15}$=1.48749 $v_{d15}$=70.23
$r_{16}$=−65.9576
    $d_{16}$=D16
$r_{17}$=9.5328
    $d_{17}$=1.6000 $n_{d17}$=1.68893 $v_{d17}$=31.07
$r_{18}$=21.6839
    $d_{18}$=0.7000
$r_{19}$=∞
    $d_{19}$=1.4000 $n_{d19}$=1.51633 $v_{d19}$=64.14
$r_{20}$=0
    $d_{20}$=0.6000
$r_{21}$=∞
    $d_{21}$=0.6000 $n_{d21}$=1.51633 $v_{d21}$=64.14
$r_{22}$=∞
    $d_{22}$=D22
$r_{23}$=∞ (imaging surface)
    $d_{23}$=0
* Thickness of the nineteenth surface=0.036+0.025×2+1.314=1.4
  three LN filters+one IR absorbing filter
or
* Thickness of the nineteenth surface=0.24+0.17×2+0.82=1.4
  three crystal filters+one IR absorbing filter Aspherical Coefficients
First Surface
    K=0
    $A_2$=0 $A_4$=1.3617×10$^{-3}$ $A_6$=−1.7282×10$^{-5}$
    $A_8$=2.6915×10$^{-7}$ $A_{10}$=0
Third Surface
    K=0
    $A_2$=0 $A_4$=−6.1114×10$^{-4}$ $A_6$=3.0939×10$^{-6}$
    $A_8$=−2.4794×10$^8$ $A_{10}$=0
Fifth Surface
    K=0
    $A_2$=0 $A_4$=1.6829×10$^{-3}$ $A_6$=−2.0954×10$^{-5}$
    $A_8$=−1.3539×10$^{-7}$ $A_{10}$=0
Sixth Surface
    K=0
    $A_2$=0 $A_4$=9.0350×10$^{-4}$ $A_6$=2.7458×10$^{-5}$
    $A_8$=−2.1856×10$^{-6}$ $A_{10}$=0
Tenth Surface
    K=0
    $A_2$=0 $A_4$=−3.2035×10$^{-4}$ $A_6$=−3.3460×10$^{-6}$
    $A_8$=−2.5697×10$^{-7}$ $A_{10}$=0
Eleventh Surface
    K=0
    $A_2$=0 $A_4$=−2.0533×10$^{-5}$ $A_6$=−5.3567×10$^{-6}$
    $A_8$=−1.4764×10$^{-7}$ $A_{10}$=0

Zoom Data

When D0 (the distance from the object to the first surface) is ∞,

|  | Wide-angle | Middle | Telephoto | Wide-angle-Middle | Middle-Telephoto |
|---|---|---|---|---|---|
| f (mm) | 4.03442 | 6.48703 | 10.84462 | 5.07233 | 8.35332 |
| Fno | 2.8000 | 3.5064 | 4.3811 | 3.1431 | 3.8306 |
| D0 | ∞ | ∞ | ∞ | ∞ | ∞ |
| D4 | 0.99719 | 4.01082 | 6.67024 | 2.64290 | 5.32446 |
| D8 | 6.97252 | 3.93783 | 1.30078 | 5.32414 | 2.62999 |
| D9 | 6.91832 | 4.46197 | 1.30290 | 5.90161 | 2.90629 |
| D14 | 1.21486 | 3.69164 | 6.82927 | 2.23330 | 5.23953 |
| D16 | 1.19324 | 1.19324 | 1.19324 | 1.19324 | 1.19324 |
| D22 | 1.00000 | 1.00000 | 1.00000 | 1.00000 | 1.00000 |

Third Embodiment

Figure 14:
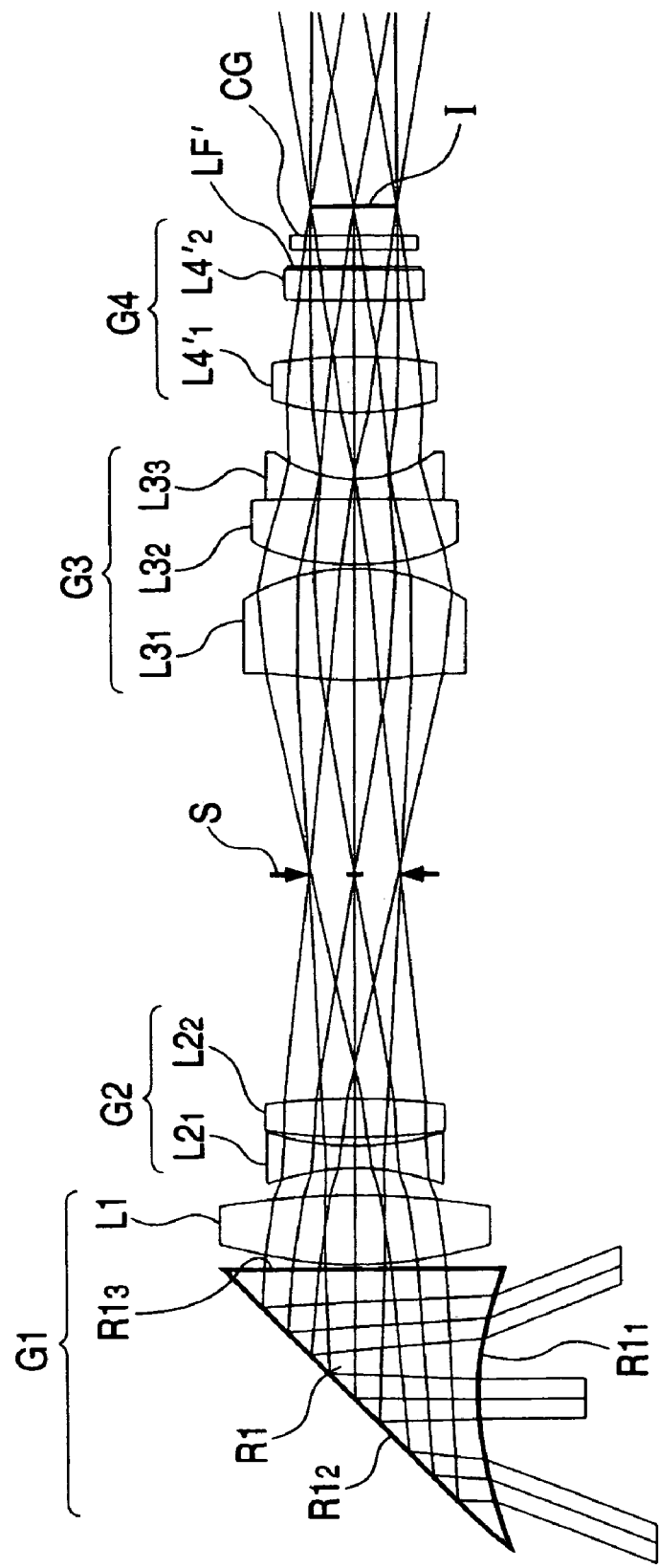
FIG. 14 is a sectional view showing an optical arrangement, developed along the optical axis, of a third embodiment of the zoom lens used in the electronic imaging apparatus according to the present invention.
Figure 15A:
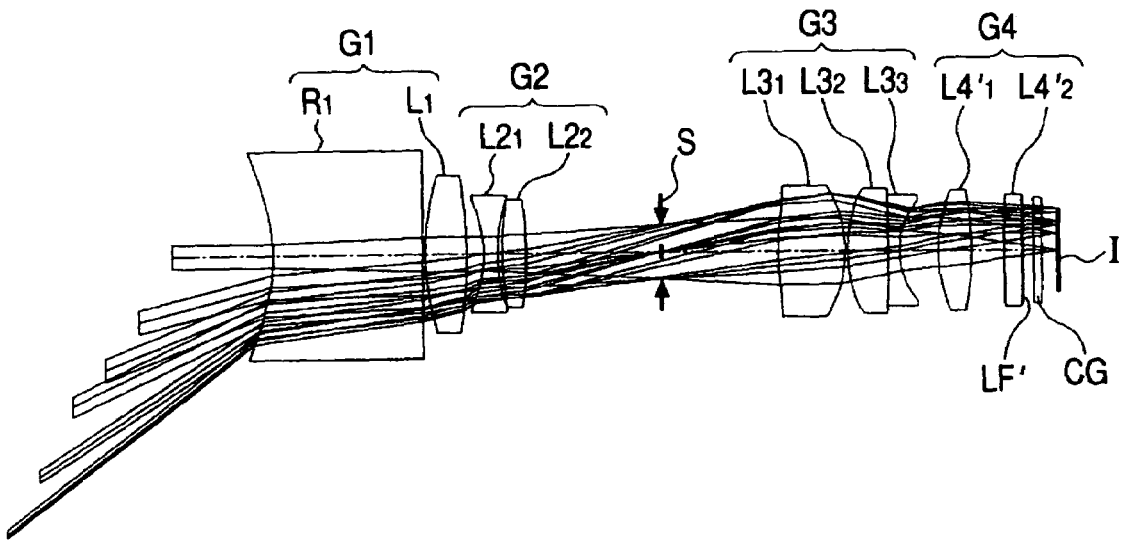
FIGS. 15A, 15B, and 15C are sectional views showing optical arrangements, developed along the optical axis, at wide-angle, middle, and telephoto positions, respectively, in focusing of the infinite object point of the zoom lens in the third embodiment.
Figure 15B:
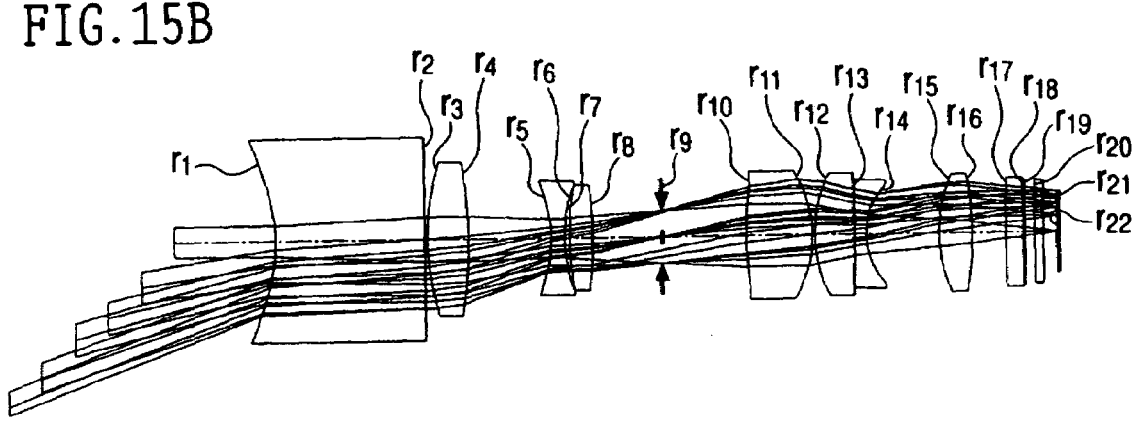
Figure 15C:
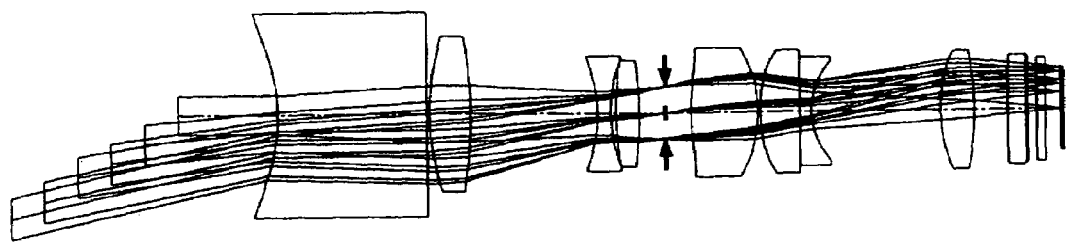
Figure 17A:
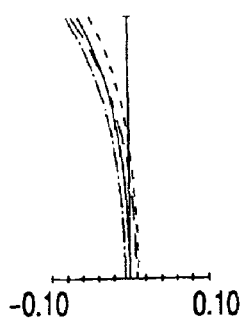
FIGS. 17A, 17B, 17C, and 17D are diagrams showing aberration characteristics at the wide-angle position in focusing of the infinite object point of the zoom lens in the third embodiment.
Figure 17B:
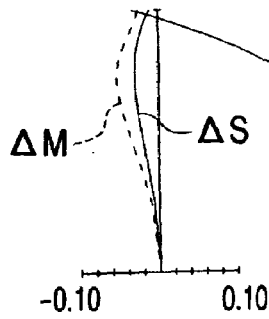
Figure 17C:
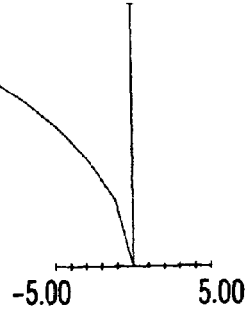
Figure 17D:
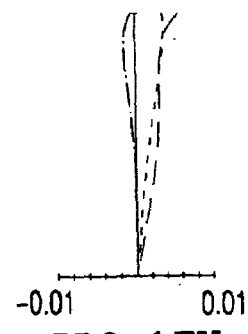
Figure 17E:
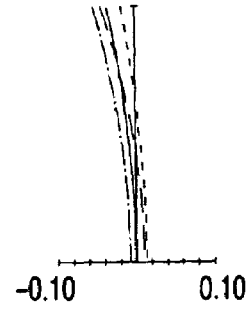
FIGS. 17E, 17F, 17G, and 17H are diagrams showing aberration characteristics at the middle position in focusing of the infinite object point of the zoom lens in the third embodiment.
Figure 17F:
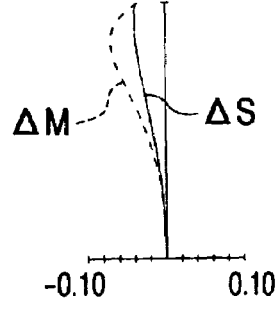
Figure 17G:
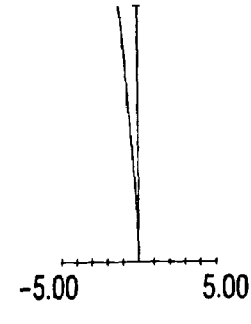
Figure 17H:
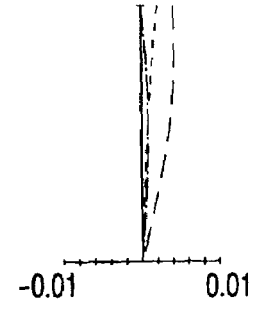
Figure 17I:
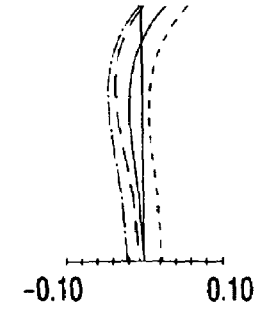
FIGS. 17I, 17J, 17K, and 17L are diagrams showing aberration characteristics at the telephoto position in focusing of the infinite object point of the zoom lens in the third embodiment.
Figure 17J:
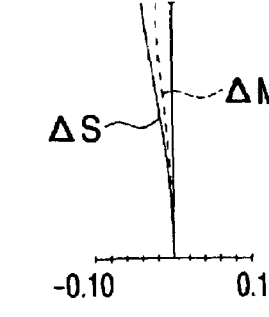
Figure 17K:
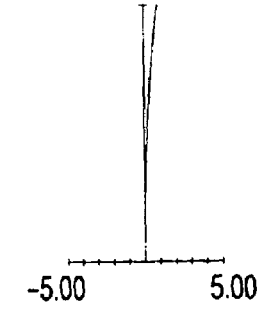
Figure 17L:
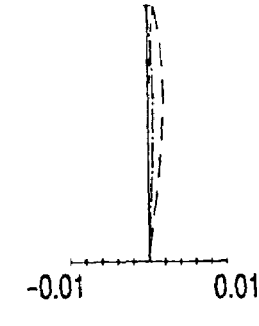

FIG. 14 shows an optical arrangement, where the optical path is bent in focussing of the infinite object point at the wide-angle position, in the third embodiment of the zoom lens used in the electronic imaging apparatus according to the present invention. FIGS. 15A, 15B, and 15C show optical arrangements at wide-angle, middle, and telephoto positions, respectively, in the third embodiment. FIGS. 16A–16E, 17A–17L, and 18A–18H show aberration characteristics in the third embodiment.

The electronic imaging apparatus of the third embodiment, as shown in FIG. 14, has, in order from the object side, a zoom lens and a CCD which is an electronic image sensor. A plane plate-like optical low-pass filter LF' and the CCD cover glass CG are interposed between the last lens surface of the zoom lens and the imaging surface I.

The zoom lens comprises, in order from the object side, the first lens unit G1, the second lens unit G2, the aperture stop S, the third lens unit G3, and the fourth lens unit G4.

The first lens unit G1 includes, in order from the object side, the reflecting optical element R1 for bending the optical path and the single biconvex positive lens L1, and has positive refracting power as a whole.

The reflecting optical element R1 is constructed as a prism which has the entrance surface $R1_1$, the reflecting surface $R1_2$ for bending the optical path, and the exit surface $R1_3$. The entrance surface $R1_1$ is a concave surface facing the object side and is configured as an aspherical surface that divergence is impaired progressively in going from the optical axis to the periphery.

The second lens unit G2 includes, in order from the object side, the biconcave negative lens $L2_1$ and the biconvex positive lens $L2_2$, and has negative refracting power as a whole.

The third lens unit G3 includes the biconvex positive lens $L3_1$ and the cemented lens component of the biconvex positive lens $L3_2$ and the biconcave negative lens $L3_3$, and has positive refracting power as a whole.

The fourth lens unit G4 includes the biconvex positive lens $L4'_1$ and a plano-convex positive lens $L4'_2$ whose object-side surface is configured as a convex surface and whose image-side surface as a flat surface.

The optical low-pass filter LF' has an extremely small thickness and is cemented to the flat surface of the plano-convex positive lens $L4'_2$.

When the magnification of the zoom lens is changed over the range from the wide-angle position to the telephoto position in focusing of the infinite object point, the first lens unit G1 is fixed, the second lens unit G2 is moved toward the image side, the aperture stop S is fixed, the third lens unit G3 is simply moved toward the object side, and the fourth lens unit G4 remains fixed.

In the focusing operation, the fourth lens unit G4 is moved along the optical axis.

In addition to being provided for the entrance surface $R1_1$ of the reflecting optical element R1 in the first lens unit G1, the aspherical surfaces are provided for the object-side surface of the biconvex positive lens L1 in the first lens unit G1, both surfaces of the biconcave negative lens $L2_1$ in the second lens unit G2, the object-side surface of the biconvex positive lens $L3_1$ in the third lens unit G3, and an interface between the biconvex positive lens $L3_2$ and the biconcave negative lens $L3_3$.

Subsequently, numerical data of optical members constituting the zoom lens of the third embodiment are shown below.

Numerical Data 3

$r_1$=−9.3150 (aspherical surface)
  $d_1$=8.8552 $n_{d1}$=1.84666 $v_{d1}$=23.78
$r_2$=∞
  $d_2$=0.1500
$r_3$=13.0658 (aspherical surface)
  $d_3$=2.5000 $n_{d3}$=1.83400 $v_{d3}$=37.16
$r_4$=−27.9677
  $d_4$=D4
$r_5$=−7.2074 (aspherical surface)
  $d_5$=0.8000 $n_{d5}$=1.74320 $v_{d5}$=49.34
$r_6$=10.7800 (aspherical surface)
  $d_6$=0.3000
$r_7$=20.7085
  $d_7$=1.4000 $n_{d7}$=1.84666 $v_{d7}$=23.78
$r_8$=−23.7899
  $d_8$=D8
$r_9$=∞ (stop)
  $d_9$=D9
$r_{10}$=13.2200 (aspherical surface)
  $d_{10}$=3.9944 $n_{d10}$=1.69350 $v_{d10}$=53.21
$r_{11}$=−7.4732
  $d_{11}$=0.1500
$r_{12}$=10.1483 (aspherical surface)
  $d_{12}$=2.3583 $n_{d12}$=1.58913 $v_{d12}$=61.14
$r_{13}$=−153.7008
  $d_{13}$=0.7000 $n_{d13}$=1.84666 $v_{d13}$=23.78
$r_{14}$=4.5673
  $d_{14}$=D14
$r_{15}$=9.2793
  $d_{15}$=2.0000 $n_{d15}$=1.48749 $v_{d15}$=70.23
$r_{16}$=−19.5419
  $d_{16}$=D16
$r_{17}$=88.5519
  $d_{17}$=1.1000 $n_{d17}$=1.68893 $v_{d17}$=31.07
$r_{18}$=∞
  $d_{18}$=0.1000 $n_{d18}$=1.51633 $v_{d18}$=64.14
$r_{19}$=∞
  $d_{19}$=0.6000
$r_{20}$=∞
  $d_{20}$=0.5000 $n_{d20}$=1.51633 $v_{d20}$=64.14
$r_{21}$=∞
  $d_{21}$=D21
$r_{22}$=∞ (imaging surface)
  $d_{22}$=0
* Thickness of the eighteenth surface=0.022+0.056×2+0=0.1
  three resin birefringent filters+one IR reflecting coating Aspherical Coefficients
First Surface
  K=0
  $A_2=0$ $A_4=7.5265\times10^{-4}$ $A_6=-6.9661\times10^{-6}$
  $A_8=5.7692\times10^{-8}$ $A_{10}=0$
Third Surface
  K=0
  $A_2=0$ $A_4=-3.4162\times10^{-4}$ $A_6=9.0980\times10^{-7}$
  $A_8=1.7020\times10^{-8}$ $A_{10}=0$
Fifth Surface
  K=0
  $A_2=0$ $A_4=1.3095\times10^{-3}$ $A_6=7.7957\times10^{-6}$
  $A_8=-2.9497\times10^{-7}$ $A_{10}=0$
Sixth Surface
  K=0
  $A_{2=0}$ $A_4=4.2459\times10^{-4}$ $A_6=3.3430\times10^{-5}$
  $A_8=-8.8443\times10^{-7}$ $A_{10}=0$
Tenth Surface
  K=0
  $A_2=0$ $A_4=-1.3437\times10^{-3}$ $A_6=-2.0825\times10^{-5}$
  $A_8=4.7918\times10^{-7}$ $A_{10}=0$
Twelfth surface
  K=0
  $A_2=0$ $A_4=5.1950\times10^{-4}$ $A_6=2.8718\times10^{-5}$
  $A_8=8.6755\times10^{-7}$ $A_{10}=0$ Zoom Data When D0 (the distance from the object to the first surface) is ∞,

|  | Wide-angle | Middle | Telephoto | Wide-angle-Middle | Middle-Telephoto |
|---|---|---|---|---|---|
| f (mm) | 4.03080 | 6.44337 | 10.75208 | 5.04360 | 8.31583 |
| Fno | 2.8600 | 3.5064 | 4.3811 | 3.1431 | 3.8306 |
| D0 | ∞ | ∞ | ∞ | ∞ | ∞ |
| D4 | 0.97877 | 4.88617 | 7.54335 | 3.03191 | 6.66777 |
| D8 | 8.08267 | 4.13960 | 1.54359 | 6.02102 | 2.38741 |
| D9 | 6.98154 | 4.99531 | 1.58245 | 6.13474 | 3.71309 |
| D14 | 2.33475 | 4.35650 | 7.70831 | 3.19006 | 5.60946 |
| D16 | 1.97979 | 1.97979 | 1.97979 | 1.97979 | 1.97979 |
| D21 | 1.00000 | 1.00000 | 1.00000 | 1.00000 | 1.00000 |

In particular, when the last lens itself, the lens unit including the last lens, or the lens unit located immediately before the last lens unit is used as the focusing lens unit, the amount of theoretical movement of the focusing lens unit, an allowable moving space for detecting the focus position, and the shift of the position of the focusing lens unit due to error calculations must be considered as the amount of allowance with respect to the moving space of the focusing lens unit. When the lens unit is downsized, the ratio of the amount of allowance to the amount of theoretical movement is increased. Consequently, the thickness of a filter to be located immediately before the imaging surface may constitute an obstacle.

Thus, as in the third embodiment, it is favorable that the filter to be located immediately before the imaging surface is configured as an extremely thin optical low-pass filter which uses material satisfying at least one of Conditions (14), (14'), and (14"), and the extremely thin optical low-pass filter is cemented to the flat surface of the last lens configured as a plano-convex or -concave lens in order to protect the strength of the extremely thin optical low-pass filter.

Figure 59A:
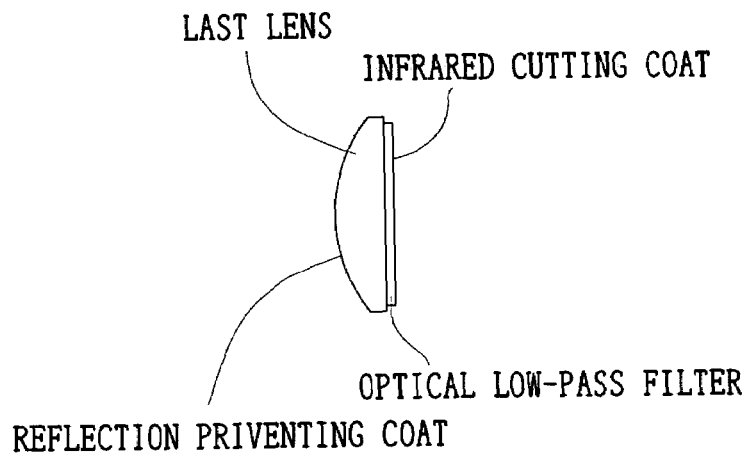
FIGS. 59A, 59B, and 59C are explanatory views showing preferred arrangements of the last lens units and filters in the electronic imaging apparatus of the present invention.
Figure 59B:
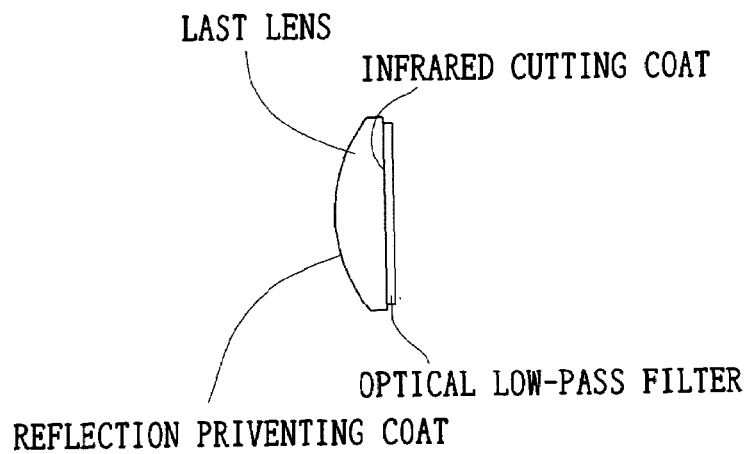
Figure 59C:
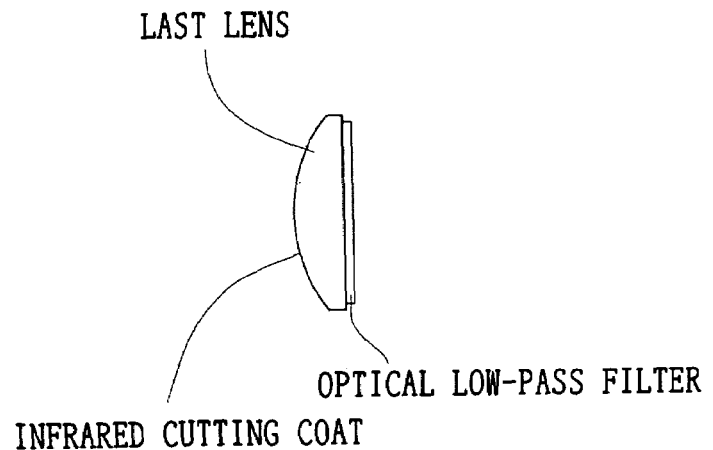

Also, since it is favorable that the filters are located on the image side of the entire optical system, the plano-convex or -concave lens should be constructed so that its image-side surface is flat. It is desirable that the infrared cutoff filter is coated and as shown in FIG. 59A, the image-side surface of the optical low-pass filter cemented to the plano-convex or -concave lens is coated with the infrared cutoff coating; as shown in FIG. 59B, the flat surface of the plano-convex or -concave lens is previously coated with the infrared cutoff coating and is cemented to the optical low-pass filter; or as shown in FIG. 59C, the curved surface of the last lens is coated with the infrared cutoff coating. In the case of FIG. 59C, it is further desirable to satisfy the following condition:

$$-0.2 < fw/R_{RX} < 0.2$$

where $R_{RX}$ is the radius of curvature, on the optical axis, of the curved surface of the last lens (the plano-convex or -concave lens).

When this condition is satisfied, the production of ghost and flare due to the infrared cutoff coating can be suppressed.

Next, values of parameters of conditions in individual embodiments described above are shown in Table 1.

TABLE 1

|  | 1st embodiment | 2nd embodiment | 3rd embodiment |
|---|---|---|---|
| Lens data | Numerical data 1 | Numerical data 2 | Numerical data 3 |
| $y_{10}$ (maximum image height) | 2.5 | 2.5 | 2.5 |
| Half angle of view for $y_{10} \times 0.6$ | 21.7° | 21.7° | 21.7° |
| Half angle of view at wide-angle position (ωw) | 33.6° | 33.6° | 33.5° |
| Half angle of view at middle position | 21.5° | 21.6° | 21.4° |
| Half angle of view at telephoto position | 12.8° | 12.9° | 13.0° |
| $y_{10}/(fw \cdot \tan \omega_{0.7\,w})$ | 0.91266 | 0.91064 | 0.91400 |
| $\log \gamma B/\log \gamma$ | 0.58262 | 0.60670 | 0.68307 |
| $R_{B3}/R_{B1}$ | 0.44377 | 0.65732 | 0.45006 |
| $fw/R_{B2}$ | -0.24100 | -0.19844 | -0.02622 |
| $v_{BP} - v_{BN}$ | 36.89 | 36.89 | 37.36 |
| $(R11 + R12)/(R11 - R12)$ | -1.00000 | -1.00000 | -1.00000 |
| $d_F/d_P$ | 0.48052 | 0.47976 | 0.47994 |
| $R11/y_{10}$ | -2.95552 | -2.93932 | -3.72600 |
| $fw \cdot (n1 - 1)/R11$ | -0.46110 | -0.46484 | -0.36637 |
| f1/fw | 4.06562 | 4.18236 | 5.53922 |
| f12/fw | 2.17324 | 2.21566 | 2.72457 |
| $(R_{1PF} + R_{1PR})/(R_{1PF} - R_{1PR})$ | -0.48870 | -0.56813 | -0.36316 |

TABLE 1-continued

|  | 1st embodiment | 2nd embodiment | 3rd embodiment |
|---|---|---|---|
| $(R_{2NF} + R_{2NR})/(R_{2NF} - R_{2NR})$ | −0.05542 | −0.01866 | −0.19862 |
| a ($\mu$m) | 2.5 | 2.0 | 1.5 |
| Fw/a | 1.13956 | 1.40000 | 1.90667 |
| ne · no/\|ne$^2$ − no$^2$\| | 85.005 | 12.899 | 10.577 |
| Optical low-pass filter material | Crystal | Lithium niobate | Resin film |
| Horizontal Nyquist filter thickness | 0.42503 | 0.05160 | 0.03173 |
| In terms of crystal | 0.42503 | 0.34002 | 0.25502 |
| Actual filter thickness (lens data) | 0.3 | 0.036 | 0.022 |
| $t_{LPF}$ (in terms of crystal) | 0.3 | 0.24 | 0.18 |
| τ 440/τ 520 (at τ max) | 0.951 | 0.951 | 0.951 |
| τ 600/τ 520 (at τ max) | 0.994 | 0.994 | 0.994 |
| τ 440/τ 520 (at τ min) | 0.917 | 0.917 | 0.917 |
| τ 600/τ 520 (at τ min) | 1.028 | 1.028 | 1.028 |
| τ 600/τ 550 | 1.0 | 1.0 | 1.0 |
| τ 700/τ 550 | 0.04 | 0.04 | 0.04 |
| τ 400/τ 550 | 0.0 | 0.0 | 0.0 |
| τ 440/τ 550 | 1.06 | 1.06 | 1.06 |
| fw/$R_{Rx}$ | — | — | 0.18606 |

The filters in the lens data are constructed with a plurality of optical low-pass filters and include the thickness of the infrared cutoff coating. The value of the maximum thickness is not used, but the values in the table are used.

Fourth Embodiment

Figure 19:
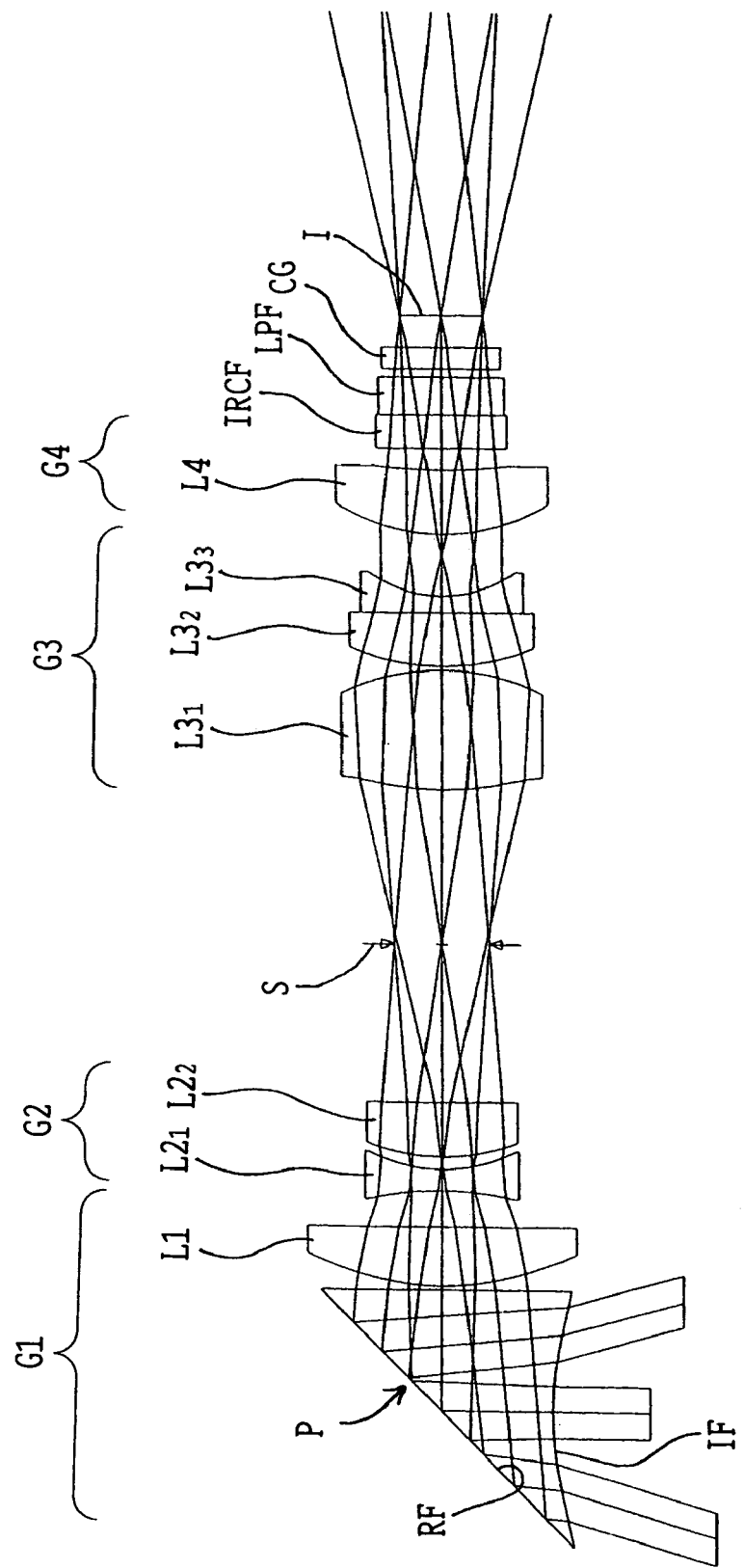
FIG. 19 is a sectional view showing an optical arrangement, developed along the optical axis, of a fourth embodiment of the zoom lens according to the present invention.
Figure 20A:
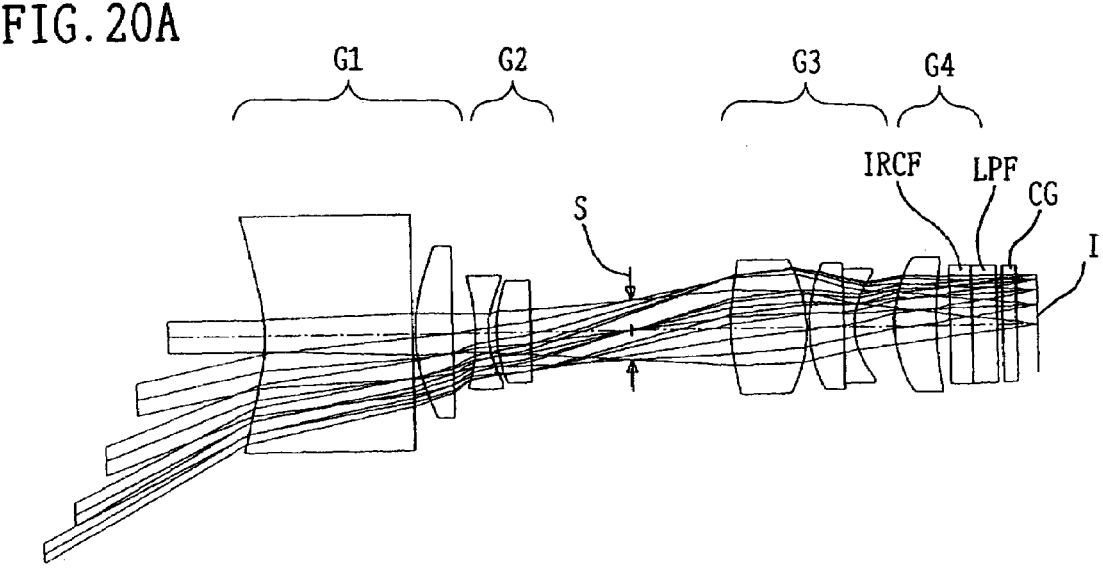
FIGS. 20A, 20B, and 20C are sectional views showing optical arrangements, developed along the optical axis, at wide-angle, middle, and telephoto positions, respectively, in focusing of the infinite object point of the zoom lens in the fourth embodiment.
Figure 20B:
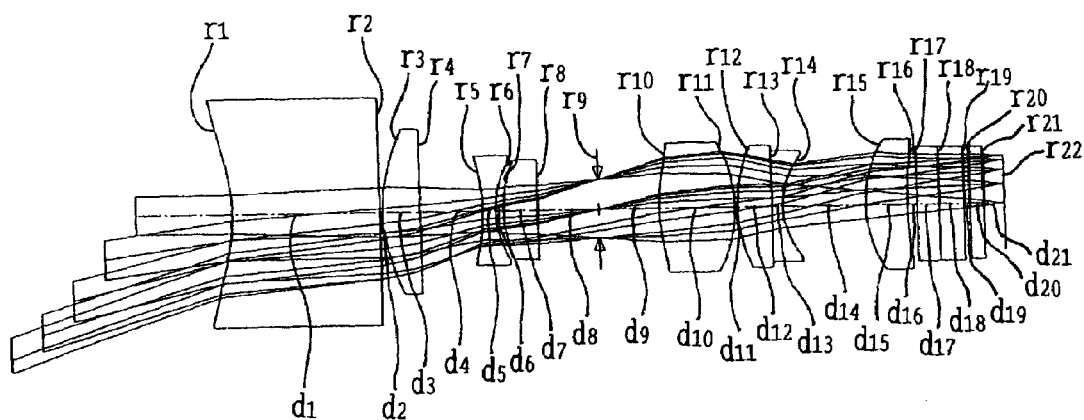
Figure 20C:
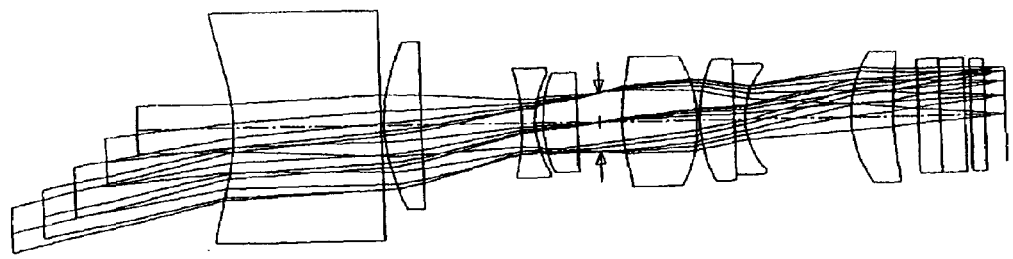

FIG. 19 shows an optical arrangement, where the optical path is bent in focussing of the infinite object point at the wide-angle position, in the fourth embodiment of the zoom lens according to the present invention. FIGS. 20A, 20B, and 20C show optical arrangements at wide-angle, middle, and telephoto positions, respectively, in the fourth embodiment. FIGS. 21A–21L, and 22A–22L show aberration characteristics in the fourth embodiment.

In FIG. 19, again, reference symbol I denotes the imaging surface of the CCD which is the electronic image sensor and CG denotes the plane plate-like CCD cover glass. Reference symbol LPF denotes an optical low-pass filter and IRCF denotes an infrared cutoff filter. The electronic imaging apparatus of the fourth embodiment has, in order from the object side, the zoom lens of the present invention, the infrared cutoff filter IRCF, the optical low-pass filter LPF, the cover glass CG, and the imaging surface I.

The zoom lens of the fourth embodiment comprises, in order from the object side, the first lens unit G1, the second lens unit G2, the aperture stop S, the third lens unit G3, and the fourth lens unit G4.

The first lens unit G1 includes, in order from the object side, a prism P which has a reflecting optical surface RF for bending the optical path and a ray incidence surface IF which is a concave surface facing the object side and is configured as an aspherical surface that divergence is impaired progressively in going from the optical axis to the periphery and a rear lens sub-unit with positive refracting power, and has positive refracting power as a whole.

The prism P is configured as a reflecting prism bending the optical path by 90°.

The rear lens sub-unit is constructed with the positive meniscus lens L1.

The second lens unit G2 includes, in order from the object side, the biconcave negative lens L2$_1$ and the positive meniscus lens L2$_2$, and has negative refracting power as a whole.

The third lens unit G3 includes, in order from the object side, the biconvex positive lens L3$_1$ and the cemented lens component of the positive meniscus lens L3$_2$ and the negative meniscus lens L3$_3$.

The fourth lens unit G4 is constructed with a positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the image side, and the third lens unit G3 is moved toward only the object side.

In the focusing operation, the fourth lens unit G4 is moved along the optical axis.

In addition to being provided for the ray incidence surface IF of the prism P in the first lens unit G1, the aspherical surfaces are provided for the object-side surface of the positive meniscus lens L1 in the first lens unit G1, both surfaces of the biconcave negative lens L2$_1$ in the second lens unit G2, and both surfaces of the biconvex positive lens L3$_1$ in the third lens unit G3.

Subsequently, numerical data of optical members constituting the zoom lens of the fourth embodiment are shown below.

Numerical Data 4
r$_1$=−11.6796 (aspherical surface)
    d$_1$=9.0200 n$_{d1}$=1.58423 v$_{d1}$=30.49
r$_2$∞
    d$_2$=0.1650
r$_3$=9.8371 (aspherical surface)
    d$_3$=2.3000 n$_{d3}$=1.69350 v$_{d4}$=53.21
r$_4$=529.3773
    d$_4$=D4
r$_5$=−12.8197 (aspherical surface)
    d$_5$=0.8000 n$_{d5}$=1.80610 v$_{d3}$=40.92
r$_6$=5.7072 (aspherical surface)
    d$_6$=0.5000
r$_7$=8.1113
    d$_7$=2.1000 n$_{d7}$=1.84666 v$_{d7}$=23.78
r$_8$=177.2938
    d$_8$=D8
r$_9$=∞ (stop)
    d$_9$=D9
r$_{10}$=10.6507 (aspherical surface)
    d$_{10}$=4.6389 n$_{d10}$=1.69350 v$_{d10}$=53.21

$r_{11}=-9.2140$ (aspherical surface)
  $d_{11}=0.1650$
$r_{12}=9.0658$
  $d_{12}=2.0900$ $n_{d12}=1.58913$ $v_{d12}=61.14$
$r_{13}=5717.2980$
  $d_{13}=0.6600$ $n_{d13}=1.84666$ $v_{d13}=23.78$
$r_{14}=4.9509$
  $d_{14}=D14$
$r_{15}=7.7937$
  $d_{15}=2.5000$ $n_{d15}=1.51742$ $v_{d13}=52.43$
$r_{16}=22.2524$
  $d_{16}=D16$
$r_{17}=\infty$
  $d_{17}=1.3200$ $n_{d17}=1.51633$ $v_{d17}=64.14$
$r_{18}=\infty$
  $d_{18}=1.4795$ $n_{d18}=1.54771$ $v_{d18}=62.84$
$r_{19}=\infty$
  $d_{19}=0.3300$
$r_{20}=\infty$
  $d_{20}=0.8250$ $n_{d20}=1.51633$ $v_{d18}=64.14$
$r_{21}=\infty$
  $d_{21}=D21$
$r_{22}=\infty$ (imaging surface)

Aspherical Coefficients
First Surface
  $K=0$
  $A_2=0$ $A_4=5.8448\times10^{-4}$ $A_6=-4.7903\times10^{-6}$
  $A_8=3.0447\times10^{-8}$
Third Surface
  $K=0$
  $A_2=0$ $A_4=-3.1814\times10^{-4}$ $A_6=-2.2382\times10^{-6}$
  $A_8=6.3527\times10^{-8}$
Fifth Surface
  $K=0$
  $A_2=0$ $A_4=-4.1561\times10^{-4}$ $A_6=5.6431\times10^{-5}$
  $A_8=-2.4336\times10^{-7}$
Sixth Surface
  $K=0$
  $A_2=0$ $A_4=-1.1787\times10^{-3}$ $A_6=8.4597\times10^{-5}$
  $A_8=-5.4129\times10^{-6}$
Tenth Surface
  $K=0$
  $A_2=0$ $A_4=-6.3435\times10^{-4}$ $A_6=-1.6391\times10^{-5}$
  $A_8=-7.1371\times10^{-7}$
Eleventh Surface
  $K=0$
  $A_2=0$ $A_4=1.9014\times10^{-5}$ $A_6=-1.5643\times10^{-5}$
  $A_8=-2.0218\times10^{-7}$ Zoom Data When D0 (the distance from the object to the first surface) is $\infty$,

|  | Wide-angle | Middle | Telephoto |
| --- | --- | --- | --- |
| f (mm) | 5.66108 | 8.59978 | 13.05912 |
| Fno | 2.8378 | 3.5255 | 4.3575 |
| D0 | $\infty$ | $\infty$ | $\infty$ |
| D4 | 1.39923 | 3.84253 | 6.19793 |
| D8 | 6.19840 | 3.75296 | 1.39972 |
| D9 | 6.11340 | 3.74403 | 1.39951 |
| D14 | 2.40017 | 5.01149 | 6.43661 |
| D16 | 0.82209 | 0.57868 | 1.49956 |
| D21 | 1.19969 | 1.19992 | 1.19940 |

When D0 (the distance from the object to the first surface) is a short distance (20 cm),

|  | Wide-angle | Middle | Telephoto |
| --- | --- | --- | --- |
| D0 | 195.03546 | 195.03546 | 195.03546 |
| D4 | 1.39923 | 3.84253 | 6.19793 |
| D8 | 6.19840 | 3.75296 | 1.39972 |
| D9 | 6.11340 | 3.74403 | 1.39951 |
| D14 | 2.11869 | 4.36476 | 5.12699 |
| D16 | 1.10357 | 1.22541 | 2.80919 |
| D21 | 1.19969 | 1.19992 | 1.19940 |

Fifth Embodiment

Figure 23:
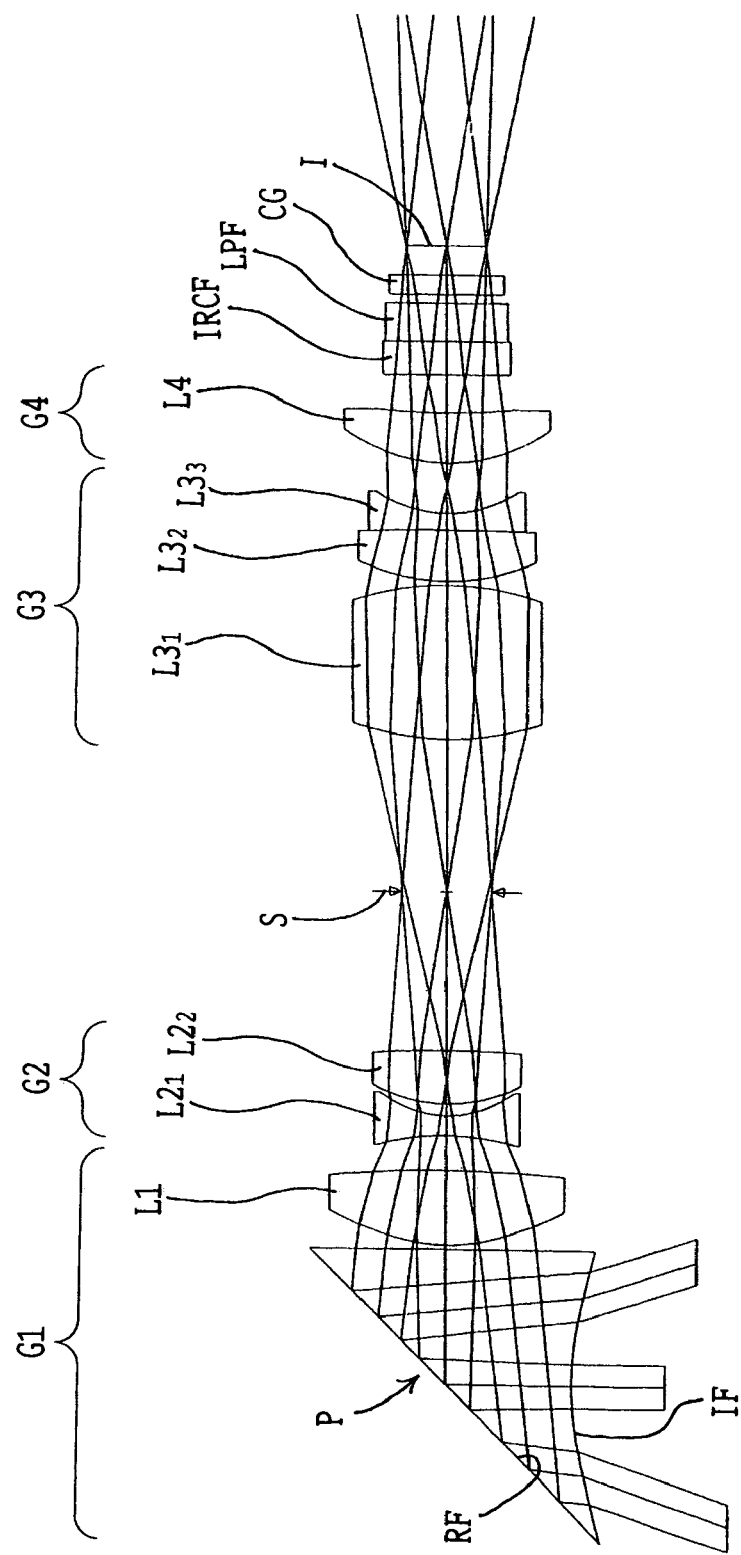
FIG. 23 is a sectional view showing an optical arrangement, developed along the optical axis, of a fifth embodiment of the zoom lens according to the present invention.
Figure 24A:
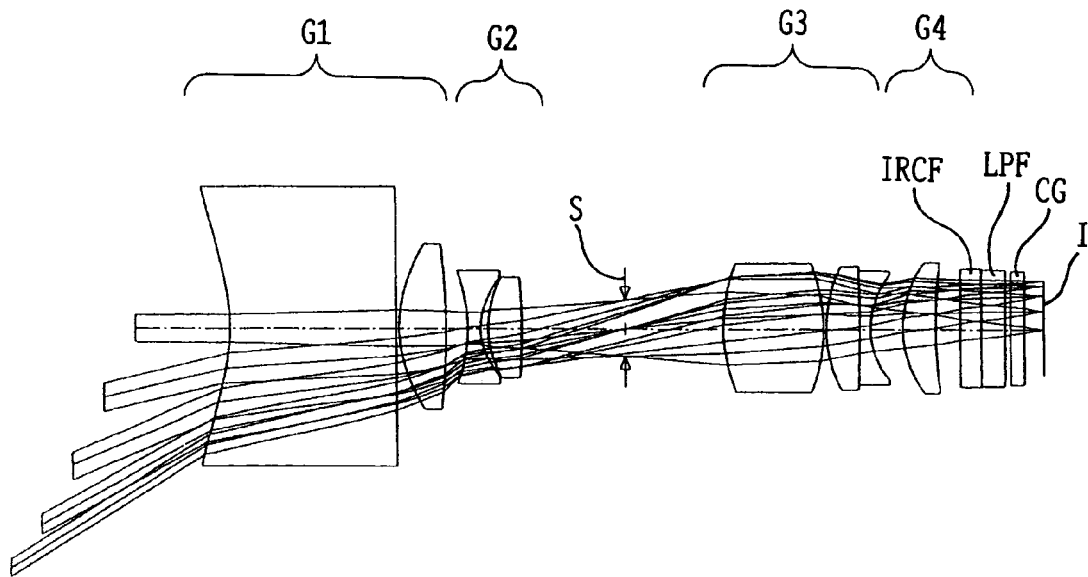
FIGS. 24A, 24B, and 24C are sectional views showing optical arrangements, developed along the optical axis, at wide-angle, middle, and telephoto positions, respectively, in focusing of the infinite object point of the zoom lens in the fifth embodiment.
Figure 24B:
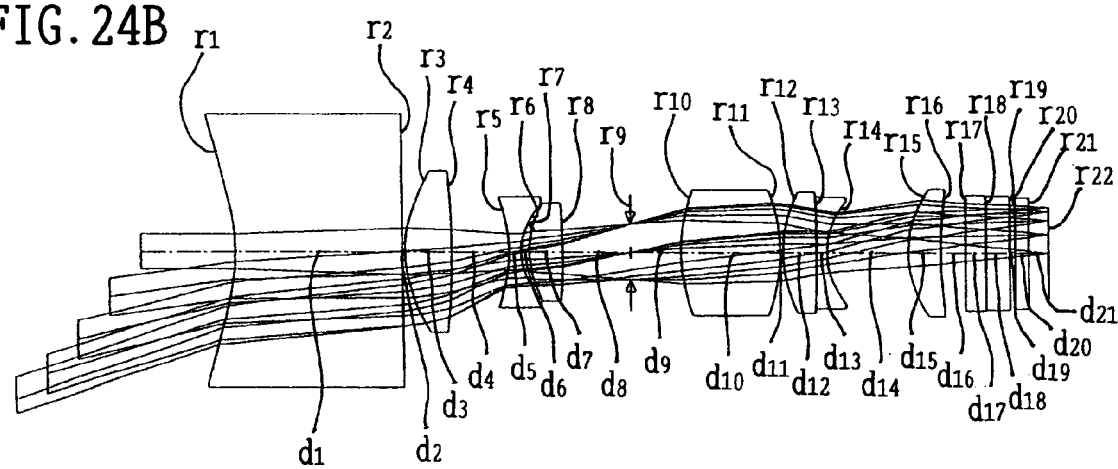
Figure 24C:
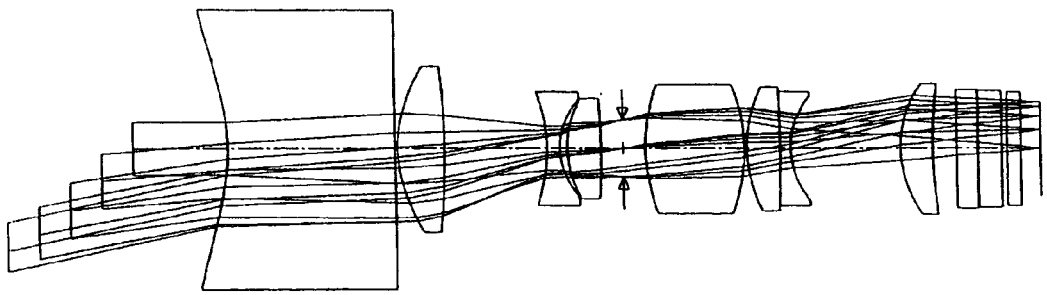

FIG. 23 shows an optical arrangement, where the optical path is bent in focussing of the infinite object point at the wide-angle position, in the fifth embodiment of the zoom lens according to the present invention. FIGS. 24A, 24B, and 24C show optical arrangements at wide-angle, middle, and telephoto positions, respectively, in the fifth embodiment.

In FIG. 23, again, reference symbol I denotes the imaging surface of the CCD which is the electronic image sensor and CG denotes the plane plate-like CCD cover glass, LPF denotes the optical low-pass filter, and IRCF denotes the infrared cutoff filter. The electronic imaging apparatus of the fourth embodiment has, in order from the object side, the zoom lens of the present invention, the infrared cutoff filter IRCF, the optical low-pass filter LPF, the cover glass CG, and the imaging surface I.

The zoom lens of the fifth embodiment comprises, in order from the object side, the first lens unit G1, the second lens unit G2, the aperture stop S, the third lens unit G3, and the fourth lens unit G4.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the biconvex positive lens $L2_2$, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$. The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the image side, and the third lens unit G3 is moved toward only the object side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens L2$_1$ in the second lens unit G2, and both surfaces of the biconvex positive lens L3$_1$ in the third lens unit G3.

Subsequently, numerical data of optical members constituting the zoom lens of the fifth embodiment are shown below.

Numerical Data 5

$r_1$=−11.7854 (aspherical surface)
 $d_1$=10.5000 $n_{d1}$=1.58423 $v_{d1}$=30.49
$r_2$=∞
 $d_2$=0.1650
$r_3$=7.8008 (aspherical surface)
 $d_3$=3.0000 $n_{d3}$=1.56907 $v_{d3}$=71.30
$r_4$=−49.1420
 $d_4$=D4
$r_5$=−9.3686 (aspherical surface)
 $d_5$=0.8000 $n_{d5}$=1.80610 $v_{d5}$=40.92
$r_6$=3.8996 (aspherical surface)
 $d_6$=0.5000
$r_7$=6.3672
 $d_7$=2.1000 $n_{d7}$=1.80518 $v_{d7}$=25.42
$r_8$=−47.8945
 $d_8$=D8
$r_9$=∞ (stop)
 $d_9$=6.1780
$r_{10}$=10.2138 (aspherical surface)
 $d_{10}$=6.2294 $n_{10}$=1.69350 $v_{d10}$=53.21
$r_{11}$=−10.9309 (aspherical surface)
 $d_{11}$=0.1650
$r_{12}$=8.6046
 $d_{12}$=2.0900 $n_{d12}$=1.58913 $v_{d12}$=61.14
$r_{13}$=−99.9521
 $d_{13}$=0.6600 $n_{d13}$=1.84666 $v_{d13}$=23.78
$r_{14}$=5.1954
 $d_{14}$=D14
$r_{15}$=7.1426
 $d_{15}$=2.0000 $n_{d15}$=1.51633 $v_{d15}$=64.14
$r_{16}$=29.6189
 $d_{16}$=D16
$r_{17}$=∞
 $d_{17}$=1.3200 $n_{d17}$=1.51633 $v_{d16}$=64.14
$r_{18}$=∞
 $d_{18}$=1.4795 $n_{d18}$=1.54771 $v_{d18}$=62.84
$r_{19}$=∞
 $d_{19}$=0.3300
$r_{20}$=∞
 $d_{20}$=0.8250 $n_{d20}$=1.51633 $v_{d20}$=64.14
$r_{21}$=∞
 $d_{21}$=D21
$r_{22}$=∞ (imaging surface)

Aspherical Coefficients
First Surface
 K=0
 $A_2$=0 $A_4$=5.1910×10$^{-4}$ $A_6$=−3.7399×10$^{-6}$
 $A_8$=2.0145×10$^{-8}$ $A_{10}$=0
Third Surface
 K=0
 $A_2$=0 $A_4$=−4.4104×10$^{-4}$ $A_6$=−3.3553×10$^{-6}$
 $A_8$=5.4885×10$^{-9}$ $A_{10}$=0
Fifth Surface
 K=0
 $A_2$=0 $A_4$=3.4042×10$^{-5}$ $A_6$=6.7454×10$^{-5}$
 $A_8$=−3.4996×10$^{-6}$ $A_{10}$=0
Sixth Surface
 K=0
 $A_2$=0 $A_4$=−2.8172×10$^{-3}$ $A_6$=1.3308×10$^{-4}$
 $A_8$=−1.9143×10$^5$ $A_{10}$=0
Tenth Surface
 K=0
 $A_2$32 0 $A_4$=−2.3186×10$^{-4}$ $A_6$=−2.1538×10$^5$
 $A_8$=7.9488×10$^{-7}$ $A_{10}$=0
Eleventh
 K=0
 $A_2$=0 $A_4$=2.6973×10$^{-4}$ $A_6$=1.5248×10$^{-5}$
 $A_8$=3.1261×10$^{-7}$ $A_{10}$=0

Zoom Data

When D0 (the distance from the object to the first surface) is ∞,

|  | Wide-angle | Middle | Telephoto |
|---|---|---|---|
| f (mm) | 5.05307 | 8.56998 | 14.55901 |
| Fno | 2.8571 | 3.7364 | 4.3824 |
| D0 | ∞ | ∞ | ∞ |
| D4 | 1.39683 | 3.62796 | 6.52030 |
| D8 | 6.52260 | 4.28823 | 1.39914 |
| D9 | 6.17797 | 3.16502 | 1.39955 |
| D14 | 1.99996 | 5.00758 | 6.78212 |
| D16 | 1.49982 | 1.50070 | 1.49610 |
| D21 | 1.20004 | 1.20279 | 1.19989 |

When D0 (the distance from the object to the first surface) is a short distance (20 cm),

|  | Wide-angle | Middle | Telephoto |
|---|---|---|---|
| D0 | 195.03546 | 195.03546 | 195.03546 |
| D4 | 1.39683 | 3.62796 | 6.52030 |
| D8 | 6.52260 | 4.28823 | 1.39914 |
| D9 | 6.17797 | 3.16502 | 1.39955 |
| D14 | 1.80885 | 4.47534 | 5.34741 |
| D16 | 1.69093 | 2.03293 | 2.93082 |
| d21 | 1.20004 | 1.20279 | 1.19989 |

Sixth Embodiment

Figure 25:
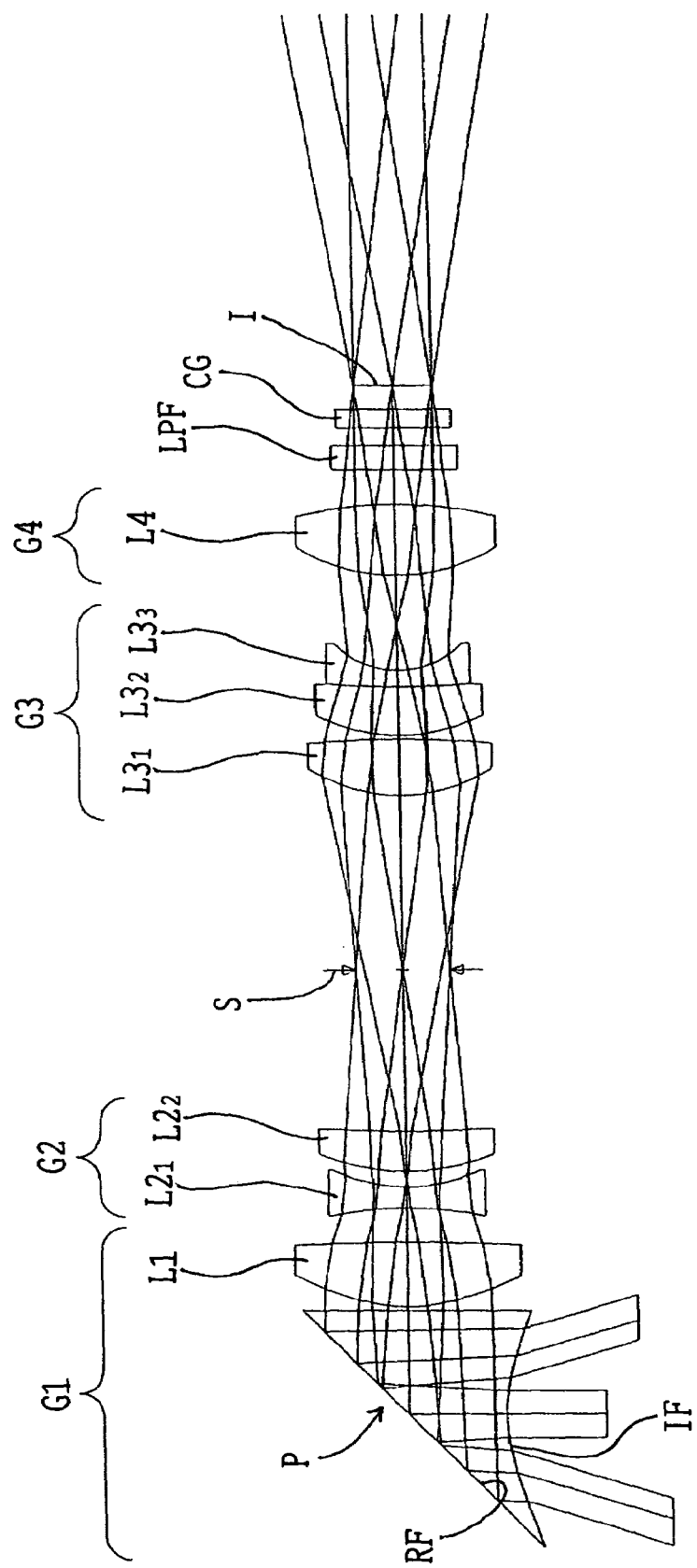
FIG. 25 is a sectional view showing an optical arrangement, developed along the optical axis, of a sixth embodiment of the zoom lens according to the present invention.
Figure 26A:
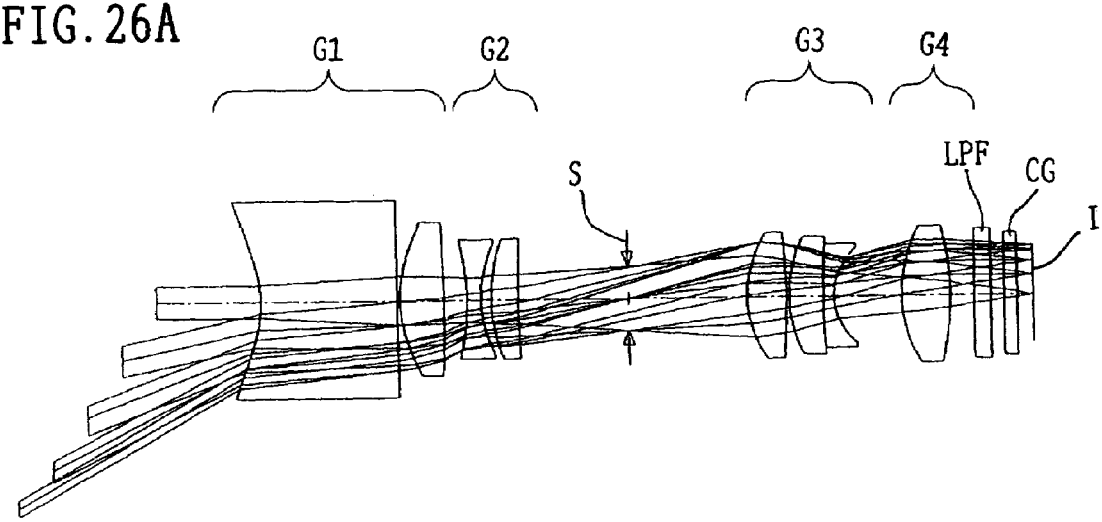
FIGS. 26A, 26B, and 26C are sectional views showing optical arrangements, developed along the optical axis, at wide-angle, middle, and telephoto positions, respectively, in focusing of the infinite object point of the zoom lens in the sixth embodiment.
Figure 26B:
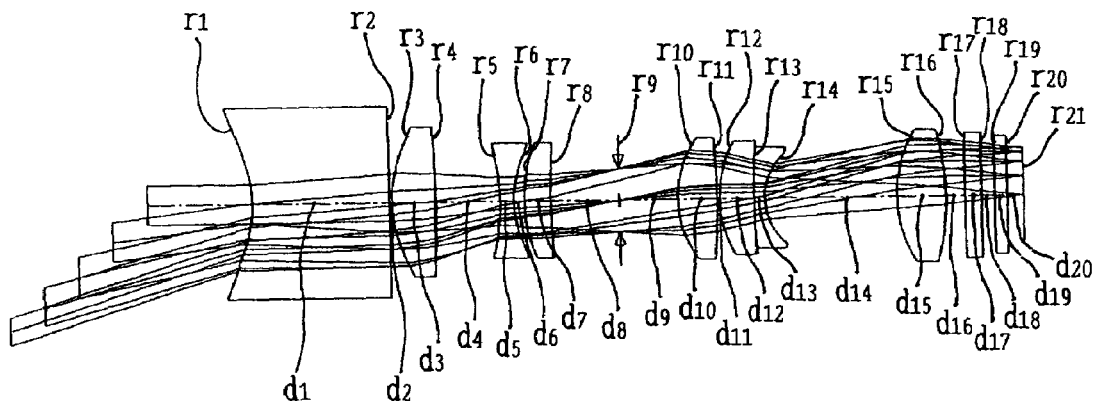
Figure 26C:
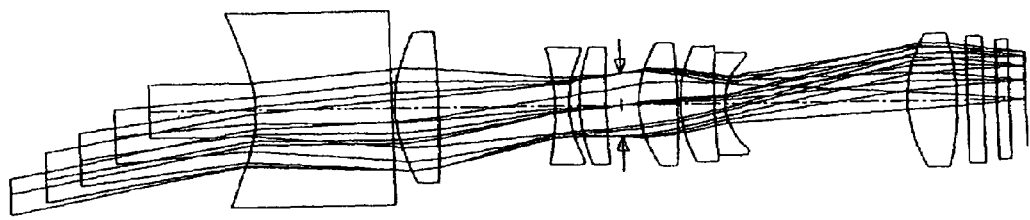

FIG. 25 shows an optical arrangement, where the optical path is bent in focussing of the infinite object point at the wide-angle position, in the sixth embodiment of the zoom lens according to the present invention. FIGS. 26A, 26B, and 26C show optical arrangements at wide-angle, middle, and telephoto positions, respectively, in the sixth embodiment. FIGS. 27A–27L, and 28A–28L show aberration characteristics in the sixth embodiment.

In FIG. 25, again, reference symbol I denotes the imaging surface of the CCD which is the electronic image sensor, CG denotes the plane plate-like CCD cover glass, and LPF denotes the optical low-pass filter. The electronic imaging apparatus of the sixth embodiment has, in order from the object side, the zoom lens of the present invention, the optical low-pass filter LPF, the cover glass CG, and the imaging surface I.

The zoom lens of the sixth embodiment comprises, in order from the object side, the first lens unit G1, the second lens unit G2, the aperture stop S, the third lens unit G3, and the fourth lens unit G4.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the positive meniscus lens $L2_2$, and has negative refracting power as a whole.

The third lens unit G3 includes, in order from the object side, the biconvex positive lens $L3_1$ and the cemented lens component of the positive meniscus lens $L3_2$ and the negative meniscus lens $L3_3$.

The fourth lens unit G4 is constructed with the biconvex positive lens L4.

When the magnification of the zoom lens is changed over the range from the wide-angle position to the telephoto position in focusing of the infinite object point, the first lens unit G1 and the aperture stop S are fixed, the second lens unit G2 is moved toward only the image side, and the third lens unit G3 is moved toward only the object side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the sixth embodiment are shown below.

Numerical Data 6

$r_1$=−6.4061 (aspherical surface)
   $d_1$=7.7000 $n_{d1}$=1.68893 $v_{d1}$=31.07
$r_2$=∞
   $d_2$=0.1500
$r_3$=6.8230 (aspherical surface)
   $d_3$=2.5000 $n_{d3}$=1.69350 $v_{d3}$=53.21
$r_4$=−75.6278
   $d_4$=D4
$r_5$=−12.3367 (aspherical surface)
   $d_5$=0.8000 $n_{d5}$=1.74320 $v_{d5}$=49.34
$r_6$=6.2521 (aspherical surface)
   $d_6$=0.6000
$r_7$=8.9494
   $d_7$=1.5000 $n_{d7}$=1.84666 $v_{d7}$=23.78
$r_8$=48.0820
   $d_8$=D8
$r_9$=∞ (stop)
   $d_9$=D9
$r_{10}$=5.8322 (aspherical surface)
   $d_{10}$=2.2000 $n_{d10}$=1.69350 $v_{d10}$=53.21
$r_{11}$=−30.5807 (aspherical surface)
   $d_{11}$=0.1500
$r_{12}$=6.9491
   $d_{12}$=1.9000 $n_{d12}$=1.58913 $v_{d12}$=61.14
$r_{13}$=35.0000
   $d_{13}$=0.6000 $n_{d13}$=1.84666 $v_{d13}$=23.78
$r_{14}$=3.3853
   $d_{14}$=D14
$r_{15}$=7.5994
   $d_{15}$=2.7000 $n_{d15}$=1.48749 $v_{d15}$=70.23
$r_{16}$=−15.2711
   $d_{16}$=D16 $n_{d16}$=1.69350 $v_{d16}$=53.21
$r_{17}$=∞
   $d_{17}$=0.9300 $n_{d17}$=1.54771 $v_{d17}$=62.84
$r_{18}$=∞
   $d_{18}$=0.7000
$r_{19}$=∞
   $d_{19}$=0.7000
$r_{20}$=∞
   $d_{20}$=D20
$r_{21}$=∞ (imaging surface)

Aspherical Coefficients
First Surface
   K=0
   $A_2$=0 $A_4$=2.1326×10$^{-3}$ $A_6$=−3.7377×10$^{-5}$
   $A_8$=7.9883×10$^{-7}$ $A_{10}$=0
Third Surface
   K=0
   $A_2$=0 $A_4$=−1.0134×10$^{-3}$ $A_6$=4.7985×10$^{-6}$
   $A_8$=−1.5827×10$^{-7}$ $A_{10}$=0
Fifth Surface
   K=0
   $A_2$=0 $A_4$=5.2064×10$^{-4}$ $A_6$=5.5598×10$^{-6}$
   $A_8$=−3.2808×10$^{-6}$ $A_{10}$=0
Sixth Surface
   K=0
   $A_2$=0 $A_4$=−1.3075×10$^{-4}$ $A_6$=3.8243×10$^{-5}$
   $A_8$=−8.6690×10$^{-6}$ $A_{10}$=0
Tenth Surface
   K=0
   $A_2$=0 $A_4$=−3.6414×10$^{-4}$ $A_6$=1.0886×10$^{-5}$
   $A_8$=−1.5741×10$^{-6}$ $A_{10}$=0
Eleventh Surface
   K=0
   $A_2$=0 $A_4$=4.0592×10$^{-4}$ $A_6$=1.8858×10$^{-5}$
   $A_8$=−1.9277×10$^{-6}$ $A_{10}$=0

Zoom Data

When D0 (the distance from the object to the first surface) is ∞,

|  | Wide-angle | Middle | Telephoto |
| --- | --- | --- | --- |
| f (mm) | 5.15163 | 8.66919 | 14.60011 |
| Fno | 2.8363 | 3.8370 | 4.8273 |
| D0 | ∞ | ∞ | ∞ |
| D4 | 1.2993 | 3.65215 | 6.63822 |
| D8 | 6.23846 | 3.88535 | 0.89960 |
| D9 | 6.70978 | 3.34865 | 0.99969 |
| D14 | 3.72065 | 7.35014 | 10.17139 |
| D16 | 1.30126 | 1.03221 | 0.56066 |
| D20 | 0.89927 | 0.89861 | 0.89850 |

When D0 (the distance from the object to the first surface) is a short distance (20 cm),

|  | Wide-angle | Middle | Telephoto |
| --- | --- | --- | --- |
| D0 | 177.30496 | 177.30496 | 177.30496 |
| D4 | 1.29934 | 3.65215 | 6.63822 |

-continued

|     | Wide-angle | Middle  | Telephoto |
| --- | ---------- | ------- | --------- |
| D8  | 6.23846    | 3.88535 | 0.89960   |
| D9  | 6.70978    | 3.34865 | 0.99969   |
| D14 | 3.52859    | 6.81371 | 8.74413   |
| D16 | 1.49332    | 1.56863 | 1.98792   |
| D20 | 0.89927    | 0.89861 | 0.98950   |

Seventh Embodiment

Figure 29:
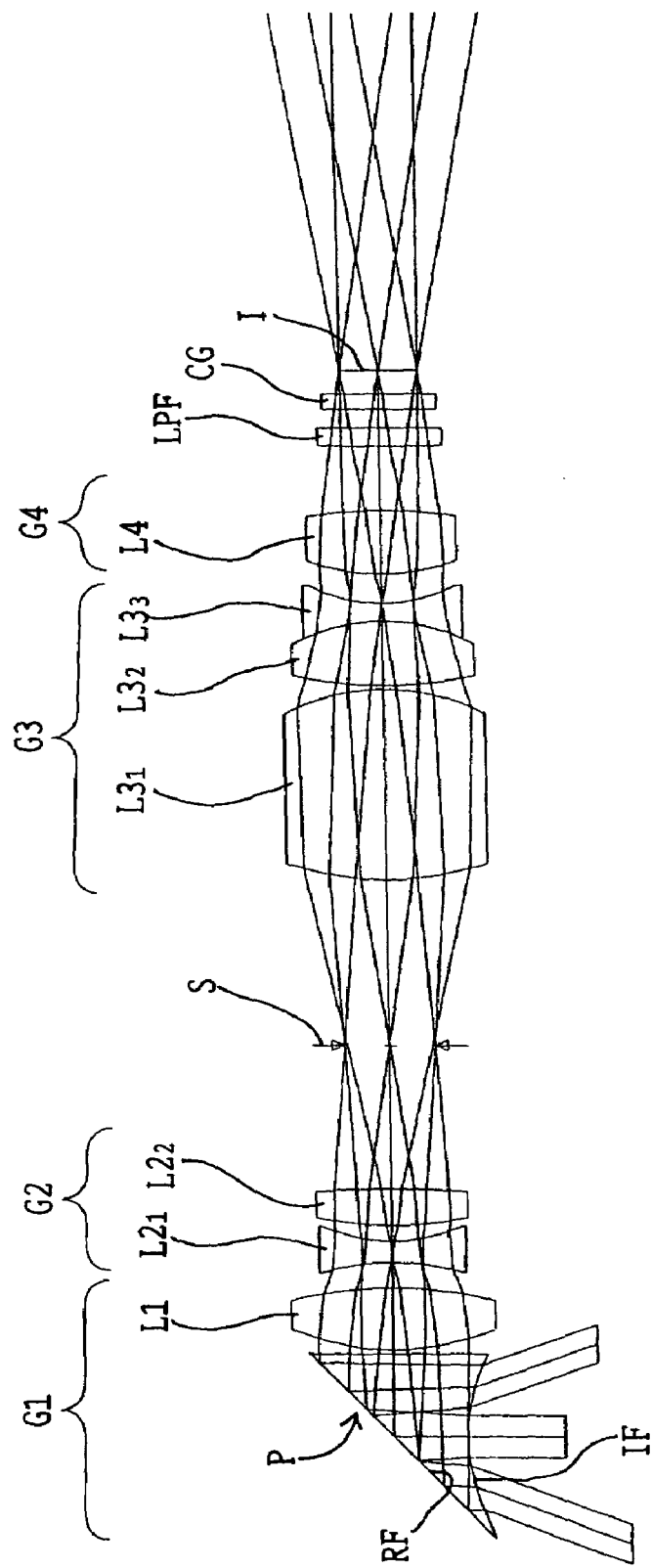
FIG. 29 is a sectional view showing an optical arrangement, developed along the optical axis, of a seventh embodiment of the zoom lens according to the present invention.
Figure 30A:
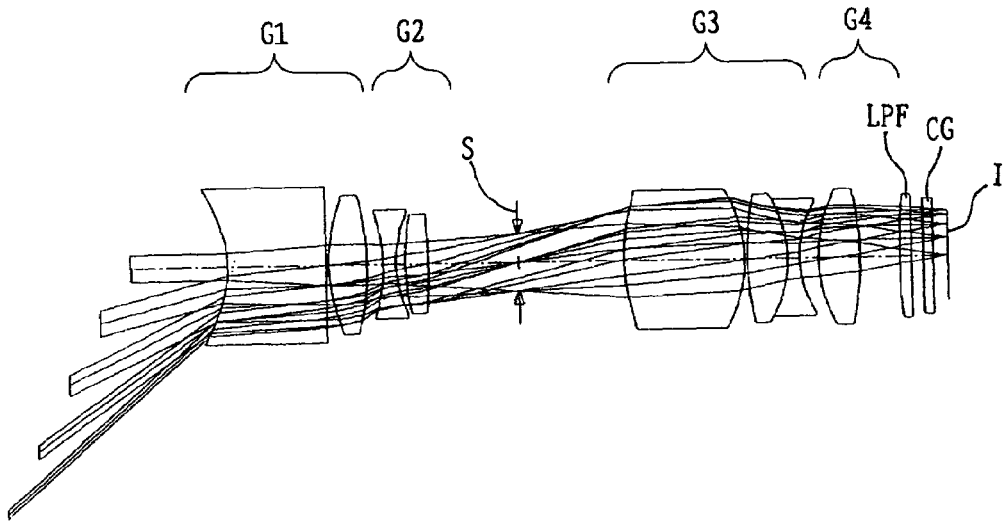
FIGS. 30A, 30B, and 30C are sectional views showing optical arrangements, developed along the optical axis, at wide-angle, middle, and telephoto positions, respectively, in focusing of the infinite object point of the zoom lens in the seventh embodiment.
Figure 30B:
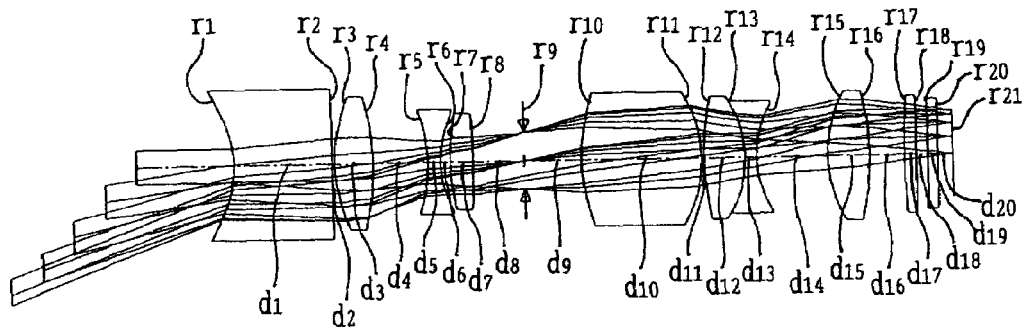
Figure 30C:
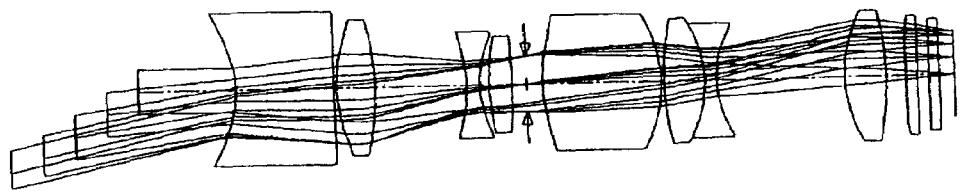

FIG. 29 shows an optical arrangement, where the optical path is bent in focussing of the infinite object point at the wide-angle position, in the seventh embodiment of the zoom lens according to the present invention. FIGS. 30A, 30B, and 30C show optical arrangements at wide-angle, middle, and telephoto positions, respectively, in the seventh embodiment. FIGS. 31A–31L, and 32A–32L show aberration characteristics in the seventh embodiment.

In FIG. 29, again, reference symbol I denotes the imaging surface of the CCD which is the electronic image sensor, CG denotes the plane plate-like CCD cover glass, and LPF denotes the optical low-pass filter. The electronic imaging apparatus of the seventh embodiment has, in order from the object side, the zoom lens of the present invention, the optical low-pass filter LPF, the cover glass CG, and the imaging surface I.

The zoom lens of the seventh embodiment comprises, in order from the object side, the first lens unit G1, the second lens unit G2, the aperture stop S, the third lens unit G3, and the fourth lens unit G4.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the biconvex positive lens $L2_2$.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the biconvex positive lens L4.

When the magnification of the zoom lens is changed over the range from the wide-angle position to the telephoto position in focusing of the infinite object point, the first lens unit G1 and the aperture stop S are fixed, the second lens unit G2 is moved toward only the image side, and the cemented lens component of the third lens unit G3 is moved toward only the object side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the seventh embodiment are shown below.

Numerical Data 7

$r_1$=−5.5389 (aspherical surface)
  $d_1$=6.0000 $n_{d1}$=1.84666 $v_{d1}$=23.278
$r_2$=∞
  $d_2$=0.1500
$r_3$=7.9429 (aspherical surface)
  $d_3$=2.4000 $n_{d3}$=1.80610 $v_{d3}$=40.92
$r_4$=−16.2044
  $d_4$=D4
$r_5$=−10.4750 (aspherical surface)
  $d_5$=0.8000 $n_{d5}$=1.74320 $v_{d5}$=49.34
$r_6$=5.7272 (aspherical surface)
  $d_6$=0.6000
$r_7$=13.8244
  $d_7$=1.4000 $n_{d7}$=1.84666 $v_{d7}$=23.78
$r_8$=−47.0781
  $d_8$=D8
$r_9$=∞ (stop)
  $d_9$=6.4631
$r_{10}$=10.0272 (aspherical surface)
  $d_{10}$=10.0272 $n_{d10}$=7.3544 $v_{d10}$=53.21
$r_{11}$=−7.8359 (aspherical surface)
  $d_{11}$=0.1500
$r_{12}$=17.0148
  $d_{12}$=2.4988 $n_{d12}$=1.51742 $v_{d12}$=52.43
$r_{13}$=−7.0740
  $d_{13}$=0.7000 $n_{d13}$=1.80518 $v_{d13}$=25.42
$r_{14}$=6.2662
  $d_{14}$=D14
$r_{15}$=8.3747
  $d_{15}$=2.5000 $n_{d15}$=1.48749 $v_{d15}$=70.23
$r_{16}$=−18.1774
  $d_{16}$=D16
$r_{17}$=−141.5544 (aspherical surface)
  $d_{17}$=0.7000 $n_{d17}$=1.58423 $v_{d17}$=30.249
$r_{18}$=∞
  $d_{18}$=0.7000
$r_{19}$=∞
  $d_{19}$=0.6000 $n_{d19}$=1.54771 $v_{d19}$=62.84
$r_{20}$=∞
  $d_{20}$=D20
$r_{21}$=∞ (imaging surface)

Aspherical Coefficients
First Surface
  K=0
  $A_2$=0 $A_4$=2.4814×10$^{-3}$ $A_6$=−4.0712×10$^{-5}$
  $A_8$=1.3226×10$^{-6}$ $A_{10}$=0
Third Surface
  K=0
  $A_2$=0 $A_4$=−1.1930×10$^{-3}$ $A_6$=0.5418×10$^{-5}$
  $A_8$=−2.5464×10$^{-7}$ $A_{10}$=0
Fifth Surface
  K=0
  $A_2$=0 $A_4$=−2.0881×10$^{-3}$ $A_6$=2.3414×10$^{-4}$
  $A_8$=−5.6282×10$^{-6}$ $A_{10}$=0
Sixth Surface
  K=0
  $A_2$=0 $A_4$=−3.4938×10$^{-3}$ $A_6$=2.2340×10$^{-4}$
  $A_8$=−5.8606×10$^{-7}$ $A_{10}$=0

Tenth Surface
K=0
$A_2=0$ $A_4=-4.2747\times10^{-4}$ $A_6=-1.1457\times10^{-5}$
$A_8=-3.1682\times10^{-7}$ $A_{10}=0$
Eleventh Surface
K=0
$A_2=0$ $A_4=3.9300\times10^{-4}$ $A_6=-1.2046\times10^{-5}$
$A_8=-2.4570\times10^{-9}$ $A_{10}=0$
Seventeenth Surface
K=0
$A_2=0$ $A_4=2.4873\times10^{-3}$ $A_6=-1.7543\times10^{-4}$
$A_8=5.7543\times10^{-6}$ $A_{10}=0$ Zoom Data When D0 (the distance from the object to the first surface) is ∞,

|  | Wide-angle | Middle | Telephoto |
| --- | --- | --- | --- |
| f (mm) | 4.60265 | 7.79964 | 13.19953 |
| Fno | 2.8520 | 3.7014 | 4.8074 |
| D0 | ∞ | ∞ | ∞ |
| D4 | 0.99533 | 3.39288 | 5.65079 |
| D8 | 5.55453 | 3.15642 | 0.89912 |
| D9 | 6.46310 | 3.52840 | 0.99886 |
| D14 | 1.14964 | 4.34907 | 7.81548 |
| D16 | 2.40112 | 2.13799 | 1.19953 |
| D20 | 0.89976 | 0.89807 | 0.89973 |

When D0 (the distance from the object to the first surface) is a short distance (20 cm),

|  | Wide-angle | Middle | Telephoto |
| --- | --- | --- | --- |
| D0 | 177.30496 | 177.30496 | 177.30496 |
| D4 | 0.99533 | 3.39288 | 5.65079 |
| D8 | 5.55453 | 3.15642 | 0.89912 |
| D9 | 6.46310 | 3.52840 | 0.99886 |
| D14 | 0.99921 | 3.91874 | 6.56783 |
| D16 | 2.55156 | 2.56832 | 2.44718 |
| D20 | 0.89973 | 0.89807 | 0.89973 |

Eighth Embodiment

Figure 33:
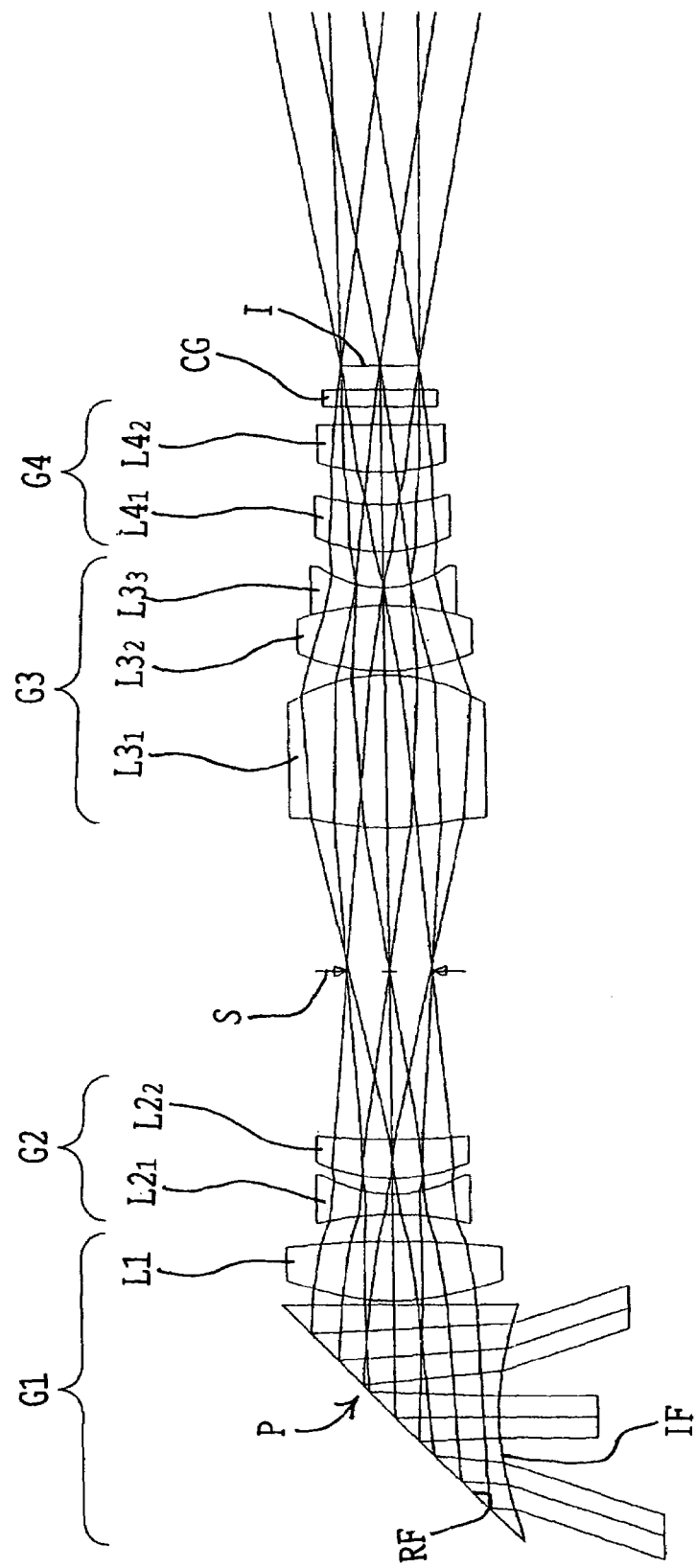
FIG. 33 is a sectional view showing an optical arrangement, developed along the optical axis, of an eighth embodiment of the zoom lens according to the present invention.
Figure 34A:
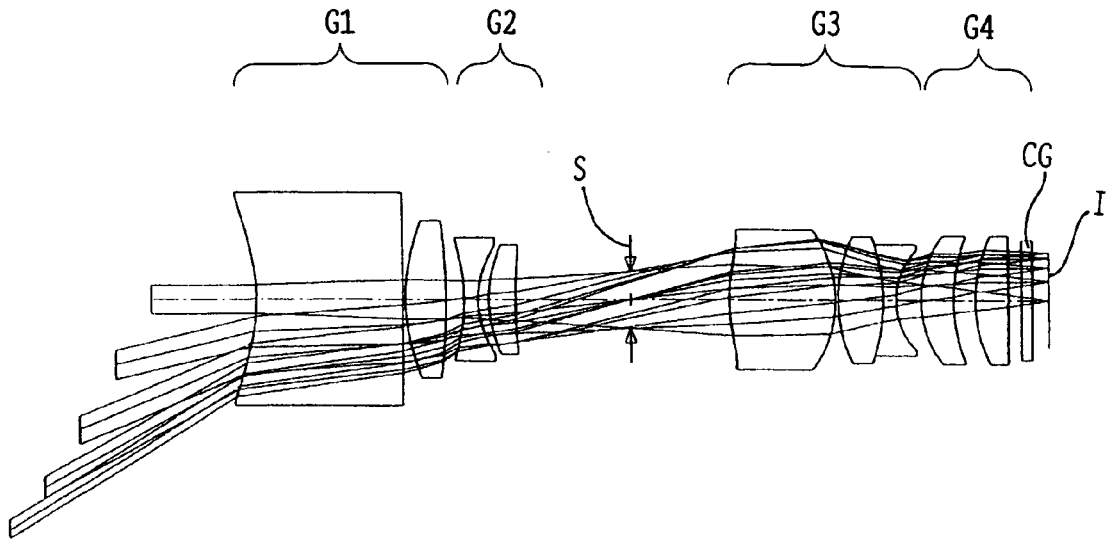
FIGS. 34A, 34B, and 34C are sectional views showing optical arrangements, developed along the optical axis, at wide-angle, middle, and telephoto positions, respectively, in focusing of the infinite object point of the zoom lens in the seventh embodiment.
Figure 34B:
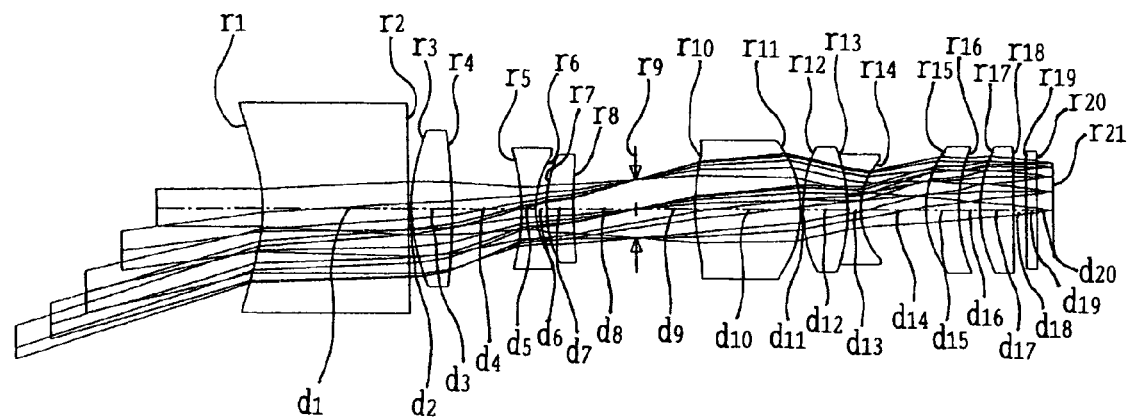
Figure 34C:
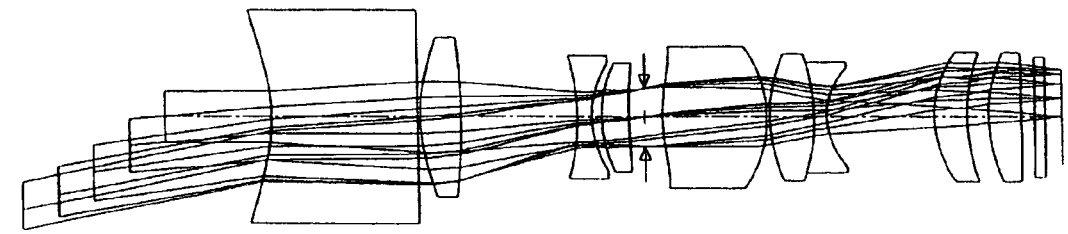

FIG. 33 shows an optical arrangement, where the optical path is bent in focussing of the infinite object point at the wide-angle position, in the eighth embodiment of the zoom lens according to the present invention. FIGS. 34A, 34B, and 34C show optical arrangements at wide-angle, middle, and telephoto positions, respectively, in the eighth embodiment. FIGS. 35A–35L, and 36A–36L show aberration characteristics in the eighth embodiment.

In FIG. 33, again, reference symbol I denotes the imaging surface of the CCD which is the electronic image sensor and LPF denotes the optical low-pass filter. The electronic imaging apparatus of the eighth embodiment has, in order from the object side, the zoom lens of the present invention, the optical low-pass filter LPF, and the imaging surface I.

The zoom lens of the eighth embodiment comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the positive meniscus lens $L2_2$, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the object side, and the third lens unit G3 is moved toward only the image side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the eighth embodiment are shown below.

Numerical Data 8
$r_1=-9.4520$ (aspherical surface)
　$d_1=8.2000$ $n_{d1}=1.80518$ $v_{d1}=25.42$
$r_2=\infty$
　$d_2=0.1500$
$r_3=9.6078$ (aspherical surface)
　$d_3=2.3000$ $n_{d3}=1.78800$ $v_{d3}=47.37$
$r_4=-36.5601$
　$d_4=D4$
$r_5=-12.2968$ (aspherical surface)
　$d_5=0.8000$ $n_{d5}=1.74320$ $v_{d5}=49.34$
$r_6=5.0653$ (aspherical surface)
　$d_6=0.6000$
$r_7=7.3064$
　$d_7=1.5000$ $n_{d7}=1.84666$ $v_{d7}=23.78$
$r_8=30.2966$
　$d_8=D8$
$r_9=\infty$ (stop)
　$d_9=D9$
$r_{10}=10.4103$ (aspherical surface)
　$d_{10}=5.8865$ $n_{d10}=1.69350$ $v_{d10}=53.21$
$r_{11}=-6.9390$ (aspherical surface)
　$d_{11}=0.1500$
$r_{12}=8.4519$
　$d_{12}=2.4987$ $n_{d12}=1.51742$ $v_{d12}=52.43$
$r_{13}=-10.7434$
　$d_{13}=0.7000$ $n_{d13}=1.84666$ $v_{d13}=23.78$
$r_{14}=4.1500$
　$d_{14}=D14$ $r_{15}=6.0955$
 $d_{15}=1.8000$ $n_{d15}=1.48749$ $v_{d15}=70.23$
$r_{16}=9.7078$
 $d_{16}=D16$
$r_{17}=8.7554$ (aspherical surface)
 $d_{17}=1.8000$ $n_{d17}=1.58423$ $v_{d17}=30.49$
$r_{18}=\infty$
 $d_{18}=0.7000$
$r_{19}=\infty$
 $d_{19}=0.6000$ $n_{d19}=1.51633$ $v_{d19}=64.14$
$r_{20}=\infty$
 $d_{20}=D20$
$r_{21}=\infty$ (imaging surface)

Aspherical Coefficients
First Surface
 $K=0$
 $A_2=0$ $A_4=9.5837\times10^{-4}$ $A_6=-1.1998\times10^{-5}$
 $A_8=1.1926\times10^{-7}$ $A_{10}=0$
Third Surface
 $K=0$
 $A_2=0$ $A_4=-5.2184\times10^{-4}$ $A_6=1.4369\times10^{-6}$
 $A_8=1.3193\times10^{-8}$ $A_{10}=0$
Fifth Surface
 $K=0$
 $A_2=0$ $A_4=-8.5131\times10^{-4}$ $A_6=1.2914\times10^{-4}$
 $A_8=-5.4974\times10^{-6}$ $A_{10}=0$
Sixth Surface
 $K=0$
 $A_2=0$ $A_4=-1.8812\times10^{-3}$ $A_6=1.7977\times10^{-4}$
 $A_8=-1.1418\times10^{-5}$ $A_{10}=0$
Tenth Surface
 $K=0$
 $A_2=0$ $A_4=-9.0524\times10^{-4}$ $A_6=-1.4899\times10^{-5}$
 $A_8=-2.7354\times10^{-6}$ $A_{10}=0$
Eleventh Surface
 $K=0$
 $A_2=0$ $A_4=2.0252\times10^{-4}$ $A_6=-1.5683\times10^{-5}$
 $A_8=-2.5889\times10^{-7}$ $A_{10}=0$
Seventeenth Surface
 $K=0$
 $A_2=0$ $A_4=1.3132\times10^{-4}$ $A_6=2.2399\times10^{-5}$
 $A_8=-2.5971\times10^{-6}$ $A_{10}=0$ Zoom Data
When D0 (the distance from the object to the first surface) is $\infty$,

|  | Wide-angle | Middle | Telephoto |
|---|---|---|---|
| f (mm) | 4.60394 | 7.80037 | 13.19942 |
| Fno | 2.8634 | 3.5902 | 4.5306 |
| D0 | ∞ | ∞ | ∞ |
| D4 | 0.99877 | 3.91855 | 6.57280 |
| D8 | 6.47386 | 3.54652 | 0.89974 |
| D9 | 5.54148 | 3.31646 | 0.99874 |
| D14 | 1.37738 | 3.62339 | 5.91816 |
| D16 | 1.19791 | 1.19758 | 1.19992 |
| D20 | 0.89970 | 0.87855 | 0.89957 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 0.99877 | 3.91855 | 6.57280 |
| D8 | 6.47386 | 3.54652 | 0.89974 |
| D9 | 5.54148 | 3.31646 | 0.99874 |
| D14 | 0.99871 | 2.57975 | 3.15075 |
| D16 | 1.57658 | 2.24122 | 3.96733 |
| D20 | 0.89970 | 0.87855 | 0.89957 |

Ninth Embodiment

Figure 37:
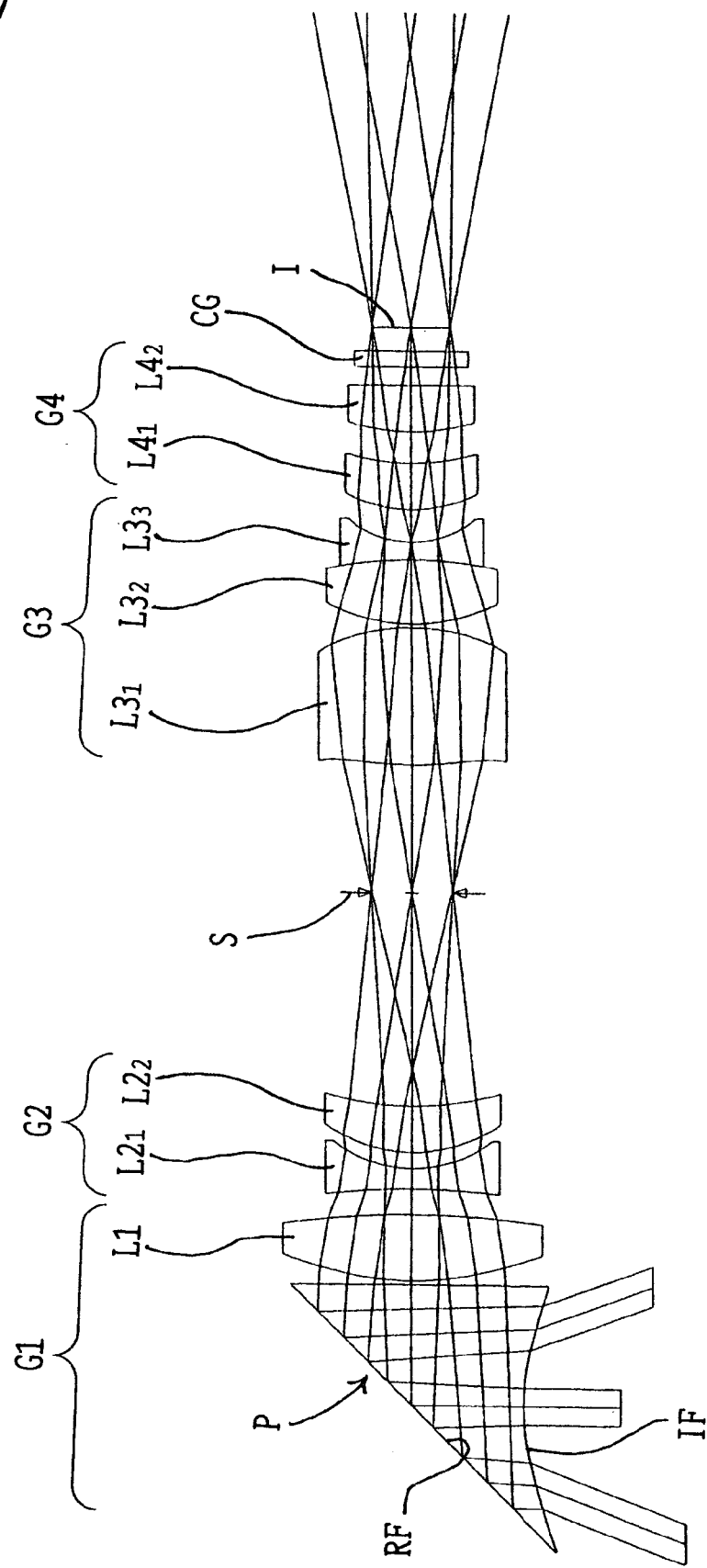
FIG. 37 is a sectional view showing an optical arrangement, developed along the optical axis, of a ninth embodiment of the zoom lens according to the present invention.
Figure 38A:
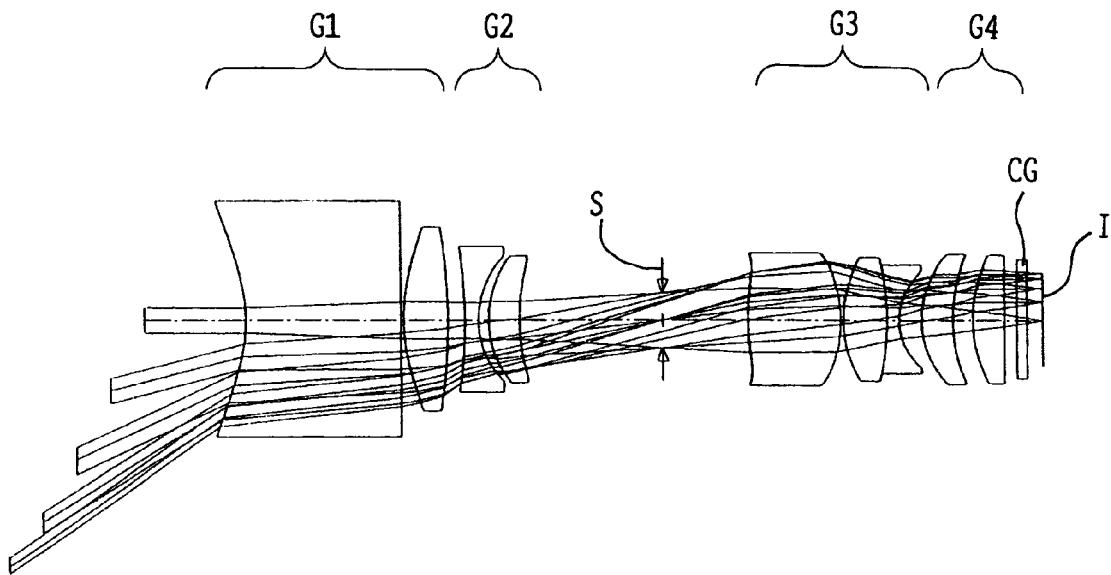
FIGS. 38A, 38B, and 38C are sectional views showing optical arrangements, developed along the optical axis, at wide-angle, middle, and telephoto positions, respectively, in focusing of the infinite object point of the zoom lens in the ninth embodiment.
Figure 38B:
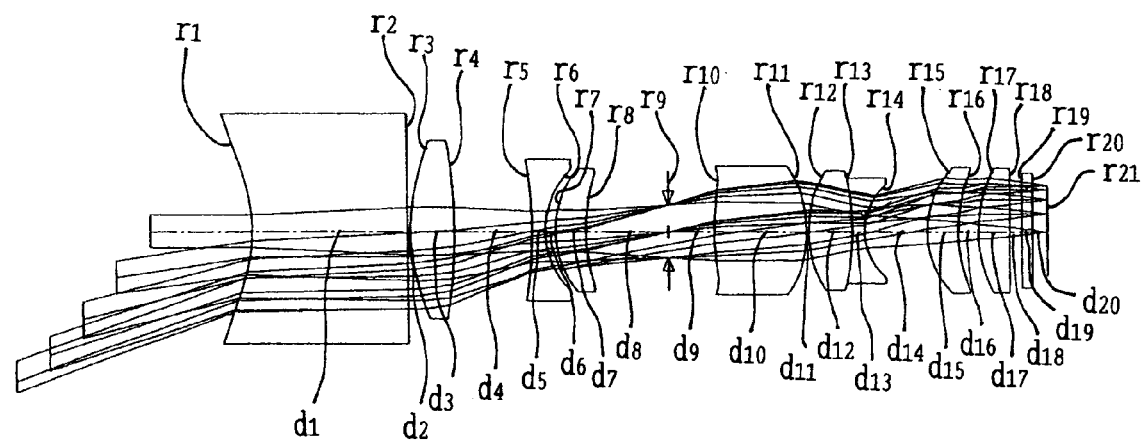
Figure 38C:
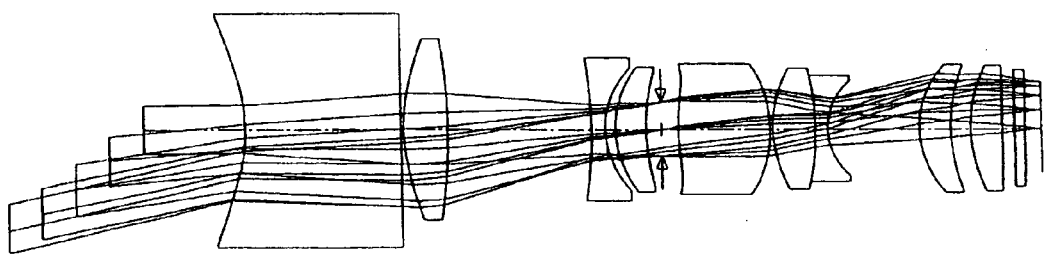

FIG. 37 shows an optical arrangement, where the optical path is bent in focussing of the infinite object point at the wide-angle position, in the ninth embodiment of the zoom lens according to the present invention. FIGS. 38A, 38B, and 38C show optical arrangements at wide-angle, middle, and telephoto positions, respectively, in the ninth embodiment.

In FIG. 37, again, reference symbol I denotes the imaging surface of the CCD which is the electronic image sensor and LPF denotes the optical low-pass filter. The electronic imaging apparatus of the ninth embodiment has, in order from the object side, the zoom lens of the present invention, the optical low-pass filter LPF, and the imaging surface I.

The zoom lens of the ninth embodiment comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the positive meniscus lens $L2_2$, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the object side, and the third lens unit G3 is moved toward only the image side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the ninth embodiment are shown below.

Numerical Data 9

$r_1=-8.7157$ (aspherical surface)
   $d_1=9.0000$ $n_{d1}=1.84666$ $v_{d1}=23.78$
$r_2=\infty$
   $d_2=0.1500$
$r_3=10.5728$ (aspherical surface)
   $d_3=2.6000$ $n_{d3}=1.80610$ $v_{d3}=40.92$
$r_4=-34.0080$
   $d_4=D4$
$r_5=-24.0290$ (aspherical surface)
   $d_5=0.8000$ $n_{d5}=1.74320$ $v_{d5}=49.34$
$r_6=5.1842$ (aspherical surface)
   $d_6=0.6000$
$r_7=5.8548$
   $d_7=1.8000$ $n_{d7}=1.84666$ $v_{d7}=23.78$
$r_8=11.8374$
   $d_8=D8$
$r_9=\infty$ (stop)
   $d_9=D9$
$r_{10}=13.7347$ (aspherical surface)
   $d_{10}=5.3762$ $n_{d10}=1.74320$ $v_{d10}=49.34$
$r_{11}=-7.8051$ (aspherical surface)
   $d_{11}=0.1500$
$r_{12}=7.2012$
   $d_{12}=2.4994$ $n_{d12}=1.58913$ $v_{d12}=61.14$
$r_{13}=-15.3665$
   $d_{13}=0.7000$ $n_{d13}=1.84666$ $v_{d13}=23.78$
$r_{14}=3.7167$
   $d_{14}=D14$
$r_{15}=5.5508$
   $d_{15}=1.8000$ $n_{d15}=1.48749$ $v_{d15}=70.23$
$r_{16}=9.3520$
   $d_{16}=D16$
$r_{17}=8.2297$ (aspherical surface)
   $d_{17}=1.8000$ $n_{d17}=1.58423$ $v_{d17}=30.49$
$r_{18}=\infty$
   $d_{18}=0.7000$
$r_{19}=\infty$
   $d_{19}=0.6000$ $n_{d19}=1.51633$ $v_{d19}=64.14$
$r_{20}=\infty$
   $d_{20}=D20$
$r_{21}=\infty$ (imaging surface)

Aspherical Coefficients
First Surface
   $K=0$
   $A_2=0$ $A_4=9.6662\times10^{-4}$ $A_6=-1.0249\times10^{-5}$
   $A_8=1.0646\times10^{-7}$ $A_{10}=0$
Third Surface
   $K=0$
   $A_2=0$ $A_4=-4.4695\times10^{-4}$ $A_6=1.3112\times10^{-6}$
   $A_8=5.2291\times10^{-9}$ $A_{10}=0$
Fifth Surface
   $K=0$
   $A_2=0$ $A_4=2.2884\times10^{-4}$ $A_6=4.8469\times10^{-6}$
   $A_8=-5.9453\times10^{-7}$ $A_{10}=0$
Sixth Surface
   $K=0$
   $A_2=0$ $A_4=3.2939\times10^{-5}$ $A_6=5.5346\times10^{-5}$
   $A_8=-4.4739\times10^{-6}$ $A_{10}=0$ Tenth Surface
   $K=0$
   $A_2=0$ $A_4=-8.4805\times10^{-4}$ $A_6=-2.7838\times10^{-5}$
   $A_8=-4.4218\times10^{-6}$ $A_{10}=0$
Eleventh Surface
   $K=0$
   $A_2=0$ $A_4=-1.5902\times10^{-4}$ $A_6=-1.8104\times10^{-5}$
   $A_8=-5.7930\times10^{-7}$ $A_{10}=0$
Seventeenth surface
   $K=0$
   $A_2=0$ $A_4=-1.4952\times10^{-4}$ $A_6=3.7214\times10^{-5}$
   $A_8=-2.5629\times10^{-6}$ $A_{10}=0$ Zoom Data When D0 (the distance from the object to the first surface) is $\infty$,

|  | Wide-angle | Middle | Telephoto |
|---|---|---|---|
| f (mm) | 4.13341 | 7.00171 | 11.89892 |
| Fno | 2.8582 | 3.5563 | 4.1904 |
| D0 | $\infty$ | $\infty$ | $\infty$ |
| D4 | 1.00056 | 4.56699 | 8.48067 |
| D8 | 8.37987 | 4.80614 | 0.89962 |
| D9 | 4.98567 | 2.71479 | 0.99930 |
| D14 | 1.27783 | 3.57887 | 5.26459 |
| D16 | 1.19857 | 1.19668 | 1.19838 |
| D20 | 0.89975 | 0.87083 | 0.89958 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 1.00056 | 4.56699 | 8.48067 |
| D8 | 8.37987 | 4.80614 | 0.89962 |
| D9 | 4.98567 | 2.71479 | 0.99930 |
| D14 | 0.99902 | 2.80501 | 3.16154 |
| D16 | 1.47738 | 1.97055 | 3.30143 |
| D20 | 0.89975 | 0.87083 | 0.89958 |

Tenth Embodiment

Figure 39:
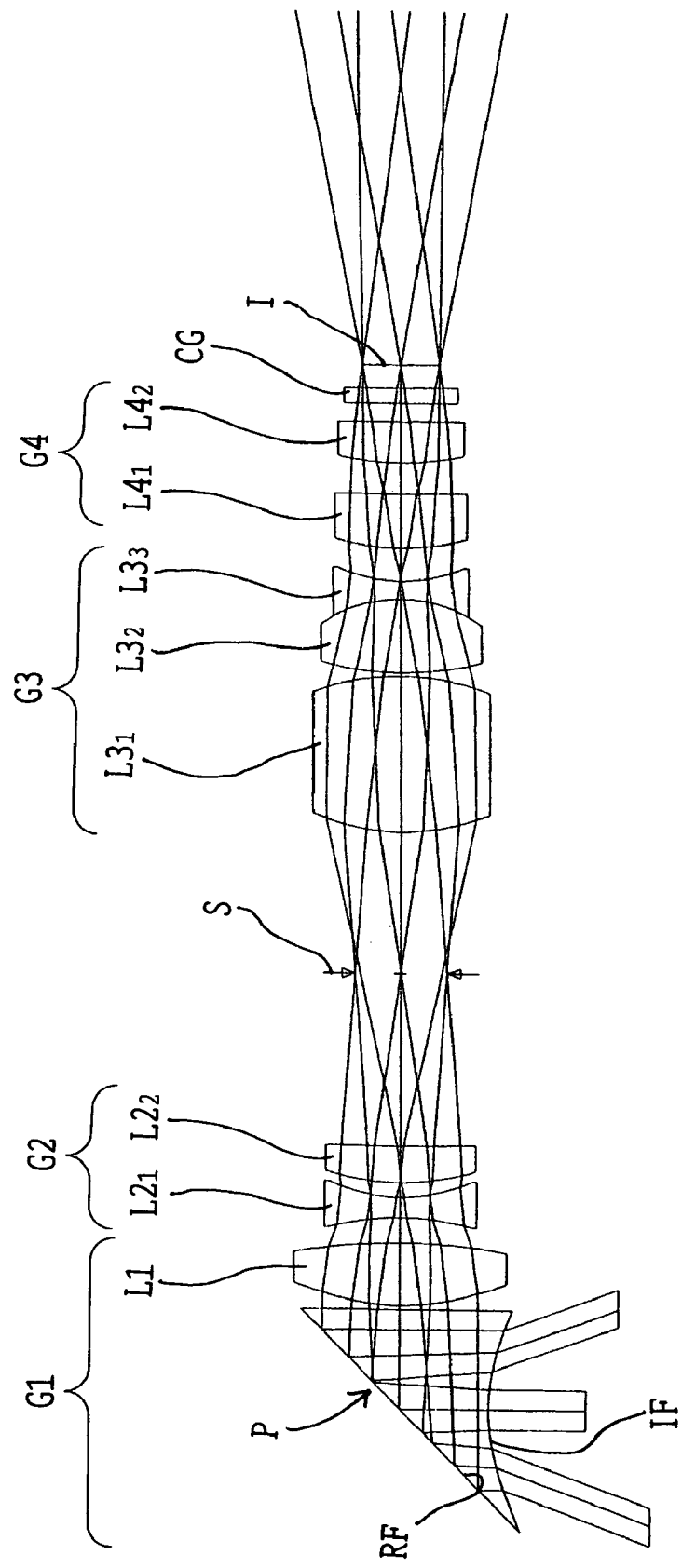
FIG. 39 is a sectional view showing an optical arrangement, developed along the optical axis, of a tenth embodiment of the zoom lens according to the present invention.
Figure 40A:
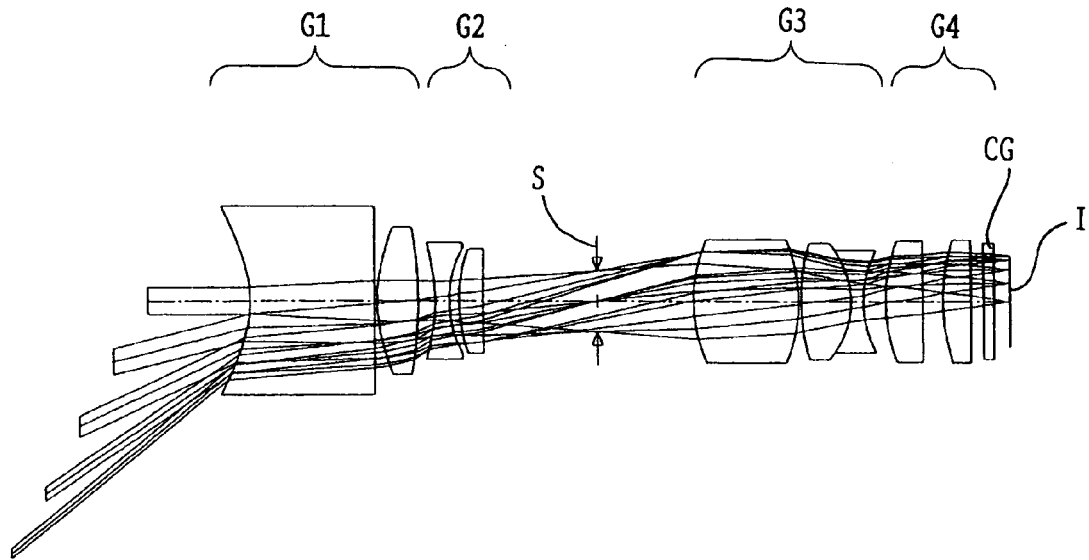
FIGS. 40A, 40B, and 40C are sectional views showing optical arrangements, developed along the optical axis, at wide-angle, middle, and telephoto positions, respectively, in focusing of the infinite object point of the zoom lens in the tenth embodiment.
Figure 40B:
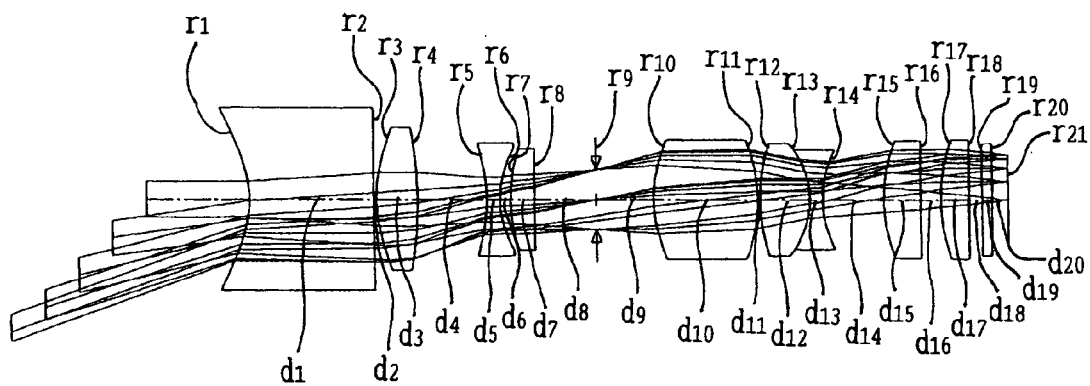
Figure 40C:
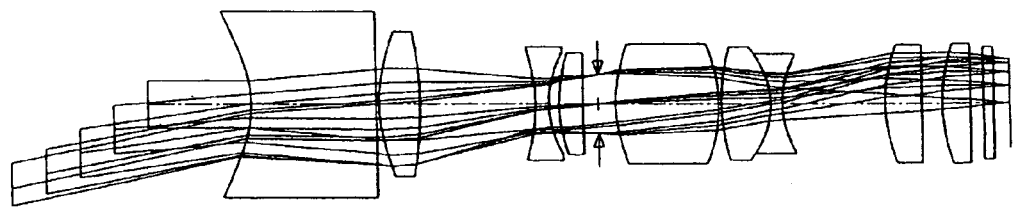

FIG. 39 shows an optical arrangement, where the optical path is bent in focussing of the infinite object point at the wide-angle position, in the tenth embodiment of the zoom lens according to the present invention. FIGS. 40A, 40B, and 40C show optical arrangements at wide-angle, middle, and telephoto positions, respectively, in the tenth embodiment.

In FIG. 39, again, reference symbol I denotes the imaging surface of the CCD which is the electronic image sensor and LPF denotes the optical low-pass filter. The electronic imaging apparatus of the tenth embodiment has, in order from the object side, the zoom lens of the present invention, the optical low-pass filter LPF, and the imaging surface I.

The zoom lens of the tenth embodiment comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the positive meniscus lens $L2_2$, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the object side, and the third lens unit G3 is moved toward only the image side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the tenth embodiment are shown below.

Numerical Data 10

$r_1=-6.6280$ (aspherical surface)
  $d_1=7.2000$ $n_{d1}=1.84666$ $v_{d1}=23.78$
$r_2=\infty$
  $d_2=0.1500$
$r_3=8.6973$ (aspherical surface)
  $d_3=2.4000$ $n_{d3}=1.80610$ $v_{d3}=40.92$
$r_4=-23.8351$
  $d_4=D4$
$r_5=-9.2324$ (aspherical surface)
  $d_5=0.8000$ $n_{d5}=1.74320$ $v_{d5}=49.34$
$r_6=6.3171$ (aspherical surface)
  $d_6=0.6000$
$r_7=9.4464$
  $d_7=1.4000$ $n_{d7}=1.84666$ $v_{d7}=23.78$
$r_8=116.6983$
  $d_8=D8$
$r_9=\infty$ (stop)
  $d_9=D9$
$r_{10}=8.1004$ (aspherical surface)
  $d_{10}=6.0304$ $n_{d10}=1.69350$ $v_{d10}=53.21$
$r_{11}=-9.7486$ (aspherical surface)
  $d_{11}=0.1500$
$r_{12}=11.9785$
  $d_{12}=2.8414$ $n_{d12}=1.51742$ $v_{d12}=52.43$
$r_{13}=-5.3173$
  $d_{13}=0.7000$ $n_{d13}=1.84666$ $v_{d13}=23.78$
$r_{14}=6.3164$
  $d_{14}=D14$
$r_{15}=9.8113$
  $d_{15}=2.1000$ $n_{d15}=1.51742$ $v_{d15}=52.43$
$r_{16}=167.1713$
  $d_{16}=D16$
$r_{17}=11.2264$
  $d_{17}=1.6000$ $n_{d17}=1.58423$ $v_{d17}=30.49$
$r_{18}=\infty$
  $d_{18}=0.7000$
$r_{19}=\infty$
  $d_{19}=0.6000$ $n_{d19}=1.51633$ $v_{d19}=64.14$
$r_{20}=\infty$
  $d_{20}=D20$
$r_{21}=\infty$ (imaging surface)

Aspherical Coefficients
First Surface
  K=0
  $A_2=0$ $A_4=1.6305\times10^{-3}$ $A_6=-2.3942\times10^{-5}$
  $A_8=4.9451\times10^{-7}$ $A_{10}=0$
Third Surface
  K=0
  $A_2=0$ $A_4=-7.6763\times10^{-4}$ $A_6=6.4278\times10^{-6}$
  $A_8=-7.397\times10^{-8}$ $A_{10}=0$
Fifth Surface
  K=0
  $A_2=0$ $A_4=1.1638\times10^{-3}$ $A_6=-2.2384\times10^{-5}$
  $A_8=-1.8966\times10^{-5}$ $A_{10}=0$
Sixth Surface
  K=0
  $A_2=0$ $A_4=3.0143\times10^{-4}$ $A_6=3.1934\times10^{-6}$
  $A_8=-2.3254\times10^{-6}$ $A_{10}=0$
Tenth Surface
  K=0
  $A_2=0$ $A_4=-4.6750\times10^{-4}$ $A_6=1.3749\times10^{-6}$
  $A_8=-9.4928\times10^{-7}$ $A_{10}=0$
Eleventh Surface
  K=0
  $A_2=0$ $A_4=6.5795\times10^{-5}$ $A_6=-4.4820\times10^{-6}$
  $A_8=-6.3863\times10^{-6}$ $A_{10}=0$ Zoom Data When D0 (the distance from the object to the first surface) is $\infty$,

|  | Wide-angle | Middle | Telephoto |
|---|---|---|---|
| f (mm) | 4.39435 | 7.47036 | 12.65489 |
| Fno | 2.8183 | 3.5292 | 4.4487 |
| D0 | $\infty$ | $\infty$ | $\infty$ |
| D4 | 0.99960 | 4.05794 | 6.79599 |
| D8 | 6.69639 | 3.63775 | 0.89990 |
| D9 | 5.58963 | 3.35096 | 0.99940 |
| D14 | 1.27582 | 3.51436 | 5.86556 |
| D16 | 1.19832 | 1.19979 | 1.19892 |
| D20 | 0.90011 | 0.89837 | 0.89981 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 0.99960 | 4.56699 | 8.48067 |
| D8 | 6.69639 | 3.63775 | 0.89990 |
| D9 | 5.58963 | 3.35096 | 0.99940 |
| D14 | 0.99945 | 2.74953 | 3.85600 |
| D16 | 1.47468 | 1.96462 | 3.20849 |
| D20 | 0.90011 | 0.89837 | 0.89981 |

Eleventh Embodiment

Figure 41:
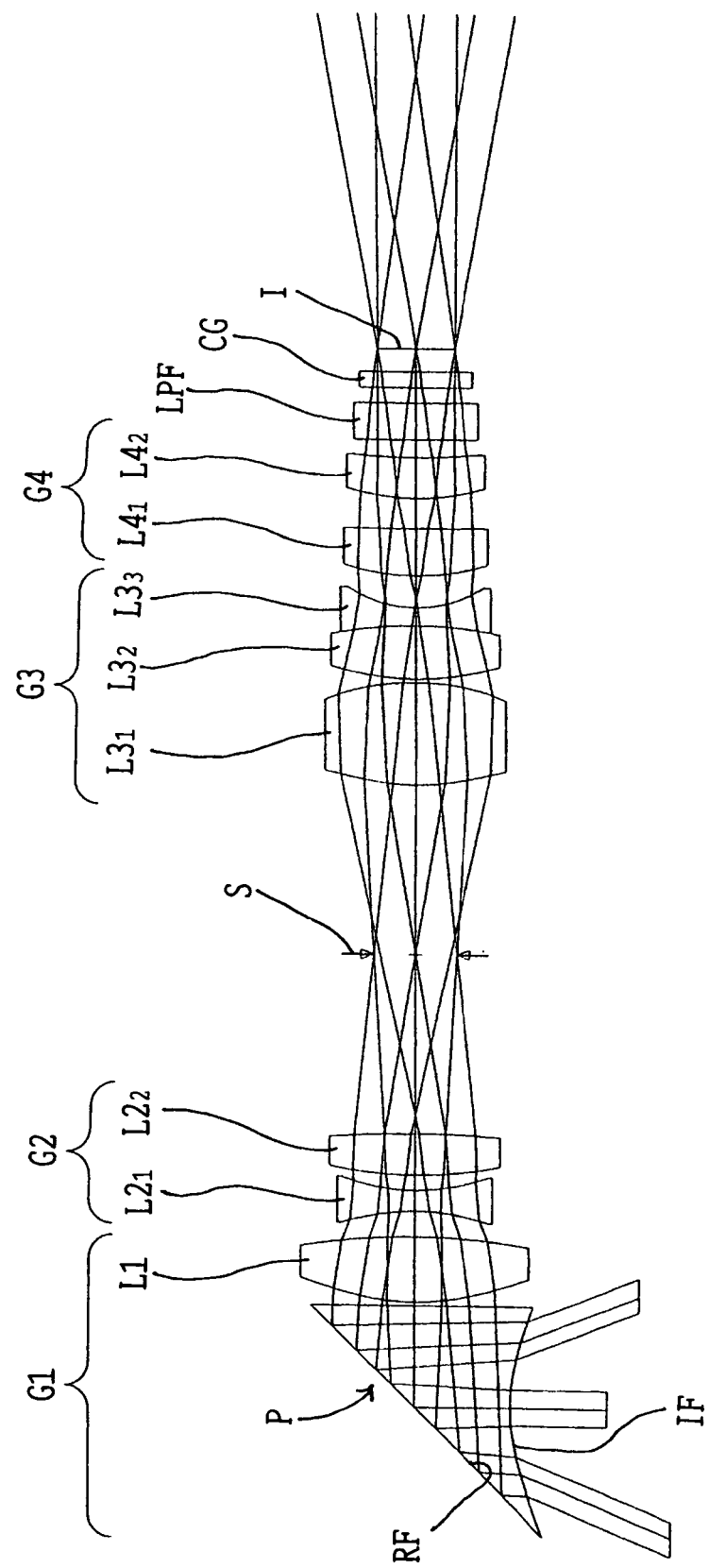
FIG. 41 is a sectional view showing an optical arrangement, developed along the optical axis, of an eleventh embodiment of the zoom lens according to the present invention.
Figure 42A:
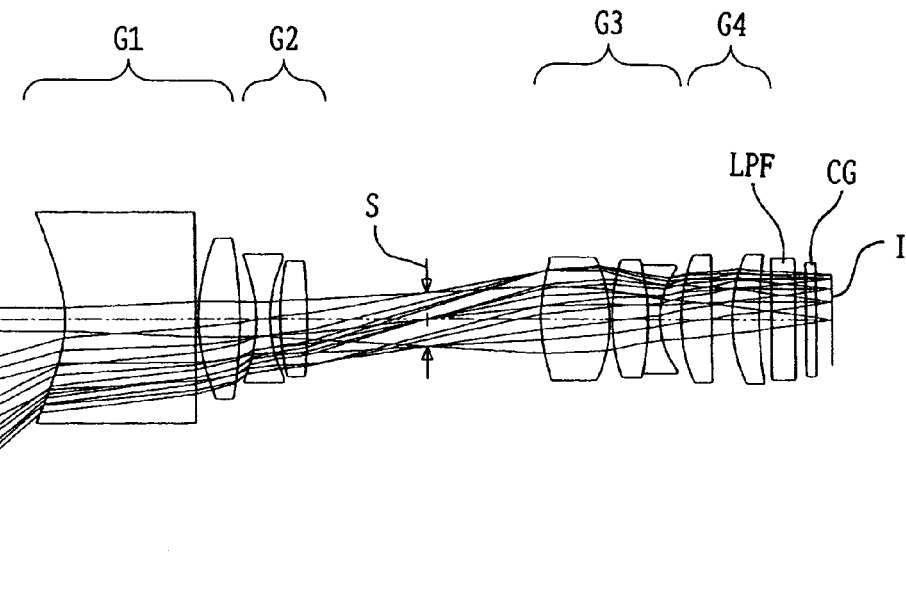
FIGS. 42A, 42B, and 42C are sectional views showing optical arrangements, developed along the optical axis, at wide-angle, middle, and telephoto positions, respectively, in focusing of the infinite object point of the zoom lens in the eleventh embodiment.
Figure 42B:
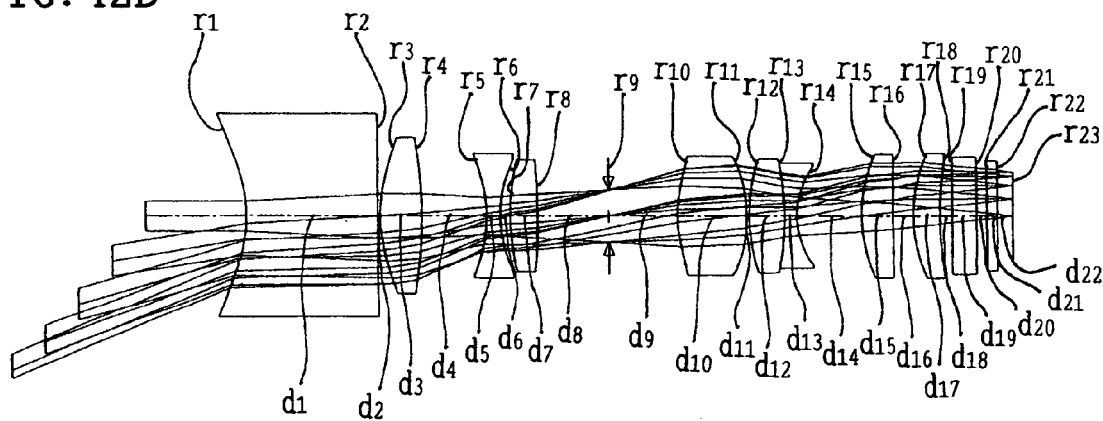
Figure 42C:
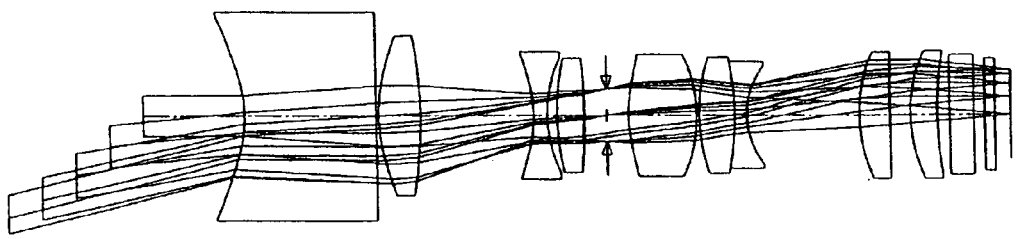

FIG. 41 shows an optical arrangement, where the optical path is bent in focussing of the infinite object point at the wide-angle position, in the eleventh embodiment of the zoom lens according to the present invention. FIGS. 42A, 42B, and 42C show optical arrangements at wide-angle, middle, and telephoto positions, respectively, in the eleventh embodiment.

In FIG. 41, again, reference symbol I denotes the imaging surface of the CCD which is the electronic image sensor, CG denotes the CCD cover glass, and LPF denotes the optical low-pass filter. The electronic imaging apparatus of the eleventh embodiment has, in order from the object side, the zoom lens of the present invention, the optical low-pass filter LPF, the CCD cover glass CG, and the imaging surface I.

The zoom lens of the eleventh embodiment comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the biconvex positive $L2_2$, and has positive refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the object side side, and the third lens unit G3 is moved toward only the image side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the eleventh embodiment are shown below.

Numerical Data 11

$r_1$=−7.3888 (aspherical surface)
　$d_1$=7.7000 $n_{d1}$=1.84666 $v_{d1}$=23.78
$r_2$=∞
　$d_2$=0.1500
$r_3$=9.2760 (aspherical surface)
　$d_3$=2.5000 $n_{d3}$=1.81474 $v_{d3}$=37.03
$r_4$=−27.0079
　$d_4$=D4
$r_5$=−7.5903 (aspherical surface)
　$d_5$=0.8000 $n_{d5}$=1.74320 $v_{d5}$=49.34
$r_6$=8.4809 (aspherical surface)
　$d_6$=0.6000
$r_7$=15.7026
　$d_7$=1.6000 $n_{d7}$=1.84666 $v_{d7}$=23.78
$r_8$=−40.5377
　$d_8$=D8
$r_9$=∞ (stop)
　$d_9$=D9
$r_{10}$=8.9882 (aspherical surface)
　$d_{10}$=4.0001 n $d_{10}$=1.69350 $v_{d10}$=53.21
$r_{11}$=−9.7388 (aspherical surface)
　$d_{11}$=0.1500
$r_{12}$=11.3104
　$d_{12}$=2.0743 $n_{d12}$=1.56384 $v_{d12}$=60.67
$r_{13}$=−16.6974
　$d_{13}$=0.7000 $n_{d13}$=1.84666 $v_{d13}$=23.78
$r_{14}$=5.0192
　$d_{14}$=D14
$r_{15}$=9.3843
　$d_{15}$=1.8000 $n_{d15}$=1.48794 $v_{d15}$=70.23
$r_{16}$=187.5375
　$d_{16}$=D16
$r_{17}$=9.3972
　$d_{17}$=1.6000 $n_{d17}$=1.68893 $v_{d17}$=31.07
$r_{18}$=24.2276
　$d_{18}$=0.7000
$r_{19}$=∞
　$d_{19}$=1.4000 $n_{d19}$=1.51633 $v_{d19}$=64.14
$r_{20}$=∞
　$d_{20}$=0.6000
$r_{21}$=∞
　$d_{21}$=0.6000
$r_{22}$=∞
　$d_{22}$=D22
$r_{23}$=∞ (imaging surface)

Aspherical Coefficients
First Surface
　K=0
　$A_2$=0 $A_4$=1.3911×10$^{-3}$ $A_6$=−1.8577×10$^{-5}$
　$A_8$=2.8434×10$^{-7}$ $A_{10}$=0
Third Surface
　K=0
　$A_2$=0 $A_4$=−6.4429×10$^{-4}$ $A_6$=3.6455×10$^{-6}$
　$A_8$=−2.1185×10$^{-8}$ $A_{10}$=0
Fifth Surface
　K=0
　$A_2$=0 $A_4$=1.3672×10$^{-3}$ $A_6$=8.9594×10−6
　$A_8$=−1.6235×10$^{-6}$ $A_{10}$=0
Sixth Surface
　K=0
　$A_2$=0 $A_4$=3.6245×10$^{-4}$ $A_6$=6.7383×10$^{-5}$
　$A_8$=−5.6459×10$^{-6}$ $A_{10}$=0
Tenth Surface
　K=0
　$A_2$=0 $A_4$=−7.4708×10$^{-4}$ $A_6$=−1.5948×10$^{-5}$
　$A_8$=−1.5411×10$^{-6}$ $A_{10}$=0
Eleventh Surface
　K=0
　$A_2$=0 $A_4$=−1.5349×10$^{-4}$ $A_6$=−1.8657×10$^{-5}$
　$A_8$=−6.1411×10$^{-7}$ $A_{10}$=0

Zoom Data

When D0 (the distance from the object to the first surface) is ∞,

|  | Wide-angle | Middle | Telephoto |
|---|---|---|---|
| f (mm) | 4.02399 | 6.47589 | 10.83793 |
| Fno | 2.8489 | 3.5064 | 4.3811 |
| D0 | ∞ | ∞ | ∞ |
| D4 | 0.99933 | 3.84470 | 6.72373 |
| D8 | 7.02438 | 4.18365 | 1.29993 |
| D9 | 6.65081 | 4.06962 | 1.29970 |
| D14 | 1.22479 | 3.79651 | 6.57608 |
| D16 | 1.19883 | 1.20089 | 1.19879 |
| D22 | 0.89973 | 0.90511 | 0.89962 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 0.99933 | 3.84470 | 6.72373 |
| D8 | 7.02438 | 4.18365 | 1.29993 |
| D9 | 6.65081 | 4.06962 | 1.29970 |
| D14 | 0.99978 | 3.22752 | 5.05760 |
| D16 | 1.42384 | 1.76988 | 2.71726 |
| D22 | 0.89973 | 0.90511 | 0.89973 |

Twelfth Embodiment

Figure 43:
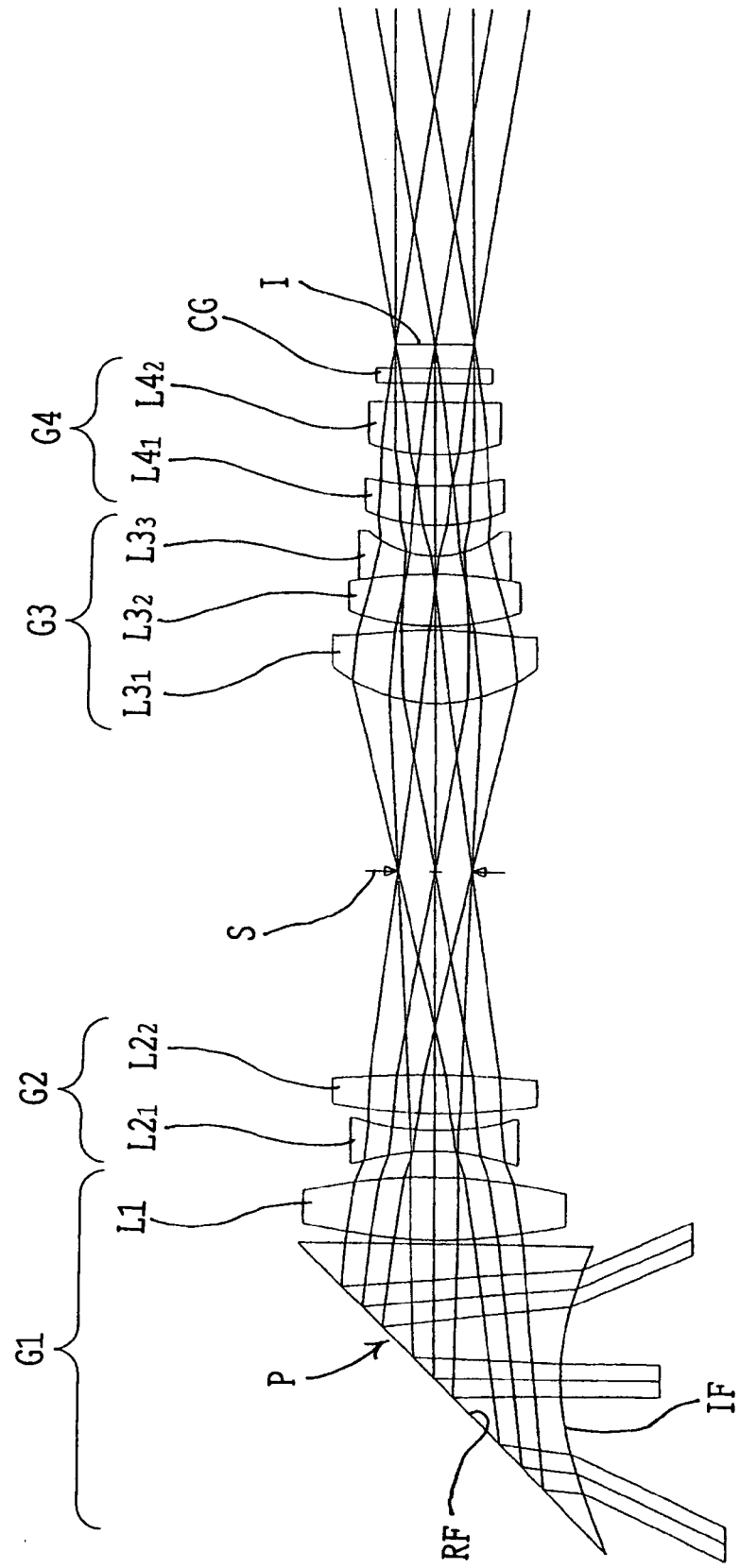
FIG. 43 is a sectional view showing an optical arrangement, developed along the optical axis, of a twelfth embodiment of the zoom lens according to the present invention.
Figure 44A:
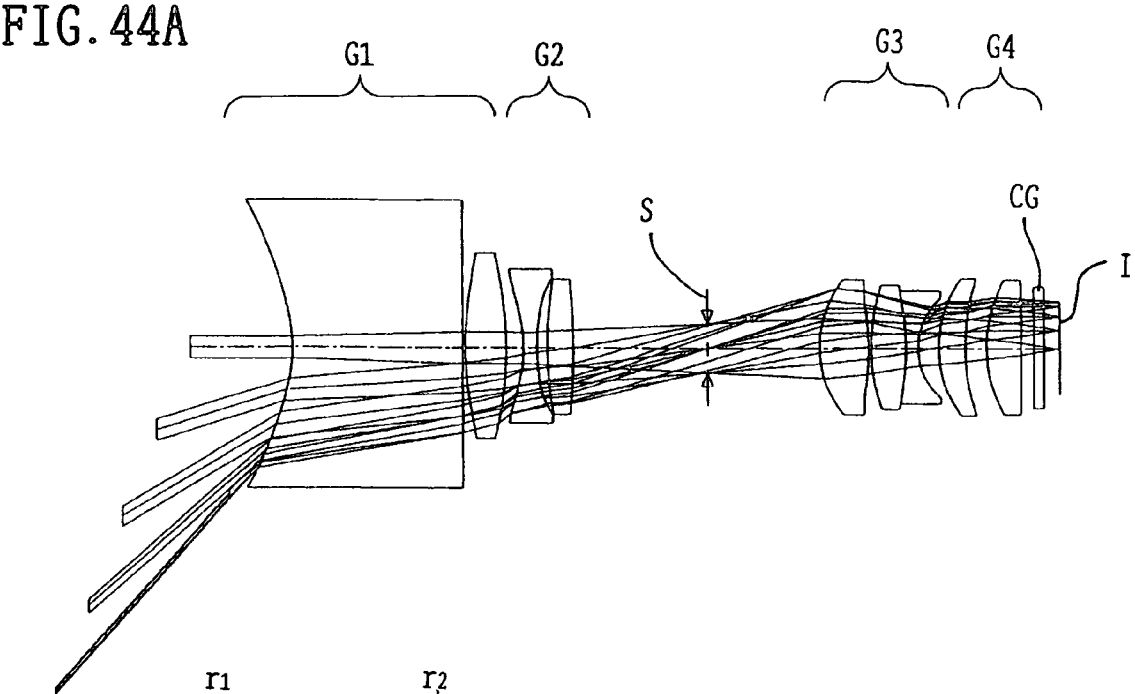
FIGS. 44A, 44B, and 44C are sectional views showing optical arrangements, developed along the optical axis, at wide-angle, middle, and telephoto positions, respectively, in focusing of the infinite object point of the zoom lens in the twelfth embodiment.
Figure 44B:
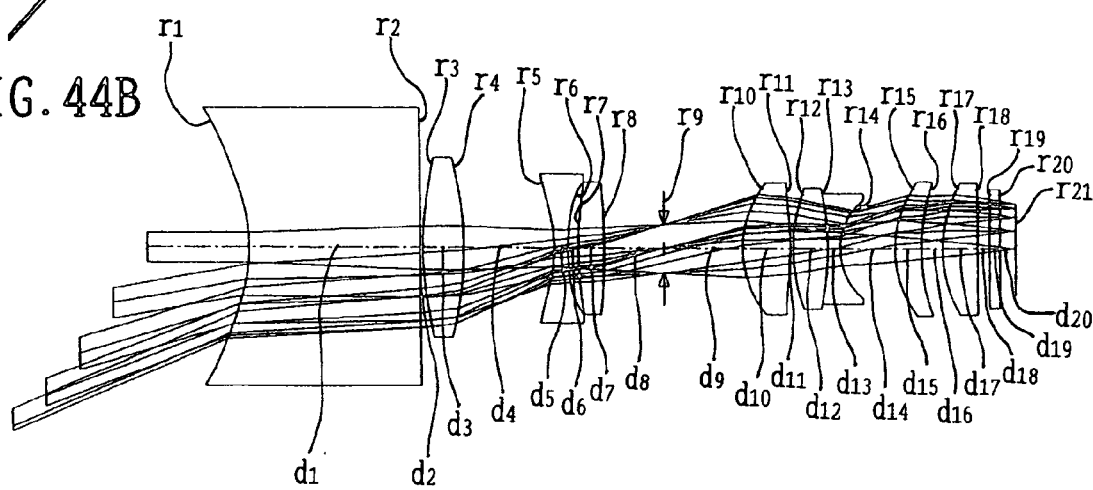
Figure 44C:
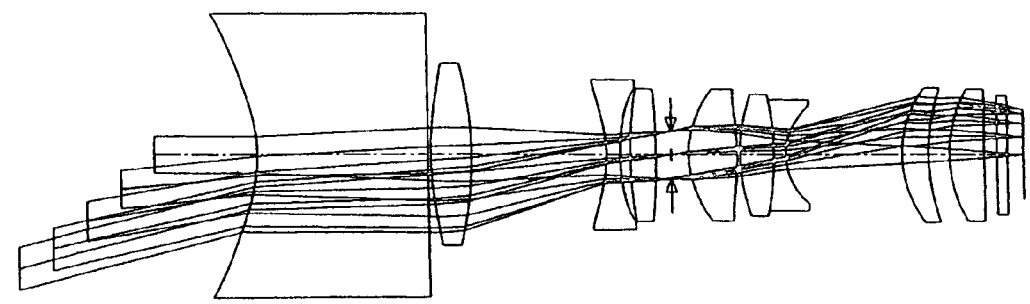

FIG. 43 shows an optical arrangement, where the optical path is bent in focussing of the infinite object point at the wide-angle position, in the twelfth embodiment of the zoom lens according to the present invention. FIGS. 44A, 44B, and 44C show optical arrangements at wide-angle, middle, and telephoto positions, respectively, in the twelfth embodiment.

In FIG. 43, again, reference symbol I denotes the imaging surface of the CCD which is the electronic image sensor, CG denotes the CCD cover glass, and LPF denotes the optical low-pass filter. The electronic imaging apparatus of the eleventh embodiment has, in order from the object side, the zoom lens of the present invention, the optical low-pass filter LPF, the CCD cover glass CG, and the imaging surface I.

The zoom lens of the twelfth embodiment comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the biconvex positive $L2_2$, and has positive refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the image side, and the third lens unit G3 is moved toward only the object side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the twelfth embodiment are shown below.

Numerical Data 12

$r_1$=−9.0619 (aspherical surface)
 $d_1$=1.0000 $n_{d1}$=1.68893 $v_{d1}$=31.07
$r_2$=∞
 $d_2$=0.1500
$r_3$=17.2821 (aspherical surface)
 $d_3$=2.4000 $n_{d3}$=1.80610 $v_{d3}$=40.92
$r_4$=−21.5319
 $d_4$=D4
$r_5$=−7.7097 (aspherical surface)
 $d_5$=0.8000 $n_{d5}$=1.74320 $v_{d5}$=49.34
$r_6$14.4282 (aspherical surface)
 $d_6$=0.6000
$r_7$=23.9607
 $d_7$=1.5000 $n_{d7}$=1.84666 $v_{d7}$=23.78
$r_8$=−44.7940
 $d_8$=D8
$r_9$=∞ (stop)
 $d_9$=D9
$r_{10}$=6.1037
 $d_{10}$=2.8002 $n_{d10}$=1.69350 $v_{d10}$=53.21
$r_{11}$=−16.4369 (aspherical surface)
 $d_{11}$=0.1500
$r_{12}$=10.2395
 $d_{12}$=1.9994 $n_{d12}$=1.69680 $v_{d12}$=55.53
$r_{13}$=−17.5185
 $d_{13}$=0.7000 $n_{d13}$=1.84666 $v_{d13}$=23.78
$r_{14}$=3.8167
 $d_{14}$=D14
$r_{15}$=6.7418
 $d_{15}$=1.5000 $n_{d15}$=1.69680 $v_{d15}$=55.53
$r_{16}$=11.9475
 $d_{16}$=D16
$r_{17}$=7.8831
 $d_{17}$=2.0000 $n_{d17}$=1.58423 $v_{d17}$=30.49
$r_{18}$=∞
 $d_{18}$=0.7000
$r_{19}$=∞
 $d_{19}$=0.6000 $n_{d19}$=1.51633 $v_{d19}$=64.14
$r_{20}$=∞
 $d_{20}$=D20
$r_{21}$=∞ (imaging surface)

Aspherical Coefficients
First Surface
    K=0
    $A_{2=0}$ $A_4=6.9910\times10^{-4}$ $A_6=-5.3200\times10^{-6}$
    $A_8=5.1494\times10^{-6}$ $A_{10}=0$
Third Surface
    K=0
    $A_2=0$ $A_4=-2.5089\times10^{-4}$ $A_6=1.4153\times10^{-8}$
    $A_8=2.0781\times10^{-8}$ $A_{10}=0$
Fifth Surface
    K=0
    $A_2=0$ $A_4=1.3578\times10-3$ $A_6=7.8893\times10^{-6}$
    $A_8=-6.6111\times10^{-8}$ $A_{10}=0$
Sixth Surface
    K=0
    $A_2=0$ $A_4=8.2151\times10^{-4}$ $A_6=1.5236\times10^{-5}$
    $A_8=1.6217\times10^{-6}$ $A_{10}=0$
Tenth Surface
    K=0
    $A_2=0$ $A_4=-2.0678\times10^{-4}$ $A_6=-7.1539\times10^{-6}$
    $A_8=9.3311\times10^{-7}$ $A_{10}=0$
Eleventh Surface
    K=0
    $A_2=0$ $A_4=8.1607\times10^{-4}$ $A_6=-3.9364\times10^{-6}$
    $A_8=1.4308\times10^{-6}$ $A_{10}=0$ Zoom Data When D0 (the distance from the object to the first surface) is ∞,

|  | Wide-angle | Middle | Telephoto |
|---|---|---|---|
| f (mm) | 3.57923 | 5.98995 | 10.30823 |
| Fno | 2.8661 | 3.4262 | 4.7381 |
| D0 | ∞ | ∞ | ∞ |
| D4 | 0.99493 | 5.29555 | 7.90023 |
| D8 | 7.80489 | 3.49887 | 0.89972 |
| D9 | 6.48820 | 4.54211 | 1.00154 |
| D14 | 1.19512 | 3.15204 | 6.67792 |
| D16 | 1.20075 | 1.19911 | 1.20428 |
| D20 | 0.90002 | 0.89493 | 0.90026 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 0.99493 | 5.29555 | 7.90023 |
| D8 | 7.80489 | 3.49887 | 0.89972 |
| D9 | 6.48820 | 4.54211 | 1.00154 |
| D14 | 0.99721 | 2.61302 | 5.16528 |
| D16 | 1.39866 | 1.73813 | 2.71691 |
| D20 | 0.90002 | 0.89493 | 0.90026 |

Thirteenth Embodiment

Figure 45:
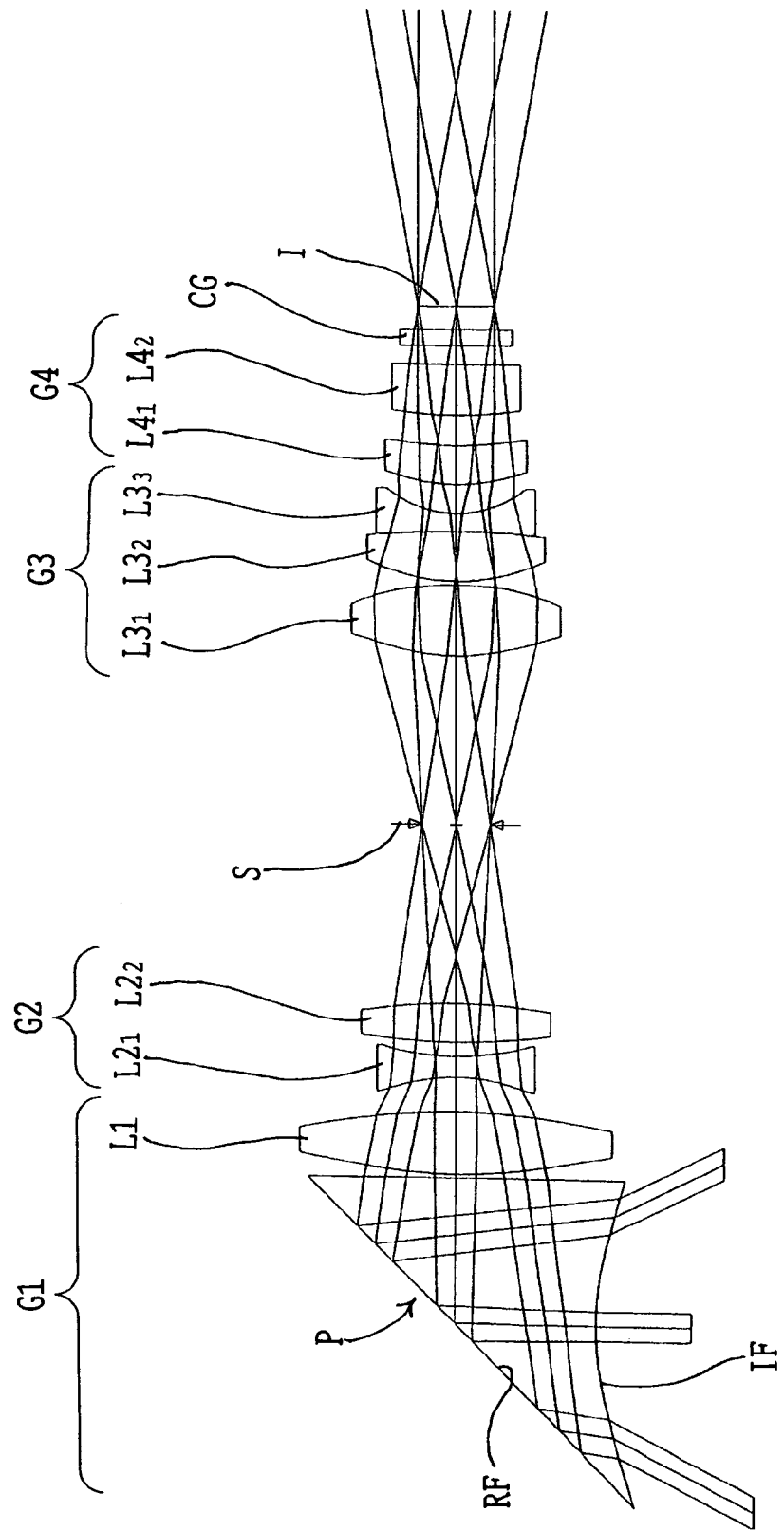
FIG. 45 is a sectional view showing an optical arrangement, developed along the optical axis, of a thirteenth embodiment of the zoom lens according to the present invention.
Figure 46A:
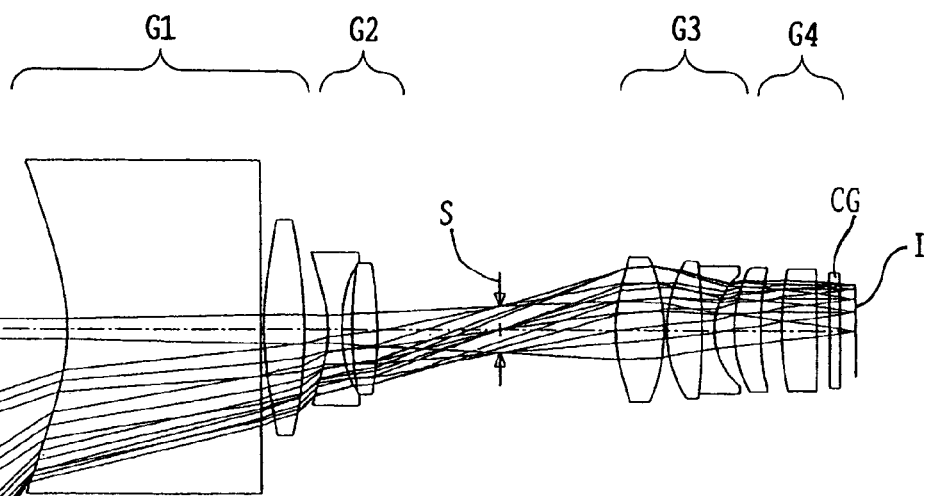
FIGS. 46A, 46B, and 46C are sectional views showing optical arrangements, developed along the optical axis, at wide-angle, middle, and telephoto positions, respectively, in focusing of the infinite object point of the zoom lens in the thirteenth embodiment.
Figure 46B:
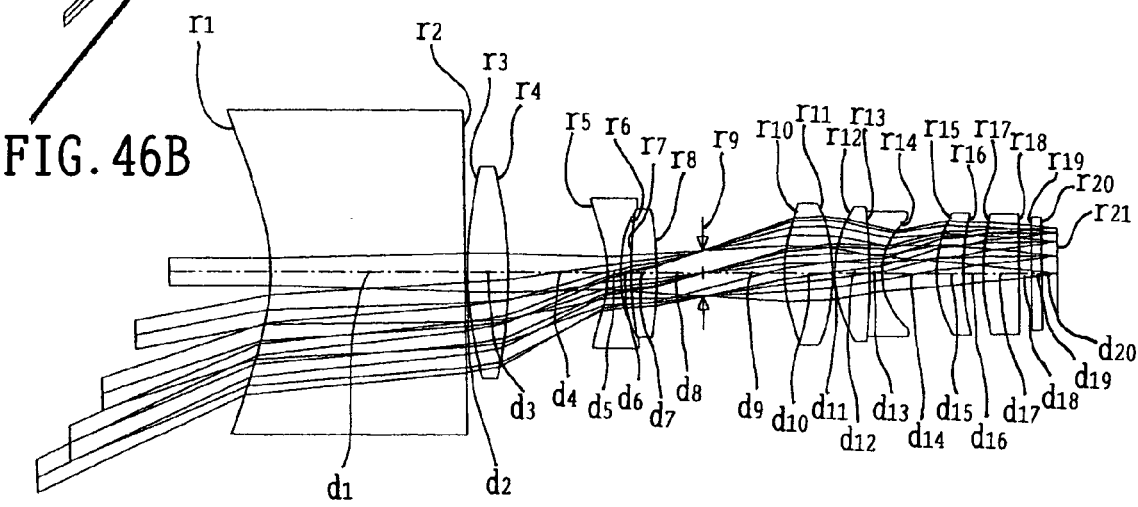
Figure 46C:
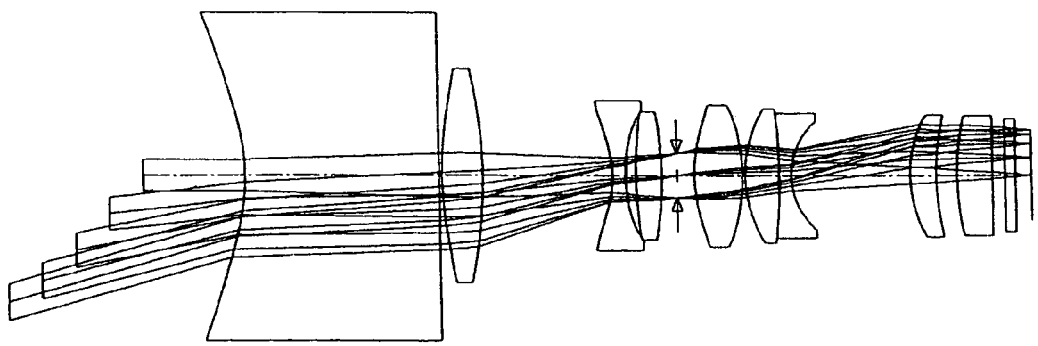

FIG. 45 shows an optical arrangement, where the optical path is bent in focussing of the infinite object point at the wide-angle position, in the thirteenth embodiment of the zoom lens according to the present invention. FIGS. 46A, 46B, and 46C show optical arrangements at wide-angle, middle, and telephoto positions, respectively, in the thirteenth embodiment.

In FIG. 45, again, reference symbol I denotes the imaging surface of the CCD which is the electronic image sensor, CG denotes the CCD cover glass, and LPF denotes the optical low-pass filter. The electronic imaging apparatus of the thirteenth embodiment has, in order from the object side, the zoom lens of the present invention, the optical low-pass filter LPF, the CCD cover glass CG, and the imaging surface I.

The zoom lens of the thirteenth embodiment comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the prism P which has the reflecting optical surface RF for bending the optical path and the ray incidence surface IF which is a concave surface facing the object side and is configured as an aspherical surface that divergence is impaired progressively in going from the optical axis to the periphery and the rear lens sub-unit with positive refracting power, and has positive refracting power as a whole.

The prism P is configured as the reflecting prism bending the optical path by 90°.

The rear lens sub-unit is constructed with the biconvex positive lens L1.

The second lens unit G2 includes, in order from the object side, the biconcave negative lens $L2_1$ and the biconvex positive $L2_2$, and has positive refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 is constructed with the positive meniscus lens L4.

When the magnification of the zoom lens is changed over the range from the wide-angle position to the telephoto position in focusing of the infinite object point, the first lens unit G1 and the aperture stop S are fixed, the second lens unit G2 is moved toward only the image side, and the third lens unit G3 is moved toward only the object side.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the thirteenth embodiment are shown below.

Numerical Data 13
$r_1=-11.4720$ (aspherical surface)
    $d_1=11.3000$ $n_{d1}=1.68893$ $v_{d1}=31.07$
$r_2=\infty$
    $d_2=0.1500$
$r_3=18.7311$ (aspherical surface)
    $d_3=2.4000$ $n_{d3}=1.78800$ $v_{d3}=47.37$
$r_4=-28.7254$
    $d_4=D4$
$r_5=-6.8934$ (aspherical surface)
    $d_5=0.8000$ $n_{d5}=1.74320$ $v_{d5}=49.34$
$r_6=10.9555$ (aspherical surface)
    $d_6=0.6000$
$r_7=24.4160$
    $d_7=1.5000$ $n_{d7}=1.84666$ $v_{d7}=23.78$
$r_8=-22.8940$
    $d_8=D8$
$r_9=\infty$ (stop)
    $d_9=D9$
$r_{10}=6.1037$ (aspherical surface)
    $d_{10}=2.8019$ $n_{d10}=1.69350$ $v_{d10}=53.21$ $r_{11} = -11.8283$ (aspherical surface)
  $d_{11} = 0.1500$
$r_{12} = 7.6193$
  $d_{12} = 2.0028$ $n_{d12} = 1.69680$ $v_{d12} = 55.53$
$r_{13} = -37.5914$
  $d_{13} = 0.7000$ $n_{d13} = 1.84666$ $v_{d13} = 23.78$
$r_{14} = 4.3208$
  $d_{14} = D14$
$r_{15} = 7.5870$
  $d_{15} = 1.5000$ $n_{d15} = 1.69680$ $v_{d15} = 55.53$
$r_{16} = 15.1487$
  $d_{16} = D16$
$r_{17} = 16.7801$
  $d_{17} = 2.0000$ $n_{d17} = 1.69680$ $v_{d17} = 55.53$
$r_{18} = \infty$
  $d_{18} = 0.7000$
$r_{19} = \infty$
  $d_{19} = 0.6000$ $n_{d19} = 1.51633$ $v_{d19} = 64.14$
$r_{20} = \infty$
  $d_{20} = D20$
$r_{21} = \infty$ (imaging surface)

Aspherical Coefficients
First Surface
  $K = 0$
  $A_2 = 0$ $A_4 = 4.5902 \times 10^{-4}$ $A_6 = -2.6743 \times 10^{-6}$
  $A_8 = 1.3133 \times 10^{-8}$ $A_{10} = 0$
Third Surface
  $K = 0$
  $A_2 = 0$ $A_4 = -1.9867 \times 10^{-4}$ $A_6 = -1.6733 \times 10^{-6}$
  $A_8 = 4.5618 \times 10^{-8}$ $A_{10} = 0$
Fifth Surface
  $K = 0$
  $A_2 = 0$ $A_4 = 1.2906 \times 10^{-3}$ $A_6 = 4.4242 \times 10^{-5}$
  $A_8 = -1.1377 \times 10^{-6}$ $A_{10} = 0$
Sixth Surface
  $K = 0$
  $A_2 = 0$ $A_4 = 3.8770 \times 10^{-4}$ $A_6 = 8.2848 \times 10^{-5}$
  $A_8 = -6.2566 \times 10^{-7}$ $A_{10} = 0$
Tenth Surface
  $K = 0$
  $A_2 = 0$ $A_4 = -2.9960 \times 10^{-4}$ $A_6 = -2.1630 \times 10^{-5}$
  $A_8 = 4.1050 \times 10^{-7}$ $A_{10} = 0$
Eleventh Surface
  $K = 0$
  $A_2 = 0$ $A_4 = 2.7796 \times 10^{-4}$ $A_6 = -2.2527 \times 10^{-5}$
  $A_8 = 3.9507 \times 10^{-7}$ $A_{10} = 0$ Zoom Data When D0 (the distance from the object to the first surface) is $\infty$,

|  | Wide-angle | Middle | Telephoto |
|---|---|---|---|
| f (mm) | 3.27089 | 5.53615 | 9.40819 |
| Fno | 2.8073 | 3.3890 | 4.9727 |
| D0 | $\infty$ | $\infty$ | $\infty$ |
| D4 | 1.38761 | 5.87153 | 7.66619 |
| D8 | 7.17738 | 2.68886 | 0.89882 |
| D9 | 6.68143 | 4.73249 | 0.99780 |
| D14 | 1.14079 | 3.12406 | 6.83407 |
| D16 | 1.21121 | 1.19657 | 1.20159 |
| D20 | 0.90026 | 0.88113 | 0.90016 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 1.38761 | 5.87153 | 7.66619 |
| D8 | 7.17738 | 2.68886 | 0.89882 |
| D9 | 6.68143 | 4.73249 | 0.99780 |
| D14 | 1.00143 | 2.73491 | 5.76408 |
| D16 | 1.35057 | 1.58573 | 2.27159 |
| D20 | 0.90026 | 0.88113 | 0.90016 |

In any of the embodiments of the present invention, as mentioned above, the optical path is bent in the direction of the major side (the horizontal direction) of the electronic image sensor (CCD). Bending of the optical path in the direction of the minor side (the vertical direction) requires a minimum of space and is advantageous for compactness. However, when the optical system is designed so that the optical path can also be bent in the direction of the major side, the optical path can be bent in either of two directions and the number of degrees of freedom of the camera design that lenses are incorporated in the camera is increased, which is favorable.

Next, values of parameters of conditions in the fourth to thirteenth embodiments are shown in Tables 2 and 3. Also, in these tables, the distances S1 in the fourth and fifth embodiments and the sixth to thirteenth embodiments are 195.03546 (mm) and 177.30496 (mm), respectively.

TABLE 2

|  | 4th embodiment | 5th embodiment | 6th embodiment | 7th embodiment | 8th embodiment |
|---|---|---|---|---|---|
| Lens data | N. data 4 | N. data 5 | N. data 6 | N. data 7 | N. data 8 |
| Half angle of view (W) ($\omega$w) | 29.3 | 32.2 | 29.0 | 33.2 | 31.9 |
| Half angle of view (M) | 19.1 | 19.1 | 17.5 | 19.9 | 18.4 |
| Half angle of view (T) | 12.8 | 11.5 | 10.5 | 11.9 | 11.3 |
| Max. image height ($y_{10}$) | 3.0 | 3.0 | 2.7 | 2.7 | 2.7 |
| $\beta 2W$ | −0.5278 | −0.6968 | −0.8050 | −0.8829 | −0.6799 |
| $\beta 3W$ | −0.6280 | −0.7545 | −0.7263 | −0.7848 | −0.6965 |
| M4 · S1 | 4.350E+2 | 2.798E+2 | 2.531E+2 | 2.427E+2 | 4.911E+2 |
| fw/fR | — | — | — | −0.01900 | 0.30721 |
| vF | 52.43 | 64.14 | 70.23 | 70.23 | 70.23 |
| vR | — | — | — | 30.49 | 30.49 |
| v12 | 53.21 | 71.30 | 53.21 | 40.92 | 47.37 |
| n12 | 1.69350 | 1.56907 | 1.69350 | 1.80610 | 1.78800 |
| D3/D2 | 0.98629 | 0.94716 | 1.07552 | 1.16357 | 0.85598 |
| $y_{07}/(fw \cdot \tan \omega_{07\ w})$ | 0.97032 | 0.97529 | 0.97232 | 0.85878 | 0.97035 |
| fw/$y_{10}$ | 1.88870 | 1.68436 | 1.90801 | 1.70469 | 1.70516 |

TABLE 3

| | 9th embodiment | 10th embodiment | 11th embodiment | 12th embodiment | 13th embodiment |
|---|---|---|---|---|---|
| Lens data | N. data 9 | N. data 10 | N. data 11 | N. data 12 | N. data 13 |
| Half angle of view (W) ($\omega$w) | 34.7 | 33.5 | 35.9 | 39.7 | 42.2 |
| Half angle of view (M) | 20.4 | 20.4 | 23.1 | 24.0 | 25.5 |
| Half angle of view (T) | 12.5 | 11.9 | 13.8 | 14.5 | 15.8 |
| Max. image height ($y_{10}$) | 2.7 | 2.7 | 2.7 | 2.7 | 2.7 |
| $\beta$2W | −0.6265 | −0.6846 | −0.7253 | −0.5979 | −0.4234 |
| $\beta$3W | −0.6381 | −0.7020 | −0.7598 | −0.5902 | −0.4994 |
| M4 · S1 | 3.732E+2 | 3.564E+2 | 2.692E+2 | 2.691E+2 | 1.906E+2 |
| fw/fR | 0.29344 | 0.22869 | 0.18853 | 0.26527 | 0.13583 |
| $\nu$F | 70.23 | 52.43 | 70.23 | 55.53 | 55.53 |
| $\nu$R | 30.49 | 30.49 | 31.07 | 30.49 | 55.53 |
| $\nu$12 | 40.92 | 40.92 | 37.03 | 40.92 | 47.37 |
| n12 | 1.80610 | 1.80610 | 1.81474 | 1.80610 | 1.78800 |
| D3/D2 | 0.59496 | 0.83472 | 1.94682 | 1.83130 | 0.93090 |
| $y_{07}$/(fw · tan $\omega_{07\,w}$) | 0.97058 | 0.89759 | 0.89684 | 0.87510 | 0.87910 |
| fw/$y_{10}$ | 1.53089 | 1.62754 | 1.49037 | 1.32564 | 1.21144 |

In the above tables, effective angles of view after digital correction for distortion are described. Corrections are made in the seventh embodiment and the tenth to thirteenth embodiments. The angle of view at which the image height coincides basically with the minor side is not changed, and the angles of view of other image heights are changed.

Fourteenth Embodiment

Figure 47:
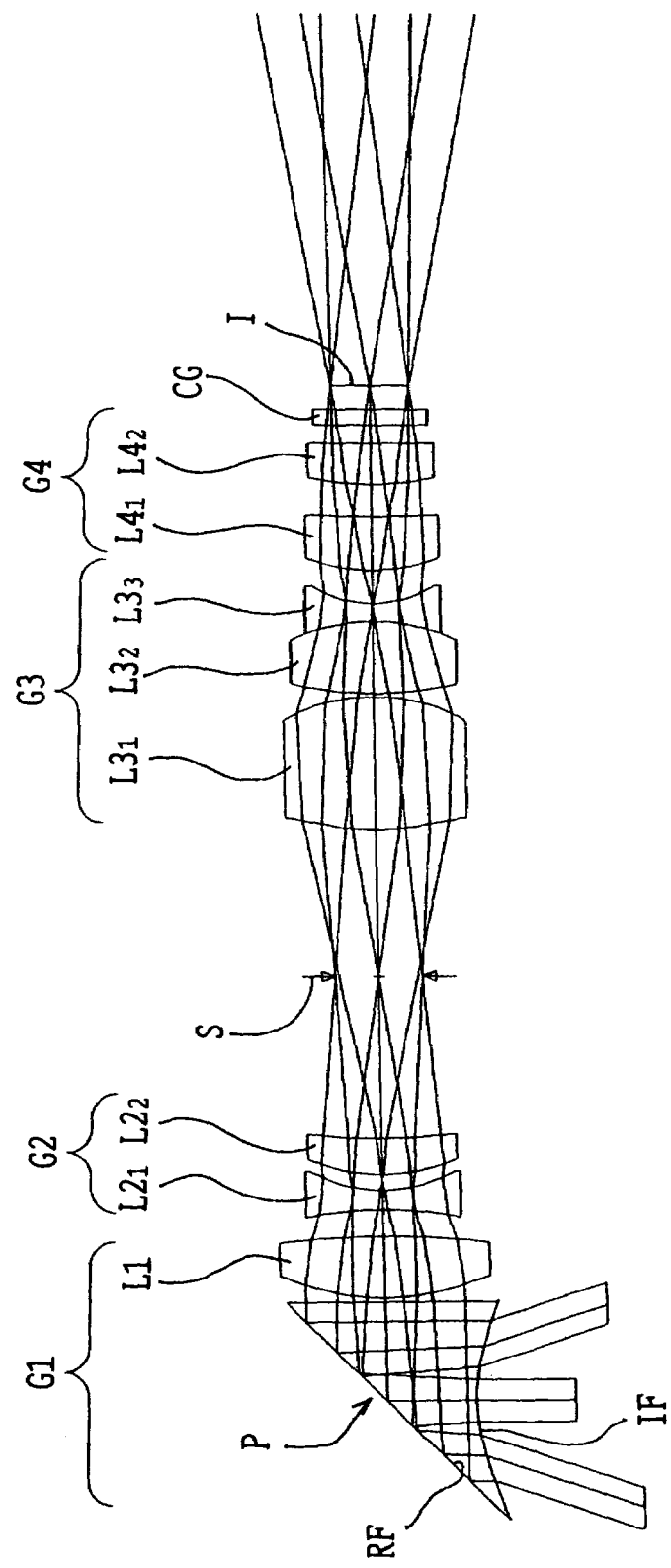
FIG. 47 is a sectional view showing an optical arrangement, developed along the optical axis, of a fourteenth embodiment of the zoom lens according to the present invention.
Figure 48A:
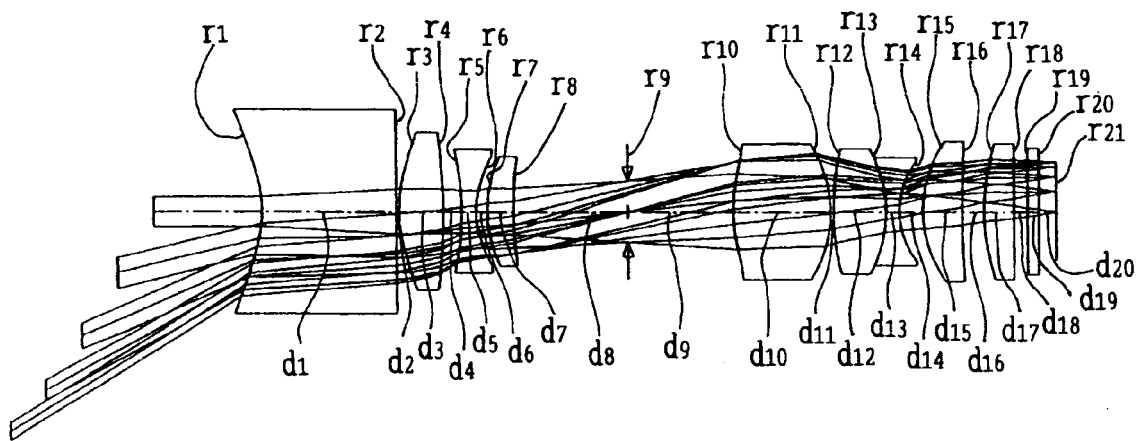
FIGS. 48A, 48B, and 48C are sectional views showing optical arrangements, developed along the optical axis, at wide-angle, middle, and telephoto positions, respectively, in focusing of the infinite object point of the zoom lens in the fourteenth embodiment.
Figure 48B:
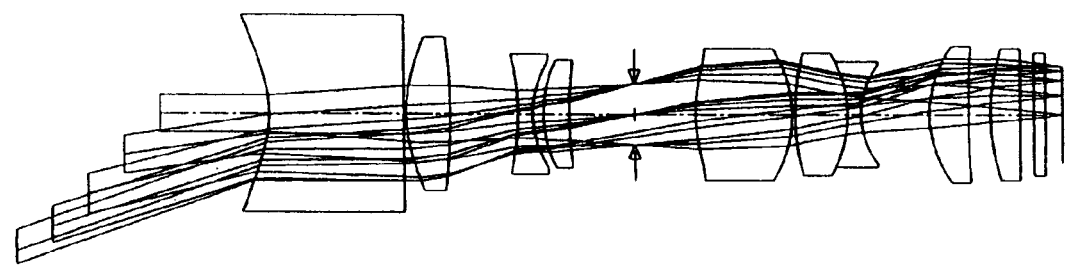
Figure 48C:
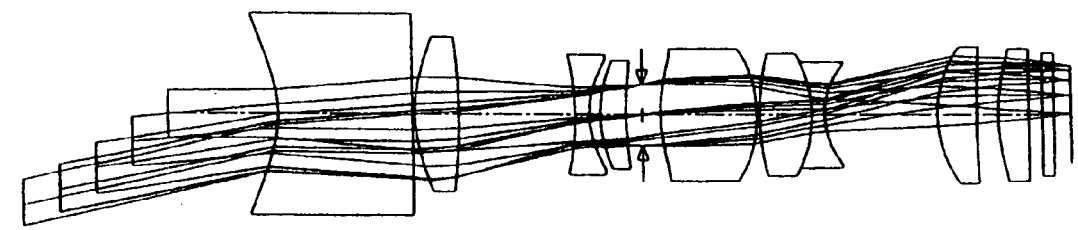

FIG. 47 shows an optical arrangement, where the optical path is bent in focussing of the infinite object point at the wide-angle position, in the fourteenth embodiment of the zoom lens according to the present invention. FIGS. 48A, 48B, and 48C show optical arrangements at wide-angle, middle, and telephoto positions, respectively, in the fourteenth embodiment. FIGS. 49A–49L and 50A–50L show aberration characteristics in the fourteenth embodiment.

In FIG. 47, again, reference symbol I denotes the imaging surface of the CCD which is the electronic image sensor and CG denotes the CCD cover glass. The electronic imaging apparatus of the fourteenth embodiment has, in order from the object side, the zoom lens of the present invention, the cover glass CG, and the imaging surface I.

The zoom lens of the fourteenth embodiment comprises, in order from the object side, the first lens unit G1, the second lens unit G2, the aperture stop S, the third lens unit G3, and the fourth lens unit G4.

The first lens unit G1 includes, in order from the object side, the prism P and the rear lens sub-unit with positive refracting power, and has positive refracting power as a whole. The prism P has, in order from the object side, the reflecting optical surface RF for bending the optical path and the ray incidence surface IF which is a concave surface facing the object side and is configured as an aspherical surface that divergence is impaired progressively in going from the optical axis to the periphery.

The prism P is the reflecting optical element and is configured as the reflecting prism bending the optical path by 90°. On the other hand, the rear lens sub-unit is constructed with the single biconvex positive lens L1.

The second lens unit G2 includes, in order from the object side, the biconcave negative lens $L2_1$ and the positive meniscus lens $L2_2$ with a convex surface facing the object side, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$.

The fourth lens unit G4 includes the positive meniscus lens $L4_1$ with a convex surface facing the object side and the plano-convex positive lens $L4_2$ whose object-side surface is configured as a convex surface and whose image-side surface as a flat surface. On the convex surface side of the plano-convex positive lens $L4_2$, the antireflection coating or the infrared cutoff coating is provided as occasion demands. On the flat surface side, the infrared cutoff coating or the optical low-pass filter is provided as occasion demands.

In the zoom lens of the fourteenth embodiment, when the magnification of the zoom lens is changed over the range from the wide-angle position to the telephoto position in focusing of the infinite object point, the first lens unit G1 is fixed, the second lens unit G2 is moved toward the image side, the aperture stop S is fixed, the third lens unit G3 is moved toward the object side, and the fourth lens unit G4 remains fixed.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, both surfaces of the biconvex positive lens $L3_1$ in the third lens unit G3, and the object-side surface of the plano-convex positive lens $L4_2$ in the fourth lens unit G4.

Subsequently, numerical data of optical members constituting the zoom lens of the fourteenth embodiment are shown below.

Numerical Data 14
$r=-6.3126$ (aspherical surface)
  $d_1=7.2000$ nd I=1.84666 $\nu_{d1}=23.78$
$r_2=\infty$
  $d_2=0.1500$
$r=7.9075$ (aspherical surface)
  $d_3=2.4000$ $n_{d3}=1.80610$ $\nu_{d3}=40.92$
$r_4=-32.3622$
  $d_4=D4$
$r_5=-16.8551$ (aspherical surface)
  $d_5=0.8000$ $n_{d5}=1.74320$ $\nu_{d5}=49.34$
$r_6=5.1593$ (aspherical surface)
  $d_6=0.6000$
$r_7=6.9778$
  $d_7=1.4000$ $n_{d7}=1.84666$ $\nu_{d7}=23.78$
$r_8=22.3055$
  $d_8=D8$ $r_9=\infty$ (stop)
  $d_9=D9$
$r_{10}=9.0856$ (aspherical surface)
  $d_{10}=5.2004$ $n_{d10}=1.69350$ $v_{d10}=53.21$
$r_{11}=-7.1858$ (aspherical surface)
  $d_{11}=0.1500$
$r_{12}=13.5232$
  $d_{12}=2.7985$ $n_{d12}=1.51742$ $v_{d12}=52.43$
$r_{13}=-7.1597$
  $d_{13}=0.7000$ $n_{d13}=1.84666$ $v_{d13}=23.78$
$r_{14}=4.5074$
  $d_{14}=D14$
$r_{15}=6.5896$
  $d_{15}=2.1000$ $n_{d15}=1.48749$ $v_{d15}=70.23$
$r_{16}=58.8701$
  $d_{16}=D16$
$r_{17}=11.5451$ (aspherical surface)
  $d_{17}=1.6000$ $n_{d17}=1.58423$ $v_{d17}=30.49$
$r_{18}=\infty$
  $d_{18}=0.7000$
$r_9=\infty$
  $d_{19}=0.6000$ $n_{d19}=1.51633$ $v_{d19}=640.14$
$r_{20}=\infty$
  $d_{20}=D20$
$r_{21}=\infty$ (imaging surface)

Aspherical Coefficients
First Surface
  K=0
  $A_4=2.2960\times10^{-3}$ $A_6=-4.0755\times10^{-5}$ $A_8=8.4958\times10^{-7}$
  $A_{10}=0$
Third Surface
  K=0
  $A_4=-9.7715\times10^{-4}$ $A_6=7.4325\times10^{-6}$ $A_8=-8.0802\times10^{-8}$
  $A_{10}=0$
Fifth Surface
  K=0
  $A_4=-9.8384\times10^{-4}$ $A_6=1.0716\times10^{-4}$ $A_8=-5.0787\times10^{-6}$
  $A_{10}=0$
Sixth Surface
  K=0
  $A_4=-1.7200\times10^{-3}$ $A_6=1.5306\times10^{-4}$ $A_8=-1.1671\times10^{-5}$
  $A_{10}=0$
Tenth Surface
  K=0
  $A_4=-8.2826\times10^{-4}$ $A_6=-2.0132\times10^{-5}$ $A_8=-2.8436\times10^{-6}$
  $A_{10}=0$
Eleventh Surface
  K=0
  $A_4=2.8435\times10^{-4}$ $A_6=-3.2184\times10^{-5}$ $A_8=-1.5285\times10^{-7}$
  $A_{10}=0$
Seventeenth Surface
  K=0
  $A_4=1.6601\times10^{-4}$ $A_6=-1.5929\times10^{-5}$ $A_8=-1.2658\times10^{-6}$
  $A_{10}=0$ Zoom Data When D0 (the distance from the object to the first surface) is $\infty$,

|  | Wide-angle | Middle | Telephoto |
| --- | --- | --- | --- |
| f (mm) | 4.60543 | 7.39970 | 11.89888 |
| Fno | 2.8829 | 3.6220 | 4.4948 |
| D0 | $\infty$ | $\infty$ | $\infty$ |

-continued

|  | Wide-angle | Middle | Telephoto |
| --- | --- | --- | --- |
| D4 | 0.99784 | 3.64375 | 6.29756 |
| D8 | 6.19915 | 3.55363 | 0.89936 |
| D9 | 5.72406 | 3.31931 | 0.99818 |
| D14 | 1.23607 | 3.63698 | 5.96010 |
| D16 | 1.19738 | 1.20041 | 1.19936 |
| D20 | 0.89973 | 0.89967 | 0.89973 |

When D0 (the distance from the object to the first surface) is a short distance (20 cm),

|  | Wide-angle | Middle | Telephoto |
| --- | --- | --- | --- |
| D0 | 177.30496 | 177.30496 | 177.30496 |
| D4 | 0.99784 | 3.64375 | 6.29756 |
| D8 | 6.19915 | 3.55363 | 0.89936 |
| D9 | 5.72406 | 3.31931 | 0.99818 |
| D14 | 0.99744 | 3.03933 | 4.50511 |
| D16 | 1.43601 | 1.79806 | 2.65435 |
| D20 | 0.89973 | 0.89967 | 0.89966 |

Fifteenth Embodiment

Figure 51:
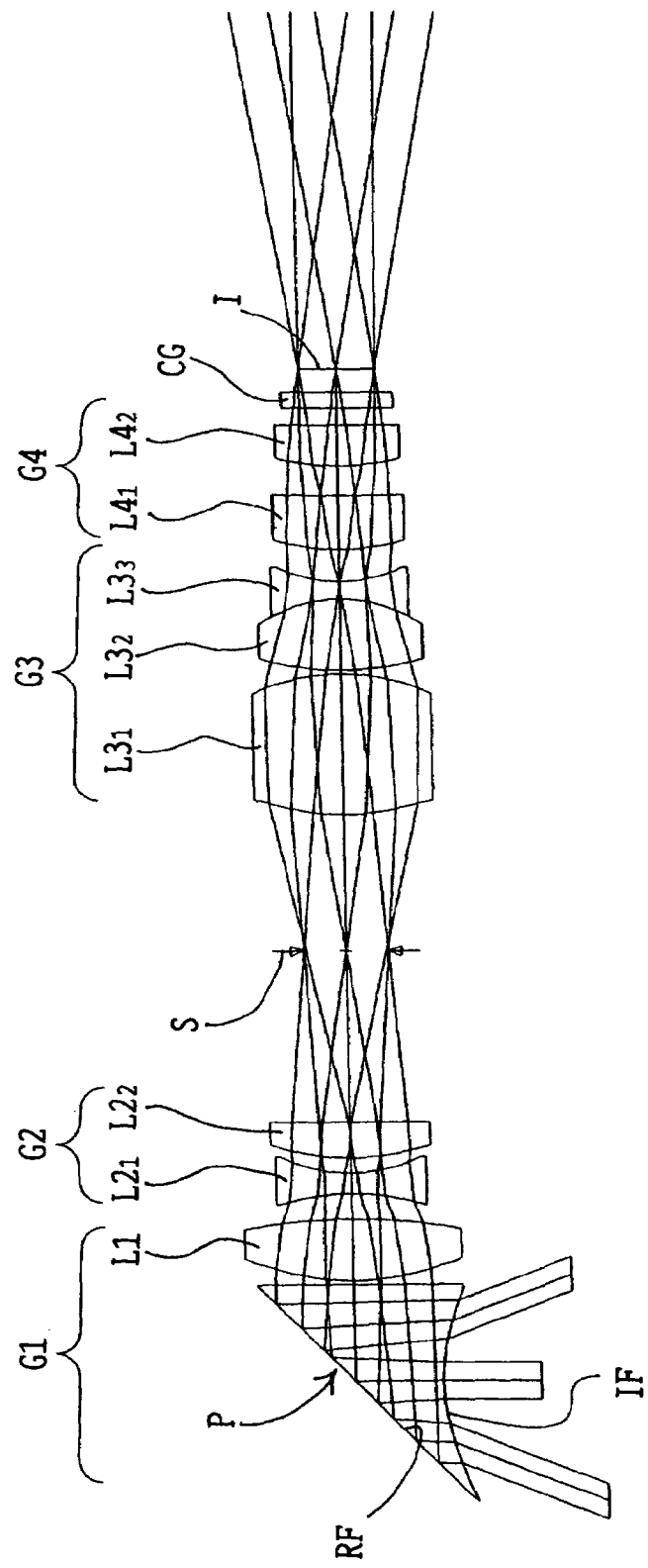
FIG. 51 is a sectional view showing an optical arrangement, developed along the optical axis, of a fifteenth embodiment of the zoom lens used in the electronic imaging apparatus according to the present invention.
Figure 52A:
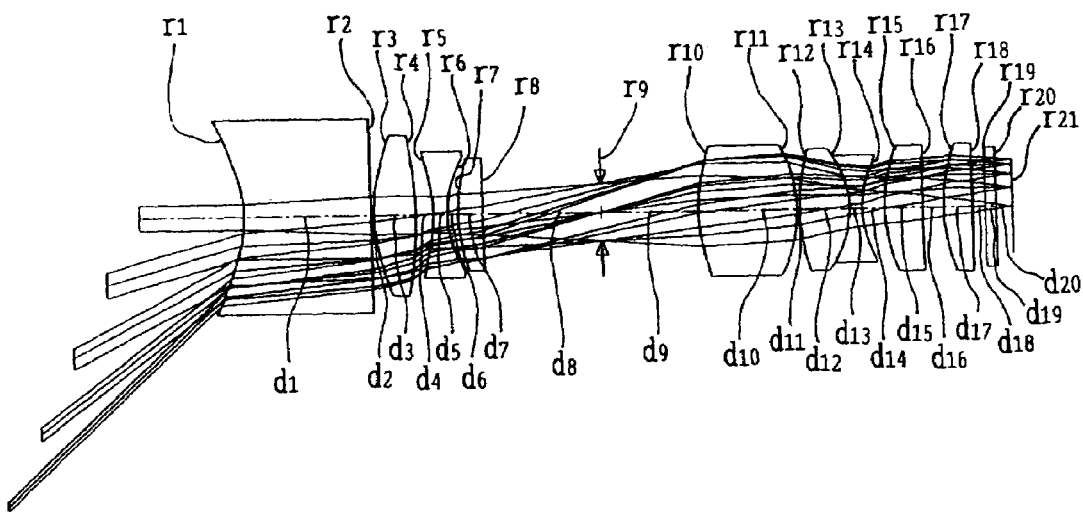
FIGS. 52A, 52B, and 52C are sectional views showing optical arrangements, developed along the optical axis, at wide-angle, middle, and telephoto positions, respectively, in focusing of the infinite object point of the zoom lens in the fifteenth embodiment.
Figure 52B:
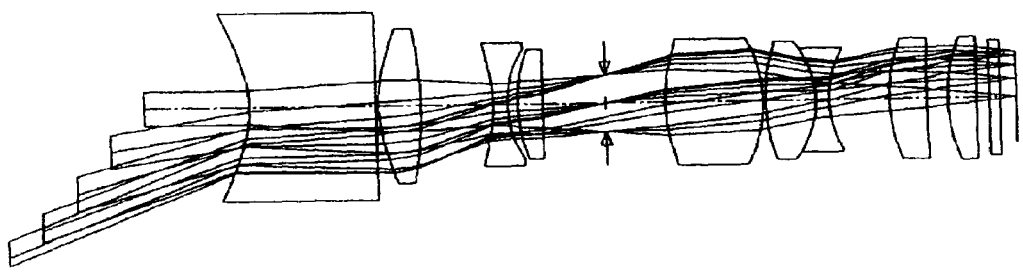
Figure 52C:
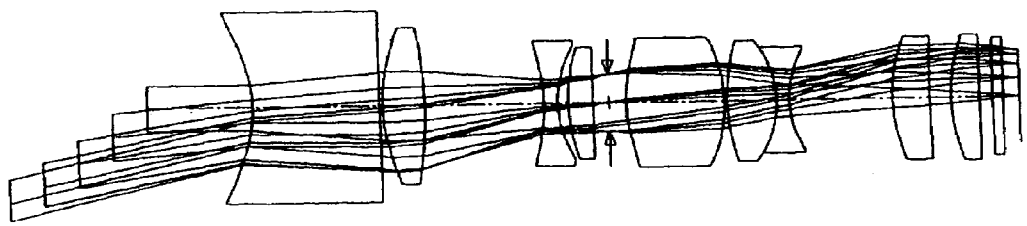

FIG. 51 shows an optical arrangement, where the optical path is bent in focussing of the infinite object point at the wide-angle position, in the fifteenth embodiment of the zoom lens according to the present invention. FIGS. 52A, 52B, and 52C show optical arrangements at wide-angle, middle, and telephoto positions, respectively, in the fifteenth embodiment. FIGS. 53A–53L and 54A–54L show aberration characteristics in the fifteenth embodiment.

In FIG. 51, again, reference symbol I denotes the imaging surface of the CCD which is the electronic image sensor and CG denotes the CCD cover glass. The electronic imaging apparatus of the fourteenth embodiment has, in order from the object side, the zoom lens of the present invention, the cover glass CG, and the imaging surface I.

The zoom lens of the fifteenth embodiment comprises, in order from the object side, the first lens unit G1, the second lens unit G2, the aperture stop S, the third lens unit G3, and the fourth lens unit G4.

The first lens unit G1 includes, in order from the object side, the prism P and the rear lens sub-unit with positive refracting power, and has positive refracting power as a whole. The prism P has, in order from the object side, the reflecting optical surface RF for bending the optical path and the ray incidence surface IF which is a concave surface facing the object side and is configured as an aspherical surface that divergence is impaired progressively in going from the optical axis to the periphery.

The prism P is the reflecting optical element and is configured as the reflecting prism bending the optical path by 90°. On the other hand, the rear lens sub-unit is constructed with the single biconvex positive lens L1.

The second lens unit G2 includes, in order from the object side, the biconcave negative lens $L2_1$ and the positive meniscus lens $L2_2$ with a convex surface facing the object side, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$, and has positive refracting power as a whole.

The fourth lens unit G4 includes the positive meniscus lens $L4_1$ with a convex surface facing the object side and the plano-convex positive lens $L4_2$ whose object-side surface is configured as a convex surface and whose image-side surface as a flat surface. On the convex surface side of the plano-convex positive lens $L4_2$, the antireflection coating or the infrared cutoff coating is provided as occasion demands. On the flat surface side, the infrared cutoff coating or the optical low-pass filter is provided as occasion demands.

In the zoom lens of the fifteenth embodiment, when the magnification of the zoom lens is changed over the range from the wide-angle position to the telephoto position in focusing of the infinite object point, the first lens unit G1 is fixed, the second lens unit G2 is moved toward the image side, the aperture stop S is fixed, the third lens unit G3 is moved toward the object side, and the fourth lens unit G4 remains fixed.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the fifteenth embodiment are shown below.

Numerical Data 15

$r_1=-6.7689$ (aspherical surface)
$\quad d_1=7.2000$ $n_{d1}=1.84666$ $v_{d1}=23.78$
$r_2=\infty$
$\quad d_2=0.1500$
$r_3=8.8567$ (aspherical surface)
$\quad d_3=2.4000$ $n_{d3}=1.80610$ $v_{d3}=40.92$
$r_4=-23.1719$
$\quad d_4=D4$
$r_5=-8.5533$ (aspherical surface)
$\quad d_5=0.8000$ $n_{d5}=1.74320$ $v_{d5}=49.34$
$r_6=6.2701$ (aspherical surface)
$\quad d_6=0.6000$
$r_7=9.5560$
$\quad d_7=1.4000$ $n_{d7}=1.84666$ $v_{d7}=23.78$
$r_8=413.6157$
$\quad d_8=D8$
$r_9=\infty$ (stop)
$\quad d_9=D9$
$r_{10}=8.7040$ (aspherical surface)
$\quad d_{10}=5.5070$ $n_{d10}=1.69350$ $v_{d10}=53.21$
$r_{11}=-8.5323$ (aspherical surface)
$\quad d_{11}=0.1500$
$r_{12}=11.1980$
$\quad d_{12}=2.7843$ $n_{d12}=1.51742$ $v_{d12}=52.43$
$r_{13}=-5.6650$
$\quad d_{13}=0.7000$ $n_{d13}=1.84666$ $v_{d13}=23.78$
$r_{14}=5.8327$
$\quad d_{14}=D14$
$r_{15}=9.2482$
$\quad d_{15}=2.1000$ $n_{d15}=1.51742$ $v_{d15}=52.43$
$r_{16}=78.4872$
$\quad d_{16}=D16$
$r_{17}=10.0989$
$\quad d_{17}=1.6000$ $n_{d17}=1.58423$ $v_{d17}=30.49$
$r_{18}=\infty$
$\quad d_{18}=0.7000$
$r_{19}=\infty$
$\quad d_{19}=0.6000$ $n_{d19}=1.51633$ $v_{d19}=64.14$
$r_{20}=\infty$
$\quad d_{20}=D20$
$r_{21}=\infty$ (imaging surface)

Aspherical Coefficients
First Surface
$\quad K=0$
$\quad A_4=1.5457\times10^{-3}$ $A_6=-2.1891\times10^{-5}$ $A_8=4.2528\times10^{-7}$
$\quad A_{10}=0$
Third Surface
$\quad K=0$
$\quad A_4=-7.4120\times10^{-4}$ $A_6=5.8864\times10^{-6}$ $A_8=-6.1820\times10^{-8}$
$\quad A_{10}=0$
Fifth Surface
$\quad K=0$
$\quad A_4=1.4436\times10^{-3}$ $A_6=-2.6891\times10^{-5}$ $A_8=1.0886\times10^{-7}$
$\quad A_{10}=0$
Sixth Surface
$\quad K=0$
$\quad A_4=4.3868\times10^{-4}$ $A_6=1.0451\times10^{-5}$ $A_8=-2.6331\times10^{-6}$
$\quad A_{10}=0$
Tenth Surface
$\quad K=0$
$\quad A_4=-6.4968\times10^{-4}$ $A_6=-1.2389\times10^{-6}$ $A_8=-1.7631\times10^{-6}$
$\quad A_{10}=0$
Eleventh Surface
$\quad K=0$
$\quad A_4=-2.9795\times10^{-5}$ $A_6=-7.8603\times10^{-6}$ $A_8=-7.1614\times10^{-7}$
$\quad A_{10}=0$ Zoom Data When D0 (the distance from the object to the first surface) is $\infty$,

|  | Wide-angle | Middle | Telephoto |
|---|---|---|---|
| f (mm) | 4.13146 | 7.00121 | 11.89909 |
| Fno | 2.8661 | 3.5482 | 4.4790 |
| D0 | $\infty$ | $\infty$ | $\infty$ |
| D4 | 0.99807 | 4.10376 | 6.81795 |
| D8 | 6.71926 | 3.61353 | 0.89929 |
| D9 | 5.47873 | 3.35044 | 0.99886 |
| D14 | 1.24880 | 3.36864 | 5.72664 |
| D16 | 1.19661 | 1.20061 | 1.19880 |
| D20 | 0.89940 | 0.90452 | 0.89903 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 0.99807 | 4.10376 | 6.81795 |
| D8 | 6.71926 | 3.61353 | 0.89929 |
| D9 | 5.47873 | 3.35044 | 0.99886 |
| D14 | 0.99871 | 2.67819 | 3.88395 |
| D16 | 1.44670 | 1.89106 | 3.04149 |
| D20 | 0.89940 | 0.90452 | 0.89903 |

Sixteenth Embodiment

Figure 55:
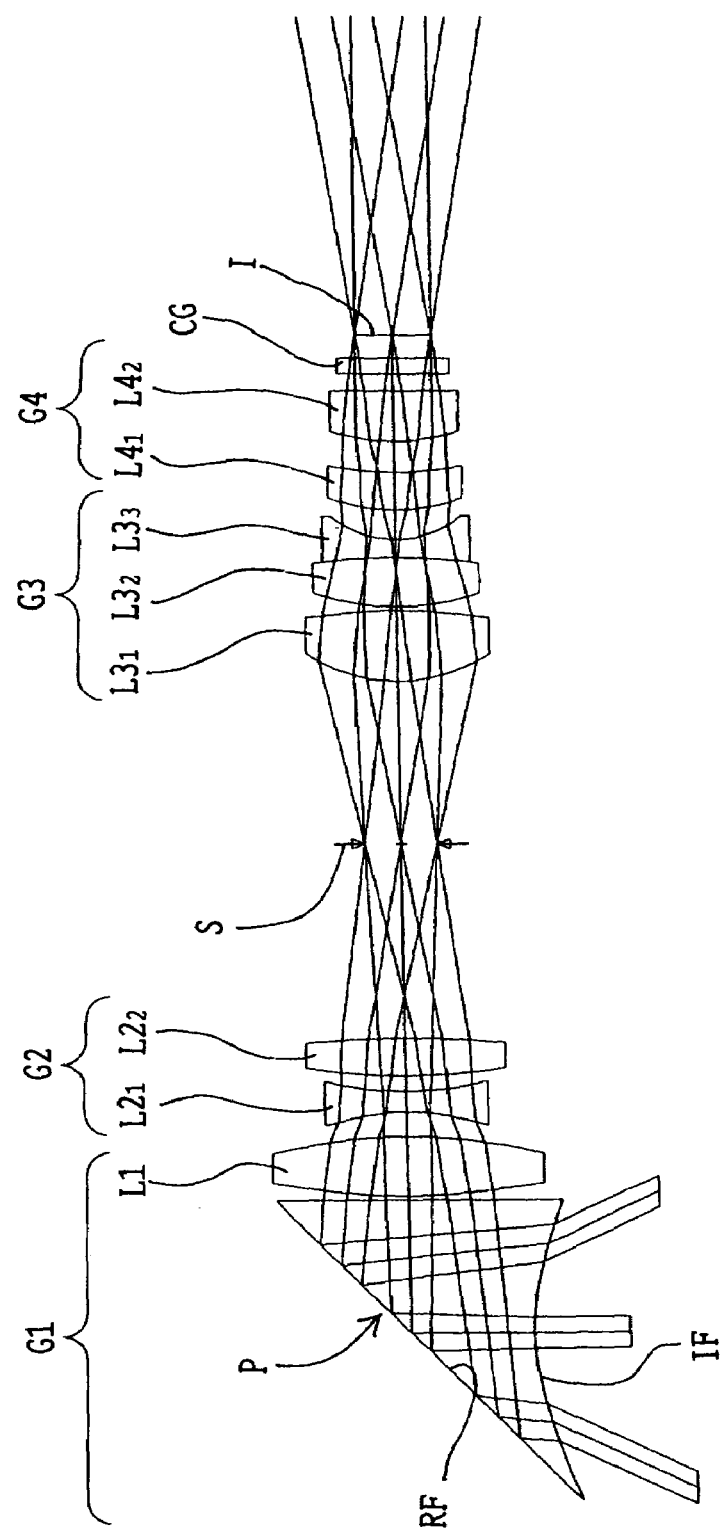
FIG. 55 is a sectional view showing an optical arrangement, developed along the optical axis, of a sixteenth embodiment of the zoom lens used in the electronic imaging apparatus according to the present invention.
Figure 56A:
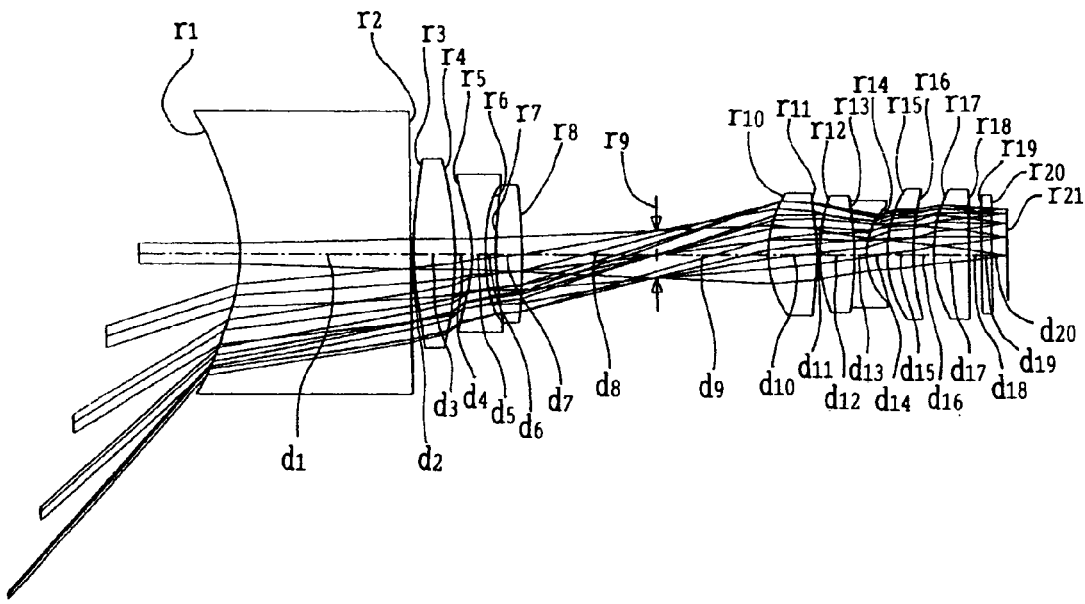
FIGS. 56A, 56B, and 56C are sectional views showing optical arrangements, developed along the optical axis, at wide-angle, middle, and telephoto positions, respectively, in focusing of the infinite object point of the zoom lens in the sixteenth embodiment.
Figure 56B:
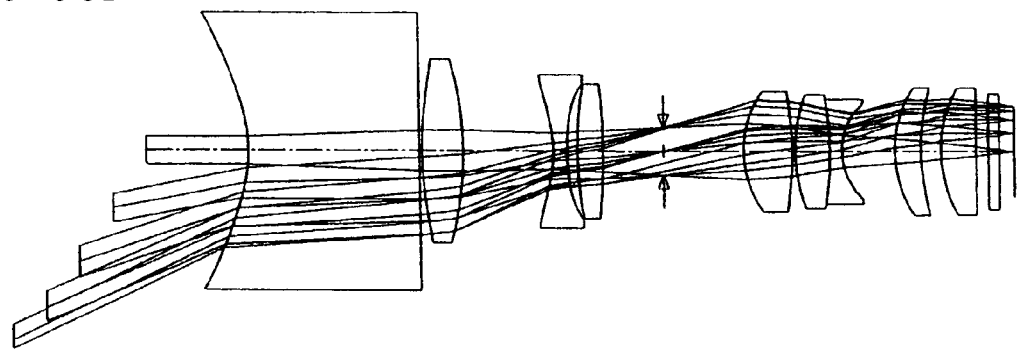
Figure 56C:
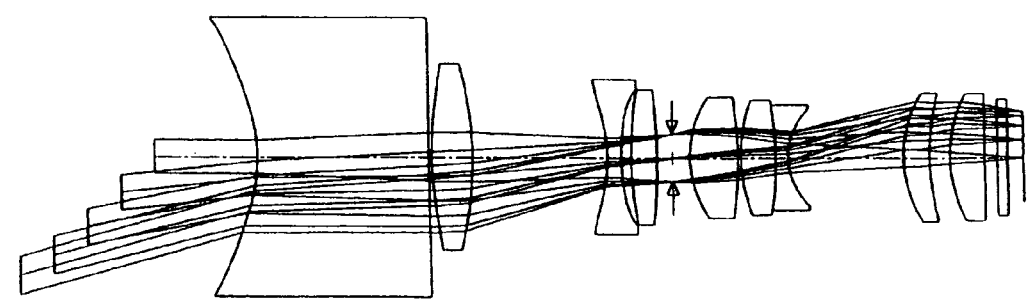

FIG. 55 shows an optical arrangement, where the optical path is bent in focussing of the infinite object point at the wide-angle position, in the sixteenth embodiment of the zoom lens according to the present invention. FIGS. 56A, 56B, and 56C show optical arrangements at wide-angle, middle, and telephoto positions, respectively, in the sixteenth embodiment. FIGS. 57A–57L and 58A–58L show aberration characteristics in the sixteenth embodiment.

In FIG. 55, again, reference symbol I denotes the imaging surface of the CCD which is the electronic image sensor and CG denotes the CCD cover glass. The electronic imaging apparatus of the sixteenth embodiment has, in order from the object side, the zoom lens of the present invention, the cover glass CG, and the imaging surface I.

The zoom lens of the sixteenth embodiment comprises, in order from the object side, the first lens unit G1, the second lens unit G2, the aperture stop S, the third lens unit G3, and the fourth lens unit G4.

The first lens unit G1 includes, in order from the object side, the prism P and the rear lens sub-unit with positive refracting power, and has positive refracting power as a whole. The prism P has, in order from the object side, the reflecting optical surface RF for bending the optical path and the ray incidence surface IF which is a concave surface facing the object side and is configured as an aspherical surface that divergence is impaired progressively in going from the optical axis to the periphery. The prism P is the reflecting optical element and is configured as the reflecting prism bending the optical path by 90°. On the other hand, the rear lens sub-unit is constructed with the single biconvex positive lens L1.

The second lens unit G2 includes, in order from the object side, the biconcave negative lens $L2_1$ and the biconvex positive lens $L2_2$, and has negative refracting power as a whole.

The third lens unit G3 includes, in order from the object side, the biconvex positive lens $L3_1$ and the cemented lens component of the biconvex positive lens $L3_2$ and the biconcave negative lens $L3_3$, and has positive refracting power as a whole.

The fourth lens unit G4 includes the positive meniscus lens $L4_1$ with a convex surface facing the object side and the plano-convex positive lens $L4_2$ whose object-side surface is configured as a convex surface and whose image-side surface as a flat surface. On the convex surface side of the plano-convex positive lens $L4_2$, the antireflection coating or the infrared cutoff coating is provided as occasion demands, and on the flat surface side, the infrared cutoff coating or the optical low-pass filter is provided as occasion demands.

In the zoom lens of the sixteenth embodiment, when the magnification of the zoom lens is changed over the range from the wide-angle position to the telephoto position in focusing of the infinite object point, the first lens unit G1 is fixed, the second lens unit G2 is moved toward the image side, the aperture stop S is fixed, the third lens unit G3 is moved toward the object side, and the fourth lens unit G4 remains fixed.

In the focusing operation, the fourth lens unit G4 is moved along the optical axis.

In addition to being provided for the ray incidence surface IF of the prism P in the first lens unit G1, the aspherical surfaces are provided for the object-side surface of the biconvex positive lens L1 in the first lens unit G1, both surfaces of the biconcave negative lens $L2_1$ in the second lens unit G2, and both surfaces of the biconvex positive lens $L3_1$ in the third lens unit G3.

Subsequently, numerical data of optical members constituting the zoom lens of the sixteenth embodiment are shown below.

Numerical Data 16

$r_1$=−9.0803 (aspherical surface)
 $d_1$=10.0000 $n_{d\ 1}$=1.68893 $v_{d1}$=31.07
$r_2$=∞
 $d_2$=0.1500
$r_3$=20.1047 (aspherical surface)
 $d_3$=2.4000 $n_{d3}$=1.80610 $v_{d3}$=40.92
$r_4$=−21.5717
 $d_4$=D4
$r_5$=−7.8993 (aspherical surface)
 $d_5$=0.8000 $n_{d5}$=1.74320 $v_{d5}$=49.34
$r_6$=15.6354 (aspherical surface)
 $d_6$=0.6000
$r_7$=23.5360
 $d_7$=1.5000 $n_{d7}$=1.84666 $v_{d7}$=23.78
$r_8$=−38.6762
 $d_8$=D8
$r_9$=∞ (stop)
 $d_8$=D9
$r_{10}$=6.4319 (aspherical surface)
 $d_{10}$=2.7996 $n_{d10}$=1.69350 $v_{d10}$=53.21
$r_{11}$=−15.9497 (aspherical surface)
 $d_{11}$=0.1500
$r_{12}$=9.9957
 $d_{12}$=1.9985 $n_{d12}$=1.69680 $v_{d12}$=55.53
$r_{13}$=−20.3022
 $d_{13}$=0.7000 $n_{d13}$=1.84666 $v_{d13}$=23.78
$r_{14}$=3.9847
 $d_{14}$=D14
$r_{15}$=7.3130
 $d_{15}$=1.5000 $n_{d15}$=1.69680 $v_{d15}$=55.53
$r_{16}$=14.1094
 $d_{16}$=D16
$r_{17}$=8.4585
 $d_{17}$=2.0000 $n_{d17}$=1.58423 $v_{d17}$=30.49
$r_{18}$=∞
 $d_{18}$=0.7000
$r_{19}$=∞
 $d_{19}$=0.6000 $n_{d19}$=1.51633 $v_{d19}$=64.14
$r_{20}$=∞
 $d_{20}$=D20
$r_{21}$=∞ (imaging surface)

Aspherical Coefficients
First Surface
 K=0
 $A_4$=6.8669×10$^{-4}$ $A_6$=−5.0449×10$^{-6}$ $A_8$=4.9350×10$^{-8}$
 $A_{10}$=0
Third Surface
 K=0
 $A_4$=−2.3237×10$^{-4}$ $A_6$=−1.7799×10$^{-7}$ $A_8$=2.6664×10$^{-8}$
 $A_{10}$=0
Fifth Surface
 K=0
 $A_4$=1.3138×10$^{-3}$ $A_6$=2.3753×10$^{-6}$ $A_8$=1.2445×10$^{-7}$
 $A_{10}$=0
Sixth Surface
 K=0
 $A_4$=8.9175×10$^{-4}$ $A_6$=4.1528×10$^{-6}$ $A_8$=1.6560×10$^{-6}$
 $A_{10}$=0
Tenth Surface
 K=0
 $A_4$=−2.1575×10$^{-4}$ $A_6$=−6.6772×10$^{-6}$ $A_8$=5.7579×10$^{-7}$
 $A_{10}$=0

Eleventh Surface
   K=0
   $A_4=6.8295 \times 10^4$  $A_6=-3.6082 \times 10^{-6}$  $A_8=7.5907 \times 10^{-7}$
   $A_{10}=0$ Zoom Data When D0 (the distance from the object to the first surface) is ∞,

|  | Wide-angle | Middle | Telephoto |
|---|---|---|---|
| f (mm) | 3.58285 | 5.61494 | 9.45983 |
| Fno | 2.8627 | 3.3784 | 4.7133 |
| D0 | ∞ | ∞ | ∞ |
| D4 | 0.99716 | 5.27298 | 7.92387 |
| D8 | 7.82632 | 3.54693 | 0.89966 |
| D9 | 6.45682 | 4.63452 | 1.00008 |
| D14 | 1.19392 | 3.03802 | 6.65096 |
| D16 | 1.20299 | 1.19733 | 1.20254 |
| D20 | 0.89977 | 0.88502 | 0.89989 |

When D0 (the distance from the object to the first surface) is a short distance (20 cm),

|  | Wide-angle | Middle | Telephoto |
|---|---|---|---|
| D0 | 177.30496 | 177.30496 | 177.30496 |
| D4 | 0.99716 | 5.27298 | 7.92387 |
| D8 | 7.82632 | 3.54693 | 0.89966 |
| D9 | 6.45682 | 4.63452 | 1.00008 |
| D14 | 0.99853 | 2.56937 | 5.38372 |
| D16 | 1.39837 | 1.66598 | 2.46978 |
| D20 | 0.89977 | 0.88502 | 0.89989 |

Values of parameters of conditions in the fourteenth to sixteenth embodiments are as shown in Table 4.

TABLE 4

|  | 14th embodiment | 15th embodiment | 16th embodiment |
|---|---|---|---|
| Lens data | Numerical data 14 | Numerical data 15 | Numerical data 16 |
| Half angle of view (W) (ωw) | 31.9 | 35.5 | 39.7 |
| Half angle of view (M) | 19.5 | 21.8 | 25.7 |
| Half angle of view (T) | 12.4 | 12.6 | 15.7 |
| Maximum image height | 2.7 | 2.7 | 2.7 |
| β2W | −0.74863 | −0.67480 | −0.51089 |
| β3W | −0.76122 | −0.69462 | −0.53488 |
| |f2|/fw | 2.2163 | 2.2125 | 3.6491 |
| f3/fw | 2.3271 | 2.4290 | 3.0760 |
| D3/D2 | 0.92336 | 0.81538 | 0.82501 |
| M4 · S1 | 2.583E+2 | 3.271E+2 | 2.256E+2 |
| $y_{07}/(fw \cdot \tan \omega_{07w})$ | 0.97071 | 0.88208 | 0.87390 |
| fw/$y_{10}$ | 1.70571 | 1.53017 | 1.32698 |
| $d_F/d_P$ | 0.47222 | 0.47222 | 0.48000 |
| R11/$y_{10}$ | −2.33800 | −2.50700 | −3.36307 |
| fw · (n1 − 1)/R11 | −0.61769 | −0.51677 | −0.27183 |
| f1/fw | 3.5685 | 3.7891 | 7.3196 |
| f12/fw | 1.7585 | 1.9906 | 3.6981 |
| $(R_{1PF} + R_{1PR})/(R_{1PF} - R_{1PR})$ | −0.60727 | −0.44695 | −0.03520 |
| $(R_{2NF} + R_{2NR})/(R_{2NF} - R_{2NR})$ | 0.53128 | 0.15403 | −0.32871 |
| $(R_{2PF} + R_{2PR})/(R_{2PF} - R_{2PR})$ | −1.91048 | −1.04730 | −0.24336 |
| $d_{22}$/fw | 0.13028 | 0.14523 | 0.16746 |
| $R_{B3}/R_{B1}$ | 0.33331 | 0.52087 | 0.39864 |
| fw/$R_{B2}$ | −0.64324 | −0.72930 | −0.17648 |
| $V_{BP} - V_{BN}$ | 28.65 | 28.65 | 31.75 |

The path bending zoom lens of the present invention described above can be used in the imaging apparatus. Imaging apparatuses refer to silver halide film cameras, digital cameras, and video cameras. Each of these imaging apparatuses is a photographing apparatus that an object image is formed by the imaging optical system of the zoom lens and this image is received by an imaging element, such as the CCD or a silver halide film, to photograph. The path bending zoom lens of the present invention can also be used in an information processor. Information processors refer to personal computers, telephones, notably mobile phones which are handy to carry, etc. The embodiments of these are shown below.

Figure 60:
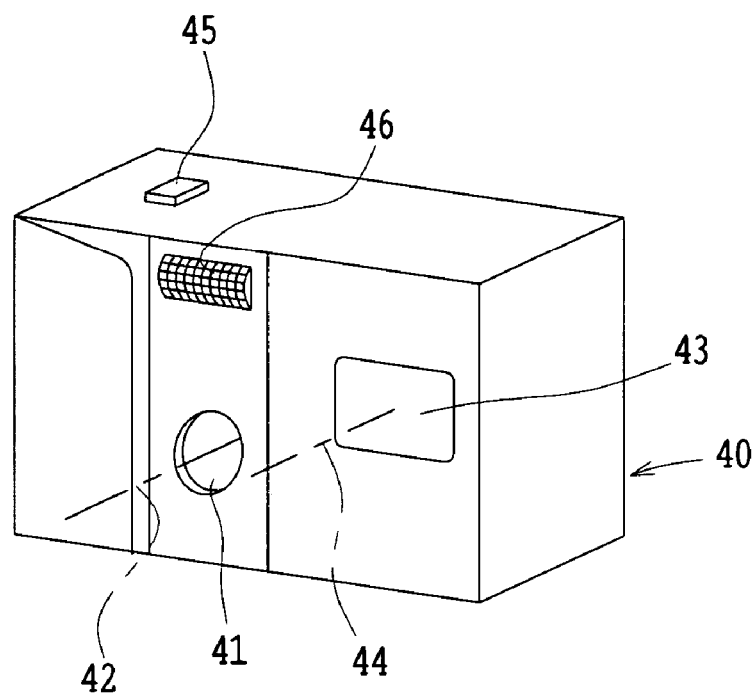
FIG. 60 is a perspective front view showing a digital camera incorporating a path bending zoom lens of the present invention in a photographing optical system.
Figure 61:
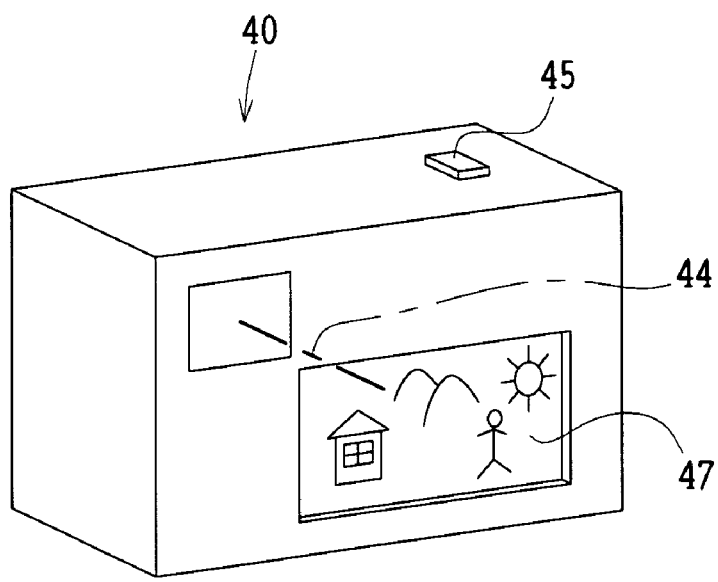
FIG. 61 is a perspective rear view showing the digital camera of FIG. 60.
Figure 62:
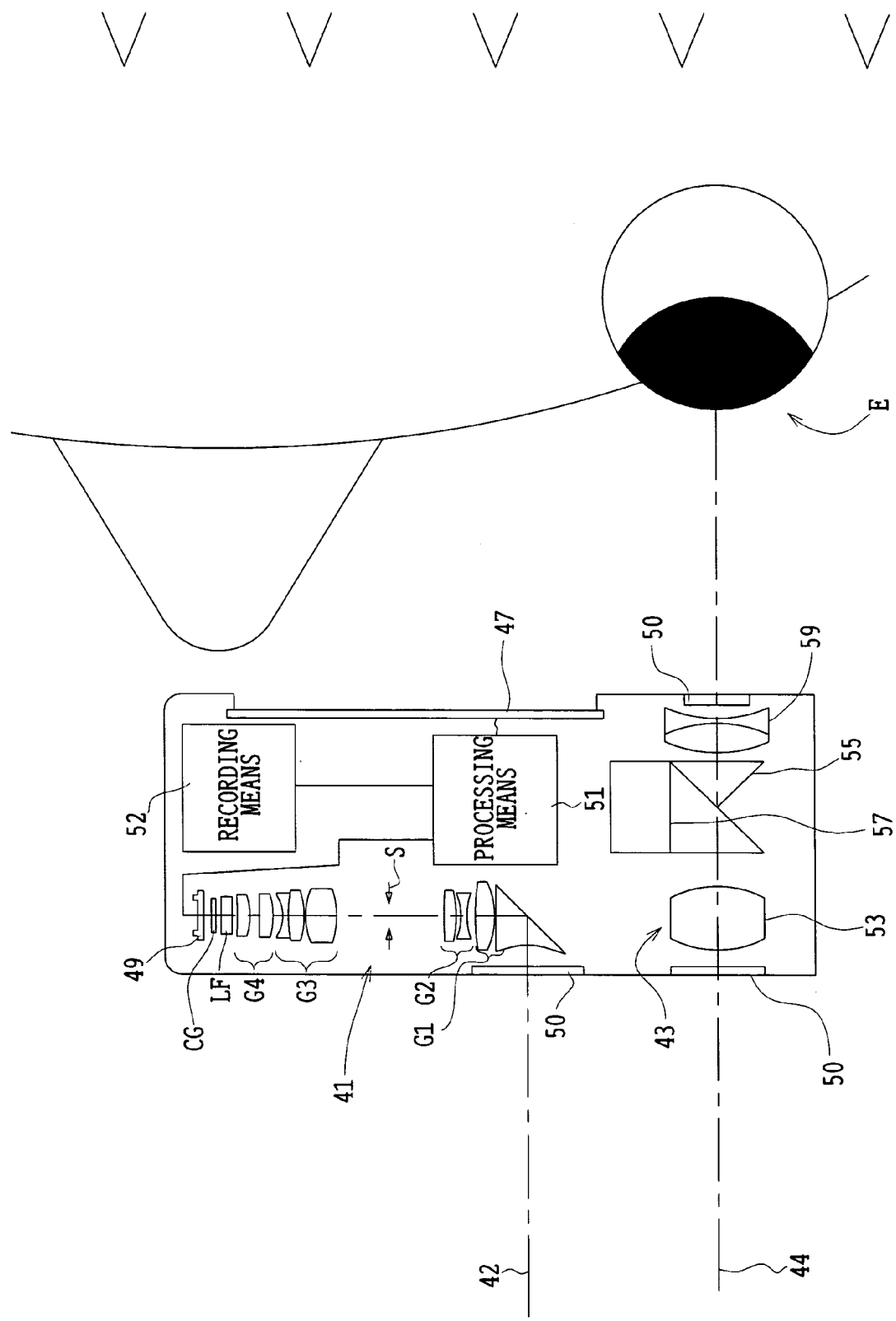
FIG. 62 is a sectional view showing the internal structure of the digital camera of FIG. 60.

FIGS. 60-62 show a digital camera in which the path bending zoom lens of the present invention is incorporated in an photographing optical system 41. In the digital camera of FIG. 62, an imaging optical path is bent in a longitudinal direction of a finder, and an observer's eye viewed from the upper side is shown.

A digital camera 40 includes the photographing optical system 41, a finder optical system 43, a shutter 45, a flash lamp 46, and a liquid crystal display monitor 47. Here, the photographing optical system 41 is placed on a photographing optical path 42. The finder optical system (a finder objective optical system) 43 is placed on a finder optical path 44. The liquid crystal display monitor 47 is provided on the back surface of the camera.

The shutter 45 is provided on the upper portion of the camera 40. When a photographer pushes the shutter 45, photographing is performed, in accordance with this, through the photographing optical system 41, for example, the path bending zoom lens of the first embodiment.

The object image formed by the photographing optical system 41 is provided on the imaging surface of a CCD 49. In this case, light from the object is incident on the CCD 49 through the near-infrared cutoff filter and the near-infrared cutoff coating. Also, the near-infrared cutoff coating is applied to the CCD cover glass or other lenses.

The object image received by the CCD 49 is displayed on the liquid crystal display monitor 47 as an electronic image through a processing means 51. A recording means 52 is connected to the processing means 51 and a photographed electronic image can be recorded. Also, the recording means 52 may be provided to be independent of the processing means 51, or may be constructed so that the image is electronically recorded and written. To electronically record and write the image, it is only necessary to use a flexible disk, a memory card, or MO. When the silver halide film, instead of the CCD 49, is placed at the image plane, the silver halide film camera is constructed.

A finder objective optical system 53 is located on the finder optical path 44. By the finder objective optical system 53, the object image is formed on a field frame 57 of a Porro prism 55 which is an image erecting member. Behind the Porro prism 55, an eyepiece optical system 59 is placed. The eyepiece optical system 59 is provided for the purpose of introducing an erect image into an observer's eye E. Also, cover members 50 are placed on the entrance side of the photographing optical system 41 and the finder objective optical system 53 and on the exit side of the eyepiece optical system 59.

In the digital camera 40 constructed as mentioned above, the optical path is bent in the direction of the major side of the finder. Whereby, the slim design of the camera is effectively achieved. The photographing optical system 41 is a zoom lens which has a wide angle of view and a high variable magnification ratio, but is favorable for correction for aberration and bright, and which is provided with a long back focal distance that the filter can be placed. Consequently, high performance and a cost reduction can be realized.

Also, the photographing optical path of the digital camera 40 may be bent in the direction of the minor side of the finder. In this case, a stroboscopic lamp (or the flash lamp) is placed in the upper direction of the entrance surface of a photographic lens. By doing so, the influence of shading caused in strobo-photography can be lessened.

In FIG. 62, plane-parallel plates are used as the cover members 50, but lenses with powers may be used as the cover members 50.

Subsequently, a personal computer of an example of an information processor. The path bending zoom lens of the present invention is incorporated as the objective optical system.

Figure 63:
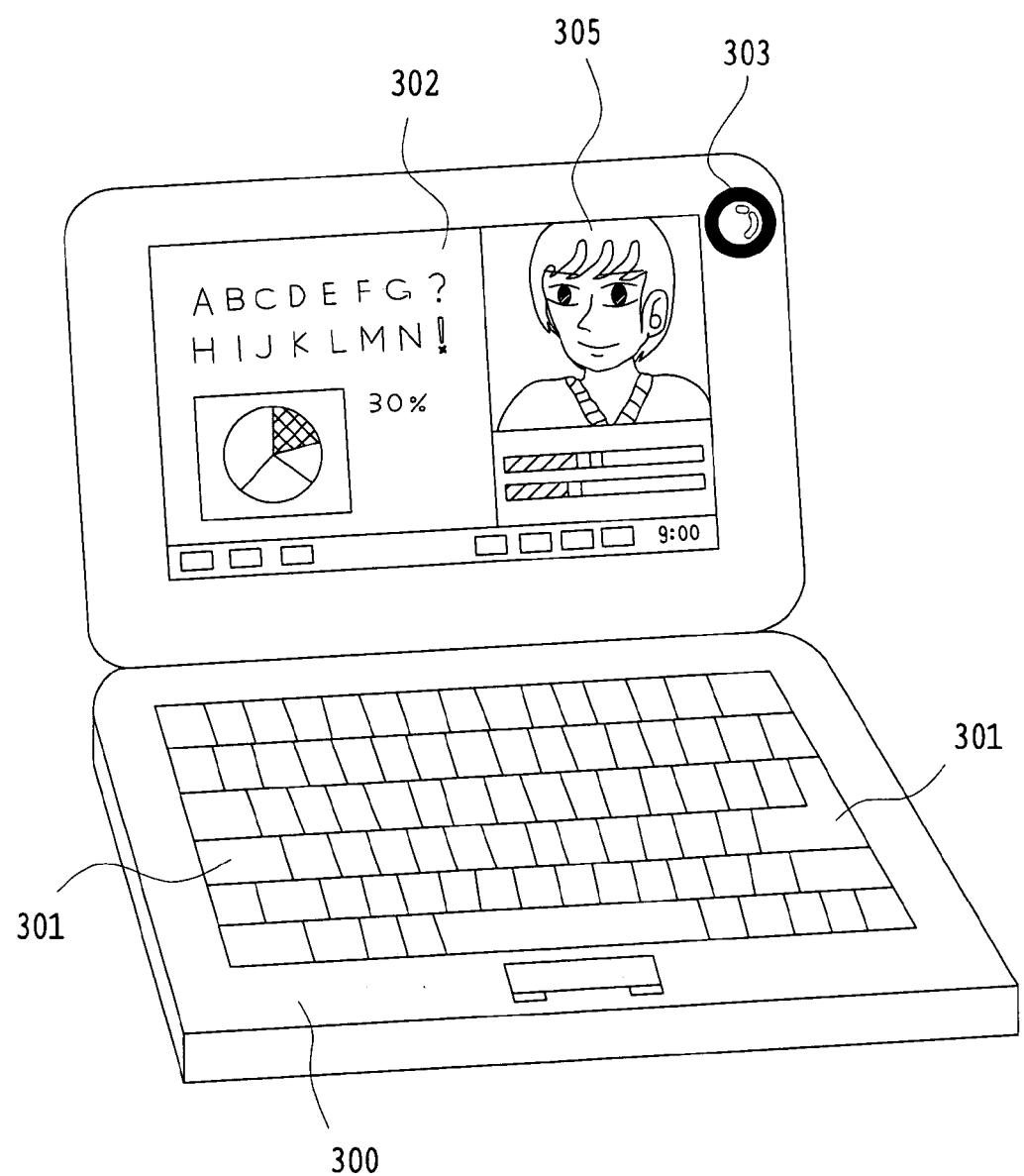
FIG. 63 is a perspective front view showing a personal computer in which the path bending zoom lens of the present invention is incorporated as an objective optical system.
Figure 64:
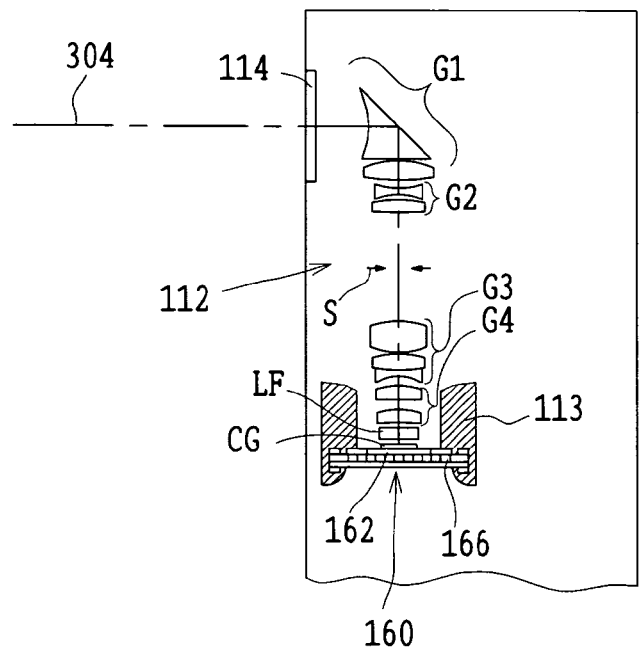
FIG. 64 is a sectional view showing the photographing optical system incorporated in the personal computer of FIG. 63.
Figure 65:
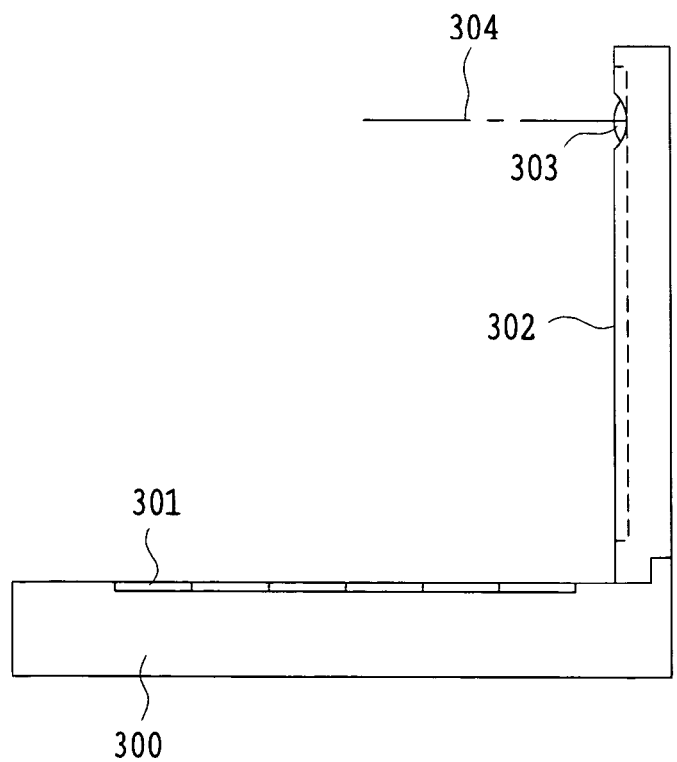
FIG. 65 is a side view showing the personal computer of FIG. 63.

As shown in FIGS. 63–65, a personal computer 300 has a keyboard 301, an information processing means or recording means, a monitor 302 displaying information, and a photographing optical system 303. The keyboard 301 is adapted to input information from the exterior by an operator. The photographing optical system 303 is adapted to photograph the operator himself or a surrounding object. Also, the information processing means or recording means is omitted from the figures.

Here, the monitor 302 may be a transmission-type liquid crystal display element, a reflection-type liquid crystal display element, or a CRT display. In the transmission-type liquid crystal display element, illumination is made with backlight from the back face. In the reflection-type liquid crystal display element, light from the front is reflected for display.

In these figures, the photographing optical system 303 is housed in the monitor 302 upper-right, but it may be located, not to speak of this place, on the periphery of the monitor 302 or the keyboard 301.

The photographing optical system 303 has an objective lens 112 an imaging element chip 162 receiving an image on a photographing optical path 304. The objective lens 112 is, for example, the path bending zoom lens of the first embodiment of the present invention. These are housed in the personal computer 300.

Here, the cover glass CG is additionally cemented to the chip 162. These are thus integrally constructed as an imaging unit 160, which is fitted into the rear end of a lens frame 113 of the objective lens 112 and can be mounted in a single operation. Therefore, the alignment of the objective lens 112 and the chip 162 and the adjustment of face-to-face spacing are not required, and assembly is simple. At the top (not shown) of the lens frame 113, a cover glass 114 is placed. The cover glass 114 is provided for the purposed of protecting the objective lens 112. Also, the driving mechanism of the zoom lens in the lens frame 113 is not shown in the figure.

An object image received by the chip 162 is input into the processing means of the personal computer 300 through a terminal 166. The object image is displayed as an electronic image on the monitor 302. In FIG. 63, a photographed image 305 of the operator himself is shown as an example. The image 305 can also be displayed on the personal computer of his communication mate from a remote place through the internet or the telephone.

FIGS. 66A–66C show a telephone which is an example of the information processor, notably a mobile phone which is handy to carry. The path bending zoom lens of the present invention is housed as the photographing optical system in the mobile phone.

A mobile phone 400, as shown in FIGS. 66A–66C, includes a microphone section 401, a speaker section 402, input dials 403, a monitor 404, a photographing optical system 405, an antenna 406, and a processing means (not shown). The microphone section 401 is adapted to input an operator's voice as information. The speaker section 402 is adapted to output the voice of a communication mate. The input dials 403 are provided for the purpose that an operator inputs information. The monitor 404 is to display information, such as photographing images of the operator himself and the communication mate, and telephone numbers. The antenna 406 is to transmit and receive electric waves for communication The processing means is to process image information, communication information, and an input signal.

The monitor 404 is a liquid crystal display element. In these figures, the arrangement of individual parts is not limited to the above description. The photographing optical system 405 has the objective lens 112 located on a photographing optical path 407 and the chip 162 receiving the object image. These are incorporated in the mobile phone 400. Here, as the objective lens 112, for example, the path bending zoom lens of the first embodiment is used., The cover glass CG is additionally cemented to the chip 162. These are integrally constructed as the imaging unit 160, which is fitted into the rear end of the lens frame 113 of the objective lens 112 and can be mounted in a single operation. Therefore, the alignment of the objective lens 112 and the chip 162 and the adjustment of face-to-face spacing are not required, and assembly is simple. At the top (not shown) of the lens frame 113, the cover glass 114 for protecting the objective lens 112 is placed. Also, the driving mechanism of the zoom lens in the lens frame 113 is not shown in the figure.

The object image received by the chip 162 is input into the processing means through the terminal 166 and is displayed as the electronic image on either the monitor 404 or the monitor of the communication mate, or both. Also, the processing means includes a signal processing function. By this signal processing function, the information of the object image received by the chip 162 is converted into a transmittable signal. The image can thus be transmitted to the communication mate.

What is claimed is:

1. A zoom lens comprising:
a lens unit located at a most object-side position; and
a moving lens unit with positive refracting power, located on an image side of the lens unit,
the lens unit including a single positive lens and the moving lens unit being simply moved toward an object side when a magnification of the zoom lens is changed in a range from a wide-angle position to a telephoto position so as to satisfy the following condition:

$$0.8 < y_{07}/(fw \cdot \tan \omega_{07w}) < 0.96$$

where fw is a focal length of an entire system of the zoom lens at the wide-angle position, $y_{07}$ is an image height expressed by $0.7 \times y_{10}$, where $y_{10}$ is a distance from a center to a point farthest therefrom on an effective imaging surface of an electronic image sensor, and $\omega_{07w}$ is an angle made by a direction of an object point with an optical axis, where the object point corresponds to an image point that is at the point $y_{07}$ away from the center on the effective imaging surface of the electronic image sensor at the wide angle position.

2. A zoom lens according to claim 1, further comprising an aperture stop interposed between the lens unit and the moving lens unit to satisfy the following condition:

$$0.4 < \log \gamma B/\log \gamma < 4.0$$

where $\gamma = fT/fw$ (where fT is a focal length of the entire system of the zoom lens at the telephoto position) and $\gamma B = $ a magnification of the moving lens unit at the telephoto position/a magnification of the moving lens unit at the wide-angle position.

3. A zoom lens according to claim 1, wherein the lens unit includes at least one cemented lens component of a positive lens and a negative lens, arranged in this order from the object side.

4. A zoom lens according to claim 1, wherein the lens unit includes at least one optical element with negative refracting power and the optical element has at least one aspherical surface.

5. A zoom lens according to claim 1, wherein the lens unit includes an optical element with negative refracting power at a most object-side position and satisfies the following condition:

$$-1.5 < (R11+R12)/(R11-R12) < 1.1$$

where R11 is a radius of curvature of an entrance surface of the optical element and R12 is a radius of curvature of an exit surface of the optical element.

6. A zoom lens according to claim 1, wherein the lens unit and the aperture stop are fixed when the magnification is changed.

7. A zoom lens according to claim 1, wherein the lens unit includes a reflecting optical element provided with a reflecting surface.

8. A zoom lens according to claim 7, wherein a most object-side surface of the reflecting optical element is concave.

9. A zoom lens according to claim 8, wherein the lens unit includes a positive lens, having positive refracting power as a whole.

10. A zoom lens according to claim 7, wherein an entrance surface of the reflecting optical element is configured as an aspherical surface that divergence is impaired progressively in going from the optical axis to a periphery.

11. A zoom lens according to claim 7, satisfying the following condition:

$$0.3 < d_F/d_P < 0.7$$

where $d_F$ is a distance from an intersection of a most object-side surface of the lens unit with the optical axis to an intersection of the reflecting surface with the optical axis and $d_P$ is a distance from an intersection of a most object-side refracting surface relative to the reflecting surface with the optical axis to an intersection of a most image-side refracting surface relative to the reflecting surface with the optical axis.

12. A zoom lens according to claim 1, having a lens unit with negative refracting power located adjacent to the lens unit, on the image side of the lens unit, wherein the lens unit with negative refracting power includes a negative lens and a positive lens.

13. A zoom lens according to claim 1, having a lens unit with negative refracting power located adjacent to the lens unit, on the image side of the lens unit, wherein an aperture stop is interposed between the lens unit with negative refracting power and the moving lens unit.

14. An electronic imaging apparatus comprising:
a zoom lens;
an electronic image sensor; and
an image processing unit,
the zoom lens comprising:
a lens unit located at a most object-side position; and
a moving lens unit with positive refracting power, located on an image side of the lens unit,
the lens unit including a single positive lens and the moving lens unit being simply moved toward an object side when a magnification of the zoom lens is changed in a range from a wide-angle position to a telephoto position so as to satisfy the following condition:

$$0.8 < y_{07}/(fw \cdot \tan \omega_{07w}) < 0.96$$

where fw is a focal length of an entire system of the zoom lens at the wide-angle position, $y_{07}$ is an image height expressed by $0.7 \times y_{10}$, where $y_{10}$ is a distance from a center to a point farthest therefrom on an effective imaging surface of an electronic image sensor, and $\omega_{07w}$ is an angle made by a direction of an object point with an optical axis, where the object point corresponds to an image point that is at the point $y_{07}$ away from the center on the effective imaging surface of the electronic image sensor at the wide angle position,
the image processing unit having steps that image data imaged by the electronic image sensor are electrically processed and contour thereof is changed.

15. A zoom lens comprising:
a first lens unit with positive refracting power, located at a most object-side position;
a second lens unit with negative refracting power, located on an image side of the first lens unit; and
a third lens unit with positive refracting power, located on the image side of the second lens unit,
wherein the first lens unit has a reflecting optical element having a reflecting surface for bending an optical path and two aspherical surfaces, and when a magnification of the zoom lens is changed in a range from a wide-angle position to a telephoto position, the second lens unit is moved and the third lens unit is simply moved toward an object side.

16. A zoom lens comprising:
a first lens unit with positive refracting power, located at a most object-side position;
a second lens unit with negative refracting power, located on an image side of the first lens unit; and
a third lens unit with positive refracting power, located on the image side of the second lens unit,
wherein the first lens unit and the second lens unit have four aspherical surfaces, and when a magnification of the zoom lens is changed in a range from a wide-angle position to a telephoto position, the second lens unit is moved and the third lens unit is simply moved toward an object side.

17. A zoom lens comprising:
a first lens unit with positive refracting power, located at a most object-side position;
a second lens unit with negative refracting power, located on an image side of the first lens unit; and
a third lens unit with positive refracting power, located on the image side of the second lens unit,
wherein each of the first lens unit and the second lens unit has two aspherical surfaces, and when a magnification of the zoom lens is changed in a range from a wide-angle position to a telephoto position, the second lens unit is moved and the third lens unit is simply moved toward an object side.

18. A zoom lens comprising:
a first lens unit with positive refracting power, located at a most object-side position;
a second lens unit with negative refracting power, located on an image side of the first lens unit; and
a third lens unit with positive refracting power, located on the image side of the second lens unit,
wherein the second lens unit and the third lens unit have four aspherical surfaces, and when a magnification of the zoom lens is changed in a range from a wide-angle position to a telephoto position, the second lens unit is moved and the third lens unit is simply moved toward an object side.

19. A zoom lens comprising:
a first lens unit with positive refracting power, located at a most object-side position;
a second lens unit with negative refracting power, located on an image side of the first lens unit; and
a third lens unit with positive refracting power, located on the image side of the second lens unit,
wherein each of the second lens unit and the third lens unit has two aspherical surfaces, and when a magnification of the zoom lens is changed in a range from a wide-angle position to a telephoto position, the second lens unit is moved and the third lens unit is simply moved toward an object side.

20. A zoom lens according to claim 15, wherein the first lens unit includes, in order from the object side along an optical path, an optical element of divergence and a positive lens.

21. A zoom lens according to claim 15, wherein the second lens unit includes, in order from the object side along an optical path, a biconcave lens and a positive lens.

22. A zoom lens according to claim 15, wherein the third lens unit includes, in order from the object side along an optical path, a single positive lens and a cemented lens component of a positive lens and a negative lens with a concave surface of strong power facing the image side.

23. A zoom lens according to claim 15, wherein a lens unit which is movable for focusing is placed on the image side of the third lens unit.

24. A zoom lens according to claim 15, wherein a most object-side lens unit is substantially fixed with respect to an image plane.

25. A zoom lens according to claim 20, wherein the first lens unit is substantially fixed with respect to an image plane, and the optical element is a prism having an entrance surface and an exit surface so that the entrance surface is configured as a concave surface that divergence is impaired progressively in going from an optical axis to a periphery.

26. A zoom lens according to claim 15, wherein an aperture stop fixed with respect to an image plane is interposed between the second lens unit and the third lens unit, and one prism and three or less single lenses are arranged on the object side of the aperture stop.

27. A zoom lens according to claim 15, wherein the second lens unit and the third lens unit are adjacent to each other, with an aperture stop between the second lens unit and the third lens unit, and satisfy the following condition:

$$0.50 < D3/D2 < 1.40$$

where D2 is a distance, measured along an optical axis, from a vertex of a most image-side surface of the second lens unit to the aperture stop at the wide-angle position and D3 is a distance, measured along the optical axis, from the aperture stop to the vertex of a most object-side surface of the third lens unit at the wide-angle position.

28. A zoom lens according to claim 15, satisfying the following condition:

$$0.75 < y_{07}/(fw \times \tan \omega_{07w}) < 0.96$$

where fw is a focal length of an entire system of the zoom lens at the wide-angle position, $y_{07}$ is an image height expressed by $0.7 \times y_{10}$, where $y_{10}$ is a distance from a center to a point farthest therefrom on an effective imaging surface of an electronic image sensor, and $\omega_{07w}$, is an angle made by a direction of an object point with an optical axis, where the object point corresponds to an image point that is at the point $y_{07}$ away from the center on the effective imaging surface of the electronic image sensor at the wide angle position.

29. A zoom lens according to claim 28, satisfying the following condition:

$$1.0 < fw/y_{10} < 2.1$$

30. An electronic imaging apparatus comprising:
a zoom lens;
an electronic image sensor; and
an image processing unit,
the zoom lens comprising:
a first lens unit with positive refracting power, located at a most object-side position;
a second lens unit with negative refracting power, located on an image side of the first lens unit; and
a third lens unit with positive refracting power, located on the image side of the second lens unit,
wherein the first lens unit has two aspherical surfaces, and when a magnification of the zoom lens is changed in a range from a wide-angle position to a telephoto position, the second lens unit is moved and the third lens unit is simply moved toward an object side,
the image processing unit having steps that image data imaged by the electronic image sensor are electrically processed and contour thereof is changed.

31. A zoom lens comprising:
a first lens unit with positive refracting power, located at a most object-side position;
a second lens unit with negative refracting power, located on an image side of the first lens unit; and a third lens unit with positive refracting power, located on the image side of the second lens unit, wherein the first lens unit has a reflecting surface, and when a magnification of the zoom lens is changed in a range from a wide-angle position to a telephoto position, the second lens unit is moved and the third lens unit is simply moved toward an object side to satisfy the following conditions:

$-1.0 \leq \beta 2W \leq -0.40$ $-1.0 \leq \beta 3W \leq -0.40$ where β2W is the magnification of the second lens unit at the wide-angle position and β3W is the magnification of the third lens unit at the wide-angle position.

32. A zoom lens according to claim 31, wherein an entrance surface of an optical element and one surface of a positive lens are configured as aspherical surfaces that curvature is moderated progressively in going from an optical axis to a periphery.

33. A zoom lens according to claim 31, wherein a negative lens of the second lens unit and a positive lens of the third lens unit have aspherical surfaces.

34. An electronic imaging apparatus comprising:
a zoom lens;
an electronic image sensor; and
an image processing unit, the zoom lens comprising:
the zoom lens comprising:
a first lens unit with positive refracting power, located at a most object-side position;
a second lens unit with negative refracting power, located on an image side of the first lens unit; and
a third lens unit with positive refracting power, located on the image side of the second lens unit, wherein the first lens unit has a reflecting surface, and when a magnification of the zoom lens is changed in a range from a wide-angle position to a telephoto position, the second lens unit is moved and the third lens unit is simply moved toward an object side to satisfy the following conditions:

$-1.0 \leq \beta 2W \leq -0.40$ $-1.0 \leq \beta 3W \leq -0.40$ where β2W is the magnification of the second lens unit at the wide-angle position and β3W is the magnification of the third lens unit at the wide-angle position.

the image processing unit having steps that image data imaged by the electronic image sensor are electrically processed and contour thereof is changed.

\* \* \* \* \*

UNITED STATES PATENT AND TRADEMARK OFFICE
CERTIFICATE OF CORRECTION

PATENT NO. : 6,995,922 B2
APPLICATION NO. : 10/750798
DATED : February 7, 2006
INVENTOR(S) : Mihara et al.

It is certified that error appears in the above-identified patent and that said Letters Patent is hereby corrected as shown below:

| Column | Line | |
|---|---|---|
| 16 | 37 | Change "0.8<y" to -- 0.88<y --; |
| 18 | 27 | Change "-0.5<(R11..." to -- -1.5<(R11... --; |
| 23 | 44 | Change "...<0.5a" to -- ...<0.15a --; |
| 88 | 55 | Change "unit has two" to -- unit has a reflecting optical element having a reflecting surface for bending an optical path and two --. |

Signed and Sealed this

Nineteenth Day of September, 2006

JON W. DUDAS
*Director of the United States Patent and Trademark Office*